United States Patent
Benkley, III et al.

(10) Patent No.: US 11,250,307 B2
(45) Date of Patent: Feb. 15, 2022

(54) SECURE, REMOTE BIOMETRIC ENROLLMENT

(71) Applicant: IDEX Biometrics ASA, Oslo (NO)

(72) Inventors: Fred G. Benkley, III, Middleton, MA (US); Peter Joseph Commerford, Londonderry, NH (US); Jeffrey Joseph Buxton, North Andover, MA (US); Anne L. Mcaleer, Impington (GB)

(73) Assignee: IDEX Biometrics ASA, Oslo (NO)

( * ) Notice: Subject to any disclaimer, the term of this patent is extended or adjusted under 35 U.S.C. 154(b) by 0 days.

(21) Appl. No.: 16/900,233

(22) Filed: Jun. 12, 2020

(65) Prior Publication Data

US 2020/0311509 A1 Oct. 1, 2020

Related U.S. Application Data

(63) Continuation-in-part of application No. 16/216,229, filed on Dec. 11, 2018, now Pat. No. 10,775,906, and
(Continued)

(51) Int. Cl.
*G06K 5/00* (2006.01)
*G06K 19/073* (2006.01)
(Continued)

(52) U.S. Cl.
CPC ....... *G06K 19/07354* (2013.01); *G06F 21/32* (2013.01); *G06F 21/45* (2013.01);
(Continued)

(58) Field of Classification Search
CPC ......... G06K 19/07354; G06K 9/00919; G06K 9/0002; G06K 9/00926; G06K 19/0707;
(Continued)

(56) References Cited

U.S. PATENT DOCUMENTS 5,864,296 A 1/1999 Upton
6,256,022 B1 7/2001 Manaresi et al.
(Continued)

FOREIGN PATENT DOCUMENTS

CN 106104604 A 11/2016
EP 0 883 079 A2 12/1998
(Continued)

OTHER PUBLICATIONS

Examination Report dated Jan. 28, 2021 in related European Patent Application No. 18 163 490.8 (10 pages).
(Continued)

*Primary Examiner* — Tuyen K Vo
(74) *Attorney, Agent, or Firm* — Rothwell, Figg, Ernst & Manbeck, P.C.

(57) ABSTRACT

Devices, systems, and methods facilitate enrollment of authenticating biometric data for authenticating an authorized user via a biometric sensor. A data input device and a power source are operatively coupled to a smart card including a fingerprint sensor. An activation code input by the user interacting with the data input device is compared with a predefined activation code, and if the detected activation code matches the predefined activation code, a fingerprint template is enrolled from fingerprint data received from the fingerprint sensor, all without transmitting data from either the power source or the data input device to any device other than the smart card.

16 Claims, 73 Drawing Sheets

Related U.S. Application Data a continuation-in-part of application No. 16/222,388, filed on Dec. 17, 2018, now Pat. No. 10,769,512, which is a continuation of application No. 15/921,297, filed on Mar. 14, 2018, now Pat. No. 10,282,651.

(60) Provisional application No. 62/767,338, filed on Nov. 14, 2018, provisional application No. 62/627,398, filed on Feb. 7, 2018, provisional application No. 62/597,674, filed on Dec. 12, 2017, provisional application No. 62/580,171, filed on Nov. 1, 2017, provisional application No. 62/525,475, filed on Jun. 27, 2017, provisional application No. 62/475,550, filed on Mar. 23, 2017.

(51) Int. Cl.
  *G06F 21/32* (2013.01)
  *G06F 21/45* (2013.01)
  *G06K 9/00* (2022.01)
  *G06K 19/07* (2006.01)

(52) U.S. Cl.
  CPC ....... *G06K 9/0002* (2013.01); *G06K 9/00919* (2013.01); *G06K 9/00926* (2013.01); *G06K 19/0707* (2013.01)

(58) Field of Classification Search
  CPC .......... G06F 21/32; G06F 21/45; G06F 21/35; G06F 21/42; G06F 2221/2117; G06Q 20/356; G06Q 20/3276; G06Q 20/40145
  USPC ................................. 235/451, 492
  See application file for complete search history.

(56) References Cited

U.S. PATENT DOCUMENTS

| | | | |
|---|---|---|---|
| 6,392,636 B1 | 5/2002 | Ferrari et al. | |
| 6,719,200 B1 | 4/2004 | Wiebe | |
| 6,983,882 B2 | 1/2006 | Cassone | |
| 7,110,577 B1 | 9/2006 | Tschudi | |
| 7,129,926 B2 | 10/2006 | Mathiassen et al. | |
| 7,308,121 B2 | 12/2007 | Mathiassen et al. | |
| 7,389,269 B1 | 6/2008 | Robinson et al. | |
| 7,543,156 B2 | 6/2009 | Campisi | |
| 7,751,601 B2 | 7/2010 | Benkley, III | |
| 8,005,275 B2 | 8/2011 | Mathiassen et al. | |
| 8,421,890 B2 | 4/2013 | Benkley, III | |
| 8,866,347 B2 | 10/2014 | Benkley, III | |
| 9,122,901 B2 | 9/2015 | Sløgedal et al. | |
| 9,152,842 B2 | 10/2015 | Vieta et al. | |
| 9,223,955 B2 | 12/2015 | Lymberopoulos et al. | |
| 9,607,189 B2 | 3/2017 | Gardiner et al. | |
| 9,684,813 B2 | 6/2017 | Clausen | |
| 9,715,616 B2 | 7/2017 | Han et al. | |
| 9,779,280 B2 | 10/2017 | Benkley, III | |
| 10,248,900 B2 | 4/2019 | Benkley, III et al. | |
| 10,282,651 B2 | 5/2019 | Benkley, III et al. | |
| 10,546,223 B2 | 1/2020 | Benkley, III et al. | |
| 2002/0060243 A1 | 5/2002 | Janiak et al. | |
| 2002/0089410 A1 | 7/2002 | Janiak et al. | |
| 2002/0097142 A1 | 7/2002 | Janiak et al. | |
| 2002/0163506 A1 | 11/2002 | Matusis | |
| 2004/0081860 A1 | 4/2004 | Hundt et al. | |
| 2004/0085300 A1 | 5/2004 | Matusis | |
| 2005/0035200 A1 | 2/2005 | Hendrick | |
| 2005/0066071 A1 | 3/2005 | Cohen et al. | |
| 2005/0139685 A1 | 6/2005 | Kozlay | |
| 2005/0207624 A1 | 9/2005 | Ehlers et al. | |
| 2006/0001137 A1 | 1/2006 | Hundt et al. | |
| 2006/0093192 A1 | 5/2006 | Bechtel | |
| 2006/0213928 A1 | 9/2006 | Cannon et al. | |
| 2007/0131759 A1 | 6/2007 | Cox et al. | |
| 2007/0220273 A1 | 9/2007 | Campisi | |
| 2008/0126260 A1 | 5/2008 | Cox et al. | |
| 2008/0223925 A1 | 9/2008 | Saito et al. | |
| 2008/0223937 A1 | 9/2008 | Preta et al. | |
| 2009/0037623 A1 | 2/2009 | Ghassabian | |
| 2009/0080709 A1 | 3/2009 | Rowe et al. | |
| 2009/0153297 A1 | 6/2009 | Gardner | |
| 2009/0201128 A1 | 8/2009 | Campis | |
| 2009/0303061 A1 | 12/2009 | Greenlee et al. | |
| 2011/0317886 A1 | 12/2011 | Matsuoka | |
| 2012/0313754 A1 | 12/2012 | Bona | |
| 2014/0003681 A1 | 1/2014 | Wright et al. | |
| 2014/0300574 A1 | 10/2014 | Benkley, III et al. | |
| 2014/0354597 A1 | 12/2014 | Kitchens, II et al. | |
| 2014/0356694 A1 | 12/2014 | Yoon et al. | |
| 2015/0010717 A1 | 1/2015 | Nieh et al. | |
| 2015/0054749 A1 | 2/2015 | Zimchoni et al. | |
| 2015/0133193 A1 | 5/2015 | Stotler | |
| 2015/0206148 A1 | 7/2015 | Cherry et al. | |
| 2015/0378176 A1 | 12/2015 | Flitsch et al. | |
| 2016/0217312 A1 | 7/2016 | Gardiner et al. | |
| 2016/0267486 A1 | 9/2016 | Mitra et al. | |
| 2017/0018816 A1 | 1/2017 | Na et al. | |
| 2017/0308228 A1 | 10/2017 | Benkley, III et al. | |
| 2017/0366351 A1 | 12/2017 | Khullar et al. | |
| 2018/0082049 A1 | 3/2018 | Olofsson et al. | |
| 2018/0144173 A1 | 5/2018 | Bauchspies | |
| 2018/0165676 A1* | 6/2018 | Bhatt .................. G06F 16/955 |
| 2018/0276449 A1 | 9/2018 | Pope et al. | |
| 2020/0013032 A1 | 1/2020 | Moskowitz et al. | |
| 2020/0050911 A1 | 2/2020 | Prawitz et al. | |

FOREIGN PATENT DOCUMENTS

| | | |
|---|---|---|
| EP | 1 471 458 A2 | 10/2004 |
| EP | 1 589 491 A2 | 10/2005 |
| EP | 1 812 890 A2 | 8/2007 |
| EP | 3382599 A2 | 10/2018 |
| GB | 2 507 540 A | 5/2014 |
| GB | 2517775 A | 3/2015 |
| GB | 2531095 A | 4/2016 |
| KR | 10-0750315 B1 | 8/2007 |
| TW | 200611203 A | 4/2006 |
| WO | 2003/049016 A2 | 6/2003 |
| WO | 2003/049104 A1 | 6/2003 |
| WO | 2003/056524 A1 | 7/2003 |
| WO | 2004/025545 A2 | 3/2004 |
| WO | 2006/050513 A2 | 5/2006 |
| WO | 2010/022129 A1 | 2/2010 |
| WO | 2013/073797 A1 | 5/2013 |
| WO | 2016/133602 A1 | 8/2016 |
| WO | 2016/135437 A2 | 9/2016 |
| WO | 2019/164851 A1 | 8/2019 |
| WO | 2019/219575 A1 | 11/2019 |
| WO | 2020/013931 A1 | 1/2020 |

OTHER PUBLICATIONS

Australian Examination Report No. 2 dated Sep. 25, 2018 issued in Australian Application No. 2018201939. (3 pages).
Davide Maltoni et al., "Section 9.6: Building a Closed Fingerprint System" in: "Handbook of Fingerprint Recognition", 2009, Springer, London, GB, ISBN: 978-1-84882-253-5, pp. 391-398.
Partial European Search Report issued for European Patent Application No. 18163490.8 dated Aug. 21, 2018, 16 pages.
International Search Report and Written Opinion dated Aug. 31, 2018 issued in International Application No. PCT/IB2018/051953. (28 pages).
Invitation to Pay Additional Fees, Partial international Search Results, and Provisional Opinion dated Jun. 27, 2018 issued in International Patent Application No. PCT/IB2018/051953. (17 pages).
Australian Patent Examination Report No. 1 dated May 15, 2018 issued in Australian Patent Application No. 2018201939. (13 pages).
Combined Search and Examination Report dated Jul. 9, 2018 issued in British Patent Application No. GB1806688.6. (7 pages).
Non-Final Office Action dated Oct. 11, 2018 issued in U.S. Appl. No. 15/928,966. (15 pages).

(56) References Cited

OTHER PUBLICATIONS

Notice of Allowance dated Dec. 28, 2018 issued in U.S. Appl. No. 15/921,297. (17 pages).
Notice of Allowance dated Dec. 28, 2018 issued in U.S. Appl. No. 15/928,966. (13 pages).
European Search Report dated Jan. 2, 2019 issued in European Application No. 18163490.8. (10 pages).
European Communication pursuant to Article 94(3) EPC dated Jan. 11, 2019 issued in European Application No. 18163490.8 (12 pages).
Maltoni, D. et al., "Chapter 1: Introduction", Handbook of Fingerprint Recognition (2009). (56 pages).
Maltoni, D. et al., "Excerpt from Chapter 7: Biometric Fusion", Handbook of Fingerprint Recognition (2009). (2 pages).
Non-Final Office Action dated Oct. 16, 2018 issued in U.S. Appl. No. 15/921,297. (10 pages).
Communication pursuant to Article 94(3) EPC dated Mar. 19, 2020 issued in European Patent Application No. 18163490.8. (13 pages).
Examination report No. 1 for standard patent application dated Mar. 24, 2020 issued in Australian Patent Application No. 2019203927. (3 pages).
International Preliminary Report on Patentability (IPRP) dated Apr. 29, 2020 issued in International Application No. PCT/IB2018/059887. (44 pages).
Notice of Allowance dated Apr. 22, 2020 issued in U.S. Appl. No. 16/222,388. (8 pages).
Notice of Acceptance dated May 18, 2020 issued in Australian Patent Application No. 2019203927. (3 pages).
Written Opinion of the International Preliminary Examining Authority dated Feb. 3, 2020 issued in International application No. PCT/IB2018/059887. (13 pages).
Third Party Observation dated Jun. 12, 2019 issued in EP Application No. 18163490.8. (3 pages).
Combined Search and Examination Report dated Jun. 18, 2019 issued in GB Application No. GB1820627.6. (7 pages).
Notice of Allowance dated Sep. 11, 2019 issued in U.S. Appl. No. 16/174,763. (42 pages).
International Preliminary Report on Patentability dated Sep. 24, 2019 issued in International Application No. PCT/IB2018/051953. (19 pages).
International Search Report and Written Opinion dated Apr. 16, 2019 issued in International Application No. PCT/IB2018/059887. (17 pages).
Examination Report dated May 13, 2019 issued in GB application No. 1806688.6. (4 pages).
Non-Final Office Action dated Nov. 6, 2019 issued in U.S. Appl. No. 16/216,229. (14 pages).
Non-Final Office Action dated Nov. 22, 2019 issued in U.S. Appl. No. 16/222,388. (11 pages).
Notice of Allowance dated Apr. 1, 2020 issued in U.S. Appl. No. 16/216,229. (7 pages).
Examination Report dated Sep. 24, 2021 in Indian Patent Application No. 201937039841 (10 pages total).

\* cited by examiner

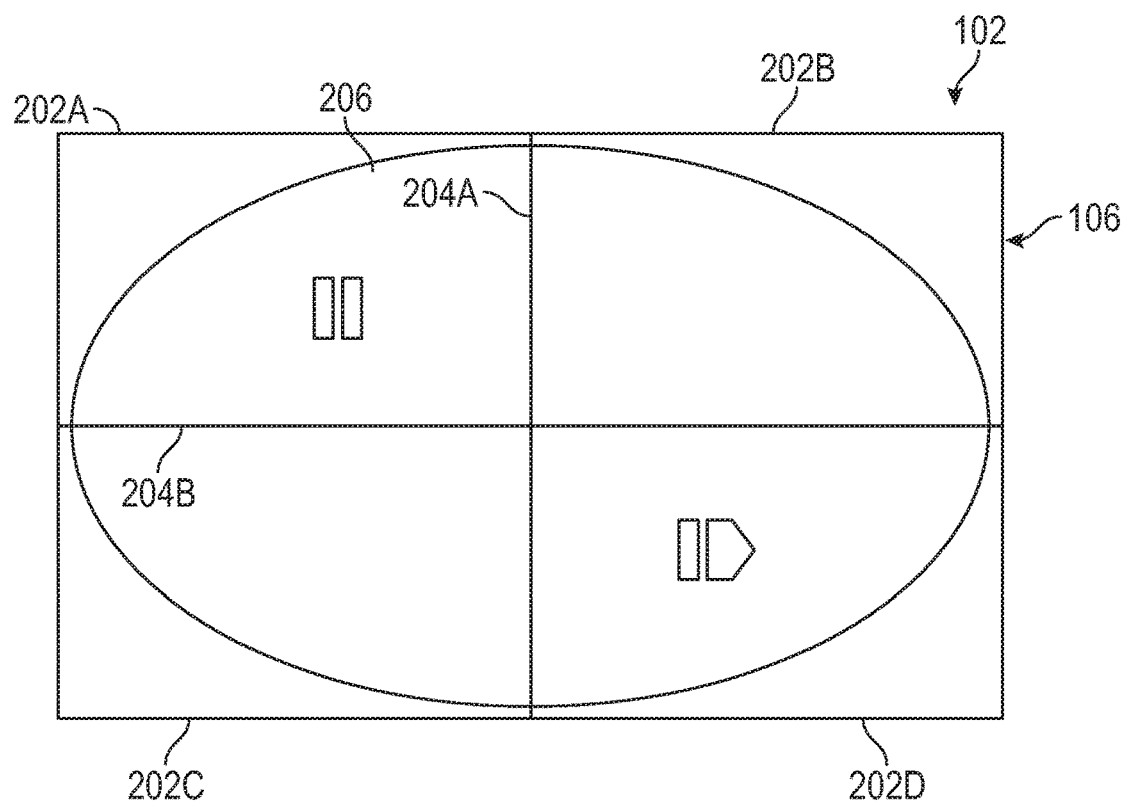
FIG. 2B
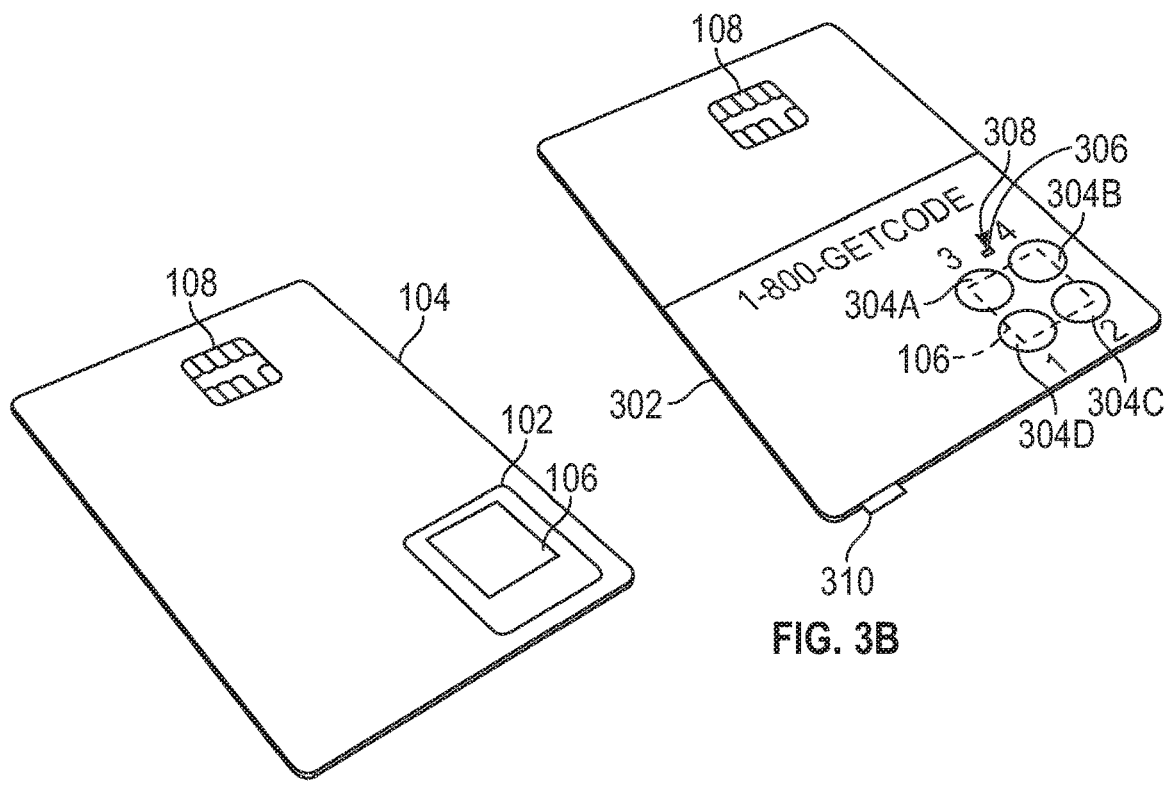
FIG. 3A
FIG. 3B

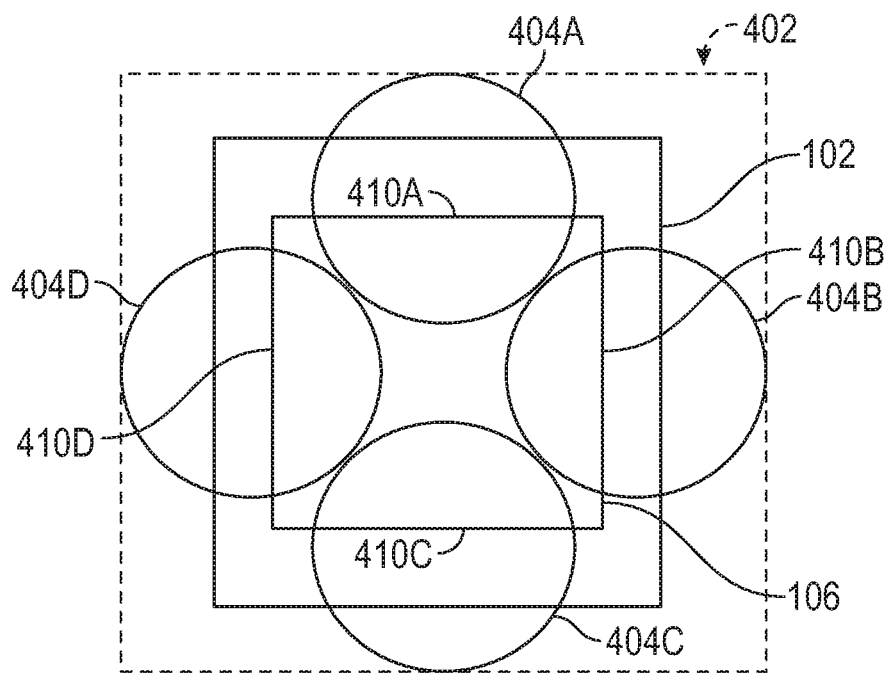
FIG. 4C
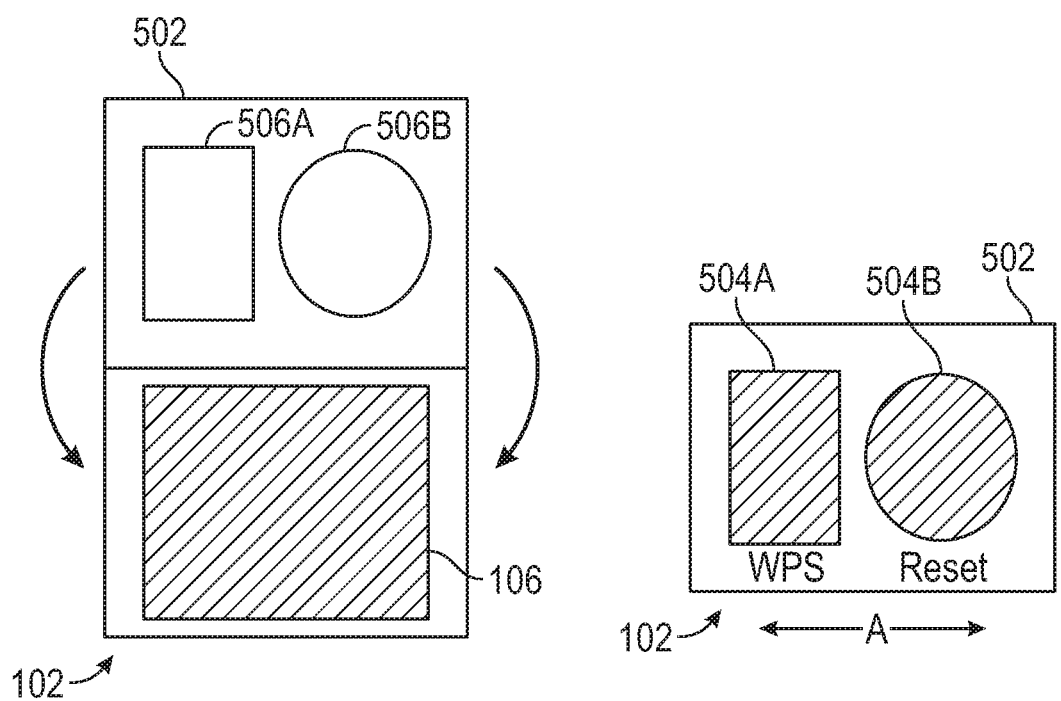
FIG. 5A  FIG. 5B

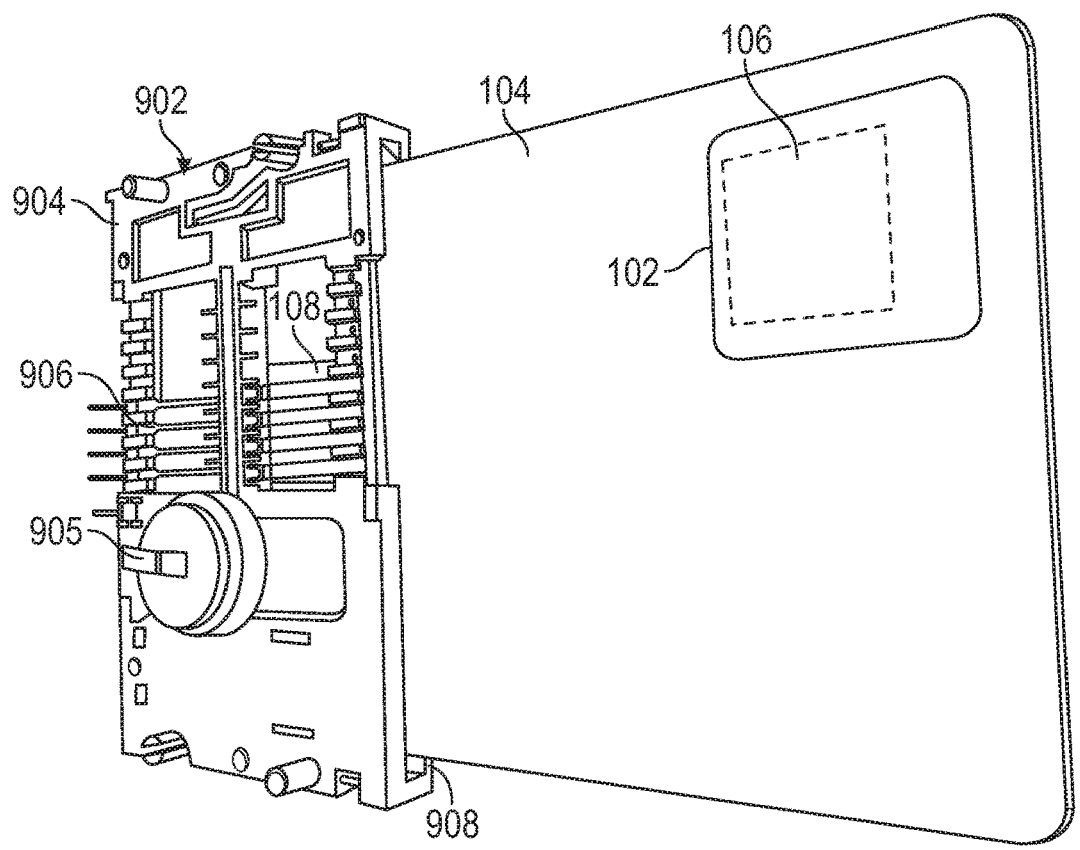
FIG. 9A
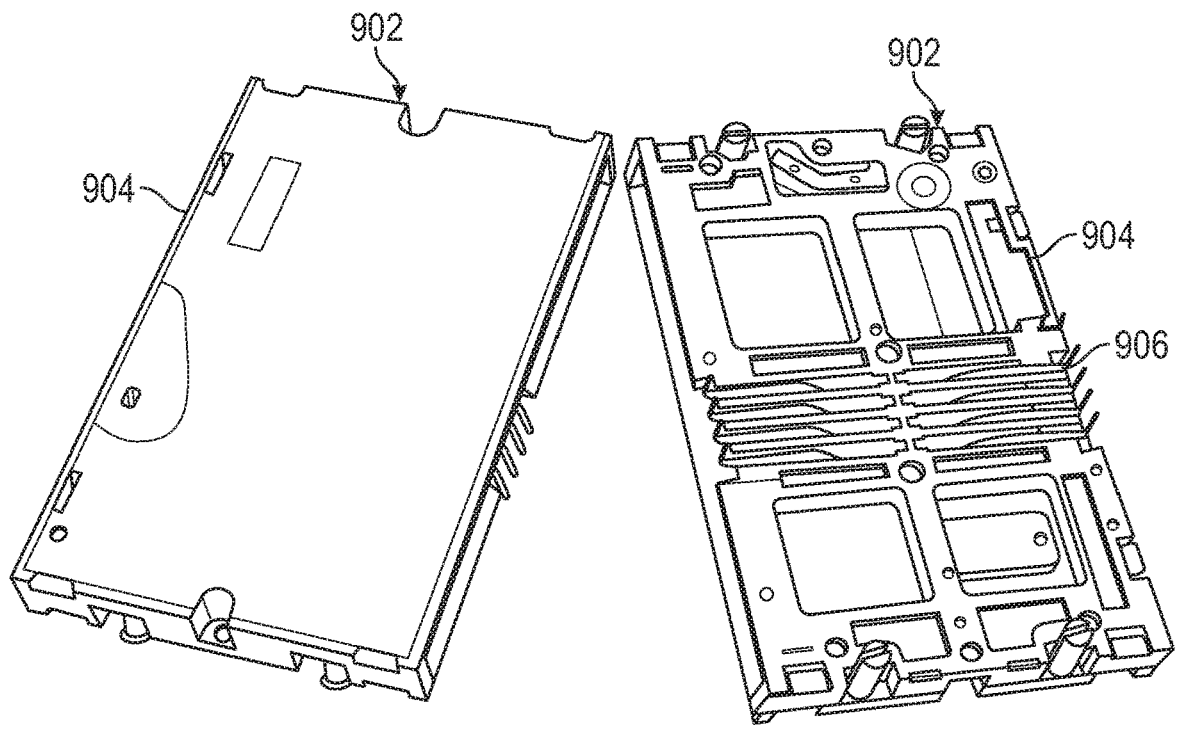
FIG. 9B
FIG. 9C

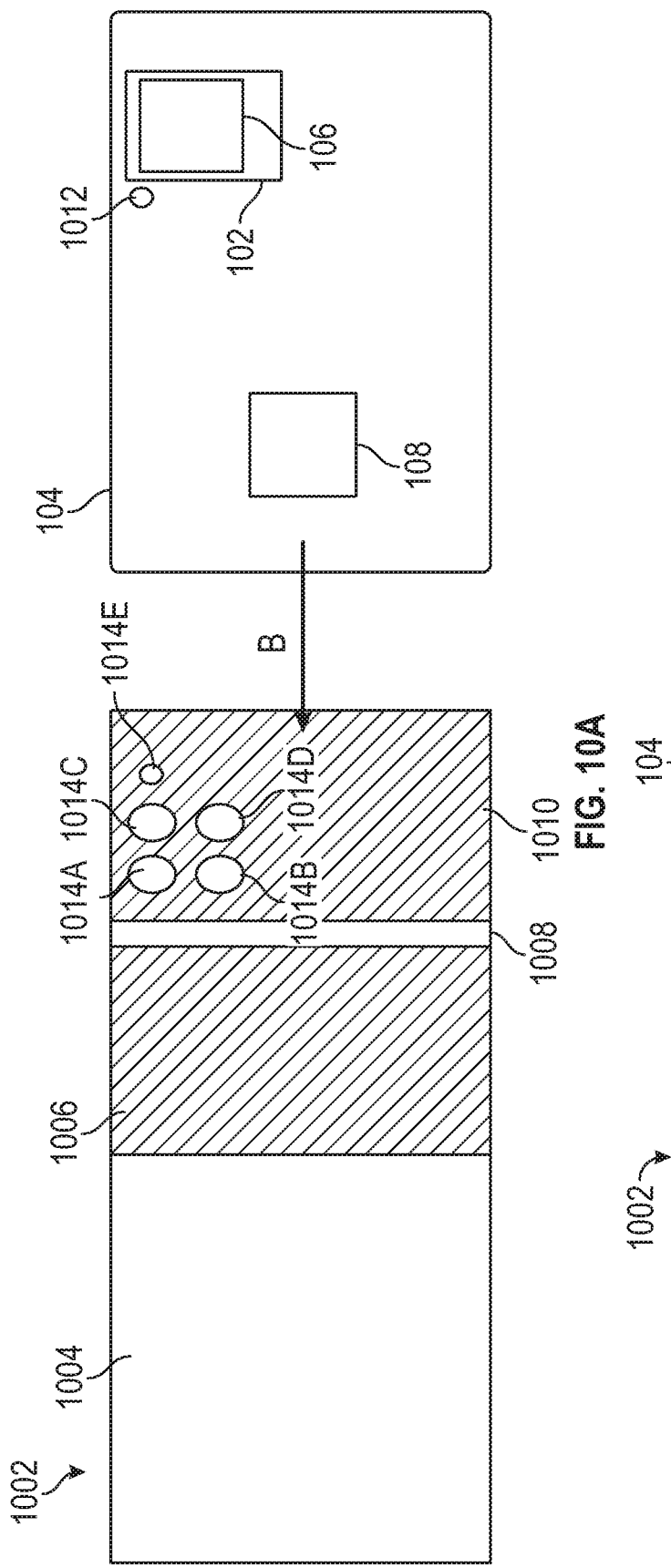
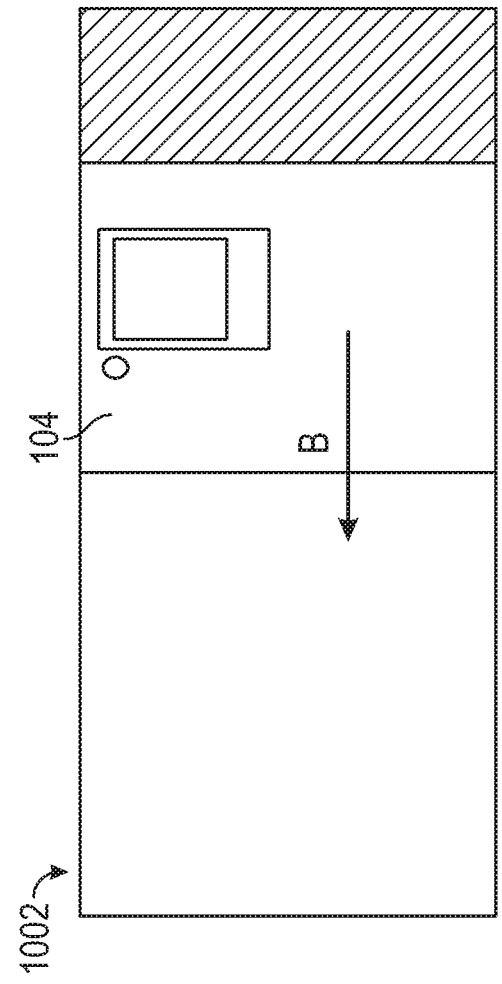
FIG. 10A
FIG. 10B

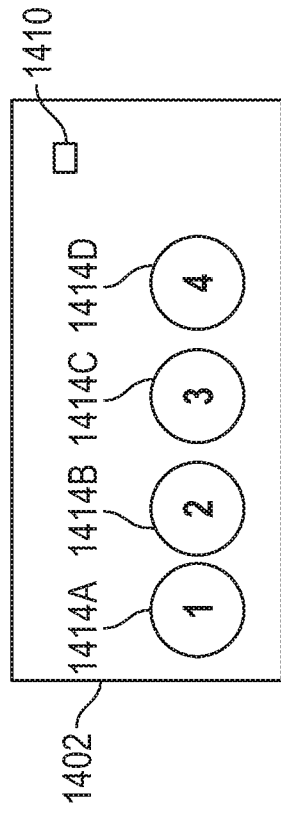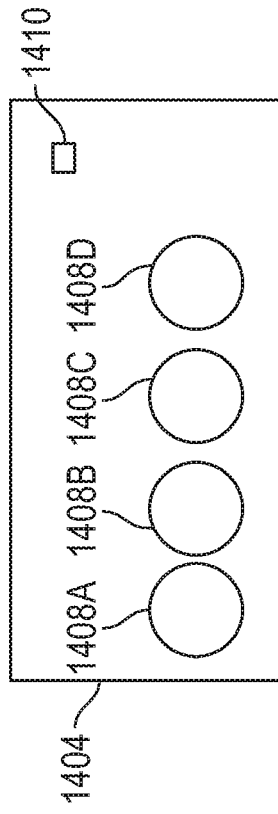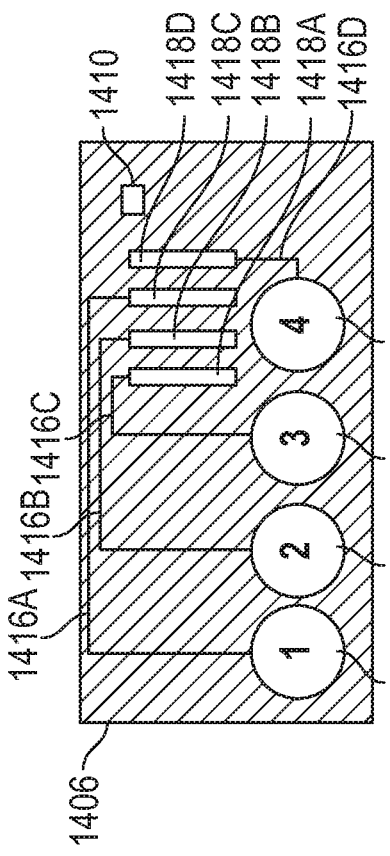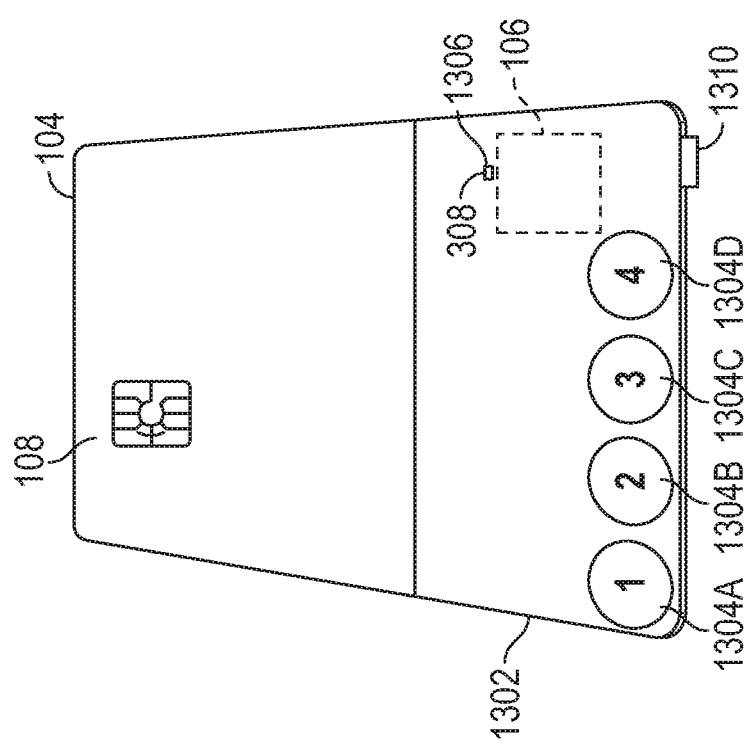

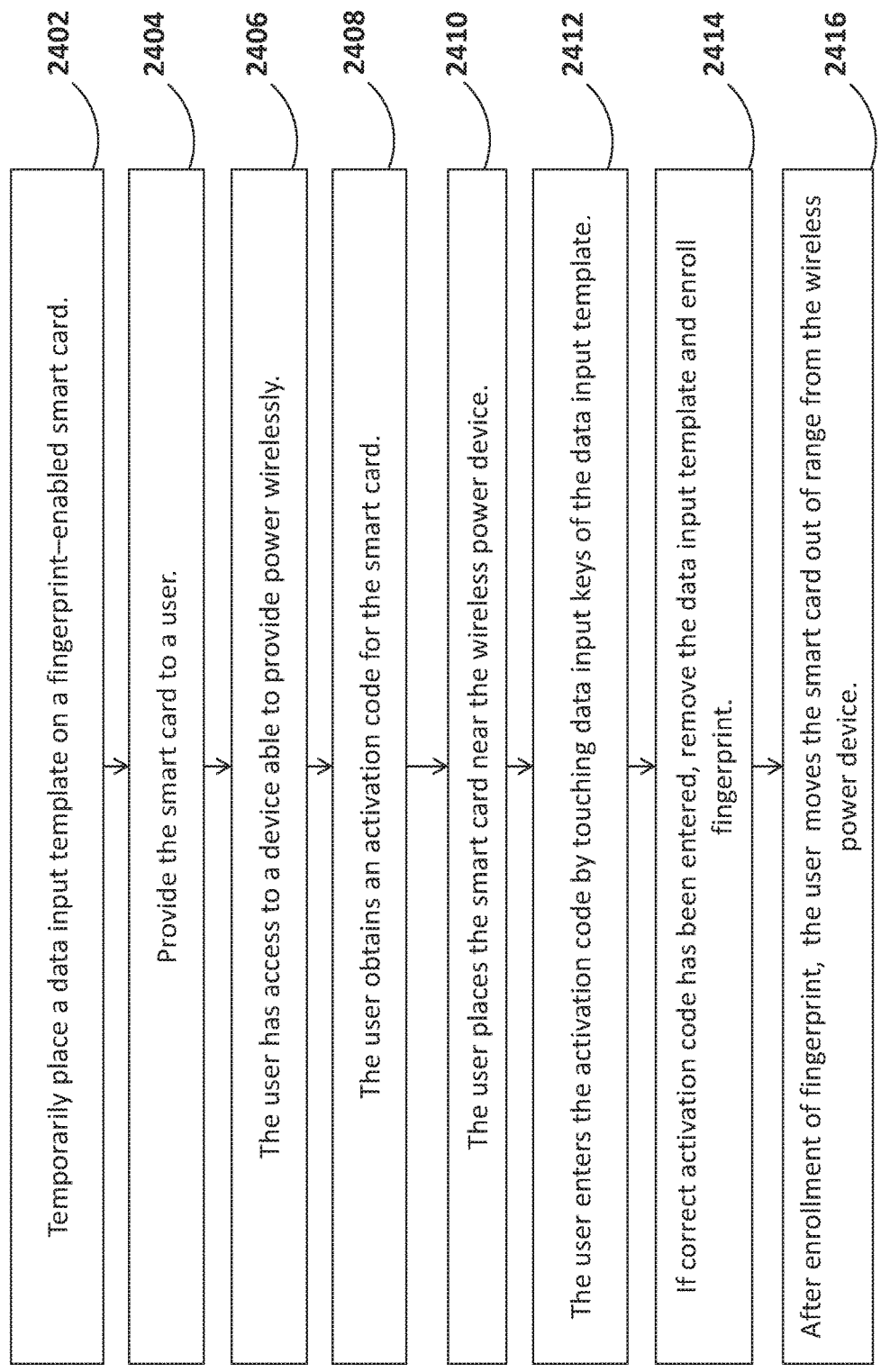

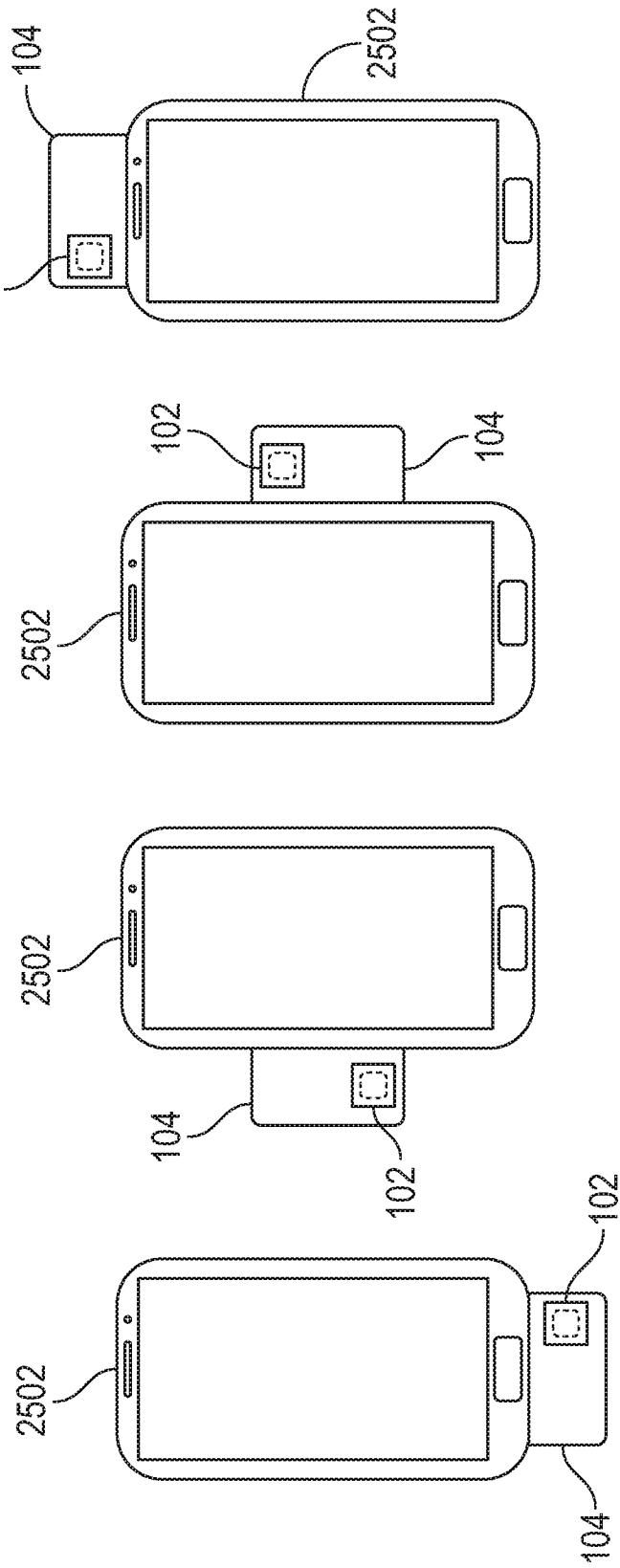

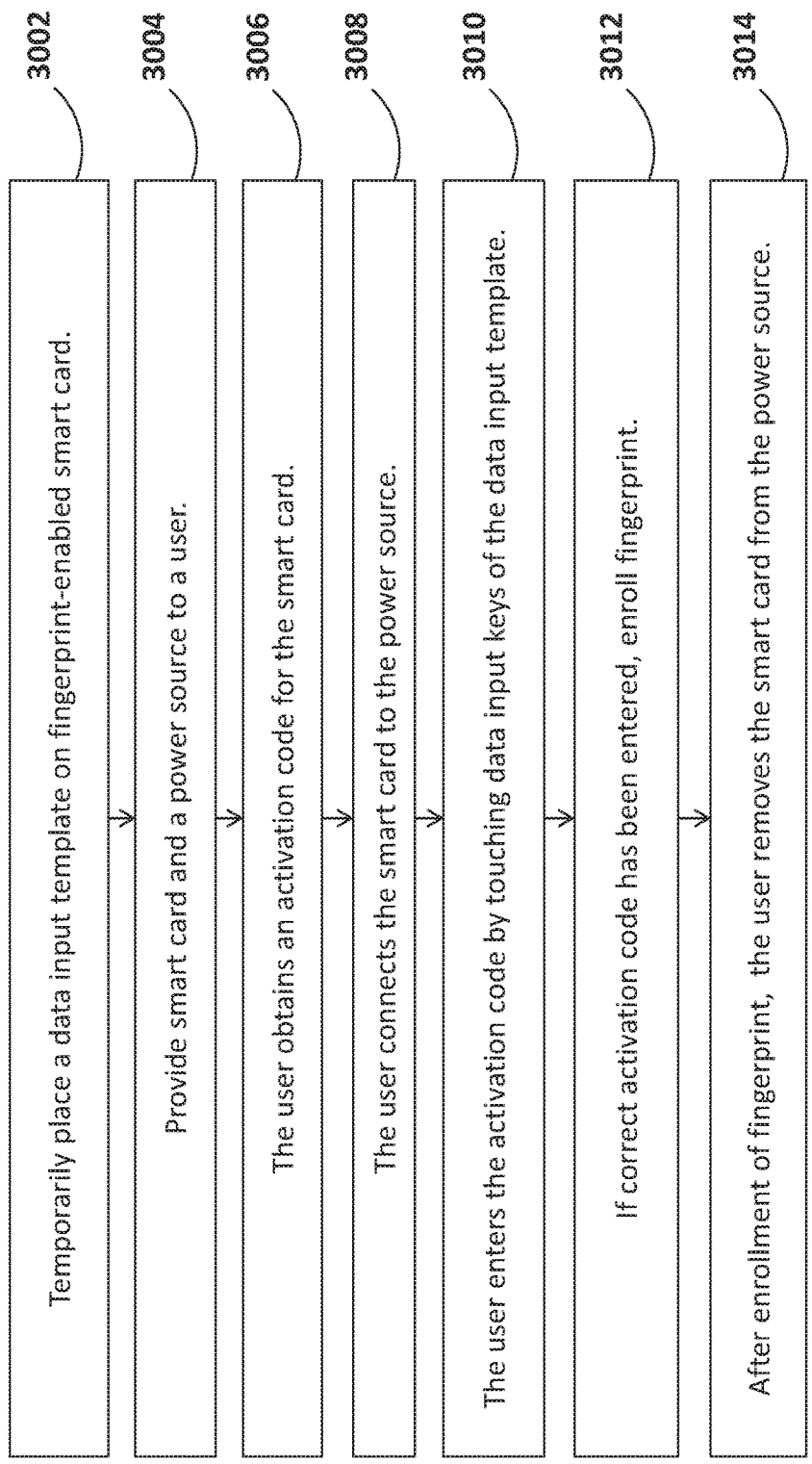

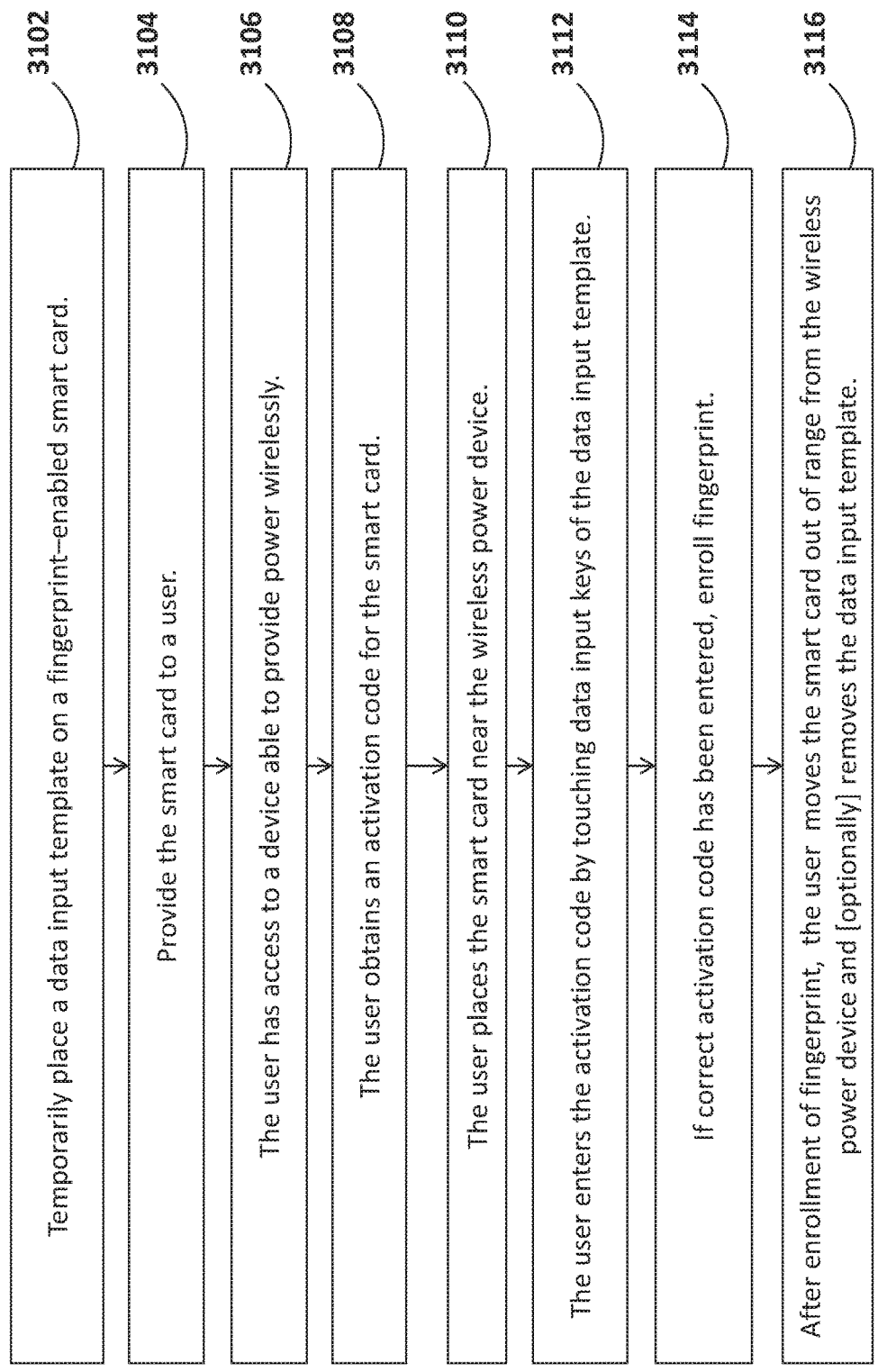

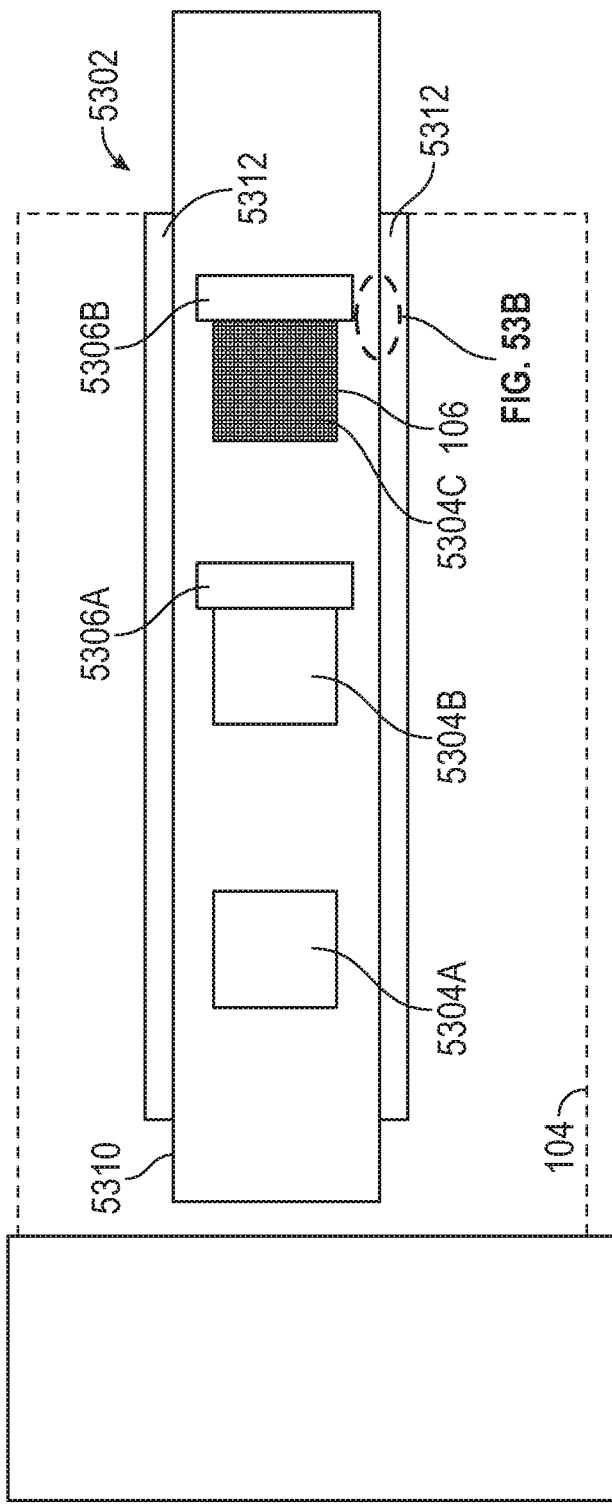
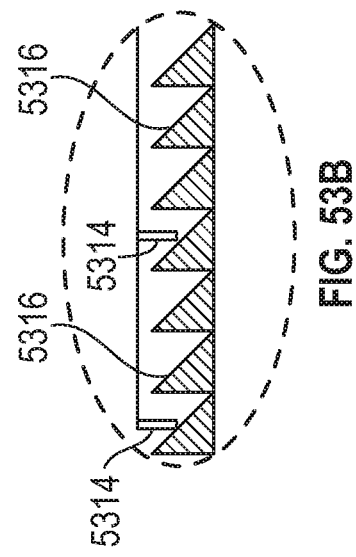
FIG. 53A
FIG. 53B

| Enrolment State | Card Green | 'A' | 'B' | Duration | Comment |
|---|---|---|---|---|---|
| 1. Waiting for 1st finger + 1st sample position A | OFF | Slow blink | OFF | Repeat flashing until finger is detected | Positive feedback that Card was inserted correctly |
| 2. 1st finger + 1st sample capturing and image processing | OFF | Fast blink | OFF | Repeat until image processed | Processing stage indicator/fast flashing |
| 3. Good enrollment 1st finger + 1st sample + remove finger | OFF | OFF | Slow blink | Wait until finger is lifted, plus 100msec debounce | Prompt user to lift finger and reposition |
| 4. Wait for 1st finger + 1st sample at position B | OFF | OFF | Slow blink | Repeat flashing until finger detected again | Continue position prompt prompt until finger detected again |
| 5. 1st finger + 2nd sample capturing and image processing | OFF | OFF | Fast blink | Repeat until image processed | Processing stage indicator/fast flashing |
| 6. Good enrollment of 1st finger + 2nd sample + remove finger | OFF | Slow blink | OFF | Wait until finger is lifted, plus 100msec debounce | Prompt user to lift finger and reposition (skip when last finger is collected) |
| 7-18: Repeat Steps 1-6 TWICE | | | | | Collect second touch at both positions |
| 19. Enrollment complete | ON | OFF | OFF | Solid ON for 10 second, then OFF to conserve battery | Indicate finger is enrolled |

FIG. 69

| State | Left | Right | 'A' | 'B' | Duration | Comment |
|---|---|---|---|---|---|---|
| 1. Waiting for 1st finger + 1st sample position A | OFF | ON | Blink | OFF | Repeat flashing until finger is detected | Positive feedback that Card was inserted correctly |
| 2. 1st finger + 1st sample capturing and image processing | OFF | ON | Blink | OFF | Repeat until image processed | Processing stage indicator/fast flashing |
| 3. Good enrollment 1st finger + 1st sample + remove finger | OFF | OFF | ON | OFF | Solid 'A' for 4 seconds then dark until finger is lifted | Positive feedback of completed enrollment, remove finger |
| 4. Wait for 1st finger + 1st sample at position B | OFF | ON | OFF | Blink | Repeat flashing until finger is detected | Positive feedback that finger is found |
| 5. 1st finger + 2nd sample capturing and image processing | OFF | ON | OFF | Blink | Repeat until image processed | Processing stage indicator/fast flashing |
| 6. Good enrollment of 1st finger + 2nd sample + remove finger | OFF | OFF | OFF | ON | Solid 'B' for 4 seconds, then dark until finger is lifted | Enrollment is complete 1st position |
| 7-18: Repeat Steps 1-6 TWICE | | | | | | Collect second touch at both positions |
| 19. Waiting for 2nd finger + 1st sample position A | ON | OFF | Blink | OFF | Repeat flashing until finger is detected | Positive feedback that position has changed |
| 20. 2nd finger + 1st sample capturing and image processing | ON | OFF | Blink | Off | Repeat until image processed | Positive feedback that position has changed |
| 21. Good enrollment 2nd finger + 1st sample + remove finger | OFF | OFF | ON | OFF | Solid 'B' for 4 seconds then dark until finger is lifted | Positive feedback 1st finger enrollment is complete |
| 22. Wait for 1st finger + 1st sample Move thumb to position B | ON | OFF | OFF | Blink | Repeat flashing until finger is detected | Positive feedback that finger is found |
| 23. 1st finger + 2nd sample capturing and image processing | ON | OFF | OFF | Blink | Repeat until image processed | Processing stage indicator/fast flashing |
| 24. Good enrollment of 1st finger + 2nd sample + remove finger | OFF | OFF | OFF | ON | Solid 'B' for 4 seconds, then dark until finger is lifted | Enrollment is complete 1st position |
| 25-36: Repeat Steps 19-24 TWICE | | | | | | Collect second touch at both positions |
| 37. Enrollment complete | ON | ON | OFF | OFF | Solid ON for 10 seconds, then OFF to conserve battery | Indicate both fingers are enrolled |

FIG. 74

SECURE, REMOTE BIOMETRIC ENROLLMENT

CROSS REFERENCE TO RELATED APPLICATIONS

This application is a continuation-in-part application claiming priority to U.S. patent application Ser. No. 16/222,388 filed Dec. 17, 2018, now U.S. Pat. No. 10,769,512, and U.S. patent application Ser. No. 16/216,229 filed Dec. 11, 2018, now U.S. Pat. No. 10,775,906, the respective disclosures of which are incorporated herein by reference. U.S. patent application Ser. No. 16/222,388 is a continuation of U.S. patent application Ser. No. 15/921,297, filed Mar. 14, 2018, now U.S. Pat. No. 10,282,651, which claims the benefit under 35 U.S.C. § 119(e) of the filing dates of U.S. Provisional Application No. 62/475,550 filed Mar. 23, 2017, U.S. Provisional Application No. 62/525,475 filed Jun. 27, 2017, U.S. Provisional Application No. 62/580,171 filed Nov. 1, 2017, U.S. Provisional Application No. 62/597,674 filed Dec. 12, 2017, and U.S. Provisional Application No. 62/627,398 filed Feb. 7, 2018, the respective disclosures of which are incorporated herein by reference. U.S. patent application Ser. No. 16/216,229 claims the benefit under 35 U.S.C. § 119(e) of the filing dates of U.S. Provisional Application No. 62/597,674 filed Dec. 12, 2017, U.S. Provisional Application No. 62/627,398 filed Feb. 7, 2018, and U.S. Provisional Application No. 62/767,338 filed Nov. 14, 2018 the respective disclosures of which are incorporated herein by reference.

U.S. patent application Ser. No. 16/222,388 is a continuation of U.S. patent application Ser. No. 15/921,297, filed Mar. 14, 2018, now U.S. Pat. No. 10,282,651, which claims the benefit under 35 U.S.C. § 119(e) of the filing dates of U.S. provisional patent application Ser. No. 62/475,550 filed Mar. 23, 2017, U.S. provisional patent application Ser. No. 62/525,475 filed Jun. 27, 2017, U.S. provisional patent application Ser. No. 62/580,171 filed Nov. 1, 2017, U.S. provisional patent application Ser. No. 62/597,674 filed Dec. 12, 2017, and U.S. provisional patent application Ser. No. 62/627,398 filed Feb. 7, 2018, the respective disclosures of which are incorporated herein by reference.

U.S. patent application Ser. No. 16/216,229 claims the benefit under 35 U.S.C. § 119(e) of the filing dates of U.S. provisional patent application Ser. No. 62/597,674 filed Dec. 12, 2017, U.S. provisional patent application Ser. No. 62/627,398 filed Feb. 7, 2018, and U.S. provisional patent application Ser. No. 62/767,338 filed Nov. 14, 2018 the respective disclosures of which are incorporated herein by reference.

FIELD OF THE DISCLOSURE

This disclosure relates to a fingerprint sensor installed on a device that has limited ability to provide feedback to a user or obtain instructions from the user, such as, for example, smart cards, fitness monitors, wearables, domestic and industrial appliances, automotive components, and "internet of things" (IOT) devices.

BACKGROUND

In the electronic sensing market, there are a wide variety of sensors for sensing objects at a given location. Such sensors are configured to sense detectable and/or measurable characteristics of an object in order to sense the presence of an object near or about the sensor and other features and characteristics of the object being sensed. Such "sense characteristics" may include a variety of detectable characteristics, such as electronic, electromagnetic, ultrasonic, thermal, optical characteristics, among others.

It is now common to see fingerprint sensors installed on devices such as smartphones. A fingerprint sensor installed on a smart phone can be used to verify the identity of the user. The fingerprint sensor can also be used as a data entry or a control mechanism for the smart phone. For example, the fingerprint sensor can detect a position of the finger on its surface and translate the position of the finger as an instruction to select a function of the smart phone or to navigate within menus being displayed by the smart phone.

As fingerprint sensors are gaining in recognition and user acceptance, fingerprint sensors are finding use in numerous other devices such as a smart cards, fitness monitors, wearables, domestic and industrial appliances, automotive components, and internet of things (IOT) devices. Some devices, such as smart cards and IOT devices, have limited to no user interfaces or status indicators such as screens, speakers, LEDs, and audio signals. Such devices may also have limited to no user input mechanisms in order to receive user input due to an absence of a keyboard, switches, buttons, and levers.

Accordingly, there is a need for a fingerprint sensor installed on a device with limited ability to provide feedback to or obtain instructions from a user wherein the fingerprint sensor provides a data entry or a control mechanism for the device. The fingerprint sensor may have a prime purpose of verifying the user's identity, but can also function as convenient way to control or enter data into a device with limited ability to provide feedback to or obtain instructions.

U.S. Pat. No. 7,129,926 "Navigation Tool," the respective disclosure of which is hereby incorporated by reference, describes a navigation tool for connecting to a display device, comprising at least two sensor elements having known positions relative to each other, each sensor element being coupled to detector means for recording a change in a predetermined parameter and timing means for determining the time of change at each sensor element and calculating means for calculating the direction and speed of the recorded changes based on the relative positions of the sensor elements and the duration between the recorded changes.

International Patent Application No. PCT/NO02/00468, "Navigation Concept," the respective disclosure of which is hereby incorporated by reference, describes an electronic unit, and method for providing input to the electronic unit, the unit comprising a sensor being capable of sensing direction of a movement over the sensor, and the method comprising the steps of: sensing the direction of a movement, categorizing the sensed direction into a chosen number of categories, said categories each being related to one or more signs, e.g., characters, on the ending of said movement, providing the related sign or command to the electronic unit as input.

U.S. Patent Application Publication No. 2014-0300574 "Biometric Sensing" the respective disclosure of which is hereby incorporated by reference, describes a dual grid touchscreen with clusters of drive and pick up lines resulting in an impedance sensor that operate in dual resolution processing modes, i.e., in low or high resolution mode, in order to track motion of an object creating a touch input.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In one example, a fingerprint sensor and data input system comprises a two-dimensional array of sensor elements, each sensor element being configured to generate a signal in response to a finger surface placed in detectable proximity to the sensor elements, and a processor configured to process signals generated by the sensor elements and to be selectively placed in a fingerprint sensing mode and a data input mode. In the data input mode, the processor is configured to determine in which of two or more spatially distinct regions of the array each sensor element that generates a signal in response to a finger surface placed in detectable proximity to the sensor element is located to effect a data input based on which spatially distinct region is contacted by the finger surface. In the fingerprint sensing mode, the processor is configured to detect variations in signals generated by sensor elements in detectable proximity to the finger surface that are indicative of features of a fingerprint of the finger surface and to form an image of the fingerprint of the finger surface.

In another example, a fingerprint sensor and data input system comprises a two-dimensional array of sensor elements, each sensor element being configured to generate a signal in response to a finger surface placed in detectable proximity to the sensor element, a data input device operatively placed on the array and defining two or more spatially distinct regions of the array, and a processor. The processer is configured to detect and distinguish contact with each of the two or more spatially distinct regions of the array when the data input device is operatively placed on the array and to detect variations in signals generated by sensor elements in detectable proximity to the finger surface that are indicative of features of a fingerprint of the finger surface and to form an image of the fingerprint of the finger surface when the data input device is not operatively placed on the array.

In another example, a fingerprint sensor and data input system comprises a two-dimensional array of sensor elements, each sensor element being configured to generate a signal in response to a finger surface placed in detectable proximity to the sensor element, a data input device operatively placed on the array and defining two or more spatially distinct regions of the array, and a processor. The processor is configured to detect and distinguish contact with each of the two or more spatially distinct regions of the array and to detect an authentication code entered by a user contacting the two or more spatially distinct regions in a specified sequence when the data input device is operatively placed on the array and to detect variations in signals generated by sensor elements in detectable proximity to the finger surface that are indicative of features of a fingerprint of the finger surface and to form an image of the fingerprint of the finger surface after a correct authentication code has been detected.

In another example, a method for enrolling a fingerprint with a two-dimensional array of sensor elements—each sensor element being configured to generate a signal in response to a finger surface placed in detectable proximity to the sensor element—comprises detecting contact by a user's finger with different spatially distinct regions of the array of sensor elements, detecting a code entered by the user contacting different spatially distinct regions of the array in a sequence, and authenticating the detected code if it matches a predefined activation code, and, if the detected code matches the predefined activation code, storing one or more fingerprint images formed when the user places a finger on the array of sensor elements.

In another example, a device comprises a sensor with a removable data input device over the sensor. The removable data input device comprises a pattern of windows defining spatially distinct regions of the sensor.

In another example, a fingerprint sensor and data input system comprises a plurality of sensor elements arranged in a two-dimensional array, each sensor element being configured to produce a signal in response to a finger surface placed in detectable proximity to the sensor element, a data input device operatively coupled to the array and including two or more data input keys, each key being associated with one or more spatially distinct data input regions of the array, and a processor. The processor is configured to detect and distinguish contact with each data input key via a signal produced by the one or more spatially distinct data input regions of the array associated with that data input key when the data input device is operatively coupled to the array and to detect variations in signals produced by sensor elements in detectable proximity to the finger surface that are indicative of features of a fingerprint of the finger surface and to form an image of the fingerprint of the finger surface when the data input device is not operatively coupled to the array.

In another example, a fingerprint sensor and data input system comprises a fingerprint sensor comprising an array of capacitive sensor elements, each sensor element being configured to produce a contact signal when contacted by a finger and a data input device configured to be removably attached to a host device incorporating the fingerprint sensor and including two or more data input keys. Each data input key is remotely coupled with one or more associated data input regions of the array so that the sensor elements encompassed by the associated data input region produce a contact signal when a user touches the data input key.

In another example, a data input system comprises a host device with a sensor and a data input device removably disposed over the sensor. The data input device comprises two or more data input keys, and each data input key is associated with one or more spatially distinct data input regions of a sensing area of the sensor.

In another example, a data input device that is removably attachable with respect to an array of contact sensor elements comprises two or more data input keys remotely disposed with respect to a portion of the data input device covering the array, each data input key comprising a conductive key trace disposed on the data input device, a conductive sensing area activation trace associated with each data input key and configured to be disposed over a spatially discrete portion of the array when the data input device is removably attached with respect to the array, and a conductive connecting trace electrically connecting each conductive key trace with the associated sensing area activation trace.

In another example, a method for enrolling a fingerprint on a smart card containing a fingerprint sensor comprises connecting the smart card to a power source, entering an activation code by using a finger to contact two or more data input keys of a data input device attached to the smart card in a sequence corresponding to the activation code, wherein a portion of the data input device is positioned over a sensing area of the fingerprint sensor and each data input key is associated with one or more spatially distinct data input regions of the sensing area, removing a portion of the data input device from the smart card to uncover the sensing area of the fingerprint sensor, contacting the sensing area of the fingerprint sensor one or more times with a finger to enroll a fingerprint template (i.e., a verification template of biometric data), and disconnecting the smart card from the power source.

In another example, a smart card comprises a card body capable of deflection along any axis lying in the plane of the card, a fingerprint sensor for authenticating a user of the smart card, a data storage element storing an activation code, a data input device coupled to the fingerprint sensor to associate distinct areas of the data input device with distinct areas of the fingerprint sensor, each distinct area of the sensor corresponding to a uniquely identifiable portion of an activation code, and a processor configured to translate a code input by a user interacting with the fingerprint sensor via the data input device and to compare the code input by the user with the stored activation code.

In another example, a method for enrolling a fingerprint sensor comprises defining an activation code to initiate an enrollment process for the fingerprint sensor and enabling a user to enter the activation code into the fingerprint sensor by interacting with each of two or more distinct portions of the fingerprint sensor. Each of the two or more distinct portions of the fingerprint sensor corresponds to a uniquely-identifiable portion of the activation code.

In another example a method for enrolling a fingerprint template (i.e., a verification template of biometric data) on a smart card having a fingerprint sensor comprises connecting one or more power transmission contacts of the smart card to a power source without connecting any data transmission contacts of the smart card to a device configured to transmit or receive data, automatically activating an enrollment mode in the fingerprint sensor upon a specific instance of connecting the one or more power transmission contacts of the smart card to the power source, enrolling a fingerprint by storing a fingerprint template derived from one or more fingerprint images generated by placing a finger on the fingerprint sensor, and upon completion of the enrolling step, automatically deactivating the enrollment mode in the fingerprint sensor.

In another example, a method for enrolling a fingerprint template on a smart card having a fingerprint sensor comprises connecting one or more power transmission contacts of the smart card to a power source without connecting any data transmission contacts of the smart card to a device configured to transmit data to or receive data from the smart card, determining if a fingerprint template has been enrolled for the fingerprint sensor of the smart card, if no fingerprint template has been enrolled for the fingerprint sensor of the smart card, automatically activating an enrollment mode in the fingerprint sensor upon connecting the one or more power transmission contacts of the smart card to the power source, enrolling a fingerprint by storing a fingerprint template derived from one or more fingerprint images generated by placing a finger on the fingerprint sensor, and upon completion of the enrolling step, automatically deactivating the enrollment mode in the fingerprint sensor.

In another example, a fingerprint sensor and data input system comprises a plurality of sensor elements arranged in a two-dimensional array, each sensor element being configured to produce a signal in response to a finger surface placed in detectable proximity to the sensor element, a data input device, including a portion disposed over the array and including a pattern of piercings formed in the portion of the data input device disposed over the array, wherein the piercings are spatially associated with one or more spatially distinct data input regions of the array, and a processor. The processor is configured to detect a finger placed in contact with the associated spatially distinct data input regions of the array and to detect a pattern of signals produced by the spatially distinct data input regions contacted through the pattern of piercings.

In another example, a fingerprint sensor and data input system comprises a plurality of sensor elements arranged in a two-dimensional array, each sensor element being configured to produce a signal in response to a finger surface placed in detectable proximity to the sensor element, a data input device, including a portion disposed over the array and including a pattern of conductive material applied to the portion of the data input device disposed over the array, wherein the pattern is spatially associated with one or more spatially distinct data input regions of the array, and a processor. The processor is configured to detect contact of the pattern of conductive material with the associated spatially distinct data input regions of the array and to detect a pattern of signals produced by the spatially distinct data input regions contacted by the pattern of conductive material.

In another example, a fingerprint sensor and data input system comprises a plurality of sensor elements arranged in a two-dimensional array, each sensor element being configured to produce a signal in response to a finger surface placed in detectable proximity to the sensor element, a data input device partially disposed over the array and including two or more data input keys, each key being associated with one or more spatially distinct data input regions of a first portion of the array, and a cutout exposing a second portion of the array, and a processor configured to detect and distinguish contact with each data input key via a signal produced by the one or more spatially distinct data input regions of the array associated with that data input key and to detect variations in signals produced by sensor elements of the second portion of the array in detectable proximity to the finger surface that are indicative of features of a fingerprint of the finger surface.

In another example, a device including a fingerprint sensor and data input system and comprises a plurality of sensor elements arranged in a two-dimensional array, each sensor element being configured to produce a signal in response to a finger surface placed in detectable proximity to the sensor element, two or more data input keys disposed on a portion of the device remote from the plurality of sensors, each data input key being coupled with one or more spatially distinct data input regions of a first portion of the array so that contact with the data input key results in a signal produced by sensor elements within each spatially distinct data input region coupled to the data input key, and a processor. The processor is configured to detect and distinguish contact with each data input key via a signal produced by the one or more spatially distinct data input regions of the array coupled with that data input key and to detect variations in signals produced by sensor elements of a second portion of the array in detectable proximity to the finger surface that are indicative of features of a fingerprint of the finger surface.

In another example, a method for enrolling a fingerprint on a smart card containing a fingerprint sensor comprises connecting the smart card to a power source, entering an activation code by using a finger to contact two or more data input keys of a data input device attached to the smart card in a sequence corresponding to the activation code, wherein a portion of the data input device is positioned over a portion of the sensing area of the fingerprint sensor, and each data input key is associated with one or more spatially distinct data input regions of a portion of the sensing area, contacting the portion of the sensing area of the fingerprint sensor that is not covered by a portion of the data input device one or more times with a finger to enroll a fingerprint template, and disconnecting the smart card from the power source.

In another example, a method for enrolling a fingerprint template on a smart card having a fingerprint sensor comprises connecting one or more power transmission contacts of the smart card to a power source without connecting any data transmission contacts of the smart card to a device configured to transmit or receive data, activating an enrollment mode in the fingerprint sensor upon detection of a trigger event, enrolling a fingerprint by storing a fingerprint template derived from one or more fingerprint images generated by placing a finger on the fingerprint sensor, and upon completion of the enrolling step, deactivating the enrollment mode in the fingerprint sensor.

In another example, the trigger event comprises one or more trigger events selected from the list consisting of a. user interactions with the biometric sensor assembly, b. placing a detectable object on the biometric sensor assembly, c. removing a detectable object from the biometric sensor assembly, d. detecting the absence of a stored verification template, e. detecting the presence of a stored verification template that is partially complete, f. detecting that power is being transmitted to the smart card for the first time, g. detecting a specified instance of power being transmitted to the smart card, h. detection that a maximum number of unsuccessful attempts to derive a verification template has not been reached, I. activating an input mechanism, j. expiration of a timer or counter, k. occurrence of an error state, l. detection of a flag set last time the smart card was inserted in a card reader that transmits data to or from the smart card, m. detection that the smart card has been connected to a power source that does not transmit data to or from the card, n. detection of a trigger event by a component of the smart card other than the biometric sensor assembly, and o detection that a particular smart card has been coupled to a particular non-data-transmitting power source.

In another example, a power source for a smart card comprises a power element, and a housing. The housing comprises a slot configured to receive an end of the smart card and contacts connected to the power element. The contacts contact power transmission contact pads of the smart card and do not contact data transmission contact pads of the smart card when the smart card is inserted into the slot to thereby connect the power transmission contact pads of the smart card to the power element.

In another example, an overlay is configured to provide power to an electronic device having terminals for connecting a source of electric power to the electronic device, and the overlay is configured to be removably secured to a surface of the electronic device. The overlay comprises a film configured to conform to the surface of the electronic device when secured thereto, a power element supported on the film, conductive material disposed on or embedded in a surface of the film, wherein the conductive material connects the power element to the terminals of the electronic device when the overlay is secured to the surface of the electronic device, and a circuit closure configured to enable a user to selectively close a power circuit between the power element and the terminals of the electronic device to enable power transmission between the power element and the electronic device.

In another example, a method for enrolling a biometric template on an electronic device having power terminals, data transmission terminals, and a biometric sensor comprises connecting an overlay to the electronic device, wherein the overlay is configured to provide power to the electronic device from a power element mounted on the overlay to the power terminals of the electronic device and to connect to the data transmission terminals of the electronic device, closing a power circuit between the power element and the power terminals of the electronic device to enable power transmission between the power element and the electronic device, triggering the biometric sensor to enter an enrollment mode, and generating the biometric template from biometric inputs from a user to the biometric sensor.

In another example, a finger guide is configured to be removably attached to a device having a fingerprint sensor and comprises two or more channels. Each channel is configured to position a finger placed thereon to contact the fingerprint sensor at a different orientation.

In another example, a power source and finger guide for a smart card including a fingerprint sensor comprise a power element, a card holder frame comprising one or more card guide rails into which the smart card is inserted to position the cardholder frame with respect to the smart card, and contacts connected to the power element, wherein the contacts contact power transmission contact pads of the smart card when the smart card is inserted into the card guide rail to thereby connect the power transmission contact pads of the smart card to the power element, and a finger guide attached to the card holder frame and comprising two or more channels, wherein each channel is configured to position a finger placed thereon to contact the fingerprint sensor at a different orientation.

In another example, a fingerprint sensor and data input system comprises a plurality of sensor elements arranged in a two-dimensional array, each sensor element being configured to produce a signal in response to a finger surface placed in detectable proximity to the sensor element, a data input device partially disposed over the array and including two or more data input keys, each key being associated with one or more spatially distinct data input regions of a first portion of the array, and a cutout exposing a second portion of the array, a processor configured to detect and distinguish contact with each data input key via a signal produced by the one or more spatially distinct data input regions of the array associated with that data input key and to detect variations in signals produced by sensor elements of the second portion of the array in detectable proximity to the finger surface that are indicative of features of a fingerprint of the finger surface, and finger guide comprising two or more channels, wherein each channel is configured to position a finger placed thereon to contact the two-dimensional array at a different orientation.

In another example, a method for enrolling a fingerprint on a smart card containing a fingerprint sensor comprises connecting the smart card to a power source, entering into an enrollment mode upon determination of a trigger event, contacting the fingerprint sensor by placing the same finger on each of two or more finger guide channels configured to position the finger placed thereon in a unique orientation with respect to the fingerprint sensor to enroll a fingerprint template for that finger, and disconnecting the smart card from the power source after enrolling the fingerprint template.

In another example, a method for re-enrolling a fingerprint on a smart card containing a fingerprint sensor wherein at least one fingerprint template has been previously enrolled comprises A. connecting the smart card to a power source, B. entering into a re-enrollment mode upon determination of a trigger event, C. contacting the fingerprint sensor by sequentially placing the same finger on each of two or more finger guide channels configured to position the finger placed thereon in a unique orientation with respect to the fingerprint sensor to enroll a fingerprint template for that finger, D. replacing the previously enrolled fingerprint template with a new fingerprint template formed from fingerprint images generated during step C or updating the previously enrolled fingerprint template with fingerprint images generated during step C, and E. disconnecting the smart card from the power source.

In another example, a method for enrolling two or more fingerprints on a device containing a fingerprint sensor comprises A. connecting the device to a power source; B. entering into a first enrollment mode upon determination of a trigger event, C. enrolling a first fingerprint template for a first finger, D. entering a subsequent enrollment mode upon determination of a trigger event, E. enrolling a subsequent fingerprint template for a subsequent finger different from a previously enrolled finger; F. determining if a required number of fingers has been enrolled, G. if the required number of fingers has not been enrolled, return to step D, and H. if the required number of fingers has been enrolled, disconnecting the smart card from the power source.

In another example, a system for enrolling a verification template of biometric data in a biometric-enabled smart card comprises a non-data-transmitting power source configured to be coupled to the smart card to transmit power to the smart card without transmitting data to or from the smart card, wherein the non-data-transmitting power source comprises a power element and a receptacle configured to receive an end of the smart card, and a biometric sensor assembly comprising one or more sensor elements and associated circuitry for controlling operation of the one or more sensor elements and for processing signals from the one or more sensor elements. The biometric sensor assembly is configured to be installed in the smart card whereby power is transmitted to the biometric sensor assembly when the non-data-transmitting power source is coupled to the smart card. The biometric sensor assembly is configured to operate in an enrollment mode when power is transmitted to the biometric sensor assembly by the non-data-transmitting power source. When operating in enrollment mode, the biometric sensor assembly is configured to derive and store a verification template of biometric data from one or more biometric images generated by the one or more sensor elements.

In another example a method for enrolling a biometric template on a smart card having a biometric sensor comprises inserting an end of the smart card into a receptacle, transmitting power to the smart card from the receptacle without transmitting data to or from the smart card, causing the biometric sensor to operate in an enrollment mode, while the biometric sensor is operating in enrollment mode, generating one or more biometric images with the biometric sensor, deriving at least one verification template of biometric data from the one or more biometric images, storing the verification template, and after storing the verification template, terminating enrollment mode in the biometric sensor.

In another example, a device to facilitate the enrollment of a verification template of fingerprint data in a fingerprint sensor-enabled smart card, the device comprises a receptacle configured to be removably coupled to the smart card; a power element supported on the receptacle, wherein the receptacle is configured to transmit power from the power element to the fingerprint sensor of the smart card when the receptacle is coupled to the smart card; a finger guide attached to the receptacle and comprising two or more finger guide channels, wherein the finger guide is configured so that each finger guide channel is adjacent the fingerprint sensor of the smart card when the receptacle is coupled to the smart card, and wherein each finger guide channel is configured to position a finger placed thereon to contact the fingerprint sensor at a different orientation; and two or more status indicators, wherein each status indicator is associated with one finger guide channel and is configured to instruct the user with respect to the placement and removal of the user's finger with respect to the associated finger guide channel.

In another example, method for enrolling a fingerprint template on a smart card having a fingerprint sensor comprises: (A) transmitting power to the smart card from a power source removably coupled to the smart card, the power source including a power element that provides power to the fingerprint sensor and a finger guide comprising two or more finger guide channels positioned adjacent to the fingerprint sensor of the smart card when the power source is coupled to the smart card, and wherein each finger guide channel is configured to position a finger placed thereon to contact the fingerprint sensor at a different orientation; and (B) during step (A), instructing the user with respect to the placement and removal of the user's finger with respect to each finger guide channel with a status indicator associated with the finger guide channel.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIGS. 2A and 2B are top views of a sensing area of the fingerprint sensor installed on a device according to some embodiments.

FIGS. 3A-3B illustrate a data input device in the form of an overlay temporarily placed over the sensing area of the fingerprint sensor installed on a smart card according to some embodiments.

FIGS. 4A-4C are top plan views of a data input device in the form of an overlay temporarily placed over the sensing area of the fingerprint sensor with different configurations of pierced holes according to some embodiments.

FIGS. 5A and 5B illustrate a data input device in the form of a frame placed over the sensing area of the fingerprint sensor installed on a device according to some embodiments.

FIG. 9A illustrates a power source used with the fingerprint sensor installed on the smart card according to some embodiments.

FIGS. 9B and 9C show a bottom view and top view, respectively, of the power source according to some embodiments.

FIGS. 10A-10E illustrate an embodiment of the power source in use with the fingerprint sensor installed on the smart card.

FIG. 13 illustrates a data input device in the form of an overlay which includes data input keys coupled to associated spatially distinct sensing areas on the sensing area of the fingerprint sensor according to some embodiments.

FIGS. 14A-14C illustrate a data input device in the form of a multi-layer overlay including data input keys coupled to associated spatially distinct sensing areas on the sensing area of the fingerprint sensor according to some embodiments.

FIG. 24 shows a flow chart illustrating an embodiment of a simple, cost effective method to enroll a fingerprint template on a device.

FIGS. 25A-25D illustrate embodiments of providing power to a smart card wirelessly.

FIGS. 30-31 show flow charts illustrating embodiments of an enrollment process employing a data input device in the form of an overlay in which a portion of the sensing area of the fingerprint sensor is exposed to the user through a cutout formed in the overlay.

FIG. 53A is a top plan view of a finger guide according to some embodiments.

FIG. 53B shows a close up of a retaining pins and teeth between a linearly moveable panel and fixed guide rails of the finger guide shown in FIG. 53A.

FIG. 69 is a table showing a list of indications according to one embodiment.

FIG. 74 is a table showing a list of indications according to one embodiment.

DETAILED DESCRIPTION

Figure 1:
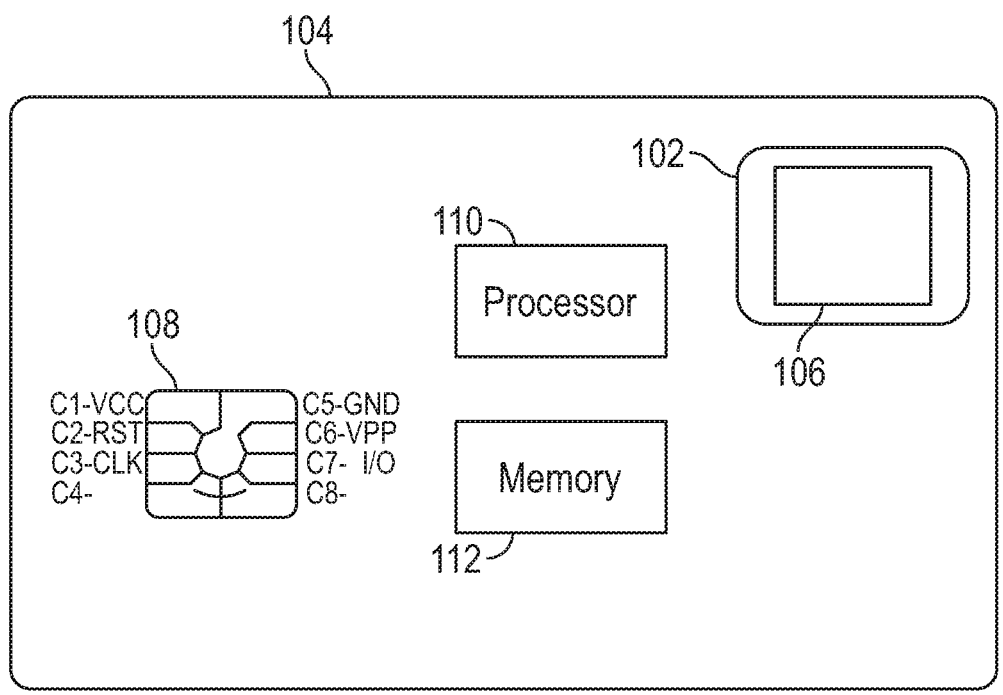
FIG. 1 illustrates a fingerprint sensor installed on a smart card according to some embodiments.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

It is now common to see fingerprint sensors installed on devices such as smartphones. A fingerprint sensor installed on a smart phone can be used to verify the identity of the user. The fingerprint sensor can also be used as a data entry or a control mechanism for the smart phone. For example, the fingerprint sensor can detect a position of the finger on its surface and translate the position of the finger as an instruction to select a function of the smart phone or to navigate within menus being displayed by the smart phone.

As fingerprint sensors are gaining in recognition and user acceptance, fingerprint sensors are now finding use in numerous other devices such as, for example, smart cards, fitness monitors or trackers, wearable devices, domestic and industrial appliances, automotive components, and internet of things (IOT) devices. Some devices, such as smart cards and IOT devices, have limited to no user interfaces or status indicators such as screens, speakers, LEDs, and audio signals with which the device may impart information to the user. Such devices may also have limited to no user input mechanisms for receiving user input due to lack of a keyboard, switches, buttons, and levers.

Such devices, as well as computers, smart phones and the like, in which user-authenticating biometric sensors, such as a fingerprint sensors, are incorporated are at times generally referred to in this disclosure as "host devices,"

Accordingly, there is a need for a fingerprint sensor installed on a device with limited ability to provide feedback to or obtain instructions from a user (hereinafter referred to as "limited device") wherein the fingerprint sensor provides a data entry or a control mechanism for the device. The fingerprint sensor may have a prime purpose of verifying the user's identity, but can also function as convenient way to control or enter data into the limited device.

In order for a biometric sensor, such as, for example, a fingerprint sensor, to operate properly, it is essential that a sufficiently detailed template (or multiple templates) of a user's biometric data (e.g., fingerprint) is detected and stored during an enrollment process. The stored template (i.e., a verification template of biometric (e.g., fingerprint) data) is used to compare with biometric image data generated by the biometric sensor (e.g., an image of a finger sensed by the fingerprint sensor) when the device is in general use. In an embodiment employing a fingerprint sensor as the biometric sensor, a user is permitted to access a device if the sensed image of the finger matches the stored fingerprint template. Accordingly, it is important to acquire and store a fingerprint template of sufficient quality. If the stored fingerprint template is not of sufficient quality, the user may experience false acceptance and rejection at a high rate.

While concepts described herein are applicable to various biometric sensors and associated biometric data and verification templates of biometric data, for purposes of illustration, and not for limitation, examples are frequently described herein in the context of fingerprint sensors and fingerprint data (i.e., images).

For an enrollment process using a fingerprint sensor with a sensing area smaller than the surface of an average finger, a template is built up from multiple images of a finger. Specifically, the user is directed to repeatedly present his or her finger on the sensing area of the fingerprint sensor until multiple images of sufficient quality are gathered to form the template. However a fingerprint sensor installed on the limited device poses difficulties throughout the enrollment process. For example, the limited feedback/input capabilities make it difficult to notify the user: (i) to begin the enrollment process, (ii) to repeatedly present his or her finger during the enrollment process, (iii) that a sufficient number of images have been gathered, and (iv) that the enrollment process is complete.

Furthermore, existing solutions for enrolling a fingerprint on the limited device require the user to visit a secure location at which the user will perform the enrollment procedure. For example, enrolling a fingerprint on a smart card requires the user to visit a secure location (e.g., a bank), create a template of the user's fingerprint on a separate device with the help of a trained agent, and upload the resulting template onto the smart card. This conventional method of enrolling a fingerprint on the limited device is inconvenient for the user due to the required physical visit to a secured location. Additionally, this conventional method has come under much scrutiny because it creates a security risk due to the fact that the user cannot be sure that the user's fingerprint has not been misplaced or copied during the process of enrollment at the secured location or that the fingerprint recorded by the separate device is fully erased after enrollment is completed. Furthermore, verification accuracy may be compromised if the sensor used for enrollment of the user, i.e., the sensor of a separate device, is different from the sensor later used for verification of the user, i.e., the sensor of the limited device.

An object of embodiments described herein is to obviate at least some of the aforementioned problems with conventional methods of enrolling a fingerprint on a limited device. Systems, devices, and methods described herein provide a cost-effective and efficient process of enrolling a user's finger onto a limited device through a fingerprint sensor installed on the device—without the need for a separate device to receive fingerprint images—which enhances the security and improves the accuracy of fingerprint matching for the limited device.

In the context of the present disclosure, a "sensor element" comprises an arrangement of one or more components configured to produce a signal based on a measurable parameter (e.g., capacitance, light/optics, heat/thermal, pressure, etc.), characteristics of which will vary based on the presence or absence of an object that is in local proximity to the sensor element. A fingerprint sensor will comprise an array of such sensor elements configured to produce a signal based on a portion of the surface of a finger placed on or near the fingerprint sensor. The sensitivity of each of the sensor elements of the fingerprint sensor is such that characteristics of the signal produced at each sensor element will vary based on surface features of the portion of finger placed on or near the array, and the varying characteristics of signals produced at each sensor element may be combined or otherwise processed to form a data file with an actual or virtual "image" of the fingerprint of the portion of the finger surface placed on or near the array.

Specific examples of such sensor elements may include, but are not restricted to, capacitive, optical, thermal, and pressure sensor elements. As an illustrative example, two types of capacitive sensor elements that may be employed in a fingerprint sensor are mutual capacitance sensor elements and self-capacitance sensor elements. An array of mutual capacitance sensor elements comprises a plurality of spaced apart drive lines and a plurality of spaced apart pickup lines arranged transversely to the drive lines and spaced from the drive lines by a dielectric material. Each intersection of the pickup lines and the drive lines constitutes a mutual capacitance sensor element configured to produce a signal indicative of a capacitance change due to the presence or absence of a portion of an object that is in local proximity to the mutual capacitance sensor element. An array of self capacitance sensor elements comprises a first plurality of spaced apart conductive lines and a second plurality of spaced apart conductive lines arranged transversely to the first plurality of spaced apart conductive lines. Each conductive line of the first and second plurality of conductive lines is configured to transmit a signal to the finger surface placed in detectable proximity and receive a resultant signal. Accordingly, each conductive line constitutes a self-capacitance sensor element configured to produce a signal indicative of a capacitance change due to the presence or absence of a portion of an object that is in local proximity to the self capacitance sensor element.

In addition, sensor elements contemplated herein include both silicon-based sensors in which sensor elements are formed directly on a silicon semiconductor substrate and may form a 2-dimensional array of sensing pixels and off-silicon sensors in which sensor elements are not disposed directly on a silicon semiconductor substrate (e.g., so-called off-chip sensors) but formed on a non-silicon substrate and are conductively connected to a remotely-located control element, which may be a silicon-based semiconductor chip, such as an application specific integrated circuit (ASIC).

While aspects of this disclosure are presented in the context of specific types of sensor elements and fingerprint sensor configurations, it should be appreciated that implementations of those aspects are not necessarily limited to a specific type of sensor elements of fingerprint sensors described herein.

FIG. 1 illustrates a biometric sensor assembly or a biometric sensor, such as fingerprint sensor 102, installed on a smart card 104 according to some embodiments. In the illustrated embodiment shown in FIG. 1, the smart card 104 is a limited device, as described above, and the smart card 104 comprises the fingerprint sensor 102. In some embodiments, the smart card 104 comprises the fingerprint, or other biometric, sensor 102, processor or processing circuitry 110, memory 112, and contact pads 108 providing contacts for an external power source. The processing circuitry 110 may be a microprocessor, microcontroller, application-specific integrated circuit (ASIC), field-programmable gate array (FPGA), or any combination of components configured to perform and/or control the functions of the smart card 104. The memory 112 may be a read-only memory (ROM) such as EPROM or EEPROM, flash, or any other storage component capable of storing executory programs and information for use by the processing circuitry 110. The fingerprint sensor 102 may comprise sensor controlling circuitry and a sensor memory. The sensor controlling circuitry may be a microprocessor, microcontroller, application-specific integrated circuit (ASIC), field-programmable gate array (FPGA), or any combination of components configured to perform and/or control the functions of the fingerprint sensor 102. The sensor memory may be a read-only memory (ROM) such as EPROM or EEPROM, flash, or any other storage component capable of storing executory programs and information for use by the processing circuitry 110. The sensor controlling circuitry is configured to execute fingerprint sensor application programming (i.e., firmware) stored in the sensor memory. The memory 112 and the sensor memory may be the same component. The sensor controlling circuitry is coupled to or may be part of the processing circuitry 110. The various components of the smart card 104 are appropriately coupled and the components may be used separately or in combination to perform the embodiments disclosed herein.

The contact pads 108 comprise one or more power transmission contacts, which may connect electrical components of the smart card 104, such as an LED, the processing circuitry 110, memory 112, sensor elements (e.g., the fingerprint sensor 102) etc., to an external power source. In some embodiments, the contact pads 108 further comprise one or more data transmission contacts that are distinct from the power transmission contacts which connect the smart card 104 to an external device configured to receive data from and/or transmit data to the smart card 104. In this context, the data transmission contacts of the smart card 104 are the contacts that convey data transmitted to or transmitted from the smart card 104.

The processing circuitry 110 and the memory 112 may comprise a secure element module. The contact pads 108 may be part of the secure element module which includes the processor 110 and memory 112, both of which are in electrical communication with the contact pads 108. In an exemplary embodiment, the secure element module may conform to the EMVCo® protocol commonly used on smart cards, and the contact pads 108 provide electric contacts between the card 104 and an external card reader to provide power to the processing circuitry 110 of the card and to read data from and/or write data to the memory 112. In FIG. 1, contact pads 108 embody an exemplary smart card contact arrangement, known as a pinout. Contact C1, VCC, connects to a power supply. Contact C2, RST, connects to a device to receive a reset signal, used to reset the card's communications. Contact C3, CLK, connects to a device to receive a clock signal, from which data communications timing is derived. Contact C5, GND, connects to a ground (reference voltage). In various embodiments, contact C6, VPP, may, according to ISO/IEC 7816-3:1997, be designated as a programming voltage, such as an input for a higher voltage to program persistent memory (e.g., EEPROM). In other embodiments, contact C6, VPP, may, according to ISO/IEC 7816-3:2006, be designated as SPU, for either standard or proprietary use, as input and/or output. Contact C7, I/O, provides Serial input and output (half-duplex). Contacts C4 and C8, the two remaining contacts, are AUX1 and AUX2 respectively and used for USB interfaces and other uses.

In embodiments described herein, the contact pads 108 are only used for providing connection points via the one or more power transmission contacts, such as C1 VCC and C5 GND, to an external power source, and no data is transmitted to or from the smart card 104 during an activation or enrollment process as described herein. The smart card 104 may comprise one or more power transmission contacts for connecting the smart card 104 to a power source, without any further data transmission capability as in a secure element module. In other embodiments, the location of the fingerprint sensor 102 may be embedded into any position on the smart card 104 such that the position of the fingerprint sensor 102 is substantially separated from the contact pads 108 and allows a user to place a finger on the fingerprint sensor 102.

A user can carry out various functions on the smart card 104 by placing a finger in various positions over a sensing area 106 of the fingerprint sensor 102. The sensing area 106 comprises a two dimensional array of sensor elements. Each sensor element is a discrete sensing component which may be enabled depending on the function of the fingerprint sensor 102. Any combination of sensor elements in the two dimensional array may be enabled depending on the function of the fingerprint sensor. While the illustrated embodiment shown in FIG. 1 describes the fingerprint sensor 102 in relation to the smart card 104, this is not required and the fingerprint sensor 102, or other biometric sensor, may be incorporated in a different limited device in other embodiments. For example, other limited devices in which aspects of the technology describe herein may be incorporated include fitness monitors, wearable devices, domestic and industrial appliances, automotive components, and "internet of things" (TOT) devices.

In some embodiments, the sensing area 106 can have different shapes including, but not limited to, a rectangle, a circle, an oval, or a lozenge.

The sensor 102 may comprise an array of sensor elements comprising a plurality of conductive drive lines and overlapped conductive pickup lines that are separated from the drive lines by a dielectric layer. Each drive line may thus be capacitively coupled to an overlapping pickup line through a dielectric layer. In such embodiments, the pickup lines can form one axis (e.g., X-axis) of the array, while the drive lines form another axis (e.g., Y-axis) of the array. Each location where a drive line and a pickup line overlap may form an impedance-sensitive electrode pair whereby the overlapping portions of the drive and pickup lines form opposed plates of a capacitor separated by a dielectric layer or layers. This impedance-sensitive electrode pair may be treated as a pixel (e.g., an X-Y coordinate) at which a surface feature of the proximally located object is detected. The array or grid forms a plurality of pixels that can collectively create a map of the surface features of the proximally located object. For instance, the sensor elements forming the pixels of the grid produce signals having variations corresponding to features of a fingerprint disposed over the particular sensor element and thus the pixels along with circuitry controlling the sensor elements and processing signals produced by the sensor elements that includes a processor and signal conditioning elements (i.e., "sensor controlling circuitry") that may be incorporated into an integrated circuit can map locations where there are ridge and valley features of the finger surface touching the sensor array.

Additional details of a fingerprint sensor with overlapping drive lines and pickup lines as well as the drive, sense, and scanning electronics, are discussed in U.S. Pat. No. 8,421,890, entitled "Electronic imager using an impedance sensor grid array and method of making," U.S. Pat. No. 8,866,347, entitled "Biometric sensing", and U.S. Pat. No. 9,779,280, entitled "Fingerprint Sensor Employing an Integrated Noise Rejection Structure," the respective disclosures of which are incorporated by reference in their entirety. Further improvements and enhancements to the devices, methods, and circuitry used to improve the sensitivity of the measurement principal employing a sensor grid comprised of overlapping drive lines and pickup lines separated by a dielectric including the drive, sense, scanning, and noise reduction electronics, are described in U.S. Pat. No. 9,779,280.

An exemplary installation of a fingerprint sensor in a smart card is described in U.S. Pat. No. 9,122,901, the disclosure of which is hereby incorporated by reference.

The sensing area 106 of the biometric sensor, (e.g., fingerprint sensor 102) installed on the device 104 may be selectively configured to operate in five modes: (1) enrollment mode; (2) verification mode; (3) data input mode; (4) control mode; and (5) unlock mode. The user may select the different modes by different interactions with the sensor, such as a double tap, hold, up/down drag, and left/right drag on the sensor area 106. In other embodiments, the sensor may be selectively configured in different modes by placing a data input device over the sensing area 106. Data input devices configured for different sensor operation modes may include unique detectable features that, when detected by the sensor, will configure the sensor in a mode corresponding to the data input device.

In the context of this disclosure, a "data input device" is any device that may be attached or otherwise coupled to a host device and is thereby coupled to a biometric sensor of the host device to enable a user to provide inputs to the host device through the biometric sensor via features of the data input device that allow the user to interface with the biometric sensor to provide control inputs or inputs of data in addition to the particular biometric data that the biometric sensor is configured to detect. For instance, in examples described herein, the data input device includes keys or buttons that are each uniquely coupled to a fingerprint sensor of the host device so that a user contacting any such key or button generates a unique control input or a unique data input corresponding to that key or button. In addition, in other examples described herein, the attachment or coupling of the data input device to the host device, or its removal, may itself provide data input to the host device, for example, communicating that the data input device has been attached or coupled to, or removed from, the host device, that the data input device has or has not been properly positioned with respect to the biometric sensor to enable proper control or data input by the user, or, as described above, to place the biometric sensor in one of a number of operating modes.

In some embodiments, when the fingerprint sensor 102 is in enrollment mode, all of the sensor elements in the two dimensional array of the sensing area 106 are activated in a fingerprint sensing mode to produce signals—such as capacitance—having detectible variations corresponding to fingerprint features—grooves and ridges—in detective proximity to the sensor array (i.e., in physical contact with the sensor elements or in sufficient proximity to the sensor elements to produce signals corresponding to fingerprint features) which together form an "image" of the fingerprint, and the sensor controlling circuitry is configured so that multiple images of a user's fingerprint may be gathered, and, possibly, manipulated, to acquire a sufficient fingerprint template that may be subsequently stored in memory. An exemplary enrollment process is described in U.S. Pat. No. 9,684,813, entitled "System and Method of Biometric Enrollment and Verification," the disclosure of which is hereby incorporated by reference. The stored fingerprint template may be continuously updated based on the user's use of the fingerprint sensor over time.

In some embodiments, when the fingerprint sensor is in verification mode (also known as authentication mode), all of the sensor elements in the sensing area 106 are activated in fingerprint sensing mode and the sensor controlling circuitry is configured so that an image of the user's fingerprint may be acquired and compared with the fingerprint template stored in memory to verifying that whether the acquired fingerprint image sufficiently matches the fingerprint template. An exemplary verification process is also described in U.S. Pat. No. 9,684,813. An exemplary verification process is also described in U.S. patent application Ser. No. 15/356,989 (Publication No. U.S. 2018-0144173) entitled "Combination of Fingerprint and Device Orientation to Enhance Security," the disclosure of which is hereby incorporated by reference. Ideally, in both the enrollment mode and the verification mode, a finger should be placed centrally on the sensing area 106 of the fingerprint sensor 102 in order to obtain the best image of the finger.

In some embodiments, when the fingerprint sensor is in control mode and data input mode, the sensor elements in the sensing area 106 are activated in contact sensing mode, data input keys are operatively coupled to associated spatially distinct regions or control areas of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the sensing area 106 of the fingerprint sensor 102. That is, as opposed to the enrollment and verification modes, in which the sensor elements and the processor of the sensor controlling circuitry are configured to detect and map different fingerprint features of the finger surface, in contact sensing mode for the control and data input modes, the sensor elements and the sensor controlling circuitry may be configured to merely detect whether or not the sensor element is directly or indirectly contacted by a finger surface and to distinguish a spatially distinct region of the sensor array in which the contacted element(s) reside.

In both the control mode and the data input mode, the sensing area 106 may be divided into spatially distinct control areas dedicated to a specific command or data input. The number and location of the spatially distinct control areas within the sensing area 106 may be configured depending on the desired use of the fingerprint sensor 106, the size of the sensing area 106, and the ability of the fingerprint sensor 102 to accurately distinguish contact by the finger with the different spatially distinct regions on the sensor. In unlock mode, the device 104 may maintain the data input mode until the user inputs a correct unlock code, wherein the input of the correct code unlocks the device 104.

In some embodiments described herein, when the fingerprint sensor is in control mode and data input mode, a first portion of the sensor elements in the sensing area 106 are activated in contact sensing mode, data input keys are operatively coupled to associated spatially distinct regions or control areas of the first portion of the sensing area to enable direct or indirect contact by a user's finger with each associated spatially distinct area, and the sensor controlling circuitry is configured so that the user may input data through the sensing area 106 by directly or indirectly placing a finger on selected, associated spatially distinct control areas within the first portion of the sensing area 106 of the fingerprint sensor 102. In such embodiments, when the fingerprint sensor is in enrollment mode, only the sensor elements located within a second portion of the two-dimensional array of the sensing area 106 different from the first portion and accessible to a user's finger may be activated in the fingerprint sensing mode and the sensor controlling circuitry is configured so that multiple images of a user's fingerprint may be gathered to acquire a sufficient fingerprint template that is stored in memory.

Figure 2A:
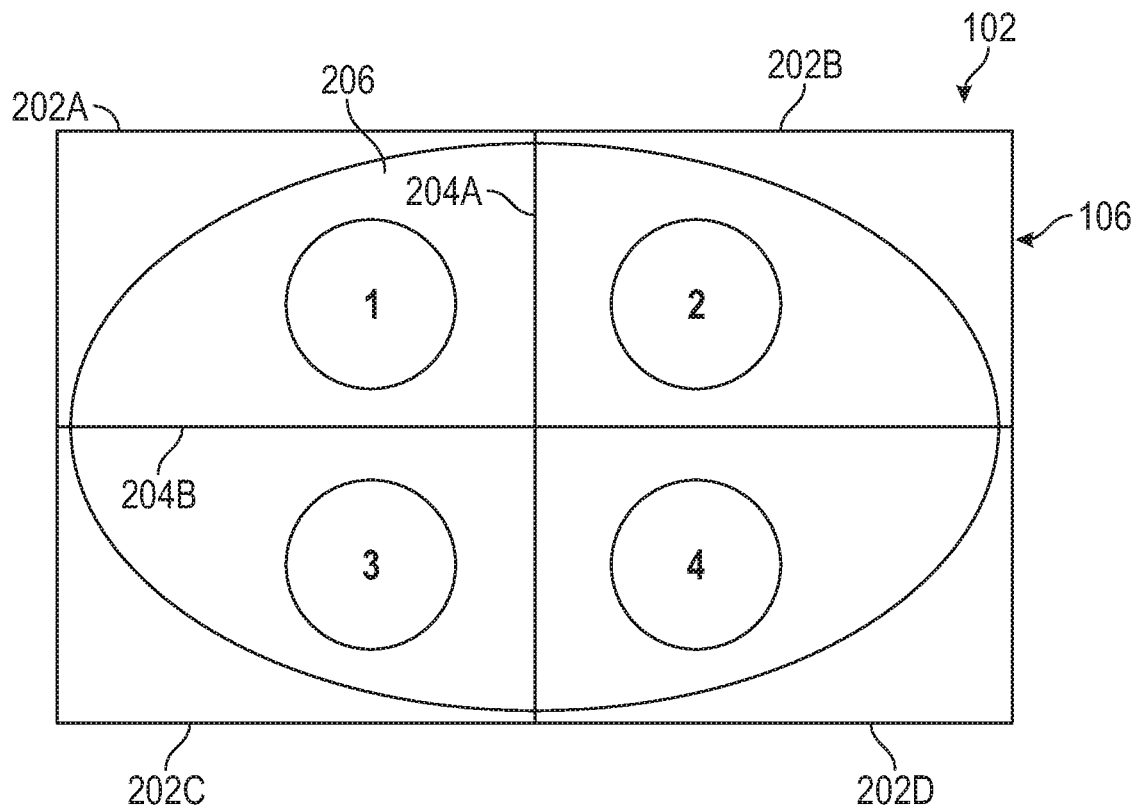

FIG. 2A is a top view of a sensing area 106 of a fingerprint sensor 102 installed on a device with limited ability to provide feedback to or obtain instructions according to some embodiments. As shown in FIG. 2A, the sensing area 106 includes indicia formed on the different quadrants (spatially distinct regions) of the sensing area to facilitate data input. In verification or enrollment mode, the user may place a finger on the center of the sensing area 106 to produce a fingerprint image. When the fingerprint sensor 102 is used in data input mode, each spatially distinct region can function as a data input "key", and the user can enter numbers (e.g., an activation code, such as a PIN code) by tapping his or her finger on the numbered regions or areas 202A-D of the sensing area 106. As shown in FIG. 2A, the sensing area 106 can be divided into four separate spatially distinct control areas 202A-D. In the illustrated embodiment shown in FIG. 2A, the user may place a finger on the top left quadrant 202A, numbered 1, of the sensing area 106. Accordingly, the sensor elements located in the top left quadrant 202A of the sensing area 106 may sense contact by the finger and the fingerprint sensor 102 may determine the location of the transmitting sensor elements and process the received signals to be an input by the user representing the number "1." In the embodiment shown in FIG. 2A, the user may place a finger on different quadrants 202A-D to input the number 1, 2, 3, and 4 in any sequence. In another embodiment, the sensing area 106 may be divided into more or less spatially distinct control areas. For example, there may be 6 spatially distinct control areas representing numbers 1-6 or two control areas representing numbers 1 and 2 (or letters A and B). Accordingly, the user is able to input numbers corresponding to the spatially distinct keys of the sensor array in any sequence through the sensing area. In another embodiment, all or part of the sensing area 106 may be employed as a single spatially distinct control area dedicated to a Morse code-type input by the user (e.g., sequentially-repeated, separate contacts with the same spatially distinct control area, each contact of a different, specified duration). The one spatially distinct control area may be positioned in any portion of the sensing area 106 or comprise the entire sensing area 106. In another embodiment, any kind of alphabetical characters, symbols or instructions (e.g., instructions for the device to attempt to connect to WiFi via WPS, disconnect/reconnect WIFI, change operating mode, pair with Bluetooth, etc.), or combination of these could be entered in a similar way depending on the desired operating function.

In some embodiments, the sensing area 106 may be large enough so that each spatially distinct control area 202A-D can sense an entire finger. Accordingly, each spatially distinct control area 202A-D may independently verify a finger and be used to give authentication to access a device. For example, a key fob that can start 1 of 2 or more automobiles for a verified user may implement such spatially distinct control areas on its sensing area. That is, a universal key fob configured to lock/unlock and start an automobile may include a fingerprint sensor large enough to accommodate 2, 3, 4, or more specifically distinct regions each large enough to image enough of a fingerprint for verification. Each distinct region of the key fob can be configured so that activation of the region corresponds to a different automobile. Thus, the key fob can be configured to permit an authorized user to operate any of 2, 3, 4, or more automobiles by touching a specific region of the sensor corresponding to a particular vehicle and providing a verifying fingerprint.

FIG. 2B is a top view of the sensing area 106 of the fingerprint sensor 102 in control mode according to some embodiments. In verification or enrollment mode, the user may place a finger on the center of the sensing area 106 to produce a fingerprint image. In control mode, the user may control a device by placing a finger on spatially distinct control areas within the sensing area 106 of the fingerprint sensor 102. In the illustrated embodiment shown in FIG. 2B, the fingerprint sensor 102 is installed on a wearable fitness monitor. In control mode, the user may pause or start the monitoring by placing his or her finger on the appropriate quadrant 202A-D of the sensing area 106 during normal operation of the wearable fitness monitor. As shown in FIG. 2B, the top left quadrant 202A of the sensing area 106 is marked with a "pause" symbol, and the bottom right quadrant 202D of the sensing area 106 is marked with a "play" symbol. Accordingly, the user can pause the monitoring by placing a finger on the top left quadrant 202A and start/resume the monitoring by placing a finger on the bottom right quadrant 202D.

In some embodiments, regions 202B and 202D may be non-functional, reserved for other manufacturer-defined functions, or reserved for certain user-defined functions.

As shown in FIGS. 2A-2B, the spatially distinct control areas may be visible to the user. In some embodiments, the dividing lines 204A-B ("cross hairs") may be indicated on the sensing area 106 and visible to the user continually during operation of the fingerprint sensor 102. In other embodiments, an elliptical shape 206 may be indicated on the sensing area 106. In such embodiments, the elliptical shape 206 is centered in the sensing area 106 to encourage the user to place a finger centrally on the sensing area 106 when using the fingerprint sensor 102 in enrollment or verification mode. Different shapes may be used for the indication instead of the elliptical shape 206. The indication of the dividing lines 204A-B and the elliptical shape 206 may be implemented by the use of distinguishing colors, lines, and textures achieved through printing and/or etching. A suitably chosen overlay which does not adversely impact the sensitivity of the sensing area 106 may be used to indicate the spatially distinct control areas.

In some embodiments, an OLED display may operate as the fingerprint sensor 102. In such embodiments, the fingerprint sensor 102 may display the indication of the dividing lines 204A-B and the elliptical shape via the OLED display. Exemplary embodiments of the OLED display configured to operate as a fingerprint sensor are described in U.S. Patent Application Publication No. US 2017-0308228, entitled "Display with Integrated Touch Screen and Fingerprint Sensor," the disclosure of which is incorporated by reference in its entirety.

FIGS. 3A-3B illustrate an application of a data input device in the form of an overlay 302 placed over the sensing area 106 of the fingerprint sensor 102 installed on a smart card 104 according to some embodiments. As shown in FIGS. 3A-3B, the overlay 302 may be placed over the sensing area 106 of the fingerprint sensor 102 of the smart card shown in FIG. 3A. A battery or external power source may be connected to one or more of the contact pads 108 to provide power for the operation of the fingerprint sensor 102. The overlay 302 may comprise an adhesively-backed sticker or film temporarily and removably placed over a portion of the card 104 including the sensing area 106 of the fingerprint sensor 102, as shown in FIG. 3B. Repositionable adhesives provided by companies such as 3M, Krylon, Franklin Adhesives and Polymers, and Bostik may be applied to the overlay 302 to temporarily place over the portion of the card 104 including the sensing area 106. The overlay 302 may indicate the spatially distinct control areas of the sensing area 106 through pierced holes 304A-D defining four data input keys, each being associated with a spatially distinct control area of the sensing area 106. The pierced holes 304A-D may provide a zoning effect without impacting the sensitivity of the fingerprint sensor 102. As shown in FIG. 3B, the four pierced holes 304A-D indicate the spatially distinct control areas on the sensing area 106 of the fingerprint sensor 102 corresponding to numbered "keys" 1, 2, 3, and 4. In other embodiments, there may be a larger number or smaller number of pierced holes depending on the function of the fingerprint sensor. The user may input a numerical activation code (also referred to as an authentication code) by placing a finger over the spatially distinct control areas in a sequence according to the activation code, thus unlocking and putting the smart card 104 into the enrollment mode. Instructions may be provided on the overlay 302 to give guidance to the user, and each spatially distinct control area may be labeled or numbered. For example, the user may call a phone number listed on the overlay 302, such as, a 1-800 phone number, to retrieve the numerical activation code to be entered or the user may receive an SMS text on their personal cell phone from a secure financial institution. Once the user retrieves the numerical activation code, the user may input the code by connecting the card 104 to a power source and placing a finger over the numbered spatially distinct control areas in a sequence according to the code, thus unlocking the card. Accordingly, only authorized end users may unlock a locked card 104 delivered through a public mail system. A user may input a gesture over the sensing area 106, such as swiping a pattern to join a plurality of spatially distinct control areas in a predetermined sequence.

The overlay 302 may comprise a single pierced hole defining one data input key, the one data input key being associated with a spatially distinct control area of the sensing area 106 configured to receive a Morse code-type data input by the user. In such embodiments, the user may retrieve activation instruction and input the activation code according to the retrieved instruction by making one or more separate sequential contacts of varying, specified durations with the input key. For example, the user may call a specified phone number to be instructed to use a finger to press down on the data input key when the user hears a beep and to lift the finger when the beep ends. This process could be repeated for one or more additional beeps of varying durations. The user may receive the Morse code activation instructions through an SMS text or a downloadable audio file.

In some embodiments, contact with the sensor may be determined by the fingerprint sensor 102 and sensor controlling circuitry by scanning the entire sensing area 106, cancelling any background noise, and calculating an average measurement at each sensor element in order to determine a signal exceeding a threshold indicating contact with the sensor element. If sensor elements registering a signal exceeding the threshold are confined to one discrete spatially distinct region—meaning the user has touched only one "key"—the contact is registered as a valid input—not necessarily the "correct" input, which is determined by the sequence provided by the code, but merely that a valid input was received. If sensor elements registering a signal exceeding the threshold are not confined to one discrete spatially distinct region—meaning the user has simultaneously touched more than one key—the contact is registered as an error. The system can be configured to register multiple touches as a valid input to increase the number of possible inputs from which a unique activation code can be constructed. For example, while contact with the "1" key and the "2" key constitute two valid possible inputs, simultaneous contact with both the "1" key and the "2" key may constitute a third valid possible input.

The fingerprint sensor 102 may detect an absence of a finger placed over the sensing area 106—i.e., absence of a signal—to distinguish between each data input by the user.

After the activation code has been successfully entered, the overlay 302 may be peeled off and disposed of when no longer used. In some embodiments, a small tab 310 sticks out of one side or corner of the overlay 302 so that the user may peel off the overlay 302 with ease. Care should be taken, however, to ensure that the card is not unintentionally removed from the power source in the process of peeling the overlay 302 off the card 104. The small tab 310 may be located on an edge or corner of the overlay 302 which encourages the user to peel off the overlay 302 in a direction moving towards the power source, rather than pulling away from the power source, to avoid dislodging the card from the power source.

As shown in FIG. 3B, the card 104 may include an LED 308 or other indicator element, and the overlay 302 may comprise a pierced hole 306 positioned over the LED 308 allowing the user to see the LED when the overlay 302 is temporarily placed over a portion of the card 104 including the sensing area 106 and the LED 308. The LED 308 may illuminate and flash to communicate various instructions and confirmations to the user. For example, the LED may show: (1) a solid light for 2-3 seconds which indicates that the fingerprint sensor 102 is powering up when the card 104 is properly connected to a power source; (2) a single flash that indicates that a valid entry by the user has been made; (3) short repeated flashes that indicate that an entry made by the user has not been made (i.e., an invalid entry attempt); (4) solid light for a long period of time, e.g., 5 seconds, which indicates that a code or data entry made by the user is correct; (5) long repeated fast flashes which indicates that a code or data entry made the user is incorrect; and (6) rapid repeated flashes when the user has exhausted a maximum number of input attempts without correctly entering the activation code. In another embodiment, the LED 308 may be multicolor. Accordingly, the LED 308 may flash different colors in a variety of combinations to communicate the various instructions and confirmations described above.

In some embodiments, the card 104 may include more than one LED 308 or other indicator element. In such embodiments, more than one LED 308 may flash different colors to communicate the various instructions and confirmations described above. For example, when there is one red LED and one green LED, the following states may be indicated: (1) both LEDS are off until power is applied to the card; (2) when power is applied, if a fingerprint template is already enrolled on the card, the green LED is on solid; (3) if no fingerprint template is enrolled on the card, an enrollment sequence starts described by the following steps 4 to 10; (4) the green LED flashes until a finger is placed on the sensor, or until a finger that remains on the sensor since the previous image capture step is taken off the sensor and then put back down again; (5) the green LED goes off when the finger is on the sensor and an image is captured; (6) if the detected sensor coverage by the finger is less than a threshold denoting a poor image capture, the red LED goes on solid for 1 second and the sequence returns to step (4); (7) if the detected sensor coverage is more than or equal to a threshold denoting likelihood of a good image capture, both LEDs stay off while the captured image is assessed to determine if it should be enrolled; (8) if the image is enrolled, the green LED goes on solid for one second, otherwise if the image has not been enrolled, the red LED goes on solid for one second; (9) repeat steps 4 to 8 until a sufficient fingerprint template is created; (10) the green LED goes on solid to indicate the process has completed successfully. The enrollment sequence (also referred to as the enrollment mode) may be terminated after the fingerprint template is stored. A flexible display such as an OLED may be embedded into the body of the card 104 to provide the user with detailed visual and textual feedback.

The fingerprint sensor 102 may include a screen or a sound emitting unit, such as an audio speaker or a vibrator, to provide feedback to the user such as a status indication. In such embodiments, the overlay 302 may be shaped or contain a cutout so the user may observe the screen and receive the status indication. In some embodiments, an OLED display may operate as the fingerprint sensor. In such embodiments, the fingerprint sensor 102 may provide feedback to the user such as a status indication via the OLED display.

Figure 4A:
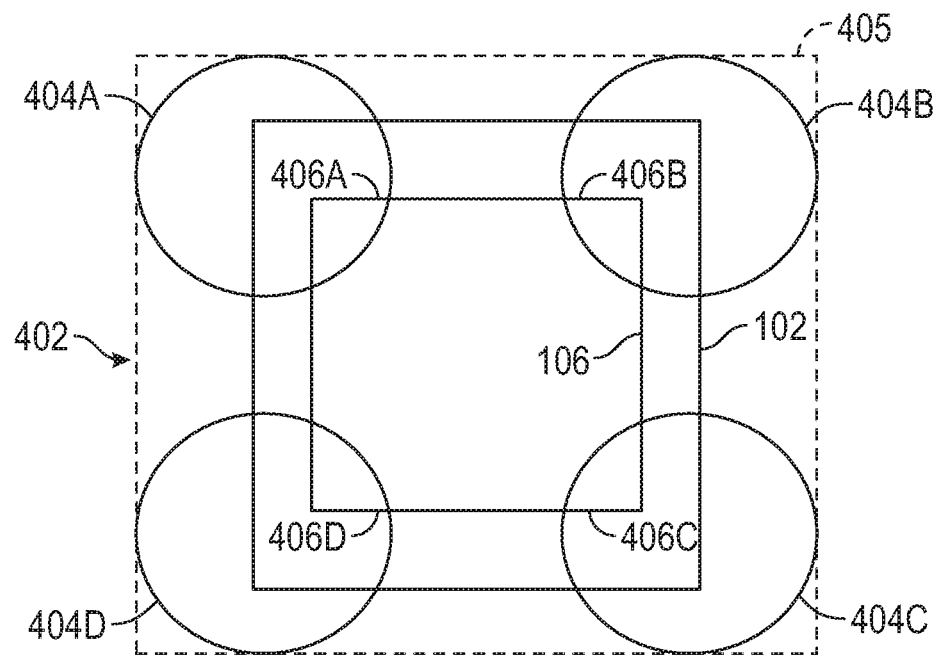
Figure 4B:
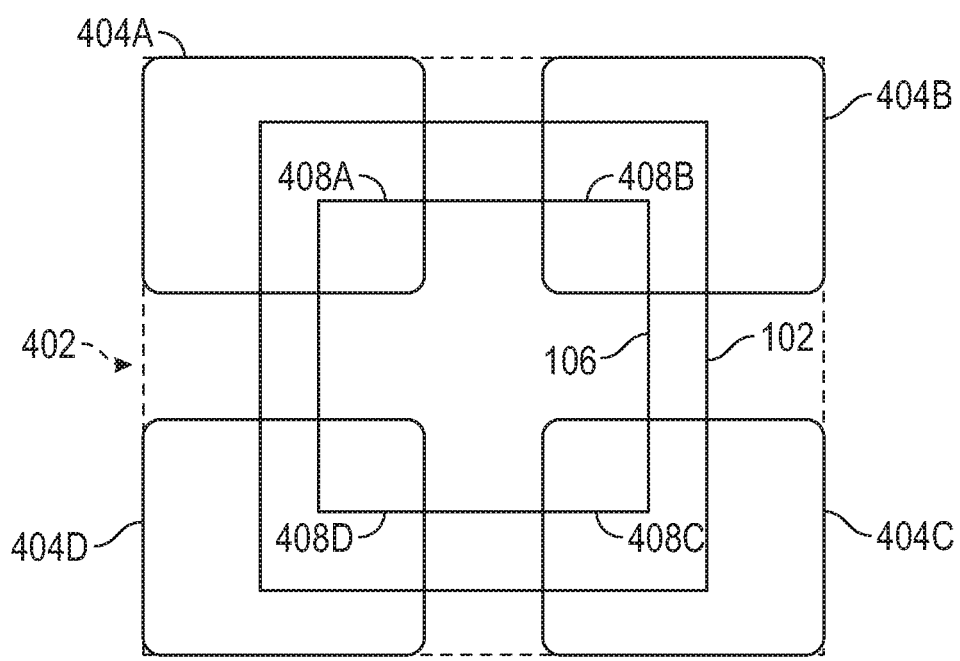

FIGS. 4A-4C are top plan views of a data input device in the form of an overlay 402 temporarily placed over the sensing area 106 with different configurations of pierced holes 404A-D formed in the overlay 402 according to some embodiments. As shown in FIGS. 4A-4C, the pierced holes 404A-D are defined spaces, such as holes or windows, in the overlay 402 surrounded by material. The surrounding material prevents a finger from making contact with the underlying sensing area 106 when a finger is placed on the overlay 402. The pierced holes 404A-D may be in a circle, oval, square or polygon shape. The pierced holes 404A-D may define data input keys associated with spatially distinct control regions of the sensing area 106 used to input data or otherwise control a device in which the fingerprint sensor 102 is installed. In the embodiments illustrated in FIGS. 4A-4C, only a portion of each pierced hole 404A-D overlies a portion of the sensing area 106, and the spatially distinct regions of the sensing area corresponding to the pierced holes 404A-D do not collectively constitute the entire sensing area 106. Technically, a spatially distinct region may be defined by a single sensor element (pixel) so long as the data input device (e.g., overlay) is configured so that a user contact with a particular "key" of the data input device corresponding to the spatially distinct region is detected at that single sensor element. This allows the fingerprint sensor area 106 and the overlay 402 to provide a larger effective touch entry area (as shown by the dotted lines 405 in FIG. 4A) for the user while maintaining accurate finger detection.

FIG. 4A illustrates an embodiment of the pierced holes 404A-D in which the pierced holes 404A-D are shaped as circles and located at each corner of the sensing area 106. As shown in FIG. 4A, each of the pierced holes 404A-D defines a circle sector sensing area 406A-D for each associated spatially distinct control area. The circle sector sensing areas 406A-D are responsible for detecting a finger when placed over the corresponding hole 404A-D. In some embodiments, the pierced holes 404A-D are separated at an optimal distance so that the fingerprint sensor 102 may distinguish which spatially distinct control area of the sensing area 106 a user is touching while maintaining the largest area for each circle sector sensing area 406A-D. As described above, in an embodiment, the fingerprint sensor 102 may recognize and reject any data input when the user simultaneously places a finger over two or more spatially distinct control areas of the sensing area 106. In some embodiments, 8 mm diameter circles may be used for the pierced holes 404A-D.

The fingerprint sensor 102 may not scan for every sensor element in the two dimensional array of sensor elements in the sensing area 106, which may improve sensor response time in data input mode. For example, the fingerprint sensor 102 may scan every sensor element in the sensing area 106 not covered by the overlay 402. As shown in FIG. 4A, the fingerprint sensor 102 may recognize the exposed sensing areas defined by the circle sector sensing areas 406A-D. Accordingly, the fingerprint sensor 102 may scan the sensor elements located within the circle sector sensing areas 406A-D.

In some embodiments, since the sensor 102 does not require the same resolution in a data input mode as is required in a fingerprint sensing mode, the fingerprint sensor 102 may scan for every other, or every third (or more) sensor element in a row or a column of the two dimensional array of sensor elements in the sensing area 106 (or in the sensing areas 406A-D), which may improve sensor response time in data input mode.

In some embodiments, each pierced hole 404A-D may be placed at the edge of each corner of the sensing area 106 so that each circle sector sensing area 406A-D is reduced to one sensor element, which may improve the distinction between each spatially distinct control area of the sensing area 106. In such embodiments, each spatially distinct control area of the sensing area 106 comprises one sensor element responsible for detecting a finger when placed over the corresponding hole 404A-D.

FIG. 4B illustrates another embodiment of the pierced holes 404A-D. As shown in FIG. 4B, the pierced holes 404A-D are shaped as squares with rounded corners and located at each corner of the sensing area 106. Accordingly, each of the pierced holes 404A-D forms a square sensing area with a round corner 408A-D. The rounded square configuration of the pierced holes 404A-D allows for a larger portion of the sensing area 106 to be dedicated to each associated spatially distinct control area compared to the circle configuration. The rounded squares may each comprise a length and width of 8 mm, for example.

The fingerprint sensor 102 may scan only the sensor elements located within the sensing areas 408A-D and may scan for every other, or every third (or more) sensor element in a row or a column of the two dimensional array of sensor elements in the sensing area 106 (or in the sensing areas 408A-D), which may improve sensor response time in data input mode.

In some embodiments, each pierced hole 404A-D may be placed at the edge of each corner of the sensing area 106 so that each square sensing area with a round corner 408A-D is reduced to one sensor element, which may improve the distinction between each spatially distinct control area of the sensing area 106. In such embodiments, each spatially distinct control area of the sensing area 106 comprises one sensor element responsible for detecting a finger when placed over the corresponding hole 404A-D.

FIG. 4C illustrates another embodiment of the pierced holes 404A-D. As shown in FIG. 4C, the pierced holes 404A-D are shaped as circles and located at each side of the sensing area 106 as opposed to each corner. Accordingly, each of the pierced holes 404A-D forms a circle segment sensing area 410A-D at each side of the sensing area 106. The configuration of the pierced holes 404A-D shown in FIG. 4C has the advantage of providing a large sensing area for each spatially distinct control area, while providing a minimal distance in between each of the distinct control areas.

In some embodiments, the fingerprint sensor 102 scans only the sensor elements located within the sensing areas 410A-D and may scan for every other, or every third (or more) sensor element in a row or a column of the two dimensional array of sensor elements in the sensing area 106 (or in the sensing areas 410A-D), which may improve sensor response time in data input mode.

In some embodiments, each pierced hole 404A-D may be placed at the edge of each side of the sensing area 106 so that each circle segment sensing area 410A-D is reduced to one sensor element, which may improve the distinction between each spatially distinct control area of the sensing area 106. In such embodiments, each spatially distinct control area of the sensing area 106 comprises one sensor element responsible for detecting a finger when placed over the corresponding hole 404A-D.

FIGS. 5A-5B shows a data input device in the form of a frame 502 used in relation with the sensing area 106 according to some embodiments. As shown in FIGS. 5A-5B, a frame 502 with pierced holes 506A-B may be aligned with the fingerprint sensor 102. The number, shape, and size of the pierced holes 506A-B may differ as described above in relation to FIGS. 4A-4C. As shown in FIG. 5A, the frame 502 may be positioned on the fingerprint sensor 102 with a hinge allowing the frame 502 to flip open and reveal the entire sensing area 106 for fingerprint sensing. As shown in FIG. 5B, the frame 502 may be flipped down to indicate the spatially distinct control areas 504A-B wherein the spatially distinct control areas 504A-B depend on the sensing area 106 revealed through the pierced holes 506A-B in the frame 502. The frame 502 may be positioned on the device that contains the fingerprint sensor 102. In such embodiments, the frame 502 is appropriately positioned on the device such that the frame 502 covers the sensing area 106 when flipped down and indicates the spatially distinct control areas as shown in FIG. 5B. The frame 502 may enable a user to control the device that contains the fingerprint sensor 102 by placing a finger on the spatially distinct control areas 504A-B. For example, the user may place a finger on a wireless protected setup (WPS) key 504A to connect the device to WiFi or place a finger on a reset key 504B to reset the device. In other embodiments, frame 502 may be positioned on the fingerprint sensor or the device that contains the fingerprint sensor with a slider such that the frame 502 may slide back and forth in direction "A" to conceal or reveal the sensing area 106.

In some embodiments, a detectable feature of the frame 502 can be sensed by one or more sensor elements of the sensing area 106 to determine that the frame 502 is flipped down and to put the sensor area 106 in data input mode to detect contact with one of the spatially distinct keys 504A or 504B. The detectable feature may be a metal, metalized paint or conductive ink, conductive polymer or any conductive coating added to the side (bottom) of the frame 502 that comes in contact with the sensing area 106 when the frame 502 is flipped shut. In such embodiments, the metal, metalized paint, conductive ink, conductive polymer, or any conductive coating allows the fingerprint sensor 102 to detect whether the frame 502 is open or closed. The fingerprint sensor 102 may switch modes depending on whether the frame 502 is open or closed. For example, when the frame 502 is open and the entire sensing area 106 is revealed, the fingerprint sensor 102 no longer detects the metal, metalized paint or conductive ink and enters a fingerprint sensing mode, such as, for example, the verification mode or the enrollment mode. As another example, when the frame 502 is closed, the fingerprint sensor 102 detects the metal, metalized paint or conductive ink and enters a mode depending on the configuration of the metal, metalized paint or conductive ink. In some embodiments, conductive ink may be added to the bottom of the frame 502 according to a predetermined pattern such that the fingerprint sensor 102 may detect and recognize the pattern and enter a particular mode based on the pattern. The frame 502 may comprise one or more metalized dome switches which provide tactile feedback to the user. In such embodiments, an input by the user is detected by the sensing area 106 when finger pressure is applied to a surface of the dome switches. For example, the one or more metalized dome switches may look like the typical keypad on a microwave oven.

A frame may include more than one flipable data input device, each providing a distinct functionality. Each data input device may be provided with a different detectable feature—e.g., a conductive ink applied in a unique pattern—to be detected by the sensor and to configure the sensor in a different data input mode corresponding to the specific data input device.

Figure 6A:
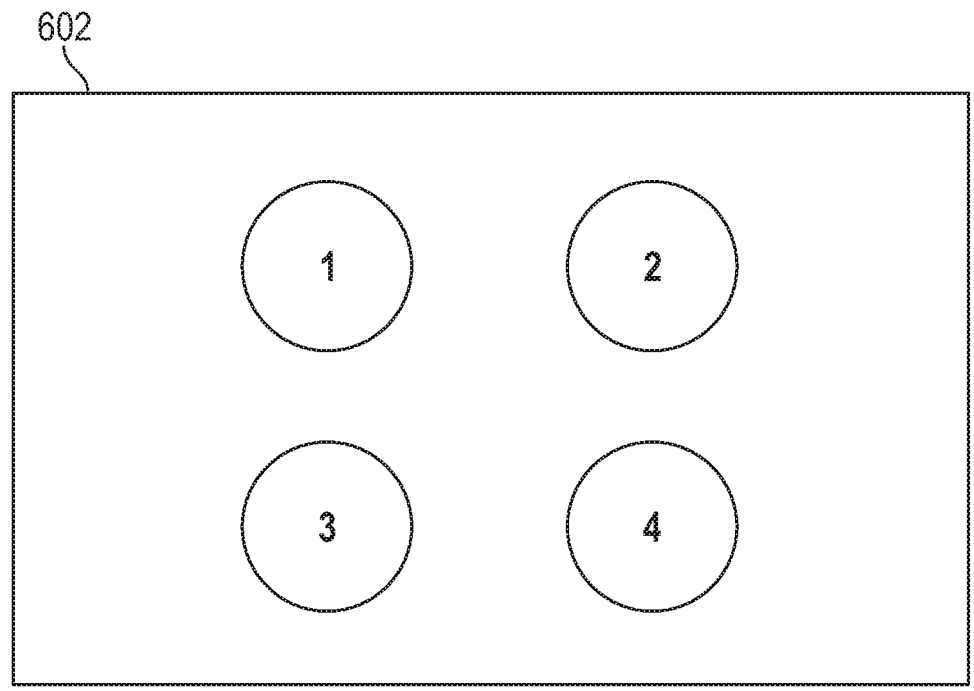
FIGS. 6A-6C illustrate a data input device in the form of a double layered overlay which may be temporarily placed over the sensing area of the fingerprint sensor according to some embodiments.
Figure 6B:
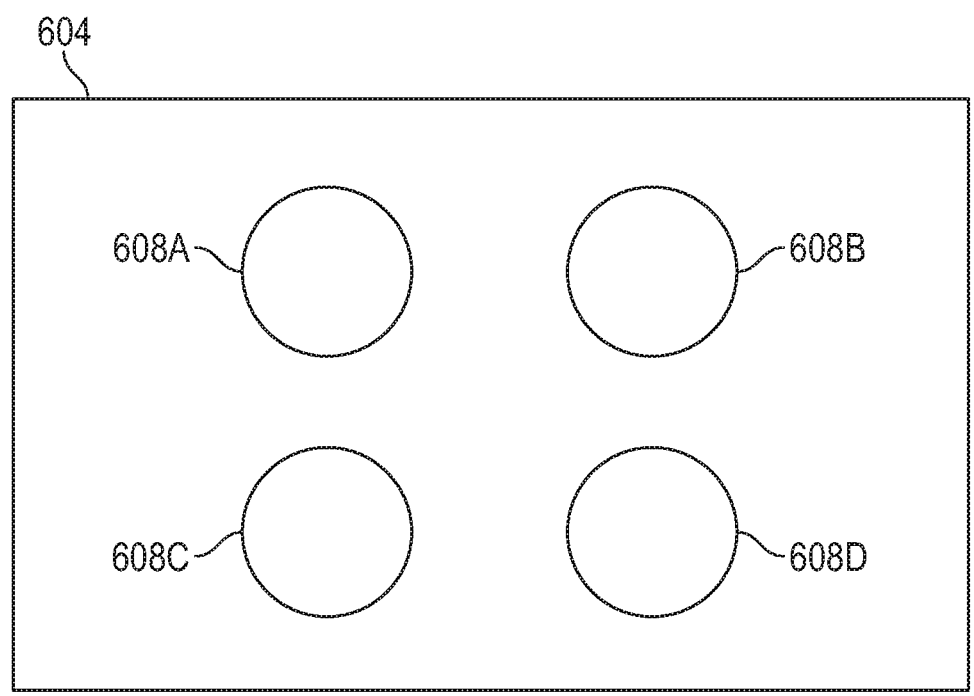
Figure 6C:
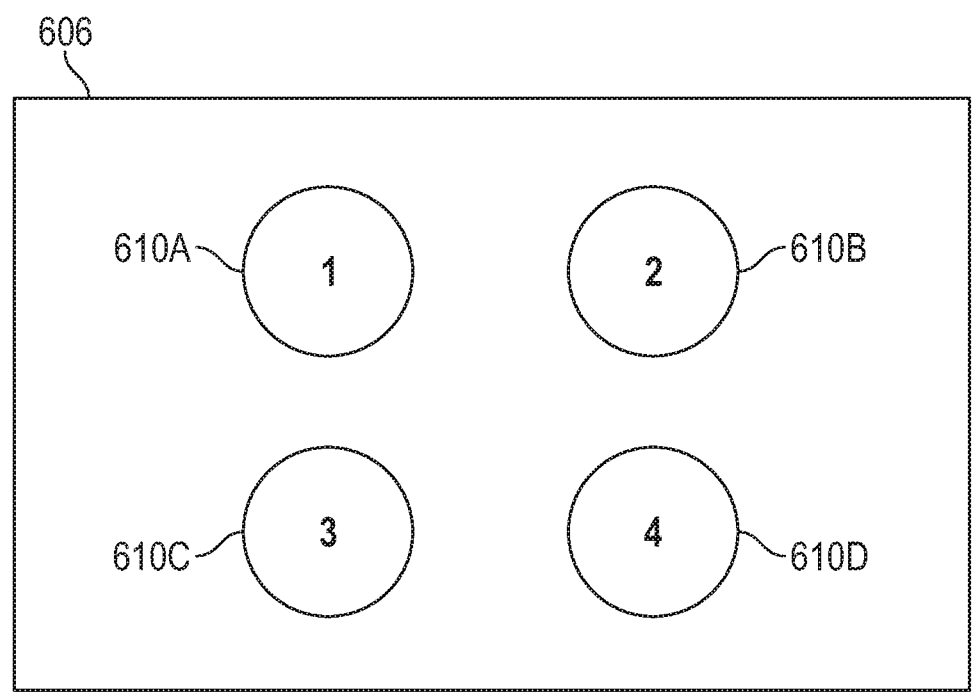

FIGS. 6A-6C illustrate the use of a data input device in the form of a double layered overlay 602 which may be temporarily placed over the sensing area 106 according to some embodiments. As shown in FIGS. 6A-6C, the double layered overlay 602 comprises an upper layer 604 and a lower layer 606, wherein the bottom of the lower layer 606 contacts the surface of the sensing area 106 when the double layered overlay 602 is placed over the sensing area 106. As shown in FIG. 6B, the upper layer 604 comprises one or more pierced holes 608A-D. The surface of the edge surrounding each pierced hole 608A-D may be slightly raised such that a user may feel the circumference of the hole when placing a finger over it. As shown in FIG. 6C, the lower layer 606 is not pierced and is made of a thin continuous sheet of material according to some embodiments. The surface of the lower layer 606 may be colored or include printed indicia, a textured pattern, or a design aligned with the pierced holes 608A-D to indicate the spatially distinct control areas to the user. The material of the lower layer 606 may be a thin polymer, typically no more than 50-100 microns in thickness. The material and thickness of the lower layer 606 should be such as to not negatively impact the detection of contact with the sensing area through the pierced holes 608A-D.

As shown in FIG. 6C, numbers or other indicia may be printed on the surface of the lower layer 606. The position of the numbered portions 610A-D on the surface of the lower layer 606 corresponds to the position of the pierced holes 608A-D on the upper layer 604. Accordingly, when the upper layer 604 and the lower layer 606 are combined to form the double layered overlay 602, the numbered portions 610A-D indicate the location of the spatially distinct control areas through the pierced holes 608A-D of the upper layer 604. The indicia may be printed on the upper layer 604. In such embodiments, the indicia may be printed substantially close to the pierced holes 608A-D so that a user may associate a separate indication for each pierced hole 608A-D.

Figure 7A:
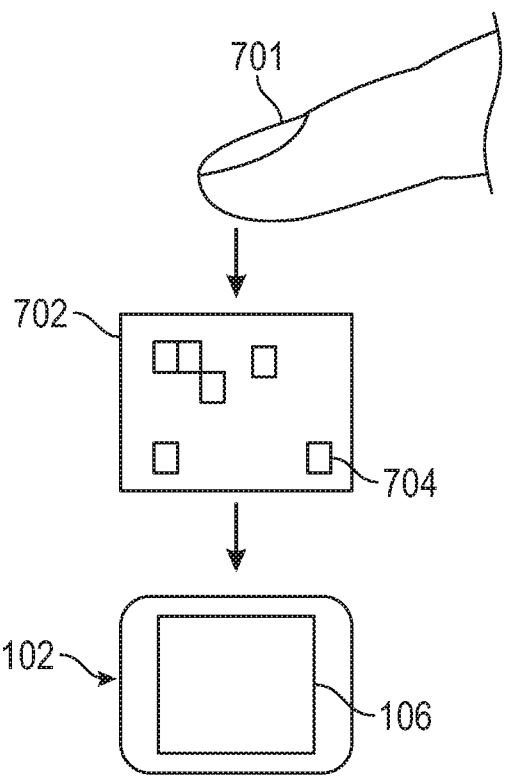
FIG. 7A illustrates a data input device in the form of an overlay with complex piercing patterns temporarily placed over the sensing area of the fingerprint sensor according to some embodiments.

FIG. 7A illustrates an embodiment of a data input device in the form of an overlay 702 with complex piercing patterns used in relation with the sensing area 106 of the fingerprint sensor 102. The overlay 702 with piercing arranged in detectable patterns, i.e., piercing patterns 704, may be used to provide a further security mechanism for the fingerprint sensor 102. For example, the patterned overlay 702 may be issued to a user and temporarily placed over the sensing area 106 to be used like a stencil for a "quick response" or QR® code (or other 2D detectable code), wherein the complex piercing pattern may constitute a unique pattern associated with the user or the device which contains the fingerprint sensor. The overlay 702 and the device on which the fingerprint sensor 102 is installed may be issued. When the user places a finger 701 over the complex piercing patterned overlay 702, preferably contacting all the piercings 704 simultaneously, the fingerprint sensor 102 only detects contact with portions of the sensing area 106 exposed through the complex pattern of piercings 704. Accordingly, the complex piercing patterned overlay 702 may function as an access code or "key" to access or otherwise utilize functions of the device on which the fingerprint sensor 102 is installed. For example, touching the sensing area 106 through the complex piercing patterned overlay 702 could put the device into a particular operating mode, or unlock special functionalities such as putting the fingerprint sensor 102 into the "enroll" mode, or performing a factory reset of the device.

The complex piercing patterns 704 on the overlay 702 may be converted into a digital representation that is stored in the memory of the device. In such embodiments, the device may require the user to touch the sensing area 106 through the complex piercing patterned overlay 702 in order to initiate a fingerprint enrollment process. For example, when the user places a finger 701 over the complex piercing patterned overlay 702, the fingerprint sensor 102 may detect the finger 701 through the complex piercing pattern 704 and compare the detected image with the stored digital representation of the complex piercing pattern 704. In some embodiments, if the detected image does not match the stored digital representation of the complex piercing pattern, the device could shut off to prevent further access by the user or emit a warning. Depending on the level of security required, the degree of matching that indicates "success" or "failure" could be made more or less strict.

Another application of the complex piercing patterned overlay 702 is to deter piracy or tampering of products. In some embodiments, devices may be sold with the complex piercing patterned overlay 702 placed over the sensing area 106. In such embodiments, the devices may only be enabled for the first time when a user places a finger over the sensing area 106 through the complex piercing patterned overlay 702, thus assuring the user that the product is genuine and/or has not been tampered with. In the embodiments disclosed in relation to FIG. 7A, the complex piercing patterned overlay 702 is used in combination with the finger 701 touching a fingerprint sensor 102. However, the concept of the complex piercing pattern 704 may be applied generally to any biometric sensor, e.g., iris, retina, palm printing, or to any device with a touchscreen in alternative embodiments.

Figure 7B:
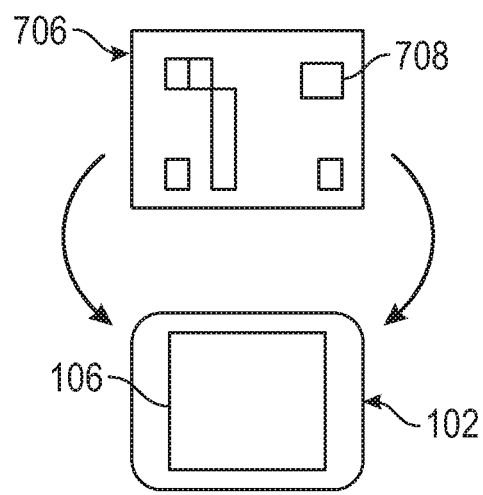
FIG. 7B illustrates a data input device in the form of an overlay with detectable printed patterns temporarily placed in contact with the sensing area of the fingerprint sensor according to some embodiments.

FIG. 7B illustrates a data input device in the form of an overlay 706 with printed patterns 708 used in relation with the sensing area 106 of the fingerprint sensor 102 according to some embodiments. In such embodiments, the overlay 706 comprises a pattern 708 of conductive material printed on it. The pattern 708 may be arranged in detectable patterns and may be used to provide a further security mechanism for the fingerprint sensor 102.

For example, the patterned overlay 706 may be issued to a user and temporarily placed on top of the sensing area 106 to be used like a "quick response" or QR® code (or other 2D detectable code), wherein the printed pattern 708 may constitute a unique pattern associated with the user or the device which contains the fingerprint sensor. The overlay and the device on which the sensor is installed may be issued separately. When the patterned overlay 706 is placed on top of the sensing area 106 of the fingerprint sensor 102 the printed pattern 708 comes in contact with the surface of the sensing area 106, and sensor elements of the fingerprint sensor 102 spatially corresponding to elements of the pattern 708 detect contact with the printed pattern 708. Accordingly, the printed patterned overlay 706 may function as an access code or "key" to access or otherwise utilize functions of the device on which the fingerprint sensor 102 is installed. For example, putting the sensing area 106 in contact with the printed patterned overlay 708 may put the device into a particular operating mode or unlock special functionalities, such as putting the fingerprint sensor 102 into "enroll" mode, or performing a factory reset of the device.

Figure 8:
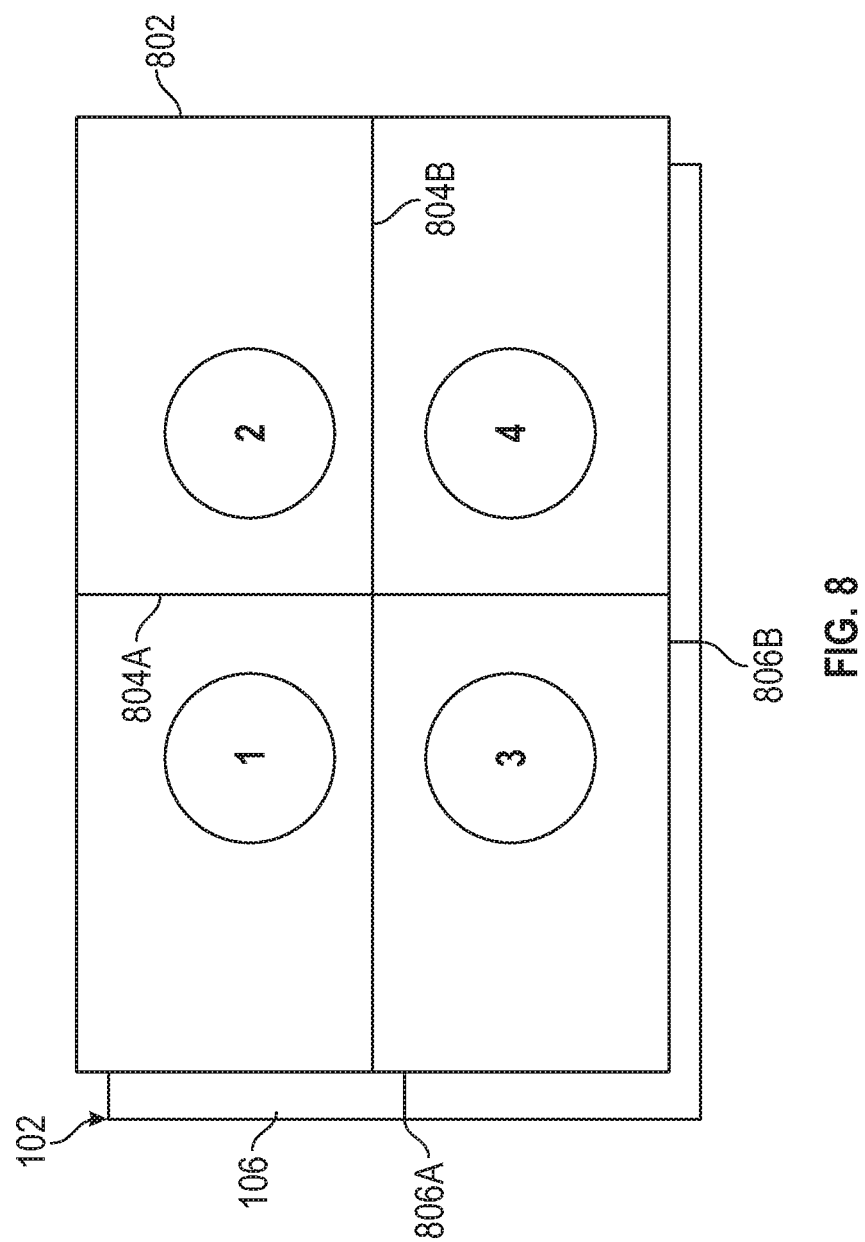
FIG. 8 illustrates a method of calibration for the fingerprint sensor according to some embodiments.

FIG. 8 illustrates a method of calibration for the fingerprint sensor 102 according to some embodiments. In some instances, a data input device such as an overlay or frame, as described in FIGS. 3-7, may be misaligned with the sensing area 106. In the illustrated embodiment shown in FIG. 8, an a data input device in the form of an overlay 802 is temporarily placed over the sensing area 106 wherein the overlay 802 is misaligned with the sensing area 106. The overlay 802 may comprise detectable features and the location of such features as detected by the sensor 102 may indicate the position of the overlay 802 with respect to the sensing area 106. For example, a vertical conductive line 804A and a horizontal conductive line 804B may be applied (e.g., with conductive ink) to the back surface of the overlay 802 to form "cross-hairs" at the center of the overlay 802. The fingerprint sensor 102 may be configured to expect the conductive lines 804A-B to be placed over the sensing area 106 at a predetermined position, in this instance a vertical and horizontal line 806A-B across the center of the sensing area 106. When an overlay 802 is placed over the sensing area 106 and the conductive lines 804A-B on the overlap 802 are not placed over the expected position, as shown in FIG. 8, the fingerprint sensor 102 detects a misalignment. The fingerprint sensor 102 may detect a margin of misalignment based on a distance between the conductive ink 804A-B on the overlay 802 and the expected placement 806A-B. In such embodiments, if the fingerprint sensor 102 detects a margin of misalignment that exceeds a predetermined threshold, the user may be alerted to replace the overlay 802 in a more accurate manner, for example with a flashing LED indicator. If the margin of misalignment does not exceed the predetermined threshold, the fingerprint sensor 102 may factor the margin of misalignment into the processing of inputs received from a finger through the overlay 802. Specifically, the fingerprint sensor 102 may adjust the expectation of the position of exposed touch areas based on the detected margin of misalignment.

The cross hairs may be replaced by a single detectable dot or a small cross at the centroid of the overlay. In some embodiments, unique detectable patterns may be formed on the overlay configured to impart information to the sensor. For example, the conductive lines 804A-B forming the cross hairs may each be formed of a unique pattern of dots, dashes, and spaces. The unique pattern may be detected, similar to the pattern of a bar code, and correlated with a specific instruction or other information. For example, the pattern may authenticate the overlay to confirm that the correct overlay is placed on the device. In some embodiments, different overlays may be used for different data input functions. In such embodiments, a unique detectable code may correspond to a particular functionality to thereby cause the fingerprint sensor to be configured in the correct data input mode.

The conductive ink 804A-B on the overlay 802 may allow the fingerprint sensor 102 to detect whether the overlay 802 has been removed. In such embodiments, the fingerprint sensor 102 may be configured not to enter an enrollment mode until the overlay 802 has been removed. In some embodiments, a variety of different overlays—each corresponding to a different data input functionality—may be temporarily placed over the sensing area 106 to operate the fingerprint sensor 102. Each overlay may have a dedicated conductive ink pattern that the fingerprint sensor 102 can recognize. In some embodiments, certain overlays are restricted from use in relation to the fingerprint sensor 102. For example, the fingerprint sensor 102 may recognize a restricted overlay based on the dedicated conductive ink pattern and deny access for that particular overlay.

FIGS. 9A-9C illustrate an embodiment of a battery-powered power source 902 in use with the fingerprint sensor 102 installed on the smart card 104. In some embodiments, the power source 902 (also referred to as a non-data-transmitting power source) is powered by a suitable battery 905, such as a small cell LR44. Alternatively, the power source 902 may rely on any suitable power element, such as solar or harvested power. The power source 902 may comprise a socket, such as a USB socket, to allow connection of the power source 902 to a main power source. As shown in FIG. 9A, the power source 902 may include a connector housing (or receptacle) 904 with a slot 908 configured to receive an end of the smart card 104 and contacts 906 (or terminals or electrodes, e.g., flexible conductive pins) within the housing that are connected to the power element (e.g., battery 905) according to some embodiments. In some embodiments, the housing 904 is made of injection molded plastic and comprises a minimal number of parts. The housing 904 may be made of a transparent material such that the user may confirm that the power source 902 is used solely for the purpose of providing power to the smart card 104. The power source 902 is configured to be removably attached to a smart card by inserting the card into the slot 908, and the contacts 906 within the housing may contact the power transmission contacts of the contact pads 108 (e.g., typically contacts C1 VCC and C5 GND of contact pads 108 of an EMVCo® compliant card of FIG. 1) to thereby electrically connect the smart card 104 to the power element and provide power to the card 104 when inserted into the housing of the power source 902. In an exemplary embodiment, eight contacts 906 are shown in FIGS. 9A-C corresponding to an exemplary pinout as shown in contact pads 108 of FIG. 1, but only two contacts 906 are needed to connect to the card 104 to the power transmission contacts when the card is inserted into the housing of the power source 902. The remaining contacts may be omitted if no data is to be transmitted to or from the card. Removing the card from the housing disconnects the card from the power source. The card 104 may only receive power from the external power source 902 and does not require any additional external electrical connections or wireless connections in order to operate.

Figure 9D:
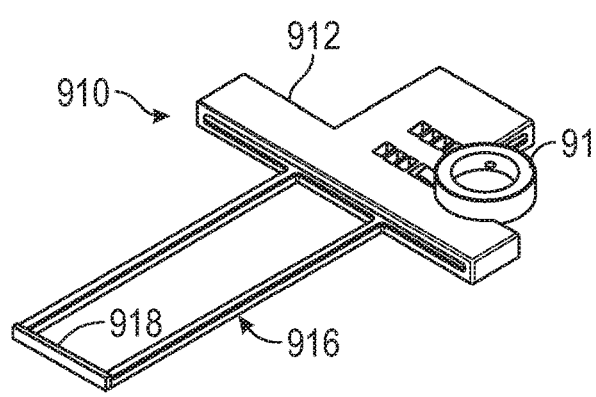
FIGS. 9D and 9E show a perspective view and plan view, respectively, of an alternative card holder/power source according to some embodiments.
Figure 9E:
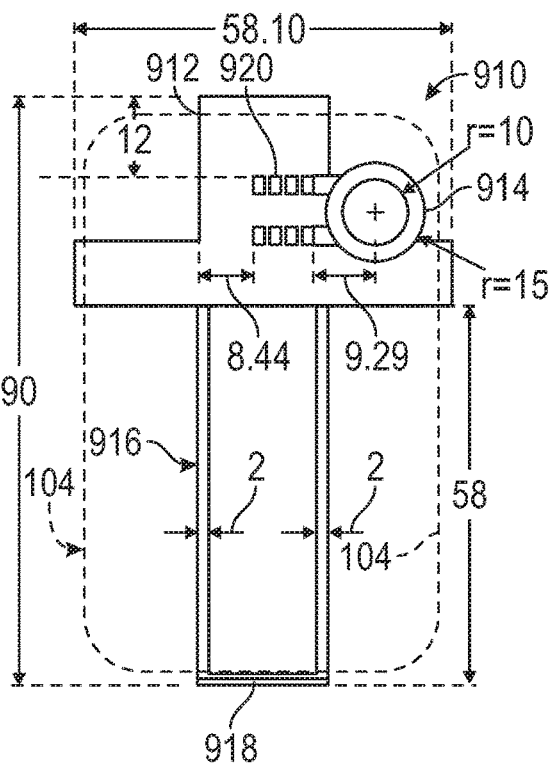

FIGS. 9D and 9E show a perspective view and plan view, respectively, of an alternative card holder/power source 910 (also referred to as a non-data-transmitting power source) according to some embodiments. FIG. 9E illustrates exemplary, non-limiting dimensions of the holder 910 in millimeters. The holder 910 comprises a slotted housing 912 (also referred to as a receptacle) configured to receive one end of the card 104 (the outline of which is shown in phantom in FIG. 9D), a battery holder 914 attached to the housing 912 and configured to hold a suitable battery, connector pins 920 coupled to the battery held in the battery holder 914 and connecting the battery held in the battery holder 914 to the power transmission contacts of the card 104 held in the housing 912. A retainer arm 916 extends from the housing 912 and includes parallel arms with a lip 918 spanning the ends of the two arms at a distal and thereof for engaging an edge of the card 104, thereby holding the card 104 in an inserted position with respect to the housing 912.

The power source may comprise one or more LEDs or other status indicators (e.g., visual, audible, tactile indicators) used to indicate the status to the user during enrollment in a situation where there are no status indicators on the smart card itself, where status indicators on the smart card are not suitable, or to supplement status indicators on the smart card. In such embodiments, a component on the smart card 104, such as the fingerprint sensor, the secure element module, or other processing circuitry, monitors the state of the enrollment process and modulates a power line in the card 104 in a known manner, depending on the state of the enrollment process. The power source may further comprise a detector circuit configured to detect the power line modulation and activate the one or more LEDs accordingly to indicate the correct state of the enrollment process.

The power source designs illustrated in FIGS. 9A-9E are ideal for providing power to a smart card, however the same design principles may be applied to create power sources for other devices with limited feedback that contain fingerprint sensors. For example, a power source for a fitness monitor would provide power to the fingerprint sensor on the fitness monitor but would need no data connection with the fitness monitor or the fingerprint sensor.

Of course, if the device on which the fingerprint sensor is installed is an electronic device having internal power, it may not be necessary to connect the device to an external power source to operate the fingerprint sensor. For example, the device may comprise an internal power source such as a solar cell panel or a battery.

There are multiple ways that enrollment mode could be triggered on the card using the power supplied by a power source, such as power source 902. For example, enrollment mode could be automatically triggered after sensing power to the card for the first time. In some embodiments, enrollment mode could be triggered after an activation code has been successfully entered using a data input device, such as the overlay sticker as shown in FIGS. 3A-3B. In some embodiments, enrollment mode could be triggered by activating an input mechanism, such as a switch or array of switches located on the power source. In any case, care must be taken to ensure the smartcard is not unintentionally removed from or otherwise disconnected from the external power source during enrollment mode. Thus, for an adhesively held overlay sticker—such as shown in FIG. 3B and a card inserted into the slot of a housing of the power source, the sticker must be carefully removed from the card in such a manner as to not remove the card from the housing. The following embodiments encompass power source arrangements that are intended to reduce the likelihood that the card will be disconnected from the power source when the data input device overlay is removed from the fingerprint sensor.

Figure 9F:
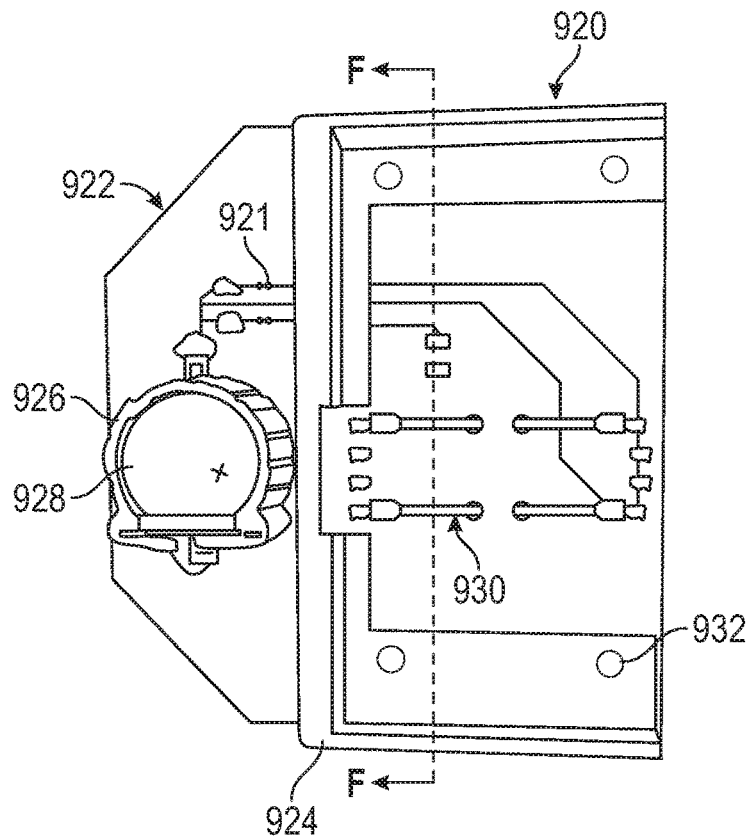
FIG. 9F is a top perspective view of an alternative card holder/power source without a card disposed in the card holder according to some embodiments.
Figure 9G:
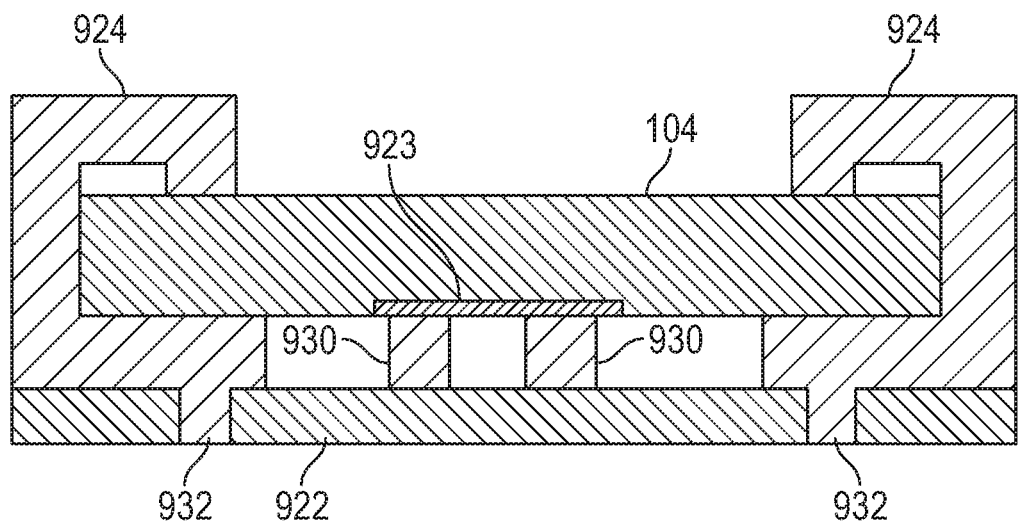
FIG. 9G illustrates a transverse cross section of the card holder/power source along the line F-F in FIG. 9F, with a card disposed in the card holder according to some embodiments.
Figure 9H:
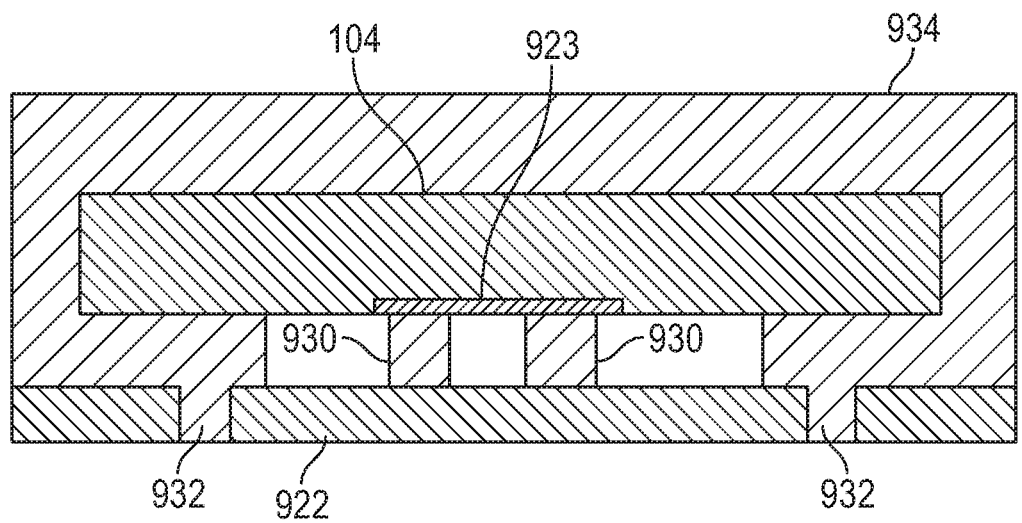
FIG. 9H illustrates a transverse cross section of a card holder/power source similar to FIG. 9G and showing an alternative card holder/power source according to some embodiments.

FIGS. 9F-9H illustrate an alternative card holder/power source 920 according to some embodiments. FIG. 9F is a plan view with no card inserted in the card holder/power source (also referred to as a non-data-transmitting power source) 920, and FIG. 9G is a cross-sectional view but showing a card inserted in the card holder/power source. In some embodiments, the holder 920 comprises a substrate 922, for example a single sided PCB, a film, plastic, or cardboard. Card guide rails 924 may be mounted on the substrate 922 and configured to receive one end of the card 104. A battery holder 926 may be attached to the substrate 922 and configured to hold a suitable battery 928. Connector pins 930 attached to the substrate between the card guide rails 924 are conductively coupled to the battery 928 via conductive traces on or within the substrate and connect the battery to power transmission contacts 923 of the card 104 held in the card guide rails 924. The card guide rails 924 may slot around one or more edges of the card 104 to hold it in position. The card guide rails 924 may be adhered directly to the substrate, or held in place with mounting pins 932 which fit into corresponding holes in the substrate. In some embodiments, status indicators 921, such as LEDs, may be added to the substrate 922. In an alternative embodiment illustrated in cross-section in FIG. 9H, the card guide rails 924 may be replaced with a housing 934 configured to receive one end of the card 104 and hold it in position. The housing 934 may be adhered directly to the substrate, or held in place with mounting pins 932 which fit into corresponding holes in the substrate 922.

Figure 10C:
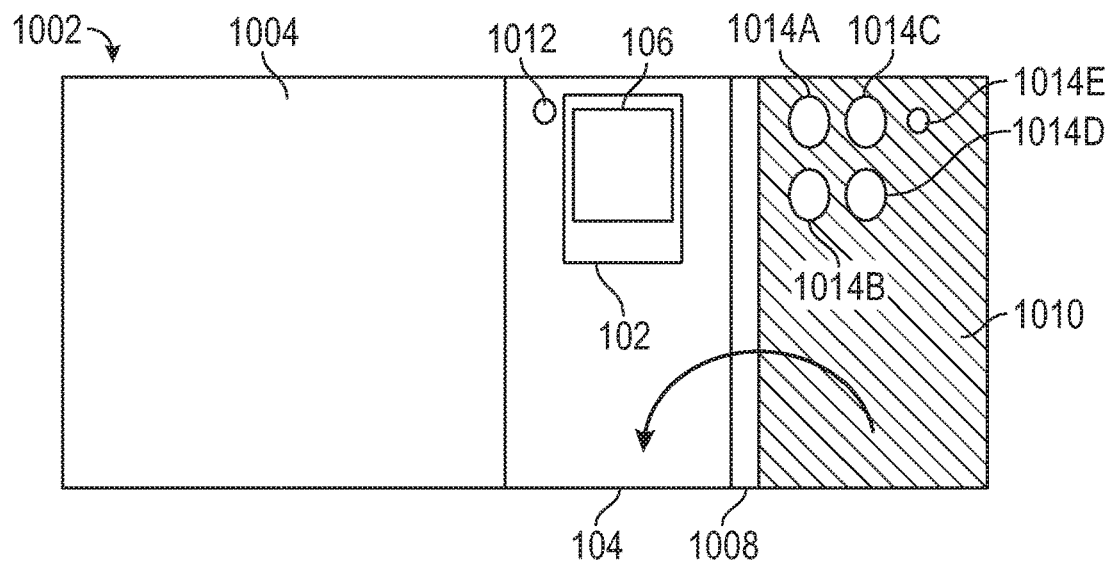

FIGS. 10A-10E illustrate an alternative power source with a connector 1002 in use with the fingerprint sensor 102 installed on the smart card 104 according to some embodiments. As shown in FIG. 10A, the power source (also referred to as a non-data-transmitting power source) 1002 comprises a top cover 1004, a bottom cover 1006, and a flap 1010 connected to the bottom cover 1006 with a hinge or foldable connection 1008. The top cover 1004 is combined with the bottom cover 1006 to form a pocket in which the smart card 104 can be removably received. The bottom cover 1006 is longer than the top cover 1004 by about the width of the flap 1010. This allows the flap 1010 to flip shut over the bottom cover 1006 to form an extended top cover over the entire area of the bottom cover 1006. The flap 1010 comprises pierced holes 1014A-E positioned on a top corner adjacent to the hinge 1008. The function of the pierced holes 1014A-E will be described in more detail in FIG. 10D. The top and bottom covers 1004, 1006 form a housing that receives the card. The power source may include a portable power element (e.g., a battery or solar element, not shown), and contact elements (not shown) internal to the housing provide electrical contact to power transmission contacts of the card when the card is inserted into the housing.

As shown in FIG. 10A, the smart card 104 comprises an LED 1012, contact pads 108 which may be part of a secure element module conforming to the EMVCo® protocol, and a fingerprint sensor 102 comprising a sensing area 106. In some embodiments, the fingerprint sensor 102 is positioned on one of the uppermost corners of the smart card 104.

As shown in FIG. 10A, the flap 1010 of the power source (also referred to as a non-data-transmitting power source) 1002 is open and the smart card 104 is positioned so that the smart card 104 may be inserted into the power source 1002 in direction "B." As shown in FIG. 10B, the smart card 104 is inserted into the pocket formed by the top and bottom covers 1004, 1006 of the power source 1002. Accordingly, the power source 1002 is removably connected to a power input, such as power transmission contacts of the contact pads 108, on the smart card 104 and provides power to operate the fingerprint sensor 102.

As shown in FIG. 10C, once the smart card 104 is fully inserted, the top cover 1004 of the power source 1002 partially covers the surface of the smart card 104, leaving the fingerprint sensor 102 uncovered. The flap 1010 is then flipped over to close over the uncovered portion of the smart card 104. In some embodiments, the pierced holes 1014A-E are located on the flap 1010 such that when the flap 1010 is closed, the pierced holes 1010A-E expose portions of the sensing area 106 and the LED 1012 to provide a data input device to enable a user to enter a code via the sensor 102. In some embodiment, the number, size, and position of the pierced holes 1010A-D may be configured as described in FIGS. 4-6.

Figure 10D:
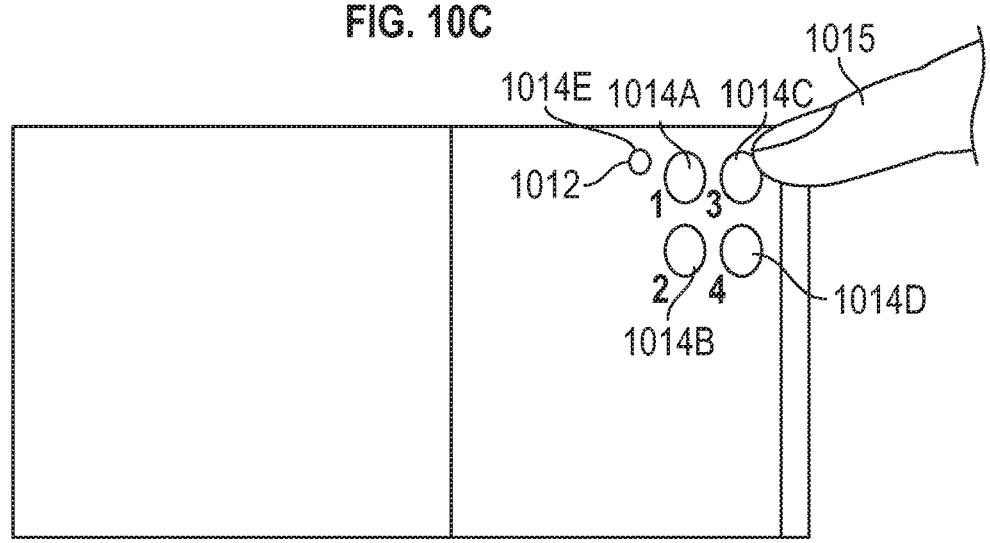

As shown in FIG. 10D, the pierced holes 1014A-D are numbered and indicate spatially distinct control areas of the sensing area 106. The user may enter data, such as a numerical activation code by placing a finger 1015 over the numbered pierced holes 1014A-D in a specific sequence. The pierced hole 1014E over the LED 1012 allows the user to receive status indications while entering the data.

In other embodiments, the flap 1010 may comprise embedded mechanical buttons instead of the pierced holes 1014A-D. In such embodiments, when the flap 1010 is closed, the embedded mechanical buttons make contact with the sensing area 106 when pressed by a user. In some embodiments, pads on the embedded mechanical buttons are conductive so that contact with the sensing area 106 may be detected by the sensor. The embedded mechanical buttons may be a dome, plunger, and blister buttons to provide a tactile aspect of the data entry "keys".

Figure 10E:
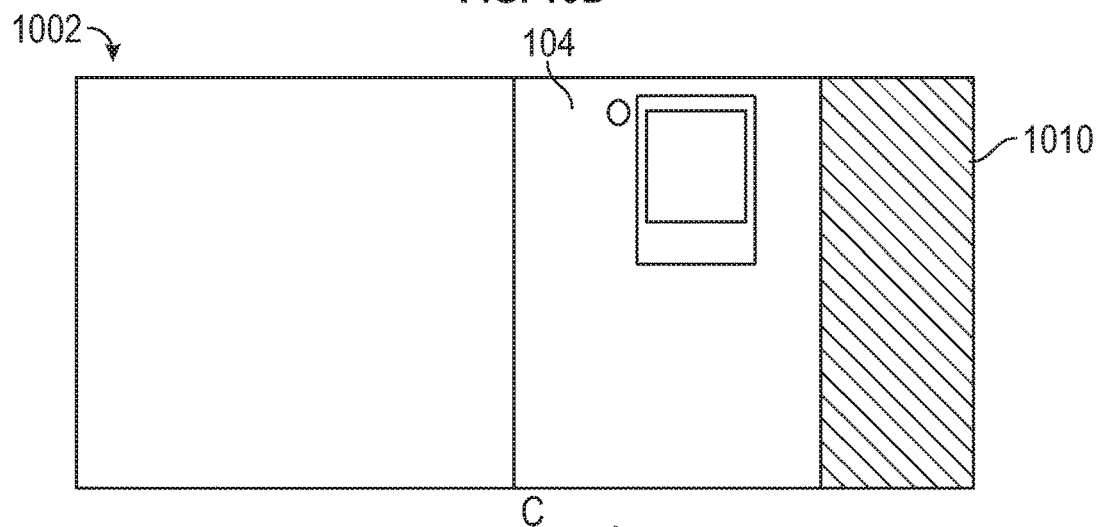

As shown in FIG. 10E, once the user completes data entry (e.g., enters a correct code), the flap 1010 may be opened and the smart card 104 may be removed. The fingerprint sensor may begin a fingerprint enrollment process once the user makes a correct code or data entry. In some embodiments, the flap 1010 is opened and the entire sensing area 106 is revealed in order to proceed with the fingerprint enrollment process. A detectable feature—such a conductive ink mark or pattern—may be provided on the back side of the flap 1010 to allow the sensor 102 to detect whether the flap 1010 is open or closed and/or allow the sensor to calibrate for the exact position of the holes as described above in relation to FIG. 8. The smart card 104 may be removed from the power source 1002 in direction "C" after a sufficient fingerprint template of the user's fingerprint is acquired and stored.

The power source 1002 may be used for purposes other than enrollment as described in FIGS. 10A-10E. For example, the power source 1002 may be used to lock, or temporarily disable, the smart card 104. In order to lock the smart card 104, the smart card 104 may be inserted into the power source 1002 as illustrated in FIGS. 10A-10B. Once the smart card 104 receives power from the power source 1002, the user may place a finger on the sensing area 106 for verified use of the smart card 104. Subsequently, the user may flip the flap 1010 over the uncovered portion of the smart card 104 such that the pierced holes 1010A-E expose portions of the sensing area 106 and the LED 1012 to provide a data input device to enable the user to enter a code via the sensor 102, as described in FIGS. 10C-10D. In such embodiments, the user may retrieve a numerical locking code for the smart card 104. For example, the user may retrieve the numerical locking code through a phone call, an SMS, or an online banking application. Once the user retrieves the numerical locking code, the user may input the locking code by placing a finger over the numbered pierced holes 1014A-D in a sequence according to the code. As a result of a valid entry of the locking code, the smart card may be locked or temporarily disabled from use. The smart card 104 may be removed from the power source 1002 after the locking process is concluded. The process described above for locking the smart card 104 may be used to unlock the smart card 104. In another embodiment, the smart card 104 may be unlocked by placing a finger on the sensing area 106 for verification.

Figure 11A:
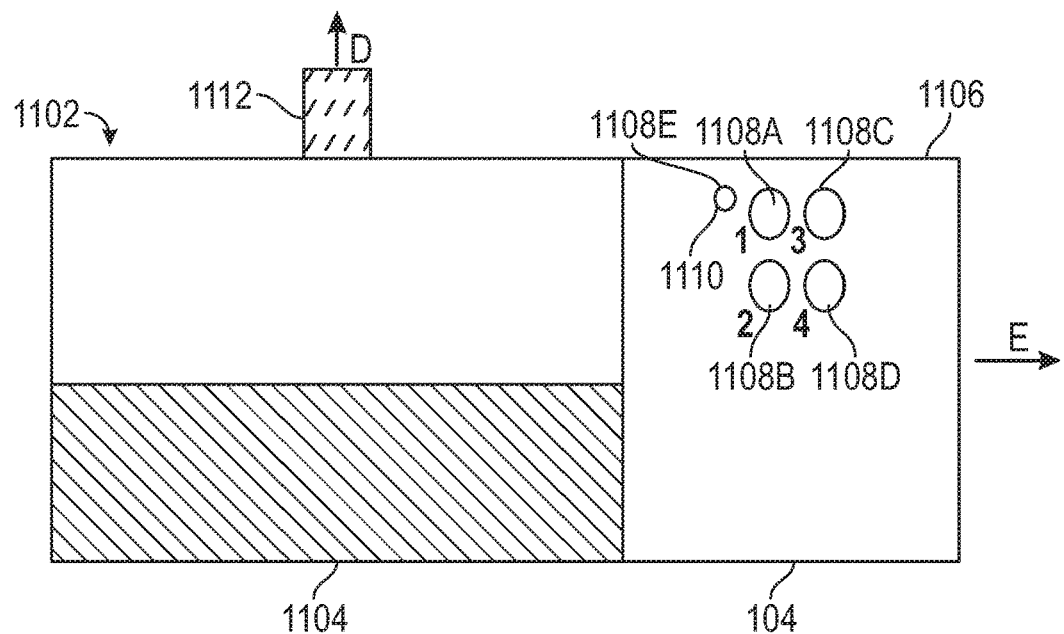
FIGS. 11A-11C illustrate an embodiment of the power source in use with the fingerprint sensor installed on the smart card.
Figure 11B:
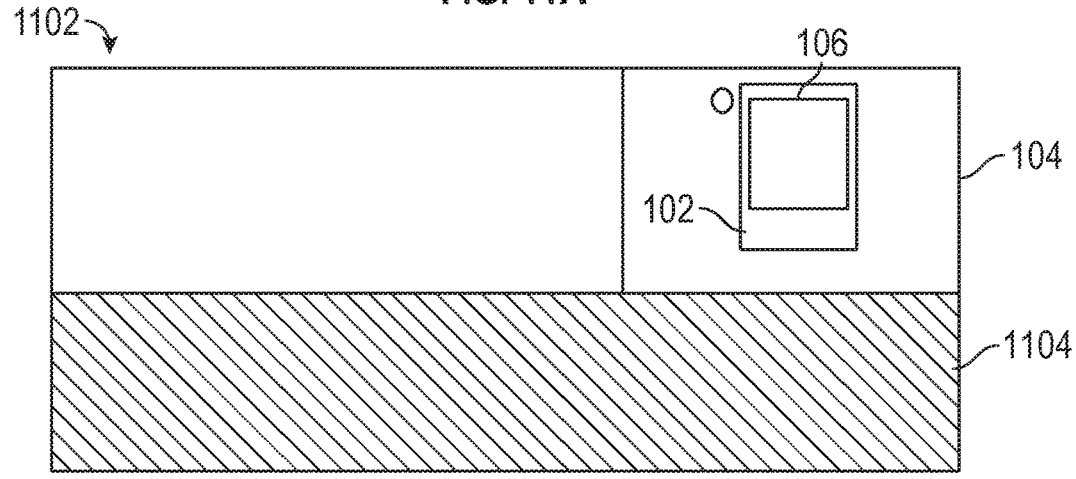
Figure 11C:
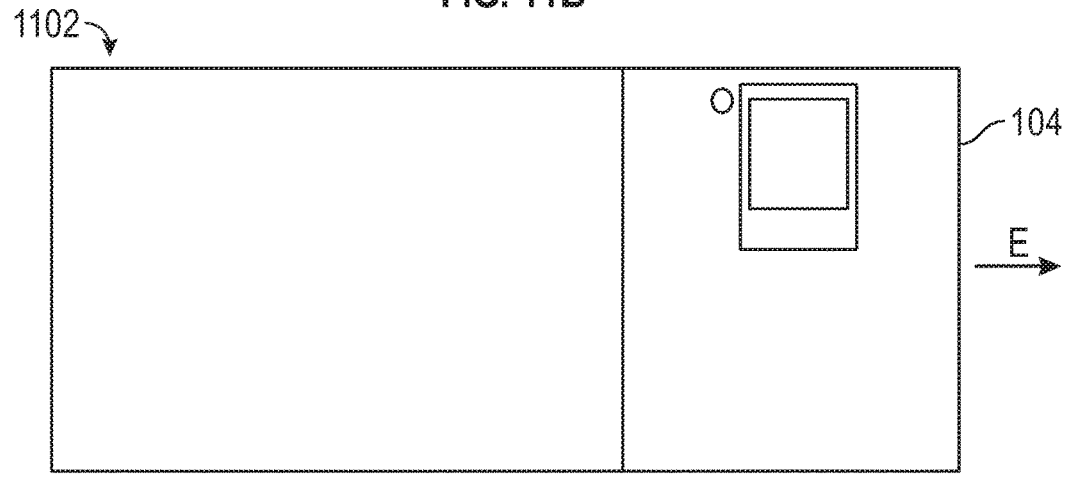

FIGS. 11A-11C illustrate another embodiment of a power source (also referred to as a non-data-transmitting power source) 1102 in use with the fingerprint sensor 102 installed on the smart card 104. As shown in FIG. 11A, the smart card 104 may be already removably received in the power source 1102, which may comprise an envelope-like housing configured to receive an end of the card and provide electrical contact between a power element (e.g., a battery or solar element) and the card. The power source 1102 only partially covers the smart card 104 so that the portion containing the fingerprint sensor 102 is exposed. A continuous sleeve 1104 wraps around a bottom end of combined power source 1102 and around the left, right, and bottom ends of smart card 104 to keep the smart card 104 in place within the power source 1102 housing. A data input device in the form of a sleeve 1106 may be used to cover the portion of the smart card 104 containing the fingerprint sensor 102. In some embodiments, the sleeve 1106 overlaps one end of the continuous sleeve 1104. Pierced holes 1108A-E located on the sleeve 1106 expose portions of the sensing area 106 and an LED 1110 on the fingerprint sensor 102. In an embodiment, a battery connection tab 1112 may be provided between the power source 1102 and the smart card 104 to keep a power connection disconnected until ready for use. The user may pull out the battery connection tab 1112 in direction "D," as shown in FIG. 11A, to connect the power source 1102 to the smart card 104 in order to operate the fingerprint sensor 102.

The pierced holes 1108A-D may be numbered and indicate spatially distinct control areas on the fingerprint sensor 102 as shown in FIG. 11A. Accordingly, once the user connects the smart card 104 to the power source 1102, the user may enter data, such as a numerical activation code by placing a finger over the pierced holes 1108A-D in a specific sequence. The pierced hole 1108E over the LED 1110 allows the user to receive status indications while entering the data. Once the user has correctly input the data and the fingerprint sensor is ready to initiate enrollment mode, the sleeve 1106 may be slid off the smart card 104 in direction "E," as shown in FIG. 11A, while the continuous sleeve 1104 remains intact to keep the card 104 inserted in the power source 1102.

As shown in FIG. 11B, sliding off the sleeve 1106 reveals a corner of the smart card 104 containing the fingerprint sensor 102. A detectable feature—such as a conductive ink mark or pattern—may be provided on an inner surface of the sleeve 1106 to allow the sensor 102 to detect if the sleeve 1106 is in place. Upon initiation of the enrollment mode, the user may place a finger on the sensing area 106. After a sufficient fingerprint template of the user's fingerprint is acquired and stored by the fingerprint sensor 102, the continuous sleeve 1104 may be slid off in direction "F," as shown in FIG. 11B. After the continuous sleeve 1104 is slid off, the smart card 104 may be removed from the power source 1002 in direction "E", as shown in FIG. 11C.

Figure 12A:
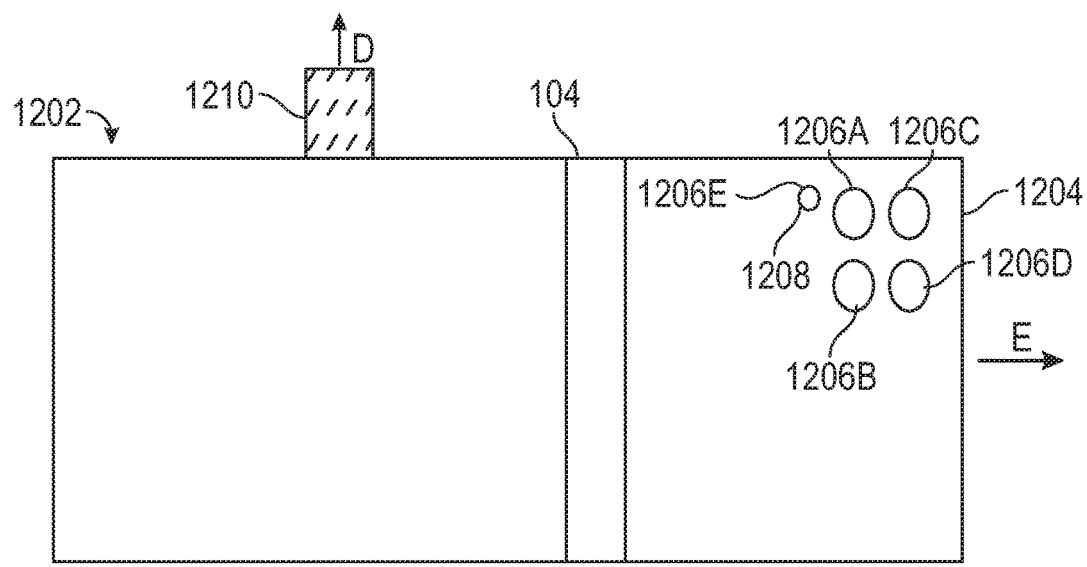
FIGS. 12A-12C illustrate an embodiment of the power source in use with the fingerprint sensor installed on the smart card.
Figure 12B:
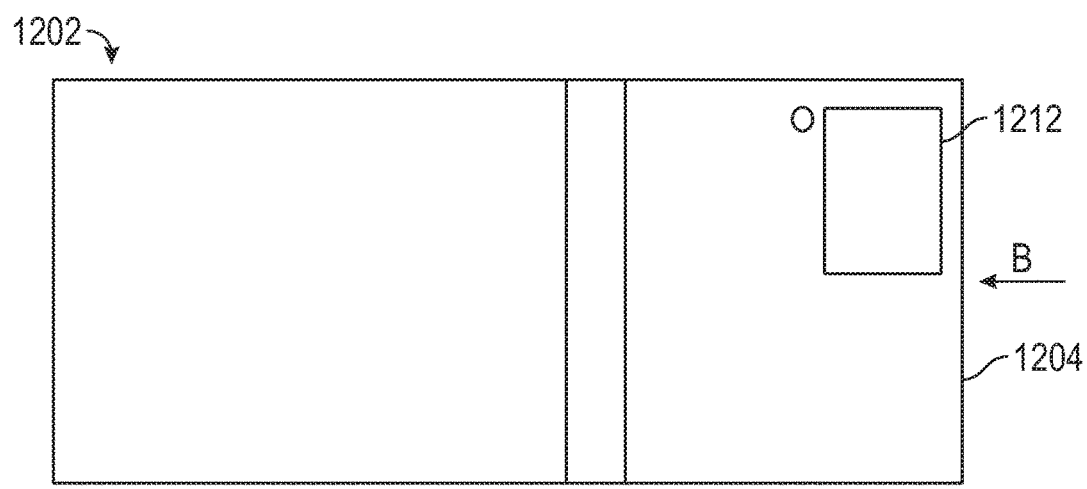
Figure 12C:
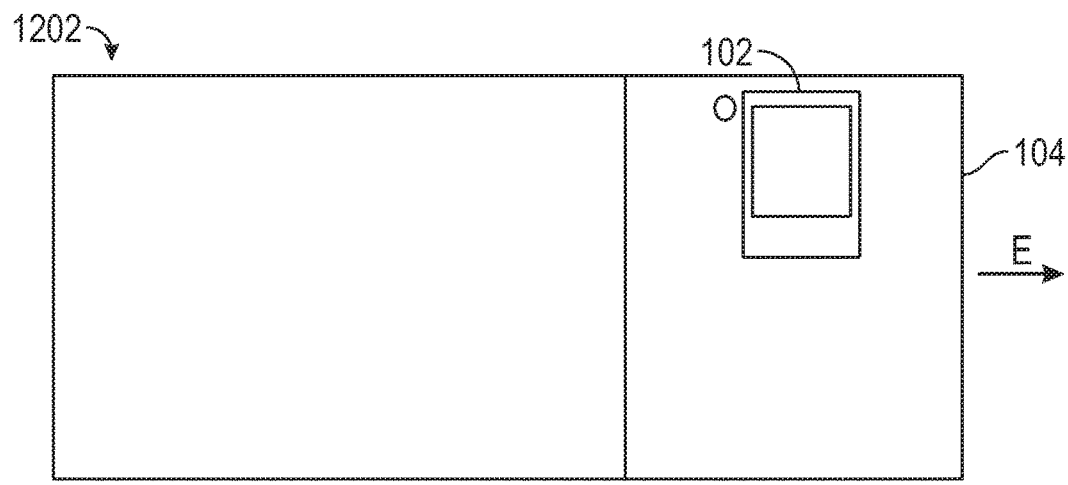

FIGS. 12A-12C illustrate another embodiment of a power source (also referred to as a non-data-transmitting power source) 1202 in use with the fingerprint sensor 102 installed on the smart card 104. As shown in FIG. 12A, the smart card 104 may be already removably received in the power source 1202, which may comprise an envelope-like housing configured to receive an end of the card and provide electrical contact between a power element (e.g., a battery or solar element) and the card. The power source 1202 only partially covers the smart card 104 such that the portion containing the fingerprint sensor 102 is exposed. A data input device in the form of a sleeve 1204 is used to cover the portion of the smart card 104 containing the fingerprint sensor 102. One side of the sleeve 1204 comprises pierced holes 1206A-E which expose portions of the sensing area 106 and an LED 1208 on the fingerprint sensor 102. A detectable feature—such as a conductive ink mark or pattern—may be provided on an inner surface of the sleeve 1204 to allow the sensor 102 to detect whether the sleeve 1204 is in place. In some embodiments, a battery connection tab 1210 is inserted between the power source 1202 and the smart card 104 to keep a power connection disconnected. The user may pull out the battery connection tab 1210 in direction "D," as shown in FIG. 12A, to connect the power source 1102 to the smart card 104 in order to operate the fingerprint sensor 102.

The pierced holes 1206A-D may be numbered and indicate spatially distinct control areas on the fingerprint sensor 102 as shown in FIG. 12A. In such embodiments, once the user connects the smart card 104 to the power source 1202 by inserting the card into the power source envelope 1202 or by removing the tab 1210 from the power source 1202 in which the card is already inserted, the user may enter data, such as a numerical activation code by placing a finger over the pierced holes 1206A-D in a specific sequence. The pierced hole 1206E over the LED 1110 allows the user to receive status indications while entering the data. Once the user has correctly input the data, the sleeve 1204 may be slid off of the smart card 104 in direction "E," as shown in FIG. 12A.

In some embodiments, once the sleeve 1204 has been slid off, a user can flip the sleeve 1204 over to reveal the finger guide 1212 and slide the sleeve 1204 back over the smart card 104 in direction "B," as shown in FIG. 12B. The finger guide 1212 may be a cutout window that indicates to the user where to place a finger on the sensor during the enrollment mode. The sleeve 1204 may then be removed from the smart card 104 after a sufficient fingerprint template of the user's fingerprint is acquired and stored by the fingerprint sensor, and the smart card 104 is then removed from the power source 1202 in direction "E," as shown in FIG. 12C.

FIG. 13 illustrates an application of another embodiment of a data input device in the form of an overlay 1302 placed over the sensing area 106 of the fingerprint sensor installed on the smart card 104. In the illustrated embodiment shown in FIG. 13, a smart card is the device containing the fingerprint sensor, but the application of the data input device is not restricted to a smart card and can be used for any device that contains a fingerprint sensor in alternative embodiments. As shown in FIG. 13, the overlay 1302 is removably placed over a portion of the card 104 including the sensing area 106 (as shown by the dotted lines in FIG. 13). The overlay 1302 may comprise data input keys 1304A-D associated with (e.g., coupled to) spatially distinct sensing areas on the sensing area 106 of the fingerprint sensor. The data input keys 1304A-D are remotely located from the sensing area 106. In some embodiments, the overlay 1302 may comprise one or more additional pierced holes to indicate spatially distinct control areas of the sensing area 106, as shown in FIG. 13, in addition to data input keys 1304A-D remotely located from the sensing area 106. As shown in FIG. 13, portions of the sensing area associated with the data input keys 1304A-D do not overlap with the spatially distinct control areas of the sensing area indicated by the one or more additional pierced holes. In some embodiments, the overlay 1302 may comprise a pierced hole 1306 over the LED 308 or other indicator element on the card 104 when the overlay 1302 is temporarily placed over a portion of the card 104 including the sensing area 106 and the LED 308. In some embodiments, an OLED display may operate as the fingerprint sensor. In such embodiments, a portion of the OLED display may be configured to be used as the indicator element. Accordingly, the pierced hole 1306 may be positioned over the portion of the OLED display configured to be used as the indicator element.

When the fingerprint sensor is used in data input mode, each data input key 1304A-D can function to enable the user to enter numbers (e.g., an activation code, such as a PIN code) by tapping his or her finger on the spatially distinct control areas 1304A-D. Each data input key 1304A-D of the overlay 1302 is electrically coupled to an associated spatially distinct portion of the sensing area 106 so that contact with each key will result in a detectable signal from the sensor element(s) of the associated spatially distinct portion of the sensing area 106. The coupling between the keys 1304A-D and the sensing area 106 allows the keys 1304A-D to be remotely located from the sensing area 106. This provides the significant advantage of positioning keys 1304A-D in locations not restricted by the boundaries of the sensing area 106. For example, extra space on the smart card 104 may be used to provide additional keys (e.g., more than four keys) or the keys 1304A-D can be spaced further apart, which may improve access for the user. In some embodiments, the overlay 1302 may comprise one data input key electrically coupled to an associated spatially distinct portion of the sensing area 106 configured to receive a Morse code-type data input by the user.

As shown in FIG. 13, the data input keys 1304A-D may be spaced out on the overlay 1302 along a short edge of the smart card 104. The data input keys 1304A-D may be spaced out on the overlay 1302 along a long edge of the smart card 104. In other embodiments, the data input keys 1304A-D may be distributed on the overlay 1302 in the middle of the smart card 104, rather than being restricted to the short or long edge. The data input keys 1304A-D may be arranged in various suitable formats depending on the application. For example, the data input keys 1304A-D may be arranged in a 2-D matrix format, a keyboard format, or a calculator pad format.

Power must be applied to the card 104 throughout a data input and enrollment process. In a non-limiting exemplary embodiment, a battery-powered power source, as shown in FIG. 9A, may be configured to be removably attached via contact pads 108 to the external battery-powered power source. A small tab 1310 extending from one side or corner of the overlay 1302 maybe provided to facilitate grasping the overlay 1302 so that the user may peel off the overlay 1302 with ease. Care should be taken, however, to ensure that the card is not unintentionally disconnected from the power source in the process of peeling the overlay 1302 off the card 104. In some embodiments, the small tab 1310 is on an edge or corner of the overlay 1302 which encourages the user to peel off the overlay 1302 in a direction moving towards the power source, rather than pulling away from the power source, to avoid dislodging the card from the power source.

The card 104 may include an LED 308 or other indicator element, and the overlay 1302 may comprise a pierced hole 1306 positioned over the LED 308 allowing the user to see the LED when the overlay 1302 is temporarily placed over a portion of the card 104 including the sensing area 106 and the LED 308. In other embodiments, the card 104 may include more than one LED 308 or other indicator element. The LED 308 may illuminate and flash to communicate various instructions and confirmations to the user.

In some embodiments, the overlay 1302 may be provided as a sleeve configured to be slid over the portion of the smart card 104 containing the sensing area 106, as shown in FIGS. 11A and 12A. Data input keys may be located anywhere on a surface of the sleeve. Each data input key may be electrically coupled to an associated spatially distinct data input portion of the sensing area 106 so that contact with each key will result in a detectable signal from the sensor element(s) of the associated spatially distinct data input portion of the sensing area 106.

In some embodiments, the overlay 1302 may be provided as an alternative power source (also referred to as a non-data-transmitting power source), as shown in FIG. 10A. In such embodiments, the data input keys may be located on the flap of the power source. The flap may comprise conductive traces which electrically couple each data input key to an associated spatially distinct input portion of the sensing area 106.

FIGS. 14A-14C illustrate an embodiment of a data input device in the form of an overlay 1402 including data input keys coupled to spatially distinct sensing areas on the sensing area of the fingerprint sensor, wherein the data input keys are remotely located from the sensing area. As shown in FIGS. 14A-14C, the overlay 1402 is a double layered overlay comprising an upper layer 1404 and a lower layer 1406. The bottom of the lower layer 1406 contacts the surface of the sensing area 106 when the overlay 1402 is placed over the sensing area 106. The upper layer 1404 and the lower layer 1406 may be made of peel-able film.

As shown in FIG. 14B, the upper layer 1404 may comprise pierced holes 1408A-D defining the data input keys, a pierced hole 1410 for an LED 308 or other indicator element on the smart card 104, and a tab 1412 for easy removal of the overlay 1402. The surface of the edge surrounding each pierced hole 1408A-D defining the data input keys may be slightly raised so that a user may feel the circumference of the holes when placing a finger over it.

As shown in FIG. 14C, the lower layer 1406 may comprise key traces 1414A-D, connection traces 1416A-D, sensing area activation traces 1418A-D, and a pierced hole 1410 for an LED 308 or other indicator element on the smart card 104. A conductive material, such as conductive ink, metallization, conductive polymer, or any conductive coating may be used to print or apply the key traces 1414A-D, the connection traces 1416A-D, and the sensing area activation traces 1418A-D onto a surface of the lower layer 1406. The key traces 1414A-D may be located remotely from the sensing area activation traces 1418A-D. The connection traces 1416A-D may connect the key traces 1414A-D to each respective, associated sensing area activation trace 1418A-D. The sensing area activation traces 1418A-D are located on the lower layer 1406 so that the sensing area activation traces 1418A-D align with the associated spatially distinct data input regions of the sensing area 106 when the overlay 1402 is temporarily placed over the smart card 104. In some embodiments, the material of the lower layer 1406 is a thin polymer, typically no more than 50-100 microns in thickness. The material and thickness of the lower layer 1406 should be such as to not negatively impact the electrical coupling of the sensing area activation traces 1418A-D with the associated spatially distinct data input regions of the sensing area 106. In some embodiments, reference traces may be printed or otherwise applied or embedded between each sensing area activation trace 1418A-D on the surface of the lower layer 1406 so that the reference traces align with associated spatially distinct reference regions of the sensing area 106. The alignment of the sensing area activation traces 1418A-D in relation to the sensing area 106 is described in further detail in FIGS. 15A-15B and FIGS. 19A-19D.

FIG. 14A illustrates a surface of the double sided overlay 1402 when the upper layer 1404 is combined with the lower layer 1406 according to some embodiments. When combined, the data input keys are defined by the key traces 1414A-D visible and accessible through the pierced holes 1408A-D. The connection traces 1416A-D and the sensing area activation traces 1418A-D are covered by the upper layer 1404 and obscured from view. In addition, the upper layer 1404 may be formed from an electrically insulating material to isolate the connection traces 1416A-D and the sensing area activation traces 1418A-D.

Figure 15A:
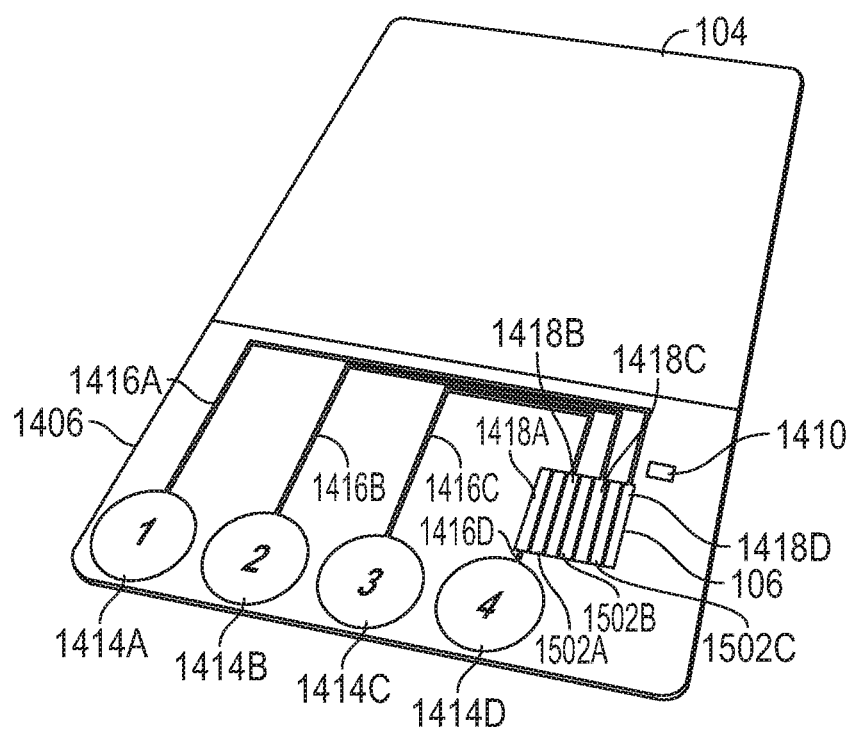
FIG. 15A illustrates an embodiment of the data input device in the form of an overlay including data input keys coupled to associated spatially distinct sensing areas on the sensing area of the fingerprint sensor and including the use of spatially distinct reference areas of the sensing area that are not coupled to associated data input keys for noise cancellation.

FIG. 15A illustrates the data input device in the form of a double layered overlay 1402 (the upper layer 1404 is not shown) temporarily placed over the smart card 104 according to some embodiments. As shown in FIG. 15A, the double layered overlay 1402 covers a portion of the smart card 104 containing the sensor area 106. The overlay 1402 is placed on the smart card 104 so that the sensing area activation traces 1418A-D on the lower layer 1406 are covering and aligned with the spatially discrete regions of the sensing area 106 (encompassing one or more specified sensor elements) associated with each key 1414A-D.

The sensing area 106 may be a sensor grid comprising spatially separated rows and columns of drive lines and pickup lines forming an array of sensor elements at overlapping locations of drive lines and pickup lines. The fingerprint sensor may be pre-programmed with expected positions of the sensing area activation traces 1418A-D corresponding to specific sensor elements on the sensing area 106. For example, the fingerprint sensor may be pre-programmed to expect the sensing area activation traces 1418A-D to cover certain rows (or portions thereof) and columns (or portions thereof) of the sensing area 106 and the associated sensor elements of the rows and columns. For example, when a finger contacts a key trace 1414A, labeled "1," the respective sensing area activation trace 1418A is connected to ground through connection trace 1416A, thereby changing the signal detected at the pickup lines (or portions thereof) (i.e., the sensor elements) covered by the sensing area activation trace 1418A. Based on the location of the detected portion of the sensing area 106, the fingerprint sensor is able to determine which key trace 1414A-D has been contacted by the finger and conclude the associated data input, which is "1" in this scenario.

Each of the sensing area activation traces 1418A-D may be positioned to cover a portion of the sensing area 106. As shown in FIG. 15A, the sensing area 106 comprises a grid of overlapping drive lines and pickup lines as described above and each of the sensing area activation traces 1418A-D may have an elongated configuration oriented in substantially the same direction as the pickup lines. Each of the sensing area activation traces 1418A-D may overlap a substantial portion of at least one pickup line. In some embodiments, each of the sensing area activation traces 1418A-D may overlap all of the at least one pickup line. In some embodiments, each of the sensing area activation traces 1418A-D may overlap a substantial portion of at least four or more pickup lines. In some embodiments, each of the sensing area activation traces 1418A-D may overlap all of the at least four or more pickup lines. In some embodiments, the sensing area activation traces 1418A-D are transverse with the pickup lines of the sensing area 106.

In some instances, the double layered overlay 1402 may be misaligned with the sensing area 106. Accordingly, the sensing area activation traces 1418A-D may be placed over the sensing area 106 misaligned with the expected positions pre-programmed into the fingerprint sensor. The double layered overlay 1402 may comprise detectable features and the location of such features as detected by the fingerprint sensor may indicate the position of the overlay 1402 with respect to the sensing area 106. A method of calibration for the fingerprint sensor based on the detectable features provided on the double layered overlay 1402 is described in more detail in FIG. 8. Accordingly, the fingerprint sensor may detect a margin of misalignment between the sensing area activation traces 1418A-D and the expected positions on the sensing area, and factor the margin of misalignment into the processing of inputs received through each sensing area activation trace 1418A-D.

The detectable features provided on the double layered overlay 1402 with respect to the sensing area 106 may comprise conductive lines forming a unique pattern of dots, dashes, and spaces. The unique pattern may be detected, similar to the pattern of a bar code, and correlated with a specific instruction or other information. For example, the pattern could authenticate the overlay 1402 to confirm that the correct overlay is placed on the card. In a situation in which different overlays may be used for different data input functions, the unique detectable code can correspond to the particular functionality to thereby cause the fingerprint sensor to be configured in the correct data input mode.

In some embodiments, the detectable features provided on the double layered overlay 1402 with respect to the sensing area 106 allow the fingerprint sensor to detect whether the overlay 1402 has been removed. In such embodiments, the fingerprint sensor may be configured not to enter an enrollment mode until the overlay 1402 has been removed. In some embodiments, a variety of different overlays—each corresponding to a different data input functionality—may be temporarily placed over the sensing area 106 to operate the fingerprint sensor. Each overlay may have a dedicated conductive ink pattern that the fingerprint sensor can recognize. In some embodiments, certain overlays may be restricted from use in relation to the fingerprint sensor. In such embodiments, the fingerprint sensor may recognize a restricted overlay based on the dedicated conductive ink pattern and deny access for that particular overlay.

Figure 15B:
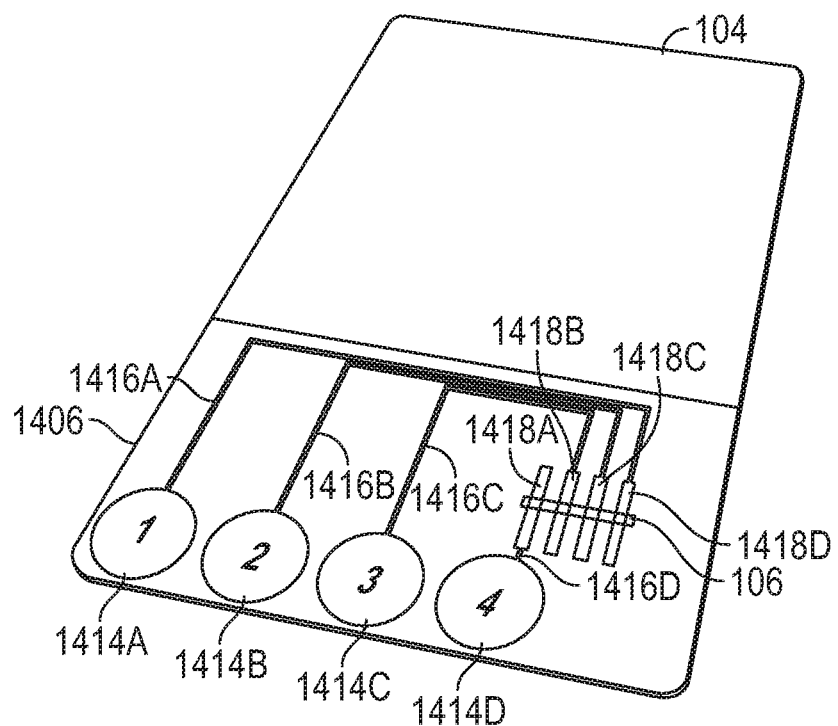
FIG. 15B illustrates an embodiment of the data input device in the form of an overlay including data input keys coupled to associated spatially discrete portions of the sensing area of the fingerprint sensor.

In some embodiments, the sensing area 106 comprises a linear array of sensor elements, as shown in FIG. 15B. Exemplary embodiments of linear arrays of sensor elements are described in U.S. Pat. No. 7,110,577, entitled "Method and Apparatus for Measuring Structures in a Fingerprint" and U.S. Pat. No. 7,751,601, entitled "Fingerprint Sensing Assemblies and Methods of Making," the respective disclosures of which are incorporated by reference in their entirety. As shown in FIG. 15B, the overlay 1402 is placed on the smart card 104 so that the sensing area activation traces 1418A-D on the lower layer 1406 are covering spatially discrete portions of the sensing area 106 (encompassing one or more specified sensor elements of the linear array) associated with each key 1414A-D.

Figure 15C:
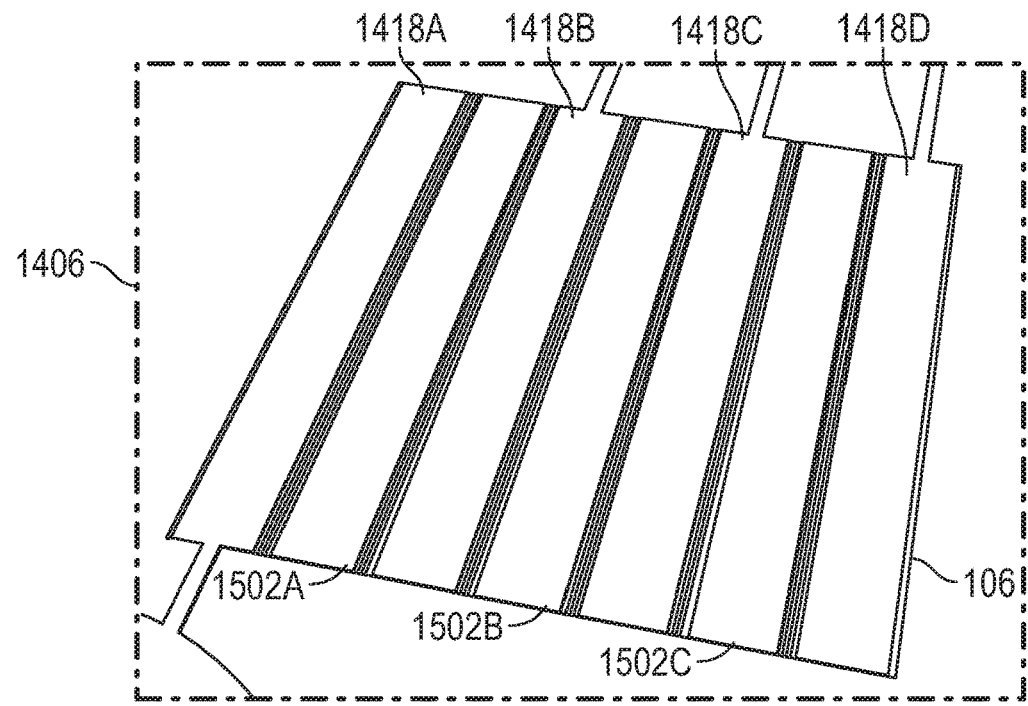
FIGS. 15C and 15D illustrate magnified views of sensing activation traces placed over a sensing area according to some embodiments.
Figure 15D:
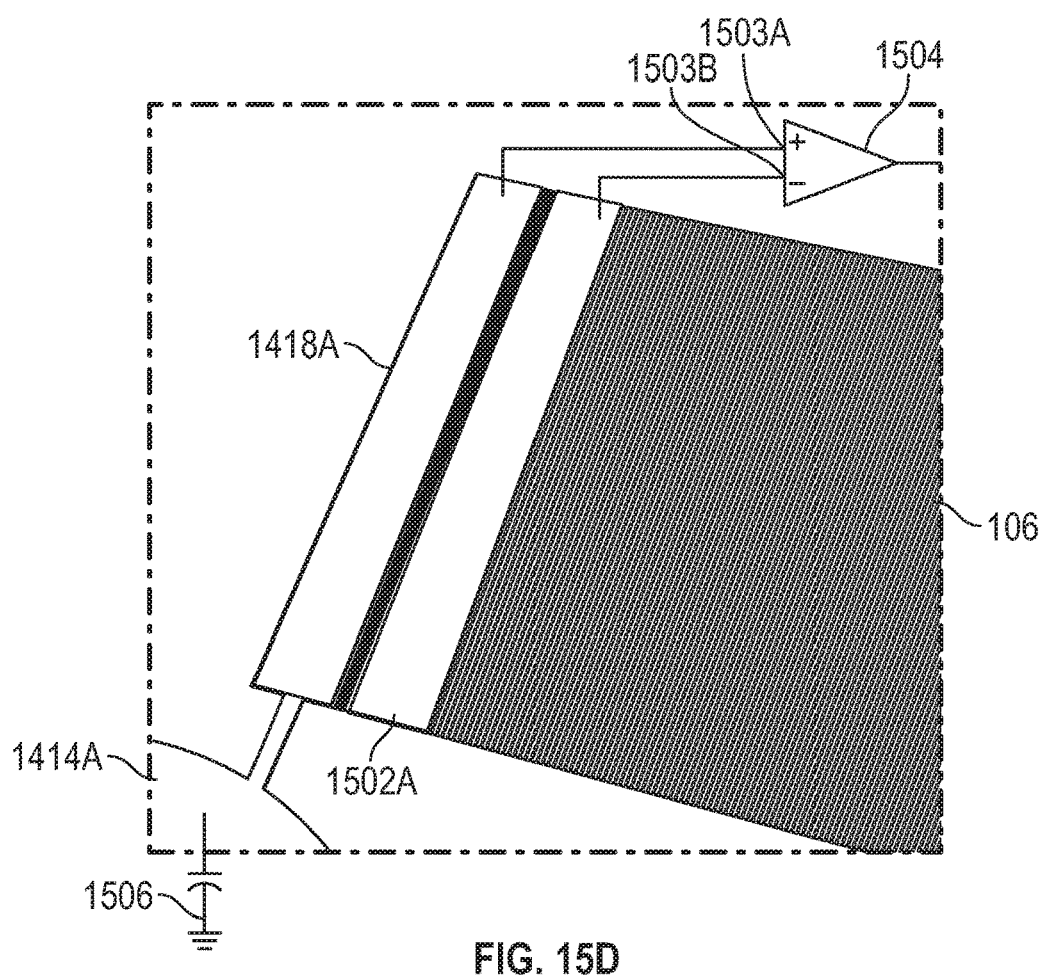

FIG. 15C illustrates a magnified view of the sensing area activation traces 1418A-D placed over the sensing area 106 according to some embodiments. As shown in FIGS. 15A and 15C, reference traces 1502A-C may be printed or otherwise applied onto or embedded into a surface of the lower layer 1406 between each of the sensing area activation traces 1418A-D such that the reference traces 1502A-C align with associated spatially distinct reference regions of the sensing area 106. The sensing area activation traces 1418A-D are connected through connection traces 1416A-D to the key traces 1414A-D. The reference traces 1502A-C are not connected to the key traces 1414A-D and may be utilized to employ a differential signal detection structure for the fingerprint sensor 102. As shown in FIG. 15D, sensor elements covered by a sensing area activation trace 1418A are connected to a positive input 1503A of a differential amplifier 1504 located in the fingerprint sensor, and sensor elements covered by an adjacent reference trace 1502A are connected to a negative input 1503B of the differential amplifier 1504 according to some embodiments. The reference trace 1502A may be subject to noise and unwanted signal inputs similar to that of the sensing area activation trace 1418A. In some embodiments, when a finger contacts a key trace 1414A, the contact by the finger completes the circuit connecting key trace 1414A to ground 1506, thereby changing pickup signals detected in the sensor elements covered by the activation trace 1418A. In such embodiments, the differential amplifier 1504 may be configured to subtract the pickup signals of the sensor elements covered by reference trace 1502A from the pickup signals of the sensor elements covered by activation trace 1418A, thereby eliminating the noise and unwanted signal inputs affecting both pickup signals equally, and leaving substantially only the signal variation in the sensor elements covered by the activation trace 1418A due to contact with the key trace 1414A. Thus, the sensor eliminates noise by subtracting the pickup signals of the sensor elements covered by a reference trace 1502A signal from the pickup signals of the sensor elements covered by an activation trace 1418A-D at the differential amplifier 1504. The use of reference traces 1502A-C to eliminate noise allows a better detection rate for the keys. In some embodiments, one reference trace 1502A may be used to eliminate noise for all of the sensing area activation traces 1418A-D.

Figure 15E:
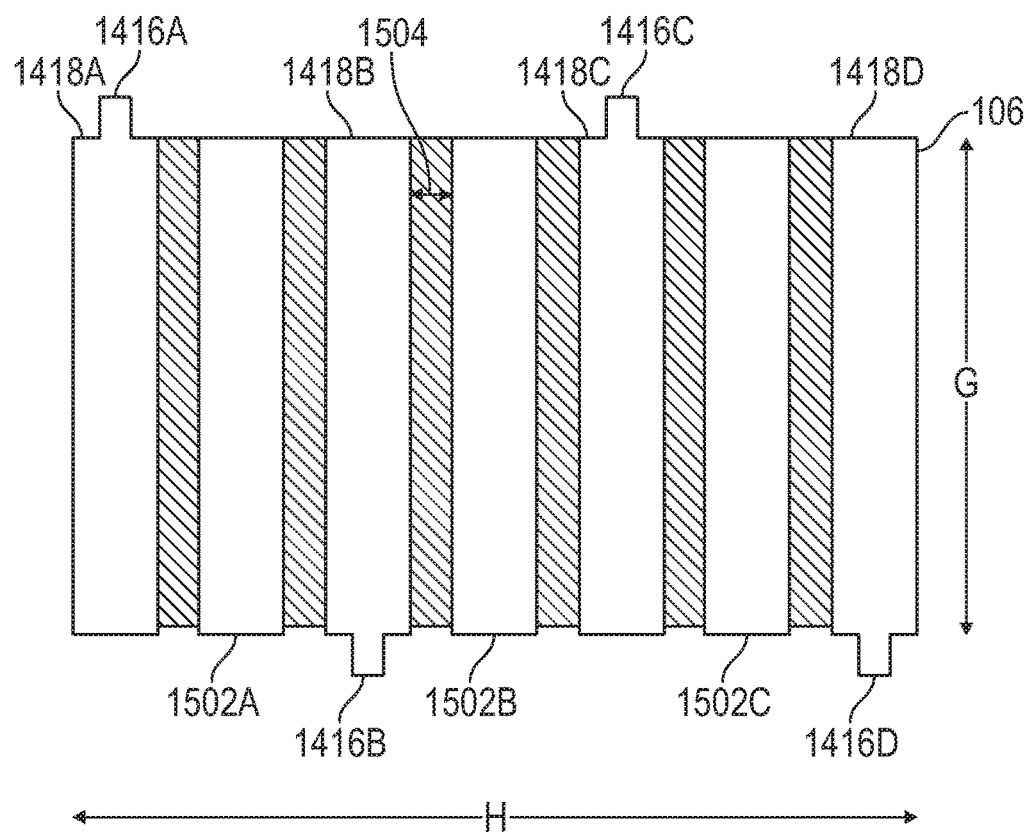
FIGS. 15E-15H illustrate embodiments of conductive material arrangement on the data input device in the form of an overlay when temporarily placed over the sensing area of the fingerprint sensor.

FIGS. 15E-15H illustrate embodiments of conductive material arrangement on the data input device in the form of an overlay when temporarily placed over the sensing area of the fingerprint sensor. As shown in FIG. 15A, the conductive material comprises four sensing area activation traces 1418A-D connected to four key traces 1414A-D (not shown in FIG. 15E) via connection traces 1416A-D and three reference traces 1502A-C. In some embodiments, the four activation traces 1418A-D facilitate a 4 key data input device. As shown in FIG. 15E, each reference trace 1502A-C is positioned between a two sensing area activation trace 1418A-D. The traces placed over the sensing area 106 are separated by a predetermined gap 1504. The width of the sensing area activation traces 1418A-D, the reference traces 1502A-C, and the gap 1504 may be determined based on the choice of conductive material used to print or insert the traces on the overlay and on the sensing area 106. For example, an achievable printer resolution may govern the minimum value of the width of the traces and the gap 1504 if conductive ink is used as the conductive material.

A single reference trace 1502A-C may be used for two or more sensing area activation traces 1418A-D provided that the sensor elements associated with the two or more sensing area activation traces 1418A-D are not to be sensed simultaneously when sharing the single reference trace 1502A-C. For example, a first sensing area activation trace 1418A may use a reference trace 1502A and a second sensing area activation trace 1418B may also use the reference trace 1502A for differential signal detection. In such embodiments, sensor elements associated with the first sensing area activation trace 1418A and the second sensing area activation trace 1418B should not be sensed simultaneously when sharing the single reference trace 1502A. In some embodiment, the second sensing area activation trace 1418B can use a second reference trace 1502B.

Figure 15F:
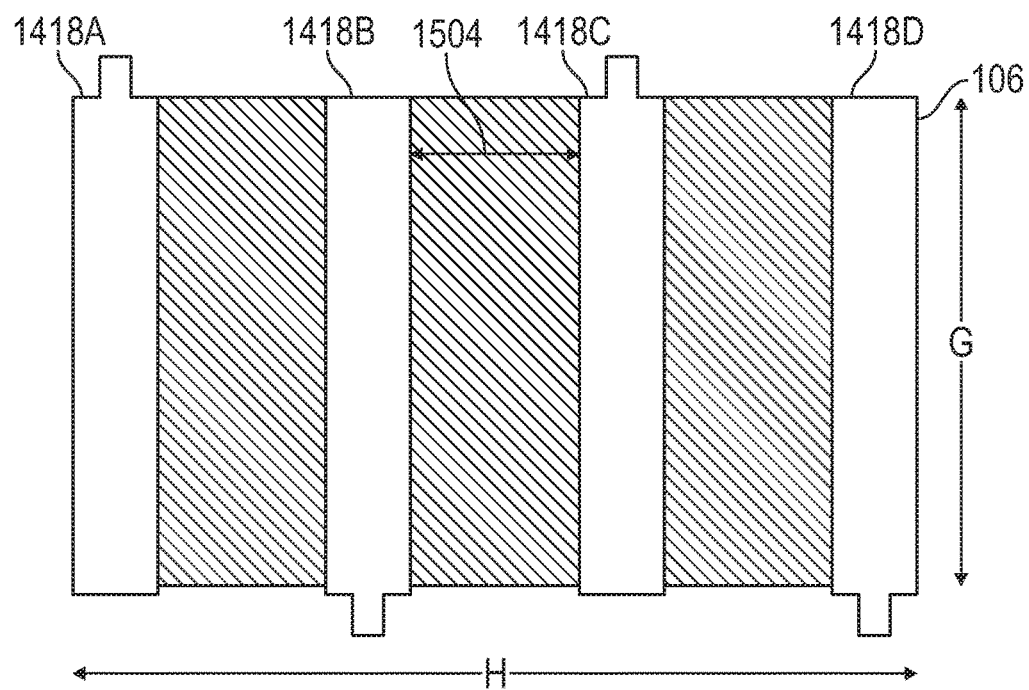
Figure 15G:
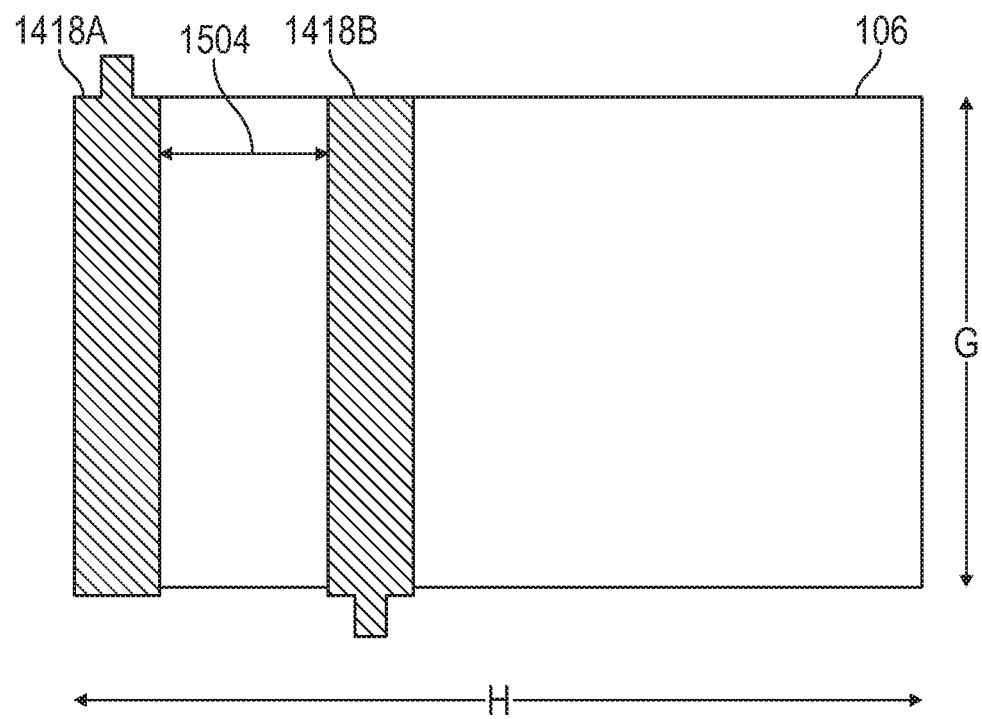
Figure 15H:
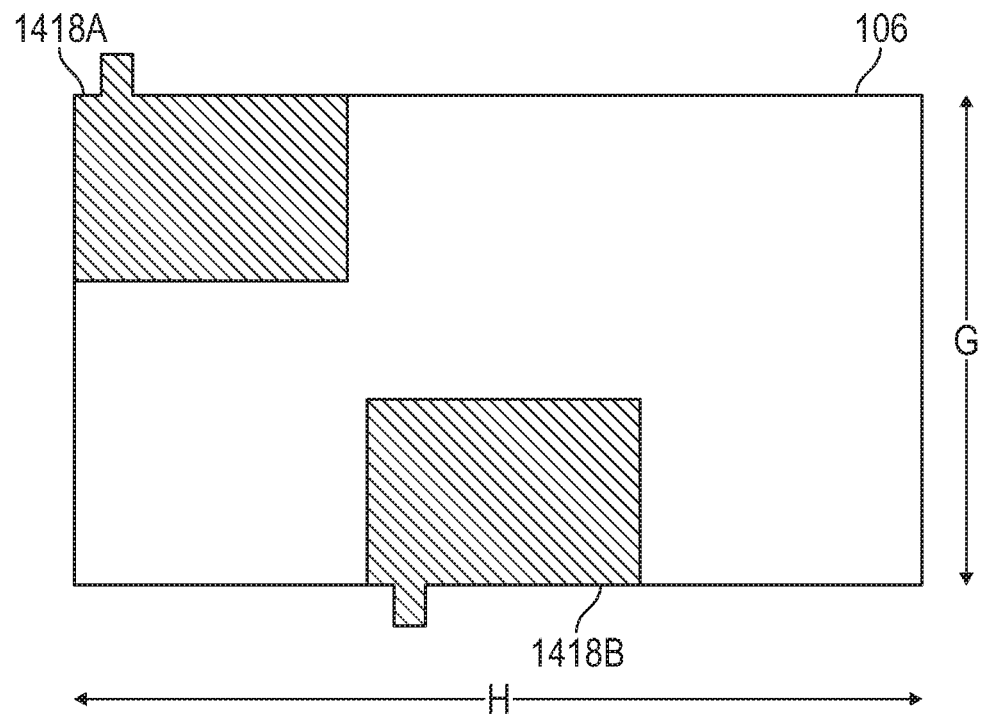

FIG. 15F illustrates another embodiment of arranging conductive material over the sensing area of the fingerprint sensor. As shown in FIG. 15F, reference traces are not used and only sensing area activation traces 1418A-D are placed over the sensing area 106 of the fingerprint sensor 102. Each of the sensing area activation traces 1418A-D are separated by a predetermined gap 1504. In some embodiments, the sensing area activation traces 1418A-D are evenly distributed over the sensing area 106. In other embodiments, the sensing area activation traces 1418A-B are not evenly distributed over the sensing area 106 and concentrated on a specific portion of the sensing area 106, as shown in FIG. 15G. The sensing area activation traces 1418A-B may be in any shape or size, as shown in FIG. 15H. As shown in FIG. 15H, the sensing area activation traces 1418A-B are not restricted to the shape of a strip having a length corresponding to the width of the sensing area along direction "G." For example, the sensing area activation traces 1418A-B may be in the shape of square or rectangle blocks on the sensing area. When the sensing area activation traces 1418A-B are in the shape of a square or a rectangle block, there may be a loss in detection sensitivity because the sensing area activation traces 1418A-B are not aligned with the full length of the pickup lines of the sensing area 106. In order to compensate for any loss in detection sensitivity, the square or rectangle block sensing area activation traces 1418A-B are wider along the sensing area length, i.e., direction "H," in order to cover more pickup lines. In some embodiments, the area of a square or rectangle block sensing area activation trace 1418A-B is the equivalent of an area of a sensing area activation trace in the shape of a strip as illustrated in FIG. 15G. Accordingly, a square or rectangle block sensing area activation trace 1418A-B may cover the same area of the sensing area 106 as a sensing area activation trace 1418A-B in the shape of a strip and therefore cover the same number of pickup/drive line overlaps (i.e., sensor elements) as the strip-shaped activation trace.

Figure 16A:
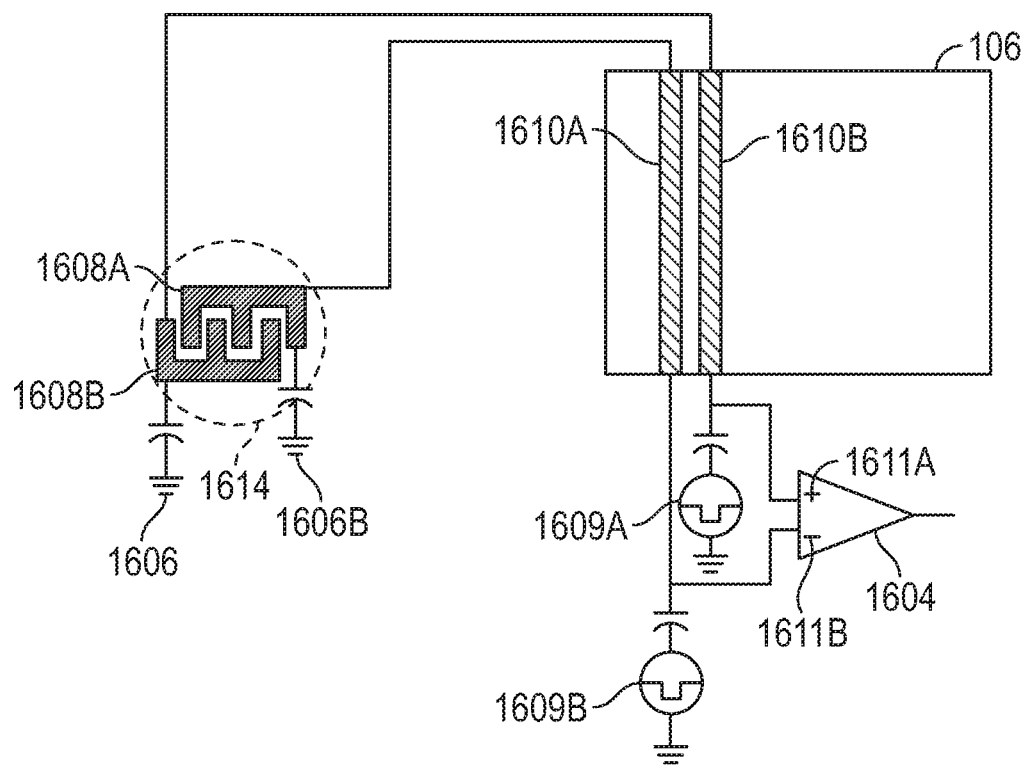
FIGS. 16A-16B illustrate embodiments of a data input device in which each key comprises two conductive elements, each coupled to an associated spatially distinct sensing areas on the sensing area of the fingerprint sensor, wherein contact with the key completes a circuit through the two conductive elements to ground.

FIG. 16A illustrates an embodiment of an alternative noise reduction concept in which the data input device comprises one or more keys 1614 formed as interdigitated plates 1608A-B. In some embodiments, each of the one or more keys 1614 comprises a first plate 1608A and a second plate 1608B. As shown in FIG. 16A, the first plate 1608A is connected to a first sensing area activation trace 1610A and the second plate 1608B is connected to a second sensing area activation trace 1610B. Accordingly, each key 1614 may be associated with sensor elements covered by two sensor activation traces 1610A, 1610B. Sensor elements covered by the first sensing area activation trace 1610A may be connected to a negative input 1611B of the differential amplifier 1604 and sensor elements covered by the second sensing area activation trace 1610B may be connected to a positive input 1611A of the differential amplifier 1604. In some embodiments, drivers 1609A-B may drive the positive input 1611A 180 degrees out of phase with the negative input 1611B of the differential amplifier 1604. In some embodiments, when a finger contacts the key 1614 and simultaneously contacts first and second plates 1608A and 1608B, the contact by the finger completes the circuit by connecting key 1614 to ground 1606A-B, thereby changing pickup signals detected in the sensor elements associated with the activation traces 1610A-B. In such embodiments, the differential amplifier 1604 subtracts the pickup signals of sensor elements associated with the first sensing area activation trace 1610A from the pickup signals of the sensor elements associated with the second activation trace 1610B, thereby eliminating the noise and unwanted signal inputs affecting both pickup signals equally and acquiring a differential signal that would be easily detected by the fingerprint sensor.

Figure 16B:
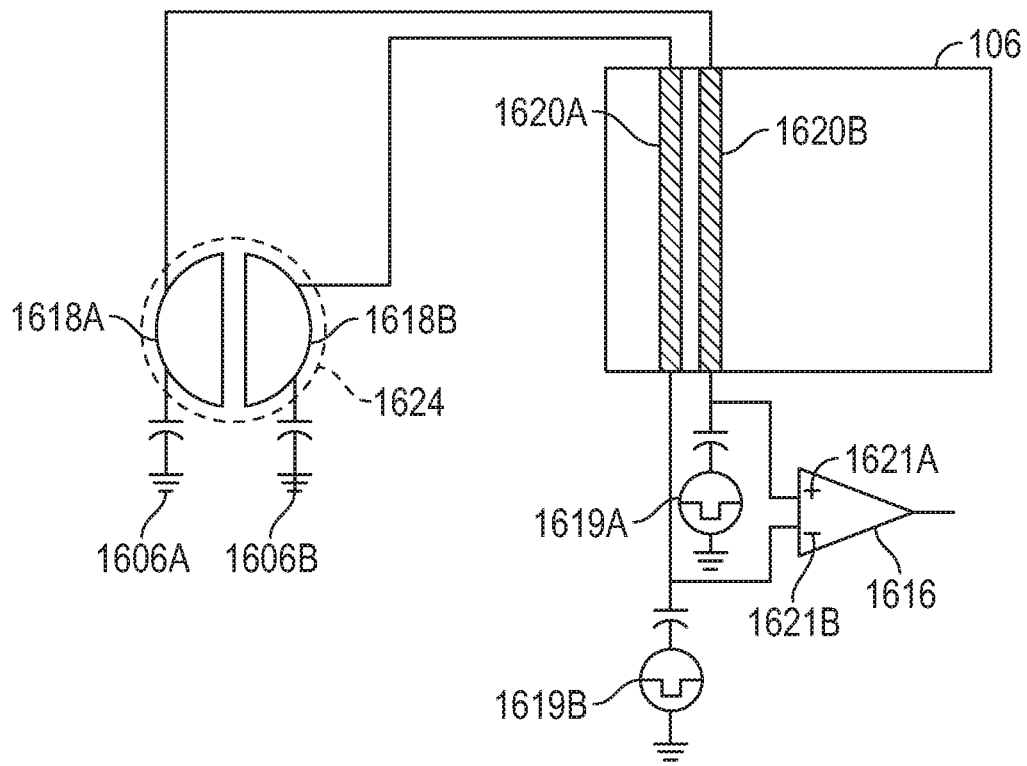

FIG. 16B illustrates an embodiment of an alternative noise reduction concept in which the data input device comprises one or more keys 1624 formed as split plates 1618A-B. In some embodiments, each of the one or more keys 1624 comprises a first plate 1618A and a second plate 1618B. As shown in FIG. 16B, the first plate 1618A is connected to a first sensing area activation trace 1620A and the second plate 1618B is connected to a second sensing area activation trace 1620B. Accordingly, each key 1624 is associated with sensor elements covered by two sensor activation traces 1620A, 1620B. Sensor elements covered by the first sensing area activation trace 1620A are connected to a negative input 1621B of a differential amplifier 1616 and sensor elements covered by the second sensing area activation trace 1620B are connected to a positive input 1621A of the differential amplifier 1616. In some embodiments, drivers 1619A-B drive the positive input 1621A 180 degrees out of phase with the negative input 1621B of the differential amplifier 1604. In some embodiments, when a finger contacts the key 1624 and simultaneously contacts first and second plates 1618A and 1618B, the contact by the finger completes the circuit by connecting key 1624 to ground 1606A-B, thereby changing pickup signals detected in the sensor elements covered by the activation traces 1620A-B. In such embodiments, the differential amplifier 1616 subtracts the pickup signals of sensor elements covered by the first sensing area activation trace 1620A from the pickup signals of the sensor elements covered by the second sensing area activation trace 1620B, thereby eliminating the noise and unwanted signal inputs affecting both pickup signals equally and acquiring a differential signal that would be easily detected by the fingerprint sensor.

Figure 17:
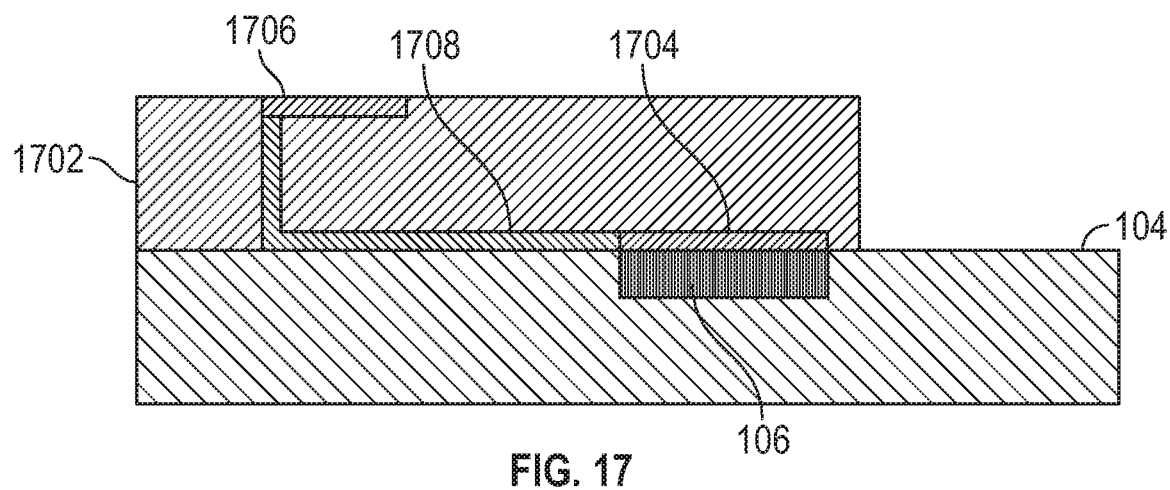
FIG. 17 is a cross sectional view of an embodiment of a data input device in the form of a single layer overlay with data input keys coupled to associated spatially distinct sensing areas on the sensing area of the fingerprint sensor, wherein the key is located on a first side of the overlay and the overlay includes a conductive trace extending through the overlay to a conductive trace connected to an associated spatially distinct sensing area on an opposite side of the overlay.

FIG. 17 is a cross sectional view of an embodiment of the data input device in the form of an overlay 1702 which creates data input keys coupled to associated spatially distinct data input sensing areas on the sensing area of the fingerprint sensor. In some embodiments, the data input key is located on a first side of the overlay 1702 and the overlay 1702 includes a conductive trace extending through the overlay 1702 to a conductive trace connected to an associated spatially distinct data input area on an opposite side of the overlay. As shown in FIG. 17, the overlay 1702 is a single layer overlay and conductive material may be printed or otherwise applied on or embedded in a top and a bottom surface of the single layer overlay 1702 and through the single layer overlay 1702 to connect the conductive material on both surfaces. In some embodiments, the conductive material printed or applied on the top surface of the single layer overlay 1702 forms one or more key traces 1706. The conductive material printed or applied on the bottom surface of the single layer overlay 1702 covering and aligned with a portion of the sensing area 106 forms one or more sensing area activation traces 1704. The one or more key traces 1706 and the one or more sensing area activation traces 1704 are connected by one or more connection traces 1708 extending along the bottom surface and through the overlay 1702. In some embodiments, each of the one or more key traces 1706 is connected to an associated spatially distinct sensing area activation trace 1704 by a dedicated connection trace 1708. Each of the one or more connection traces 1708 are spatially distinct. The single layer overlay 1702 may be formed from an electrically insulating material to isolate each of the one or more key traces 1706, connection traces 1708, and sensing area activation traces 1704. The function and description of the key traces 1706, connection traces 1708, and sensing area activation traces 1704 are described in more detail in FIGS. 14A-14C and FIGS. 15A-15H above.

In some embodiments, the single layer overlay 1702 is made of peel-able film and may be temporarily placed over the smart card 104 by applying a repositionable adhesive. In some embodiments, a small tab may be provided at a side or corner of the single layer overlay 1702 so that the user may peel off the overlay 1702 with ease.

Figure 18:
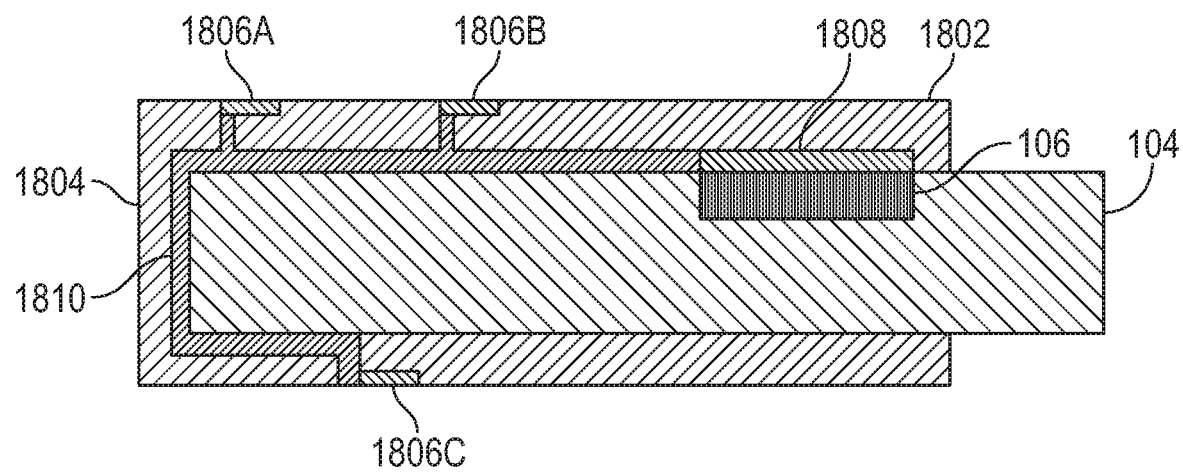
FIG. 18 is a cross sectional view of an embodiment of a data input device in the form of an overlay secured to opposed sides of a host device and including data input keys on multiple surfaces of the host device that are coupled to associated spatially distinct sensing areas on the sensing area of the fingerprint sensor.

FIG. 18 is a cross sectional view of an embodiment of a data input device in the form of an overlay 1802 secured to opposite sides of a host device and including data input keys on multiple surfaces of the host device that are coupled to associated spatially distinct regions or portions of the sensing area of the fingerprint sensor. As shown in FIG. 18, the overlay 1802 is applied to multiple surfaces of the smart card 104 or other type of host device. The overlay 1802 covers the sensing area 106 and provides one or more keys 1806A-B on the same side of the card 104 as the sensing area 106 and is also wrapped around or folded around the smart card 104 in order to provide the user with one or more data input keys 1806C on the opposite side of the smart card 104. In some embodiments, conductive material printed or applied on an outside surface of the overlay 1802 forms the one or more keys 1806A-C. The conductive material printed or applied on an inside surface, the surface in contact with the smart card 104, of the overlay 1802, covering and aligned with a portion of the sensing area 106 forms one or more sensing area activation traces 1808. The one or more keys 1806A-C and the one or more sensing area activation traces 1808 are connected by one or more connection traces 1810 extending along the inside surface and through the overlay 1802. In some embodiments, each of the one or more keys 1806A-C are connected to an associated spatially distinct sensing area activation trace 1808 by a dedicated connection trace 1810. Each of the one or more connection traces 1810 are spatially distinct. In some embodiments, the overlay 1802 is formed from an electrically insulating material to isolate each of the one or more keys 1806A-C, connection traces 1810, and sensing area activation traces 1808. The function and description of the key traces 1806A-C, connection traces 1810, and sensing area activation traces 1808 are described in more detail in FIGS. 14A-14C and FIGS. 15A-15H above.

The embodiment of the overlay disclosed in relation to FIG. 18, where one or more keys 1806A-B are provided on one side of the card 104 and one or more data input keys 1806C are provided on the opposite side of the smart card 104, may improve the convenience of data entry for the user for certain applications. The availability of data input keys 1806A-C on multiple surfaces increases the variety of data input combinations. The wrap around portion 1804 of the overlay 1802 may be any shape depending on the shape of the smart card 104 or device the overlay 1802 is being wrapped or folded around. The overlay 1802 may be a single layer overlay as described in FIG. 17. In other embodiments, the overlay 1802 may be a double layered overlay as described in FIGS. 14A-C.

Figure 19:
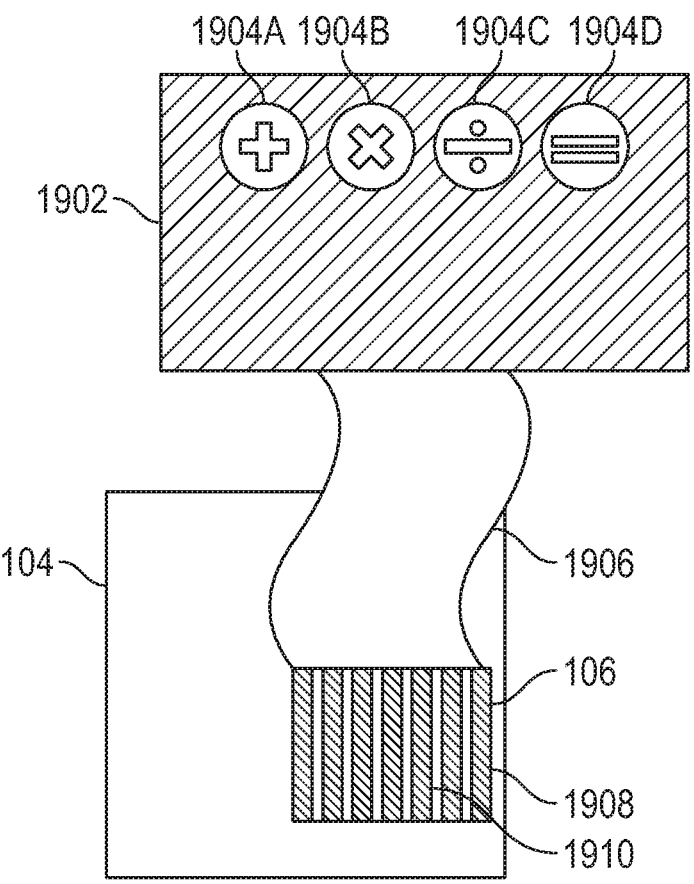
FIG. 19 illustrates an embodiment of a data input device including data input keys on a remote keypad device and a data transfer cable coupling the data input keys to associated spatially distinct sensing areas on the sensing area of the fingerprint sensor.

FIG. 19 illustrates an embodiment of a data input device including data input keys on a remote keypad device and a data transfer cable coupling the data input keys to associated spatially distinct sensing regions on the sensing area of the fingerprint sensor. As shown in FIG. 19, an overlay 1908 is electrically attached to an end of a data transfer cable 1906 and temporarily placed over the sensing area 106. In some embodiments, conductive material may be printed or applied on a bottom surface of the overlay 1908 which contacts the surface of the sensing area 106 when the overlay 1908 is temporarily placed over the sensing area 106. The conductive material printed or applied on the bottom surface of the overlay 1908 forms one or more sensing area activation traces 1910, which covers and aligns with a portion of the sensing area 106. The data transfer cable 1906 couples the one or more sensing area activation traces 1910 to associated data input keys 1904A-D on a remote keypad device 1902. The data transfer cable 1906 may be a flexible cable comprising conductive traces to connect the one or more sensing area activation traces 1910 to associated data input keys 1904A-D on the remote keypad device 1902. In some embodiments, the remote keypad device 1902 comprises status indicators such as LEDs, a display screen or a sound emitting unit, such as an audio speaker or a vibrator, to provide feedback to the user during data input.

Figure 20:
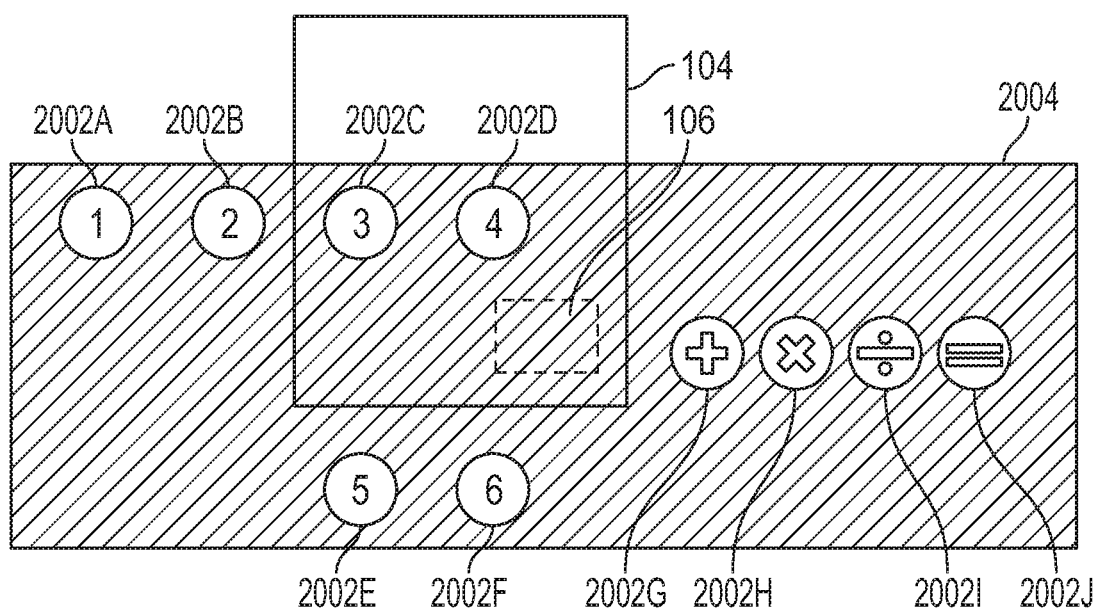
FIG. 20 illustrates an embodiment of a data input device including data input keys coupled to associated spatially distinct sensing areas on the sensing area of the fingerprint sensor, wherein the data input keys are remotely located from the sensing area and the data input device extends off of a surface of the host device.

FIG. 20 illustrates an embodiment of a data input device including data input keys coupled to associated spatially distinct sensing areas on the sensing area of the fingerprint sensor. In some embodiments, the data input keys 2002A-J are remotely located from the sensing area 106 and the data input device 2004 extends beyond one or more edges of the host device. As shown in FIG. 20, the data input device 2004 covers a portion of the smart card 104, or any other host device, which contains the sensing area 106 and comprises the data input keys 2002A-J remotely located from the sensing area 106. The data input device 2004 may extend off of the smart card 104 in any direction. The data input device 2004 may be in a different shape including a rectangle, a circle, an oval or a lozenge. In some embodiments, repositionable adhesive may be applied to a portion of a bottom surface of the data input device 2004 that overlaps with the surface of the smart card 104. In some embodiments, lines or other indicia may be provided on the bottom surface of the data input device 2004 to assist the user in properly positioning the data input device 2004 and smart card 104 with respect to each other.

In some embodiments, the data input device 2004 comprises one or more data input keys 2002A-J, each associated with a spatially discrete region of the sensing area 106. The data input keys 2002A-J may be located anywhere on the surface of the data input device 2004. For example, the data input keys 2002A-J may be positioned on the area of the data input device 2004 that overlies the smart card 104 and/or on the area of the data input device that is not overlying the smart card 104. Each of the one or more keys 2002A-J is connected to an associated sensing area activation trace covering a portion of the sensing area 106. As described above, each key 2002A-J may comprise a conductive material printed or otherwise applied to the data input device 2004 to form a key trace, a sensing area activation trace covering the associated spatially distinct data input region of the sensing area 106, and a connection trace connecting the key trace to the sensing area activation trace. The data input device 2004 may be a double layer construction with the conductive portions printed on top of a lower layer made of a thin material that will not negatively impact the electrical coupling of the sensing area activation traces with the associated spatially distinct data input regions of the sensing area 106 and an upper layer made from an insulating material and including holes formed over the key traces. In other embodiments, the data input device may be a single layer construction with traces formed on top of a layer of insulating material, sensing area activation traces formed on the bottom of the layer and connecting traces formed on the top and/or bottom and extending though the layer.

FIGS. 21A-21D illustrates another embodiment of a data input device in the form of an overlay 2102. In some embodiments, the overlay 2102 comprises a power source (also referred to as a non-data-transmitting power source) for the fingerprint sensor 102 installed on the card 104. The card 104 comprises the fingerprint sensor 102 with a sensing area 106, the LED 308, and the contact pads 108 providing contacts for an external power source.

Figure 21A:
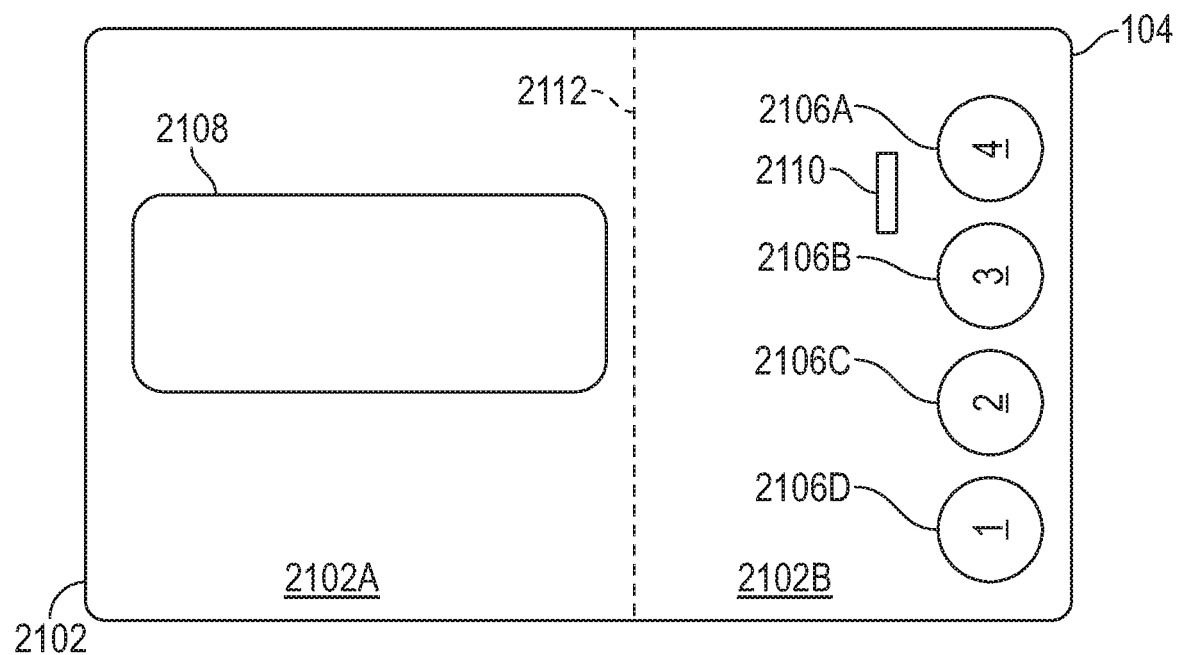
FIGS. 21A-21D illustrate an embodiment of a data input device in the form of an overlay comprising a power source for the fingerprint sensor.
Figure 21B:
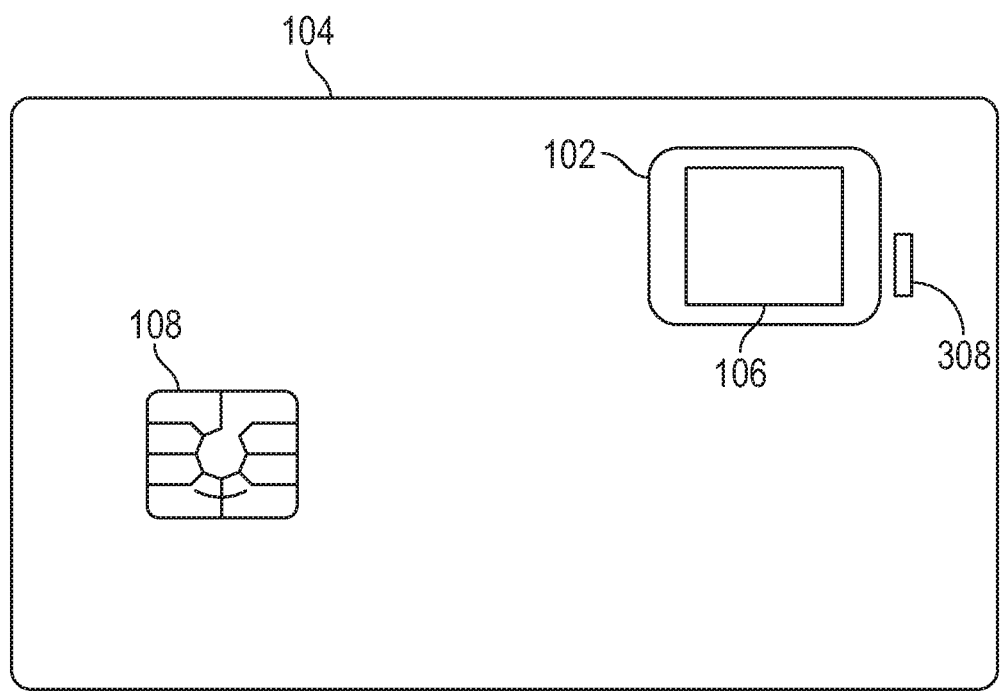

As illustrated in FIGS. 21A-21B, the overlay 2102 comprises a plurality of data input keys 2106A-D and a pierced hole 2510 to be placed over an LED 308 of the card 104. Each of the plurality of data input keys 2106A-D is directly or indirectly coupled to one or more spatially distinct regions of the sensing area 106. In some embodiments, the power source of the overlay 2102 is a solar cell panel 2108. The overlay 2102 may comprise two separate or separable parts 2102a, 2102b. The overlay 2102 may include a perforated line 2112 for separating a portion 2102a comprising the solar cell panel 2108 and a portion 2102b comprising the plurality of data input keys 2106A-D. The perforated line 2112 allows a user to easily peel off the portion 2102b containing the plurality of data input keys 2106A-D while the portion 2102a containing the solar cell panel 2108 remains attached to the card 104. The overlay 2102 may comprise, for example, an adhesively-backed label or a sleeve placed over the card in one or two parts.

In some embodiments, one or more of the contact pads 108 provide electric contacts between the card 104 and the solar cell panel 2108 contained in the overlay 2102.

Figure 21C:
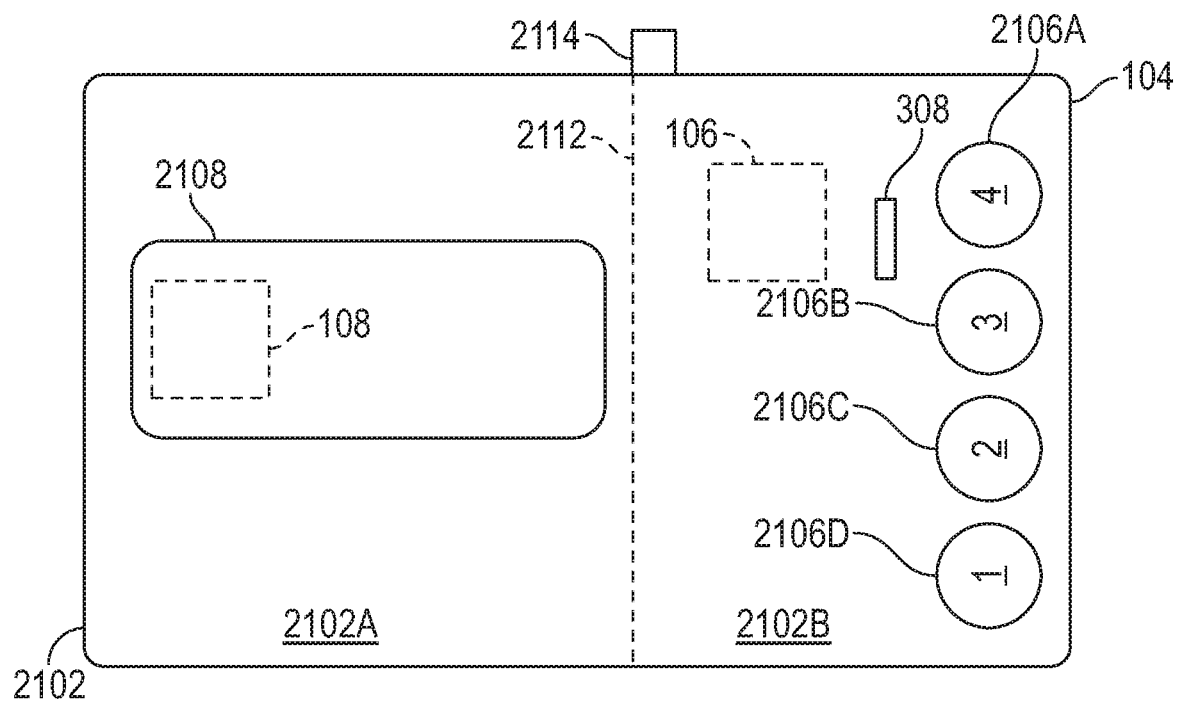

The overlay 2102 may be removably placed over a portion of the card 104 including the sensing area 106 and the contact pads 108, as shown in FIG. 21C. In some embodiments, the overlay 2102 is operatively placed on the card 104 such that the solar cell panel 2108 is electrically coupled to the contact pads 108 and the data input keys 2106A-D are electrically coupled to associated spatially distinct data input sensing areas on the sensing area 106.

Figure 21D:
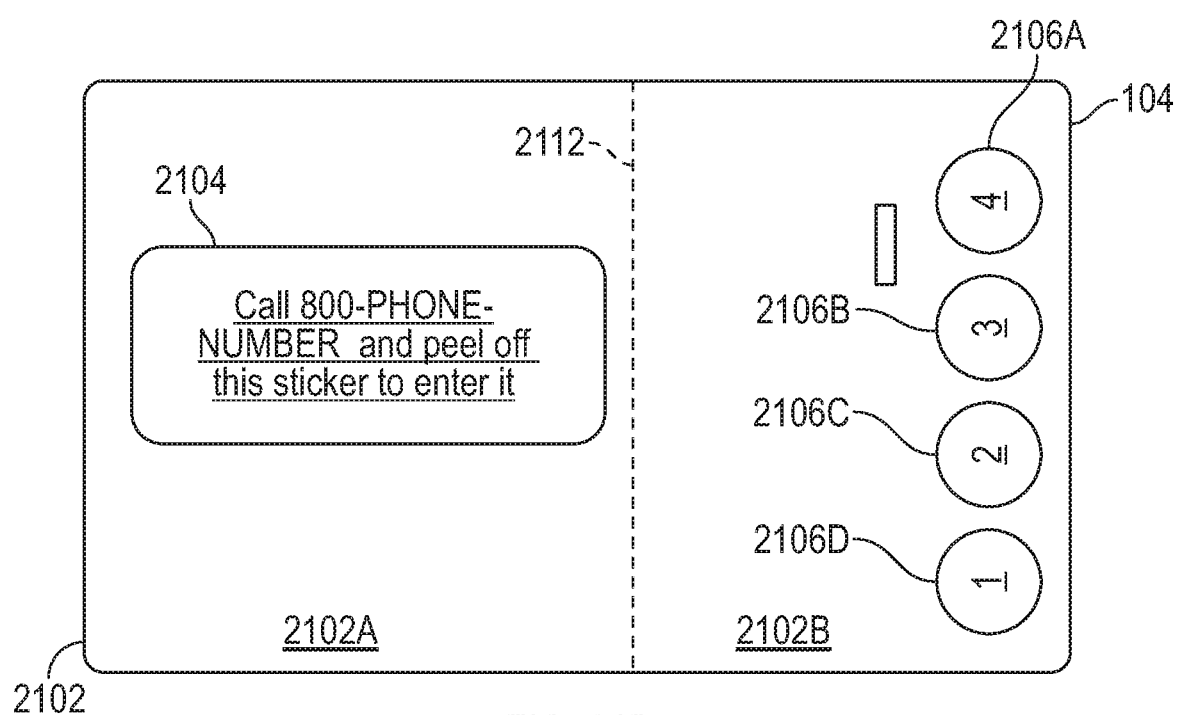

As shown in FIG. 21D, a cover overlay 2104 may be removably placed over the solar cell panel 2108 on portion 2102a of the overlay 2102. When the cover overlay 2104 is removably placed over the solar cell panel 2108, the solar cell panel 2108 cannot generate the power necessary for operation of the fingerprint sensor 102. Accordingly, the cover overlay 2104 needs to be removed from the overlay 2102 to operate the fingerprint sensor 102. When exposed, the solar cell panel 2108 provides power through the contact pads 108 for the operation of the fingerprint sensor 102. The fingerprint sensor 102 may then be activated and enter a data input mode, in which the fingerprint sensor 102 awaits the input of an activation code via the data input keys 2106A-D. In some embodiments, an indication may be provided to the user via LED 308 to signal to the user that the card is powered and ready to receive an activation code. In some embodiments, instructions may be provided on the cover overlay 2102 to give guidance to the user. For example, the user may be instructed to: (i) call a phone number listed on the cover overlay 2104, such as, a 1-800 phone number, to retrieve a numerical activation code and (ii) peel off the cover overlay 2104 in order to enter the retrieved numerical activation code.

Once the user inputs the correct numerical activation code, the fingerprint sensor 102 enters enrollment mode—e.g., as may be signaled by the LED 308 as described herein. The user may peel off or otherwise remove the portion 2102b of the overlay 2102 comprising the data input keys 2106A-D to expose the sensing area 106 and enroll a fingerprint. Care must be taken to ensure the portion 2102a of the overlay is not unintentionally removed from or otherwise dislodged from the card 104 during the enrollment mode or while the portion 2102b is being removed. The overlay 2102 may comprise a small tab 2114 sticking out of one side adjacent to the perforated line 2112, as shown in FIG. 21C, to help the user easily peel off the portion 2102a comprising the data input keys 2106A-D. After the user successfully enrolls a fingerprint template—e.g., as may be signaled by the LED as described herein—the user may peel off any remaining portions of the overlay 2102, including the solar cell 2108, to obtain the functional smart card as shown in FIG. 21B.

In some embodiments, the portion of the overlay 2102 comprising the solar cell panel 2108 may be provided as a power source housing, as described in FIGS. 11A and 12A. In such embodiments, the overlay does not require a battery connection tab 1112. Instead, a cover overlay may be removably placed over the solar cell panel.

The overlay 2102 may be provided as an alternative power source, as shown in FIG. 10A. In such embodiments, the solar cell panel and the cover overlay placed over the solar cell panel may be provided on the top cover of the power source and the data input keys may be located on the flap of the power source.

Figure 22:
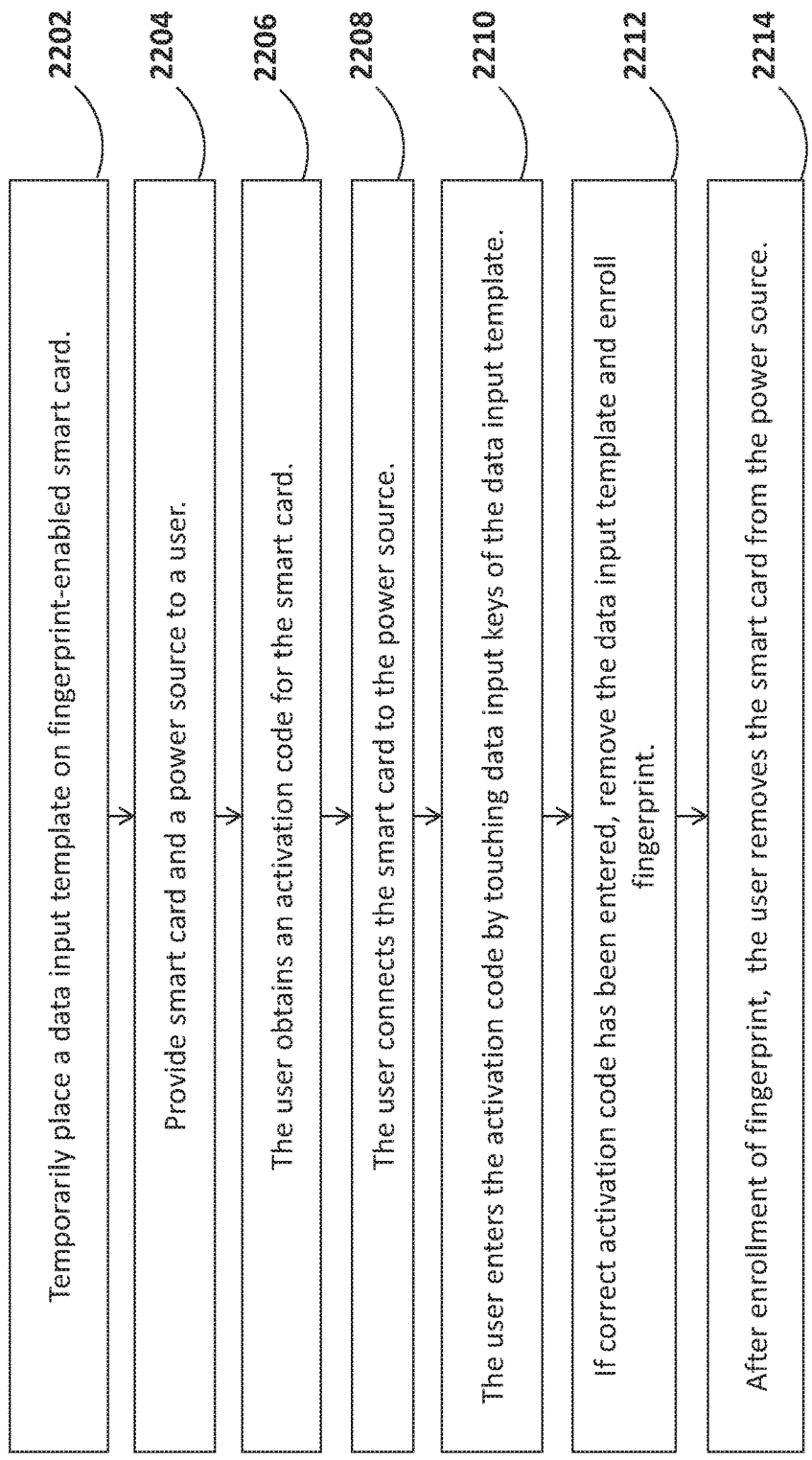
FIG. 22 shows a flow chart illustrating an embodiment of a simple, cost effective method to enroll a fingerprint template on a device.

FIG. 22 is a flowchart illustrating an embodiment of a simple, cost-effective method 2200 to enroll a biometric template, such as a fingerprint template, on a device that has limited ability to provide feedback to the user, such as a smart card, is described in detail below. In the illustrated embodiment shown in FIG. 22, a smart card is assumed to be the device containing the fingerprint sensor, but the method is not restricted to a smart card and can be used for any device that contains a fingerprint sensor in alternative embodiments. A smart card, as defined by the "Smart Card Alliance," is a device in which an integrated circuit, or chip, is embedded. Smart card technology conforms to international standards ISO/IEC 7816 and ISO/IEC 14443. Accordingly, a person of ordinary skill in the art will understand that a smart card is not restricted to a plastic card. While the plastic card was the initial smart card form factor, technology used for the smart card is now available in a wide variety of form factors, including plastic cards, key fobs, and subscriber identification modules (SIMs) used in GSM mobile phones, watches, electronic passports and USB-based tokens. Smart card applications include, and are not restricted to, bank cards, mobile phone subscriber identification modules (SIM), healthcare cards, government and enterprise ID cards, benefits and social welfare cards, driver's licenses, physical and logical access cards, mass transit (ticketing) cards, and card that combine multiple applications on a single card, In step 2202, a data input device, such as the data input device in the form of an overlay as shown in FIGS. 3B and 13 or the data input device in the form of a sleeve as shown in FIGS. 10-12, is temporarily connected to a fingerprint-enabled smart card. In some embodiments, a unique code, such as an activation code, is written into a secure memory of the smart card and encrypted in a secure location during the manufacturing process of the smart card. The fingerprint sensor on the smart card is calibrated during the manufacturing process and set to data-input mode before the smart card is sent to the user. A data input device, such as, for example any of the overlays or sleeves described herein, may be placed on the card as a final or near-final step of the card manufacturing process. The data input device may be temporarily placed over the portion of the card including the sensing area 106 by applying a repositionable adhesive provided by companies such as 3M, Krylon, Franklin Adhesives and Polymers and Bostik.

In step 2204, the card provider provides the smart card and a low-cost, simple power source to the user, e.g., sent by mail or courier or given out by a bank or retail outlet. The power source could be battery powered, powered by mains (e.g., via a USB connector), or solar powered. A non-limiting exemplary embodiment of the power source is described in FIGS. 9A-9H. In some embodiments, if the smart card contains an on-board power source, the power source need not be provided to the user.

The smart card and the power source may be sent to the user with the smart card already inserted in the power source as described in FIGS. 11A-11C and 12A-C. In such embodiments, a battery connection tab may be inserted between the power source and the smart card to keep a power connection disconnected. The user may pull out the battery connection tab, as shown in FIG. 12A, to connect the power source to the smart card.

In step 2206, the user follows instructions, received with the card to obtain an activation code from the card provider. For example, the user may be asked to call a number, or the data input device might have a QR® code that the user can scan with a smart phone, or the user could log-in to their on-line banking site or mobile application and indicate they wish to receive an activation code by SMS. In some embodiments, other secure mechanisms for obtaining the activation code are available. In some embodiments, a six-digit activation code provides the user with an appropriate security level. The security level may be increased or decreased by varying the number of required digits, depending on the card provider's requirements.

In step 2208, if not already done, the user connects the smart card to the power source, for example by inserting the card into a power source housing. The card receives power from the power source, and a status indicator on the smart card (e.g., an LED) indicates to the user that the smart card is ready.

In step 2210, the user enters the activation code by sequentially touching the data input keys of the data input device in a sequence corresponding to the activation code, for example, as described in FIGS. 2A, 3A-3B, 10D, 11A, 12A, 13, 17, 18, 19 and 20. The fingerprint sensor may be configured to simply detect presence of the finger on the remote or direct-contact data input key in the code entry and unlock mode. In some embodiments, the fingerprint sensor may be configured to detect fingerprint ridges and valleys in the code entry and unlock mode.

In some embodiments, the fingerprint sensor may comprise a status indicator configured to indicate to the user that the entered code is correct or incorrect. If the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out permanently.

In some embodiments, if one or two unsuccessful entries have been made, the number of unsuccessful entries is stored in a non-volatile memory. In such embodiments, even if power to the smart card is disconnected and reapplied, the smart card still remembers how many unsuccessful entries have been made. Accordingly, the card cannot be "re-set" to a full complement of attempts by disconnecting the card after a number of unsuccessful attempts that is less than the maximum allowed number of attempts.

A smart card "state" may be stored in the non-volatile memory of the card. For example, different states may include: (i) "new state" meaning the card is awaiting unlock by entry of a valid activation code; (ii) "unlocked state" meaning that the card is unlocked but enrollment has not been successfully completed; (iii) "active state" meaning that the card is unlocked and an enrollment has been successfully completed; and (iv) "locked state" meaning that the card unlock procedure has been unsuccessfully attempted.

In step 2212, if the activation code has been entered correctly, the user can now remove the data input device from the card and start to enroll a fingerprint (enrollment mode). The smart card must remain connected to the power source throughout the enrollment process. The status indicator makes an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

In some embodiments, the user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 2214, the user removes the smart card from the power source, and the power source may be discarded.

Accordingly, the user has now successfully enrolled a fingerprint in the smart card through the simple, cost-effective method 2200 and can use the smart card in the normal way to pay for items, but now requiring fingerprint verification in order to use the smart card. In some embodiments, multiple users may enroll a fingerprint on the smart card, or a user may enroll multiple fingers on the smart card, using the above noted method 2200. In such embodiments, the card may be programmed with multiple activation codes that are provided to each user. For each method 2200, a new activation code is required and entered to enroll a new user/finger.

In some embodiments of the method 2200, the data input device may be provided as a sleeve and guide the user for activation code entry as described in FIGS. 11A-11C and 12A-12C.

In some embodiments of the method 2200, the overlay may be not required to guide the user for activation code entry. In such embodiments, the power source may comprise a pierced flap to guide the user, as described in FIGS. 10A-10E, and the overlay need not be placed on the card as part of a manufacturing process of the card.

In some embodiments of the method 2200, the power source may comprise a display screen, speakers, and may include a socket for headphones. In such embodiments, the smart card may provide status indications throughout the enrollment process through the display screen and speakers contained in the power source.

Figure 23A:
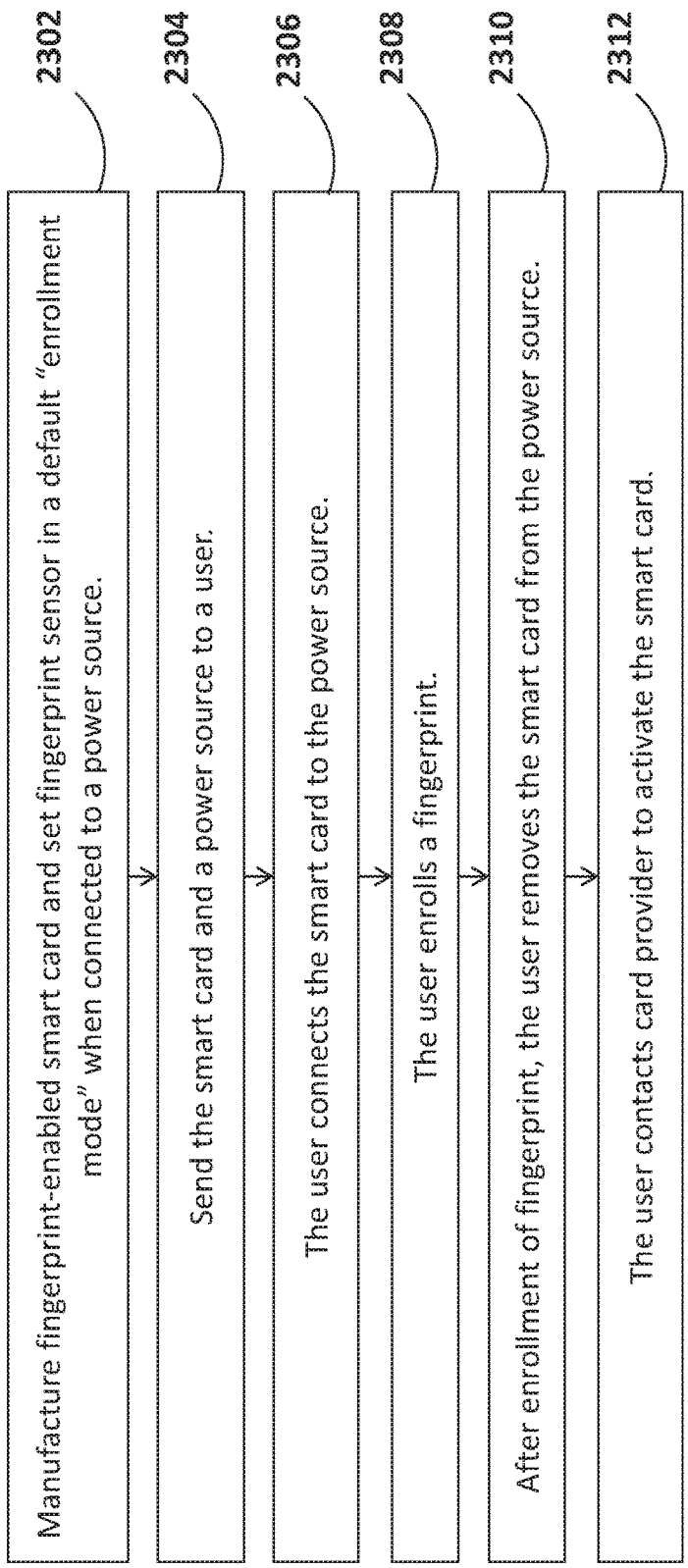
FIGS. 23A and 23B show flow charts illustrating embodiments of a simple, cost effective method to enroll a fingerprint template on a device.

FIG. 23A is a flowchart illustrating another embodiment of a simple, cost effective method 2300 to enroll a biometric template, such as a fingerprint template, on a device that has limited ability to provide feedback to the user, such as a smart card, without requiring entry of activation data (i.e., an activation code) prior to enrolling the fingerprint template.

In step 2302, a fingerprint-enabled smart card is manufactured. During the manufacturing process, the fingerprint sensor on the fingerprint-enabled smart card is configured to be in a default "enrollment mode" when connected to a power source. The card provider may optionally set the status of the smart card as inactive to prevent unauthorized use before the intended user can enroll a fingerprint template and contact the card provider to activate the card.

In step 2304, the card provider provides the smart card and a low-cost, simple power source to the user, e.g., sent by mail or courier or given out by a bank or retail outlet. The power source may be battery powered, powered by mains (e.g., via a USB connector), or solar powered. A non-limiting exemplary embodiment of the power source is described in FIGS. 9A-9H. In some embodiments, if the smart card contains an on-board power source, such as a solar cell, an external power source is not required.

In step 2306, the user connects the smart card to the power source by, for example, inserting the card into a power source housing having contacts for connecting one or more power transmission contacts of the smart card to the power source without connecting any data transmission contacts of the smart card to a device configured to transmit data to or receive data from the card. Accordingly, connecting the smart card to the power source does nothing but provide power to the electrical components of the smart card—e.g., LED, logic elements, sensor elements, etc. —and the power source is unable to transmit data to or from the smart card.

The smart card and the power source may be sent to the user with the smart card already inserted in the power source as described in FIG. 9A. In such embodiments, a battery connection tab is inserted between the power source and the smart card to keep a power connection disconnected. The user may pull out the battery connection tab, as shown in FIG. 12A, to connect the power source to the smart card.

Connection to the power source may automatically activate the enrollment mode in the fingerprint sensor. In some embodiments, the enrollment mode in the fingerprint sensor is activated once upon a specific instance of connecting the card to the power source (e.g., the first, second, third, etc. connection of the smart card to the power source). The card remains in enrollment mode until disconnected from the power source or until the enrollment is complete. If the card is disconnected from the power source before enrollment is complete, the card cannot again be put into enrollment mode by re-connecting the card to the power source, and the user may be required to take some action, such as contact the card provider or obtain a new card, to enable the card to be put into enrollment mode.

The user may trigger the enrollment mode by connecting the card to the power source and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In other embodiments, the enrollment mode in the fingerprint sensor is activated each time the smart card is connected to the power source until a fingerprint template is stored. In yet another embodiment, enrollment mode in the fingerprint sensor may be activated each time the smart card is connected to the power source until a fingerprint template has been stored after the initial automatic activation upon the specific instance of connecting the smart card to the power source.

The card receives power from the power source, and a status indicator on the smart card (e.g., an LED) indicates to the user that the one or more power transmission contacts of the power source are connected to the power source (i.e., the card is powered), that the fingerprint sensor is in enrollment mode, and the smart card is ready for enrollment to start.

In step 2308, the user can now start to enroll a fingerprint. The fingerprint is enrolled by storing a fingerprint template derived from one or more fingerprint images generated by placing a finger on the fingerprint sensor. The smart card must remain connected to the power source throughout the enrollment process. In the event the smart card is disconnected from the power source during the enrollment process, the enrollment mode in the fingerprint sensor is automatically deactivated. In some embodiments, reconnecting the smart card to the power source automatically activates the enrollment mode in the fingerprint sensor until a fingerprint template is stored. That is, enrollment mode may be automatically activated upon application of power to the card if the card logic detects that no fingerprint template has been stored for the card. The enrollment process is complete when a sufficient fingerprint template is acquired and stored in the fingerprint sensor (e.g., as described in previously incorporated U.S. Pat. No. 9,684,813). Once the enrollment process is complete, enrollment mode in the fingerprint sensor is disabled. Accordingly, connecting the smart card to the power source after a successful enrollment will no longer activate the enrollment mode in the fingerprint sensor. In some embodiments, the status indicator provides an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for the fingerprint template and confirm that the enrolling step is successfully complete, e.g., by the LED illuminating for longer period, such as 10 or more seconds. In other embodiments, more than one LED may flash different colors to communicate the various indications described above. A flexible display such as an OLED panel may be used to provide textual feedback during the enrollment process.

In step 2310, the user removes the smart card from the power source, thereby disconnecting the one or more power transmission contacts of the smart card from the power source, and the power source may be discarded.

If the card provider set the status of the card as inactive at step 2302, then the user must activate the card before attempting to use it. In step 2312, the user contacts the card provider (e.g., by phone, app, internet, etc.) to activate the smart card. The user must provide acceptable user verification details to the card provider in order to activate the smart card. If the user is verified, the card provider sets the card status as active in their systems. The user is now able to use the card in the normal way to pay for items, but now requiring fingerprint verification in order to use the smart card. If the user is not verified, the card remains inactive and cannot be used.

Figure 23B:
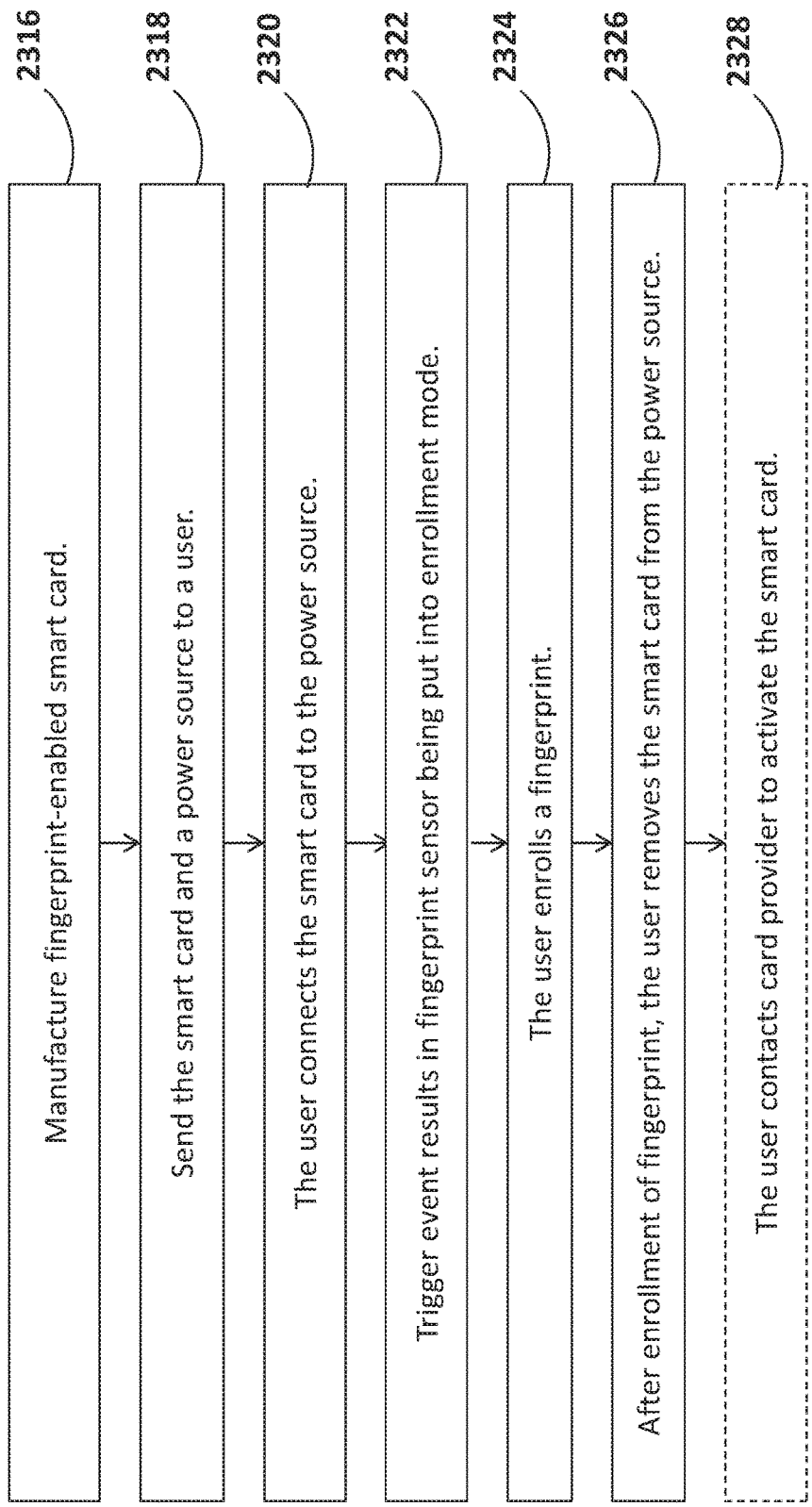

FIG. 23B is a flowchart illustrating another embodiment of a simple, cost effective method 2314 to enroll a biometric template, such as a fingerprint template, on a device that has limited ability to provide feedback to the user, such as a smart card, without requiring entry of activation data (i.e., an activation code) prior to enrolling the fingerprint template.

In step 2316, a fingerprint-enabled smart card is manufactured. The card provider may optionally set the status of the smart card as inactive to prevent unauthorized use before the intended user can enroll a fingerprint template and contact the card provider to activate the card.

In step 2318, the card provider provides the smart card and a low-cost, simple power source to the user, e.g., sent by mail or courier or given out by a bank or retail outlet. The power source may be battery powered, powered by mains (e.g., via a USB connector), or solar powered. A non-limiting exemplary embodiment of the power source is described in FIGS. 9A-9H. In some embodiments, if the smart card contains an on-board power source, such as a solar cell, an external power source is not required.

In step 2320, the user connects the smart card to the power source by, for example, inserting the card into a power source housing having contacts for connecting one or more power transmission contacts of the smart card to the power source without connecting any data transmission contacts of the smart card to a device configured to transmit data to or receive data from the card. Accordingly, connecting the smart card to the power source does nothing but provide power to the electrical components of the smart card—e.g., LED, logic elements, sensor elements, etc. —and the power source is unable to transmit data to or from the smart card.

The smart card and the power source may be sent to the user with the smart card already inserted in the power source as described in FIG. 9A. In such embodiments, a battery connection tab is inserted between the power source and the smart card to keep a power connection disconnected. The user may pull out the battery connection tab, as shown in FIG. 12A, to connect the power source to the smart card.

In step 2322 one or more trigger events are detected that results in the fingerprint sensor being put into enrollment mode. An example trigger event may be based on the non-expiration of a timer or a counter. For example, the trigger event may be detecting that the timer or counter has not expired. In such embodiments, a user can enroll a biometric template within a certain time after the fingerprint sensor is put into enrollment mode. In other embodiments, the trigger event may be detecting that the age of the smart card is under a certain age limit which is tracked, for example, by the timer or the counter. The counter may be incremented each time a biometric template has been successfully enrolled or whenever the smart card was used. In such embodiments, the trigger event may be detecting that the counter has not exceeded a predetermined threshold (e.g., a predetermined number of biometric template enrollments or card uses).

Another example trigger event may include an occurrence of an error state. A software or hardware component error may occur during the enrollment. An error recovery procedure initiated in response to such software or hardware component error may be the trigger event. In such embodiments, the software or hardware component error would have to be a recoverable error (e.g., a minor error, a transient event or a glitch). Thus, detection of a recoverable error that precluded completion of the enrollment process would cause the sensor to enter enrollment mode. In such embodiments, a non-recoverable error occurring during the enrollment (e.g., a component on the card fails) would not initiate or constitute a trigger event.

Other example trigger events include detection of a flag set last time the card was inserted in a card reader (for example a flag set when the card is inserted into a card reader that transmits data to or from the card and instructing the card to enter enrollment mode the next time the card is connected to power), lack of an enrolled fingerprint template on the card is detected, or detecting that power has been provided to the card. Still another trigger event may be detection that the card has been inserted into a power source that has connection to only power contacts on the card and no data transmission contacts. Other events, or combinations of events, may be trigger events. The trigger event may be detected by the fingerprint sensor, or by another component on the card (e.g., the secure element module) or may be detected as a result of the fingerprint sensor and another component on the card interacting, e.g., a handshake. If a component other than the fingerprint sensor detects the trigger event, that component may signal to the fingerprint sensor to enter enrollment mode.

The enrollment mode may be triggered, but the user may not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In some embodiments, the card remains in enrollment mode until disconnected from the power source or until the enrollment is complete. If the card is disconnected from the power source before enrollment is complete, the process may move back to step 2322, whereby an appropriate trigger event will result in the sensor being put back into enrollment mode, or alternatively the user may be required to take some action, such as contact the card provider or obtain a new card, to enable the card to be put into enrollment mode.

In some embodiments, the card receives power from the power source, and a status indicator on the smart card (e.g., an LED) indicates to the user that the one or more power transmission contacts of the power source are connected to the power source (i.e., the card is powered), that the fingerprint sensor is in enrollment mode, and the smart card is ready for enrollment to start.

In step 2324, the user can now start to enroll a fingerprint. The fingerprint is enrolled by storing a fingerprint template derived from one or more fingerprint images generated by placing a finger on the fingerprint sensor. The smart card must remain connected to the power source throughout the enrollment process. In the event the smart card is disconnected from the power source during the enrollment process, the enrollment mode in the fingerprint sensor is automatically deactivated. In some embodiments, reconnecting the smart card to the power source moves the process back to step 2322, whereby an appropriate trigger event will result in the sensor being put back into enrollment mode. The enrollment process is complete when a sufficient fingerprint template is acquired and stored in the fingerprint sensor (e.g., as described in previously incorporated U.S. Pat. No. 9,684,813). Once the enrollment process is complete, enrollment mode in the fingerprint sensor is disabled permanently or alternatively, until a fresh trigger event occurs. In some embodiments, the status indicator provides an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for the fingerprint template and confirm that the enrolling step is successfully complete, e.g., by the LED illuminating for longer period, such as 10 or more seconds. In another embodiment, more than one LED may flash different colors to communicate the various indications described above. A flexible display such as an OLED panel may be used to provide textual feedback during the enrollment process.

In step 2326, the user removes the smart card from the power source, thereby disconnecting the one or more power transmission contacts of the smart card from the power source, and the power source may be discarded.

In some embodiments, the card provider sets the status of the card as inactive at step 2316. In such embodiments, the user must activate the card before attempting to use it. Accordingly, the method 2314 to enroll the biometric template may include a further step 2328 in which the user contacts the card provider (e.g., by phone, app, internet, etc.) to activate the smart card. The user must provide acceptable user verification details to the card provider in order to activate the smart card. If the user is verified, the card provider sets the card status as active in their systems. The user is now able to use the card in the normal way to pay for items, but now requiring fingerprint verification in order to use the smart card. If the user is not verified, the card remains inactive and cannot be used.

FIG. 24 is a flowchart illustrating another embodiment of a simple, cost effective method 2400 to enroll a biometric template, such as a fingerprint template, on a device that has limited ability to provide feedback to the user, such as a smart card, is described in detail below.

In step 2402, a data input device, such as an overlay as described in FIGS. 3B and 13 or a sleeve as described in FIGS. 10-12, is temporarily connected to a fingerprint-enabled smart card. In some embodiments, a unique code, such as an activation code, is written into a secure memory of the smart card and encrypted in a secure location during the manufacturing process of the smart card. The fingerprint sensor on the smart card may be calibrated during the manufacturing process and set to data-input mode before the smart card is sent to the user. A data input device, such as, for example any of the overlays or sleeves described herein, may be placed on the card as a final or near-final step of the card manufacturing process. In some embodiments, the data input device is temporarily placed on the card by applying a repositionable adhesive provided by companies such as 3M, Krylon, Franklin Adhesives and Polymers and Bostik may be applied to the overlay 302 to temporarily place over the portion of the card 104 including the sensing area 106.

In step 2404, the card provider provides the smart card to the user, e.g., sent by mail or courier or given out by a bank or retail outlet.

In step 2406, the user has access to a device, e.g., a smartphone, that is able to provide power wirelessly, e.g., via Near Field Communication, and thus, it is not necessary to provide a power source to the user. A power source may be provided to the user to give the user the choice of using wireless power or wired power.

In step 2408, the user follows instructions, received with the card to obtain an activation code from the card provider. The user may be asked to call a number, or the data input device might have a QR® code that the user can scan with a smart phone, or the user could log-in to their on-line banking site or mobile application and indicate they wish to receive an activation code by SMS. Other secure mechanisms to obtain the activation code may be available in alternative embodiments. In some embodiments, a six digit activation code provides the user with an appropriate security level. The security level may be increased or decreased by varying the number of required digits, depending on the card provider's requirements.

In step 2410, the user places the smart card near the smartphone in range for NFC connectivity, as shown in FIGS. 25A-25D. As shown in FIGS. 25A-25D, the smart card 104 is positioned near a communication device 2502, such as for example a smart phone, in various configurations. In each configuration, the fingerprint sensor 102 in the smart card 104 is left accessible such that the user can touch the sensing area of the fingerprint sensor 102 while keeping the smart card 104 within the NFC range. The smart card 104 receives power through NFC connectivity and a status indicator on the smart card 104 may show the user that the smart card 104 is ready for enrollment to start. In some embodiments, the user may disable all connectivity on the communication device 2502, except for NFC, to ensure that the communication device 2502 is completely "off-grid" during the enrollment process for added security. For example, the user can turn off cellular data, Wi-Fi, Bluetooth, etc.

Referring back to FIG. 24, in step 2412, the user enters the activation code by sequentially touching the data input keys of the data input device in a sequence corresponding to the activation code, for example, as described in FIGS. 2A, 3A-3B, 10D, 11A, 12A, 13, 17, 18, 19 and 20. The fingerprint sensor is configured to simply detect presence of the finger on the remote or direct-contact data input keys in the code entry and unlock mode. In some embodiments, the fingerprint sensor may be configured to detect fingerprint ridges and valleys in the code entry and unlock mode.

In some embodiments, the status indicator may indicate to the user that the entered code is correct or incorrect. If the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card may lock the user out permanently.

In some embodiments, if one or two unsuccessful entries have been made, the number of unsuccessful entries may be stored in a non-volatile memory. Accordingly, even if power to the smart card is disconnected and reapplied, the smart card may still remember how many unsuccessful entries have been made. Accordingly, the card cannot be "re-set" to a full complement of attempts by disconnecting the card after a number of unsuccessful attempts that is less than the maximum allowed number of attempts.

In some embodiments a smart card "state" may be stored in the non-volatile memory of the card. For example, different states may include: (i) "new state" meaning the card is awaiting unlock by entry of a valid activation code; (ii) "unlocked state" meaning that the card is unlocked but enrollment has not been successfully completed; (iii) "active state" meaning that the card is unlocked and an enrollment has been successfully completed; and (iv) "locked state" meaning that the card unlock procedure has been unsuccessfully attempted.

In step 2414, if the activation code has been entered correctly, the user can now remove the data input device from the card and start to enroll a fingerprint (enrollment mode). The smart card must remain in range for NFC connectivity to the smartphone throughout the enrollment process. The status indicator may make an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

The user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 2416, the user moves the smart card out of range for NFC connectivity to remove the smart card from the power source. In some embodiments, if the user had disabled all connectivity on the device, except for NFC, in step 2410, the user may re-enable all connectivity on the device.

Accordingly, the user has now successfully enrolled a fingerprint in the smart card through method 2400 and can use the smart card in the normal way to pay for items, but now requiring fingerprint verification in order to use the smart card. In some embodiments, multiple users may enroll a fingerprint on the smart card, or a user may enroll multiple fingers on the smart card, using the above noted method. In such embodiments, the card may be programmed with multiple activation codes that are provided to each user. To enroll a new user/finger, a new activation code is entered.

In some embodiments of the method 2400 to enroll the biometric template, the data input device may be provided as a sleeve and may guide the user for activation code entry as described in FIGS. 11A-11C and 12A-12C.

Figure 26A:
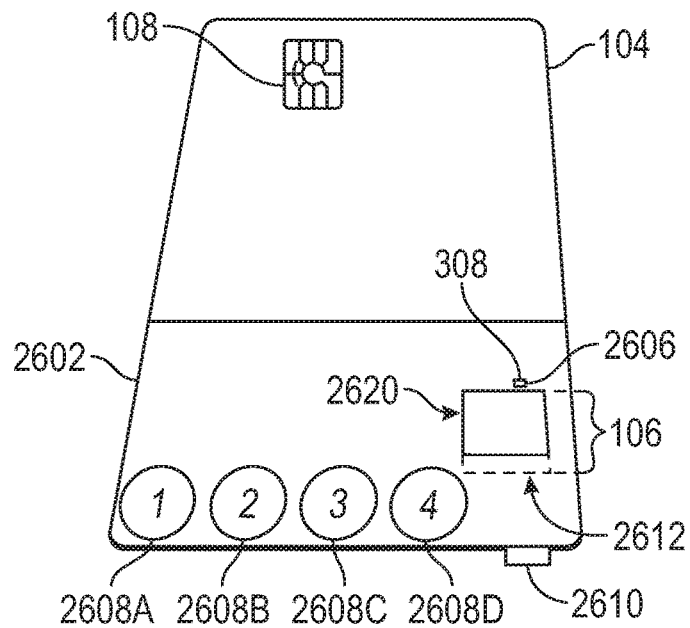
FIG. 26A illustrates an embodiment of a data input device in the form of an overlay which includes data input keys coupled to associated spatially distinct sensing areas on the sensing area of the fingerprint sensor, wherein the data input keys are remotely located from the sensing area, and a portion of the sensing area of the fingerprint sensor is exposed through a cut-out while another portion is covered by the overlay.

FIG. 26A illustrates a data input device in the form of an overlay which includes data input keys coupled to associated spatially distinct sensing areas on the sensing area of the fingerprint sensor, wherein the data input keys are remotely located from the sensing area according to some embodiments. A portion of the sensing area of the fingerprint sensor is exposed through a cut-out formed in the overlay while another portion of the sensing area is covered by the overlay.

As shown in FIG. 26A, a data input device in the form of an overlay 2602 comprises a portion 2612 covering a portion X (as shown by the dotted lines in FIG. 26A) of the sensing area 106 of the fingerprint sensor installed on the smart card 104 and additionally comprises a cut-out 2620 in the overlay 2602 to expose a remaining portion Y of the sensing area 106 of the fingerprint sensor. In a non-limiting exemplary embodiment, a smart card 104 is the device containing the fingerprint sensor, but the application of the data input device is not restricted to a smart card and can be used for any device that contains a fingerprint sensor in alternative embodiments. In some embodiments, the overlay 2602 is removably placed over a portion of the card 104 including portion X of the sensing area 106, and exposing portion Y of the sensing area through the cutout 2620 of the overlay 2602. The overlay 2602 includes data input keys 2608A-D associated with (e.g., coupled to) spatially distinct sensing areas on portion X of the sensing area 106 of the fingerprint sensor. As shown in FIG. 26A, the data input keys 2608A-D may be remotely located from the sensing area 106.

The overlay 2602 may comprise a pierced hole 2606 over the LED 308 or other indicator element on the card 104 when the overlay 2602 is placed over a portion of the card 104 including the sensing area 106 and the LED 308. In some embodiments, an OLED display may operate as the fingerprint sensor. In such embodiments, a portion of the OLED display that is included in portion Y of the sensing area 106 is configured to be used as the indicator element and hence a status indication is visible through the cut-out in the overlay.

In some embodiments, each data input key 2608A-D may function to enable the user to enter numbers (e.g., an activation code, such as a PIN code) by tapping his or her finger on the spatially distinct control areas 2608A-D. Each data input key 2608A-D of the overlay 2602 is electrically coupled to an associated spatially distinct portion of portion X of the sensing area 106 such that contact with each key will result in a detectable signal from the sensor element(s) of the associated spatially distinct portion of the sensing area 106. The coupling between the keys 2608A-D and the sensing area 106 allows the keys 2608A-D to be remotely located from the sensing area 106. This provides the significant advantage of positioning keys 2608A-D in locations not restricted by the boundaries of the sensing area 106. For example, extra space on the smart card 104 may be used to provide additional keys (e.g., more than four keys) or the keys 2608A-D can be spaced further apart, which may improve access for the user. In other embodiments, the overlay 2602 may comprise one data input key electrically coupled to an associated spatially distinct portion of the sensing area 106 configured to receive a Morse code-type data input by the user.

Figure 26B:
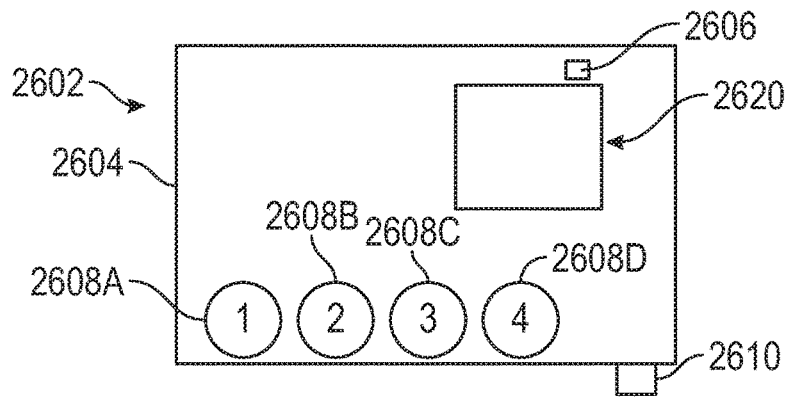
FIGS. 26B and 26C illustrate top and bottom surfaces, respectively, of a data input device in the form of a single-layer overlay including data input keys coupled to associated spatially distinct sensing areas on a portion of the sensing area of the fingerprint sensor that is covered by the overlay and additionally including a cutout formed in the overlay to expose a portion of the sensing area of the fingerprint sensor according to some embodiments.
Figure 26C:
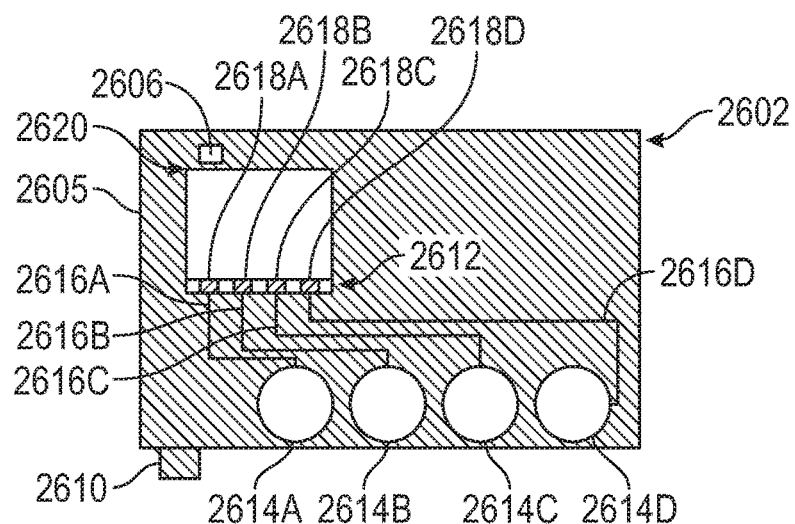

FIGS. 26B-26C illustrate top and bottom surfaces, respectively, of a data input device in the form of an overlay including data input keys coupled to associated spatially distinct sensing areas on the portion X of the sensing area of the fingerprint sensor and additionally including a cut-out to expose the portion Y of the sensing area of the fingerprint sensor according to some embodiments.

As shown in FIGS. 26B-26C, the overlay 2602 comprises a top surface 2604 and a bottom surface 2605. A portion 2612 of the bottom surface 2605 makes direct contact with the portion X of the sensing area 106 that is smaller than the entire sensing area 106 when the overlay 2602 is placed over the sensing area 106. In some embodiments, the overlay is made of a non-conductive film, e.g., a thin polymer film and may be less than 100 microns thick.

As shown in FIG. 26B, the top surface 2604 comprises data input keys 2608A-D, a pierced hole 2606 for an LED 308 (as described above in FIG. 26A) or other indicator element on the smart card 104, an optional tab 2610 for easy removal of the overlay 2602, and a cut-out area 2620 to expose the portion Y of the sensing area 106 of the fingerprint sensor. The top surface 2604 may be a silk-screen printed to indicate data keys 2608A-D. The surface of the edge surrounding each data input key 2608A-D may be slightly raised so that a user may feel the circumference of the holes when placing a finger over it.

As shown in FIG. 26C, the bottom surface 2605 comprises key traces 2614A-D, connection traces 2616A-D, sensing area, the pierced hole 2606 for the LED 308 or other indicator element on the smart card 104, and the cut-out area 2620 to expose the portion Y of the sensing area of the fingerprint sensor. The data input keys 2608A-D on the top surface align with key traces 2614A-D on the bottom surface. A conductive material, such as conductive ink, metallization, conductive polymer, or any conductive coating may be used to print or apply the key traces 2614A-D, the connection traces 2616A-D, and the sensing area activation traces 2618A-D onto the bottom surface 2605. The key traces 2614A-D are located remotely from the sensing area activation traces 2618A-D. The connection traces 2616A-D connect the key traces 2614A-D to each respective, associated sensing area activation trace 2618A-D. The sensing area activation traces 2618A-D are located on the bottom surface 2605 such that the sensing area activation traces 2618A-D align with associated spatially distinct data input regions of the portion X of the sensing area 106 when the overlay 2602 is placed over the smart card 104.

In a non-limiting exemplary implementation of the embodiment of overlay 2602, when the fingerprint sensor is in control mode and data input mode, sensor elements within portion 2612 (i.e., portion X) of the sensing area 106 are activated and scanned in contact sensing mode and data input keys 2608A-D are operatively coupled to associated spatially distinct activation traces 2618A-D within portion 2612 (i.e., portion X) of the sensing area 106. When the fingerprint sensor with overlay 2602 is in enrollment mode, only the sensor elements located within portion 2620 (i.e., portion Y) of the two-dimensional array of the sensing area 106 may be activated and scanned in the fingerprint sensing mode, and the sensor controlling circuitry is configured such that multiple images of a user's fingerprint may be gathered to acquire a sufficient fingerprint template that is stored in memory. In verification or authentication mode, the overlay 2602 would typically have been removed from the card 104 (or other device), and the sensor elements of the entire sensing area, including portion 2612 (i.e., portion X) and portion 2620 (i.e., portion Y), are scanned in fingerprint sensing mode to generate a fingerprint image for comparison against the fingerprint template created in enrollment mode.

Figure 27A:
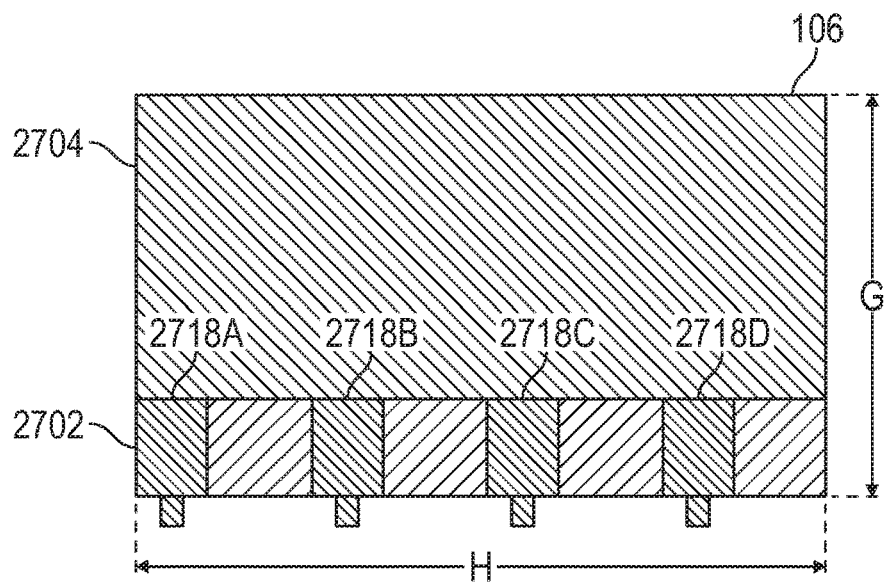
FIG. 27A illustrates an embodiment of arranging conductive material over the sensing area of the fingerprint sensor.

FIG. 27A illustrates an embodiment of arranging conductive material over the sensing area of the fingerprint sensor. In this embodiment, the sensing area activation traces 2718A-D may be in the shape of square or rectangle blocks on portion X 2702 of the sensing area 106. FIG. 27A shows portion X 2702 and portion Y 2704 as two non-overlapping rectangles, sharing one long side along direction "H." Arranging portion X 2702 and portion Y 2704 in this way optimizes the area of the portion Y 2704, thereby providing better fingerprint matching performance. However, other implementations are possible, for example, portion X 2702 may be L-shaped or may even form a frame surrounding portion Y 2704.

When the sensing area activation traces 2718A-D are in the shape of a square or a rectangle block, there may be a loss in detection sensitivity because the sensing area activation traces 2718A-D are not aligned with the full length of the pickup lines of the sensing area 106. In order to compensate for any loss in detection sensitivity, the square or rectangle block sensing area activation traces 2718A-D may be wider along the sensing area length, i.e., direction "H," than the height in the sensing area width direction "G" in order to cover more pickup lines. In some embodiments, the portion X 2702 of the sensing area 106 covers around 5-20% of the total sensing area 106. In some embodiments, for a 9 mm×9 mm fingerprint sensor with 6 data input traces, each sensing area activation trace 2718A-D is approximately 1 mm square, distributed equally along one side of the sensing area 106.

Figure 27B:
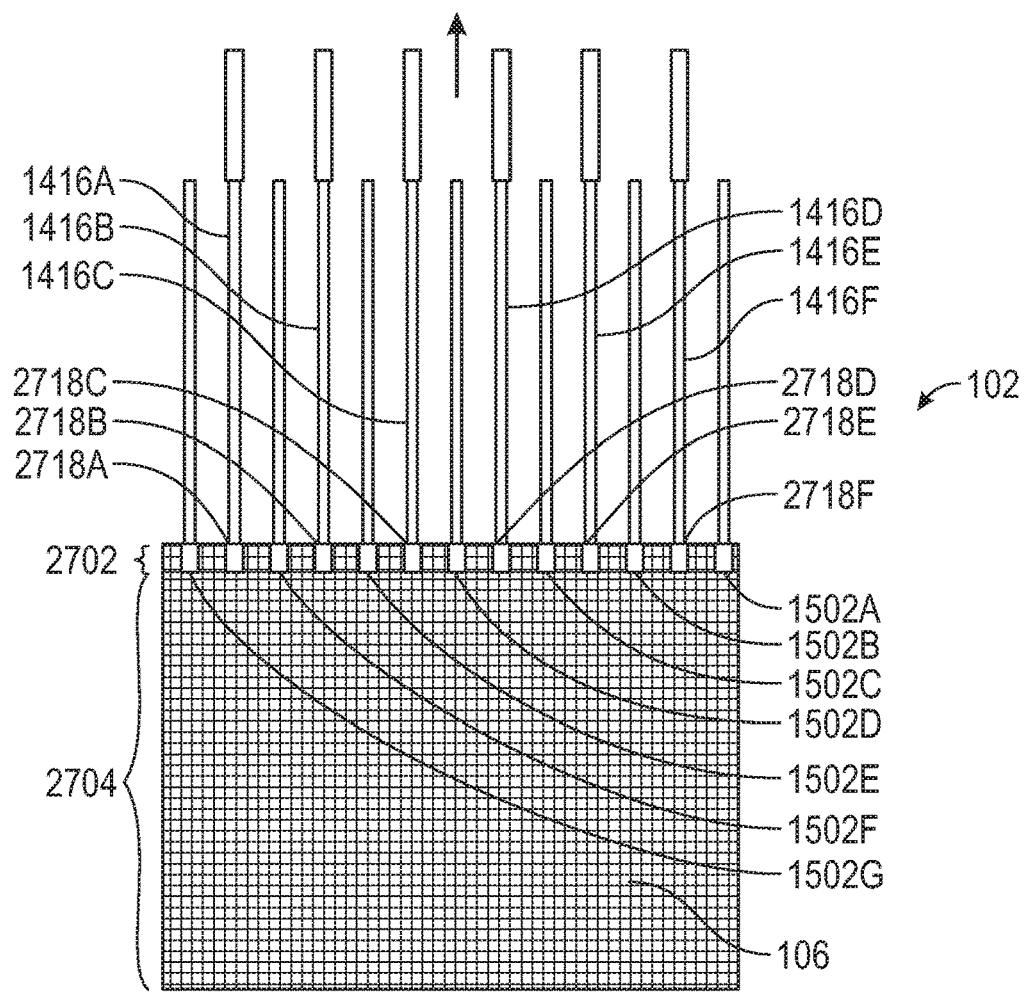
FIG. 27B illustrates an embodiment of arranging conductive material over the sensing area of the fingerprint sensor including activation traces on a portion of the sensing area connected to data keys and reference traces disposed between and adjacent the activation traces.

FIG. 27B illustrates an embodiment of arranging conductive material over the sensing area of the fingerprint sensor including activation traces on a portion of the sensing area connected to data keys and reference traces disposed between and adjacent the activation traces. In some embodiments, sensing area activation traces 2718A-F of equal size and shape are distributed evenly over portion X 2702 of the sensing area 106, and reference traces 1502A-G are distributed evenly between each neighboring pair of the sensing area activation traces 2718A-F (and adjacent each outermost activation trace 2718A and 2718F) so that the reference traces 1502A-G align with associated spatially distinct reference regions of portion X 2702 of the sensing area 106. In some embodiments, reference traces 1502A-G are the same size and shape as the activation traces 2718A-F. The sensing area activation traces 2718A-F are connected through connection traces 1416A-F to corresponding key traces (not shown). The reference traces 1502A-G are not connected to the key traces but are subject to noise and unwanted signal inputs similar to that of the sensing area activation trace 2718A-F. In some embodiments, during the sensor's scanning process, detected signals from sensor elements covered by the reference traces 1502A-G (also referred to as reference signals) may be subtracted from detected signals from sensor elements covered the activation traces 2718A-F (also referred to as activation signals) in order to remove the noise and unwanted signals. In some embodiments, reference signals may be subtracted from activation signals by differential amplifier, as described above in connection with FIG. 15D.

FIG. 27B illustrates reference traces 1502A-G and sensor activation traces 2718A-F that are evenly distributed in portion X 2702 and of equal size and shape. However this is not required and the reference traces 1502A-G and sensor activation traces 2718A-F may be of any appropriate size and shape at any appropriate distribution in portion X 2702 in alternative embodiments.

Figure 28:
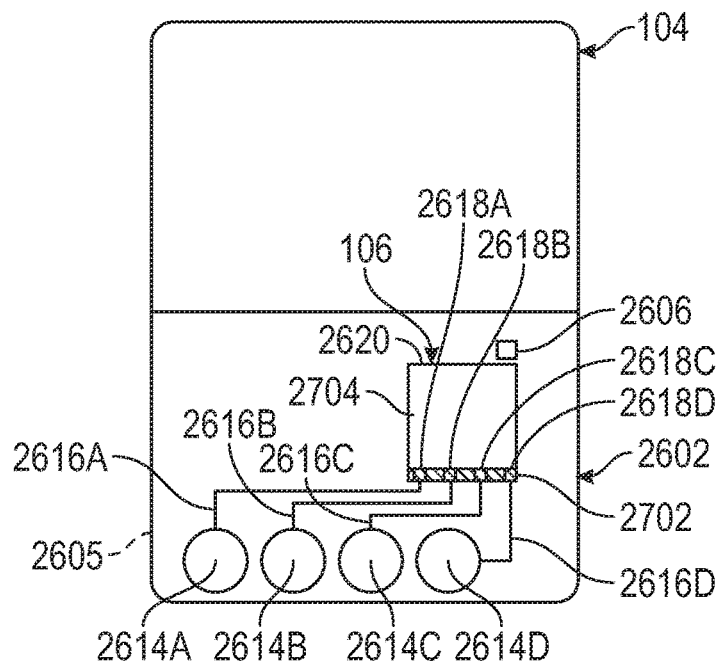
FIG. 28 illustrates a data input device in the form of a single-layer overlay temporarily placed over a smart card according to some embodiments.

FIG. 28 illustrates the data input device in the form of an overlay 2602 temporarily placed over the smart card 104 according to some embodiments. To aid illustration, the upper surface is not shown and the overlay 2602 is shown as transparent, so one can see the bottom surface 2605 in contact with the fingerprint sensor. As shown in FIG. 28, the overlay 2602 covers a portion of the smart card 104 containing the sensor area 106. The overlay 2602 is placed on the smart card 104 such that the sensing area activation traces 2618A-D on the lower layer 2605 are covering and aligned with the spatially discrete regions of portion X 2702 of sensing area 106 (encompassing one or more specified sensor elements) associated with each key trace 2614A-D. The cut-out area 2620 in the single layered overlay 2602 leaves portion Y 2704 of sensing area 106 exposed.

Figure 29A:
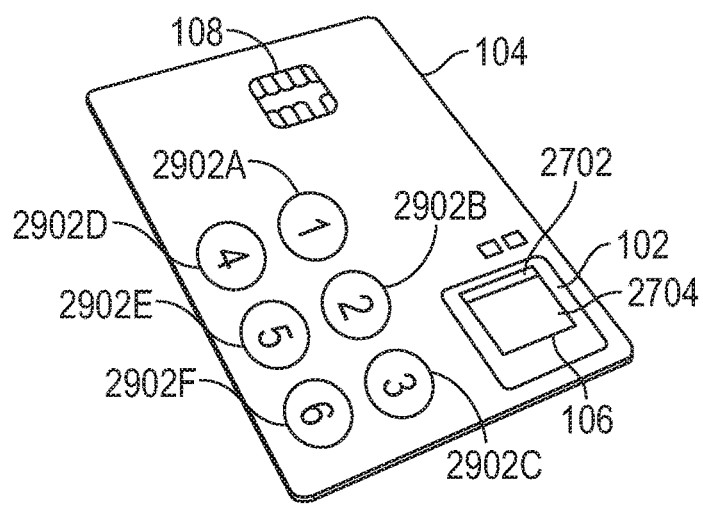
FIGS. 29A and 29B illustrate devices containing fingerprint sensors with data input keys incorporated into the device according to some embodiments.
Figure 29B:
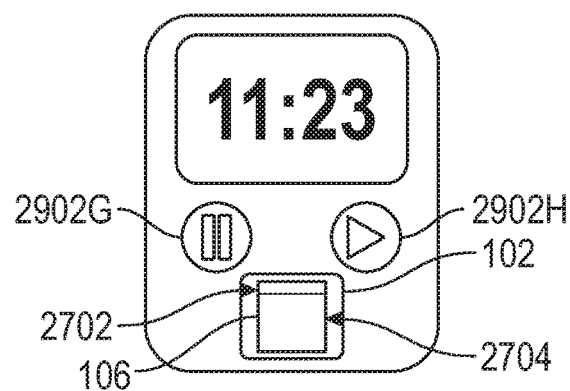

FIGS. 29A-B illustrate devices containing fingerprint sensors with data input keys incorporated into the device according to some embodiments. In some embodiments, the data keys are a permanent feature of the device and are not on a temporary overlay.

FIG. 29A shows an example of a smart card 104 according to some embodiments. Smart cards are typically made of multiple layers of plastic, some layers incorporating circuitry and possibly an antenna. In some embodiments, data input keys 2902A-F may be incorporated into a layer of the card body itself, and portion Y 2704 of the sensing area of the fingerprint sensor 102 may be exposed at a top surface of the card body. In a lower layer, key traces may be coupled with the data input keys 2902A-F on the upper layer. Connection traces (not shown) connect the key traces to portion X 2702 of the sensing area of the fingerprint sensor 102. In some embodiments, the data input keys 2902A-F are partially milled out of the card body to reduce the thickness of the card body between the key and the underlying key trace. The partial milling out of the card body may aid the user to locate the data input keys by touch.

FIG. 29B shows an example of a device such as a smart watch or fitness monitor, according to some embodiments. However, the principles applied to the device described in FIG. 29B are not restricted to the smart watch or fitness monitor, and the principles also apply to other devices with limited user interfaces such as key fobs, remote controls, dashboards, white goods, and industrial equipment in alternative embodiments. As shown in FIG. 29B, data input keys 2902G-H, and portion Y 2704 of the sensing area of the fingerprint sensor are permanently available to the user on the upper surface of the device. In a layer underneath, key traces may be coupled with the data input keys 2902G-H. As described above in FIG. 29A, connection traces (not shown) connect the key traces to portion X 2702 of the sensing area of the fingerprint sensor.

Unlike existing smart cards or goods incorporating keypads, the embodiments described in FIGS. 29A and 29B offer the manufacturer the opportunity to reduce component costs by using the fingerprint sensor to implement the keypad in addition to offering biometric services. In the specific case of a contactless smartcard containing a fingerprint sensor and data input keys, the embodiment described in FIG. 29A may be particularly advantageous in saving on additional circuitry and processing logic. In contactless smart cards, the fingerprint sensor 102, functioning alone, or in conjunction with other components on the card 104, may be able to harvest power from an NFC signal in order to provide fingerprint authentication when placed in range of a wireless power device according to some embodiments. In such embodiments, the same power harvesting circuitry and power management processing capabilities that the contactless smart card already uses for fingerprint authentication purposes may be employed to power the card wirelessly when data input is required.

In a non-limiting exemplary implementation of the embodiment of the smart card of FIG. 29A or the device of FIG. 29B, when the fingerprint sensor 102 is in control mode and data input mode, sensor elements within data input sensing area X 2702 of the sensing area 106 are activated and scanned in contact sensing mode and data input keys are operatively coupled to associated spatially distinct sensor elements within data input sensing area X of the sensing area. When the fingerprint sensor 102 is in enrollment mode, only the sensor elements located within exposed sensing area Y 2704 of the two-dimensional array of the sensing area 106 may be activated and scanned in the fingerprint sensing mode, and the sensor controlling circuitry is configured such that multiple images of a user's fingerprint may be gathered to acquire a sufficient fingerprint template that is stored in memory. In verification or authentication mode, only the sensor elements located within exposed sensing area Y 2704 of the two-dimensional array of the sensing area 106 may be activated and scanned in the fingerprint sensing mode, and the sensor controlling circuitry is configured to generate a fingerprint image for comparison against the fingerprint template created in enrollment mode.

As described above, the sensing area 106 of the fingerprint sensor 102 installed on the device 104 may be selectively configured to operate in five modes: (1) enrollment mode; (2) verification mode; (3) data input mode; (4) control mode; and (5) unlock mode. In some embodiments, the user can select the different modes by different interactions with the sensor 102, such as a double tap, hold, up/down drag, and left/right drag on the sensor area 106. In other embodiments, the sensor 102 can be selectively configured in different modes when the user presses the data input keys that are coupled to the sensing area 106.

However, the embodiments shown in FIGS. 26A and 29A-29B additionally offer the user the ability to operate in more than one mode simultaneously. For example, if the user was to put one enrolled finger on sensor area Y 2620, 2704 and at the same time, press one or more data input keys, the fingerprint sensor can capture a single image from the sensor that would detect the fingerprint image (in area Y 2620, 2704) and would detect which data input key(s) had been pressed (in area X 2612, 2702) at that instant. This offers a new suite of possibilities to be able to interact with a host device in a secure fashion since it allows the host device owner to verify their identity at the exact instant the owner is making an additional input. Some examples of how this feature may be used are, for example, the host device can only be locked/unlocked/reset if the verified user of the device is detected when the lock/unlock/reset key is pressed, or certain features on the host device can only be activated if the user is verified at the same time as they press a certain key, or a payment from the user's account can only be taken if the user is verified at the same time as they press "enter" to authorize the payment, and so on. The features also prevent accidental data entry, e.g., if a user's biometrically-enabled key fob is in her handbag, if something in the bag presses against the key fob and hits the unlock button, the car won't unlock because her fingerprint has not been simultaneously detected.

FIGS. 30-31 show flow charts describing an enrollment process 3000 and 3100, respectively, where portion Y 2620 of the sensing area 106 of the fingerprint sensor 102 is exposed to the user through a data input device in the form of an overlay constructed as described in FIGS. 26B-26C. Since portion Y 2620 of the sensing area 106 is exposed, after the activation code (PIN) has been entered, the user need not remove the overlay until after the user has enrolled his or her finger, or optionally, the user may leave the overlay on the device.

Referring to FIG. 30, in step 3002, a data input device, such as a data input device as shown in FIGS. 26B-26C is temporarily connected to a biometric-enabled device, such as a fingerprint-enabled smart card. In some embodiments, a unique code, such as an activation code, is written into a secure memory of the smart card and encrypted in a secure location during the manufacturing process of the smart card. The fingerprint sensor on the smart card may be calibrated during the manufacturing process and set to data-input mode before the smart card is sent to the user.

In step 3004, the card provider provides the smart card and a low-cost, simple power source to the user, e.g., sent by mail or courier or given out by a bank or retail outlet. The power source may be battery powered, powered by mains (e.g., via a USB connector), or solar powered. A non-limiting exemplary embodiment of the power source is described in FIGS. 9A-H. In some embodiments, if the smart card contains an on-board power source, the power source need not be provided to the user.

The smart card and the power source may be sent to the user with the smart card already inserted in the power source as described in FIGS. 11A-11C and 12A-12C. In such embodiments, a battery connection tab is inserted between the power source and the smart card to keep a power connection disconnected. The user may pull out the battery connection tab, as shown in FIG. 12A, to connect the power source to the smart card.

In step 3006, the user follows instructions, received with the card to obtain an activation code from the card provider. For example, the user could be asked to call a number, or the data input device might have a QR® code that the user can scan with a smart phone, or the user could log-in to their on-line banking site or mobile application and indicate they wish to receive an activation code by SMS. Other secure mechanisms to obtain the activation code may be available in alternative embodiments. A six digit activation code may provide the user with an appropriate security level. The security level may be increased or decreased by varying the number of required digits, depending on the card provider's requirements.

In step 3008, if not already done, the user connects the smart card to the power source, for example by inserting the card into a power source housing. The card receives power from the power source, and a status indicator on the smart card (e.g., an LED) may indicate to the user that the smart card is ready.

In step 3010, the user enters the activation code by sequentially touching the data input keys of the data input device in a sequence corresponding to the activation code. The status indicator can indicate to the user that the entered code is correct or incorrect. As described above, if the entered code is incorrect, the user can make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out.

In step 3012, if the activation code has been entered correctly, the user can now start to enroll a fingerprint (enrollment mode) without removing the data input device from the card. The smart card must remain connected to the power source throughout the enrollment process. In some embodiments, the status indicator makes an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

The user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 3014, the user removes the smart card from the power source, and the power source may be discarded. The user may, optionally, also remove the data input device after successful enrollment, possibly after additional data input.

Accordingly, the user has now successfully enrolled a fingerprint in the smart card through the enrollment process 3000 and can use the smart card in the normal way to pay for items, but now requiring fingerprint verification in order to use the smart card. In some embodiments, multiple users may enroll a fingerprint on the smart card, or a user may enroll multiple fingers on the smart card, using the above noted process 3000. In such embodiments, the card may be programmed with multiple activation codes that are provided to each user. To enroll a new user/finger through the enrollment process 3000, a new activation code is entered, which is made convenient by the fact that the data input device was not removed during enrollment of the previous fingerprint.

Referring to FIG. 31, in step 3102, a data input device, such as a data input device as shown in FIGS. 26A-26C is temporarily connected to a biometric-enabled device, such as a fingerprint-enabled smart card. In some embodiments, a unique code, such as an activation code, is written into a secure memory of the smart card and encrypted in a secure location during the manufacturing process of the smart card.

In step 3104, the card provider provides the smart card to the user, e.g., sent by mail or courier or given out by a bank or retail outlet.

In step 3106, the user has access to a device, e.g., a smartphone, that is able to provide power wirelessly, e.g., via Near Field Communication, and thus, it is not necessary to provide a power source to the user. A power source may optionally be provided to the user to give the user the choice of using wireless power or wired power.

In step 3108, the user follows instructions, received with the card to obtain an activation code from the card provider. For example, the user could be asked to call a number, or the data input device might have a QR® code that the user can scan with a smart phone, or the user could log-in to their on-line banking site or mobile application and indicate they wish to receive an activation code by SMS. Other secure mechanisms to obtain the activation code may be available in alternative embodiments. A six digit activation code may provide the user with an appropriate security level. The security level may be increased or decreased by varying the number of required digits, depending on the card provider's requirements.

In step 3110, the user places the smart card near the smartphone in range for NFC connectivity, e.g., as shown in FIGS. 25A-25D. The smart card receives power through NFC connectivity and a status indicator shows the user that the smart card is ready for enrollment to start. In an embodiment, the user could disable all connectivity on the device, except for NFC, to ensure that the device is completely "off-grid" during the enrollment process for added security. For example, the user can turn off cellular data, Wi-Fi, Bluetooth, etc.

In step 3112, the user enters the activation code by sequentially touching the data input keys of the data input device in a sequence corresponding to the activation code. The status indicator may indicate to the user that the entered code is correct or incorrect. If the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out.

In some embodiments, if one or two unsuccessful entries have been made, the number of unsuccessful entries is stored in a non-volatile memory. Accordingly, even if power to the smart card is disconnected and reapplied, the smart card still remembers how many unsuccessful entries have been made. Accordingly, the card cannot be "re-set" to a full complement of attempts by disconnecting the card after a number of unsuccessful attempts that is less than the maximum allowed number of attempts.

In step 3114, if the activation code has been entered correctly, the user can now start to enroll a fingerprint (enrollment mode) without removing the data input device from the card. The smart card must remain in range for NFC connectivity to the smartphone throughout the enrollment process. In some embodiments, the status indicator may make an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

The user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 3116, the user moves the smart card out of range for NFC connectivity to remove the smart card from the power source and optionally removes the data input device. In some embodiments, if the user had disabled all connectivity on the device, except for NFC, in step 3110, the user can re-enable all connectivity on the device.

Figure 32:
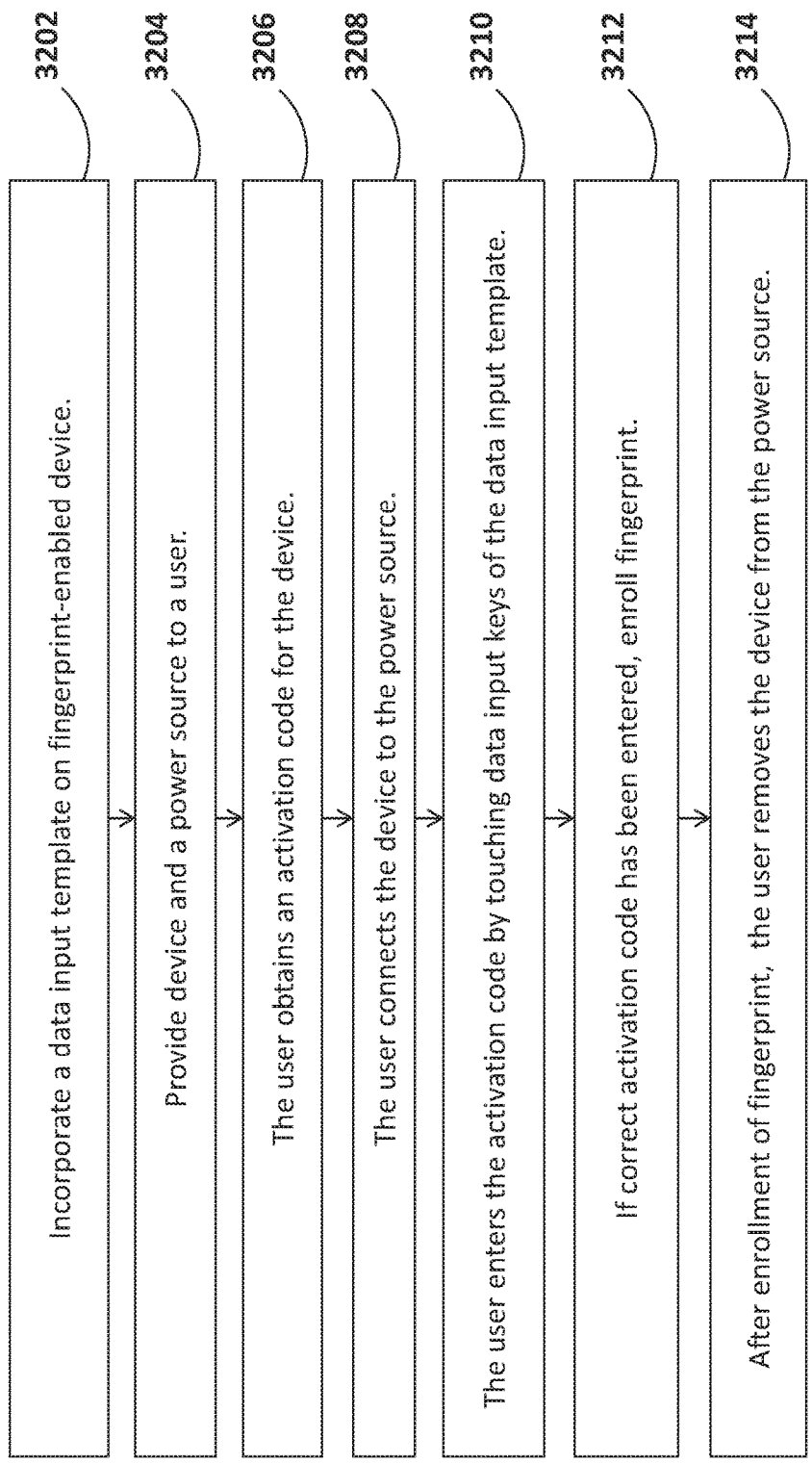
FIGS. 32-33 show flow charts illustrating embodiments of an enrollment process on a device where data input keys and at least a portion of the fingerprint sensor are permanently available to the user.
Figure 33:
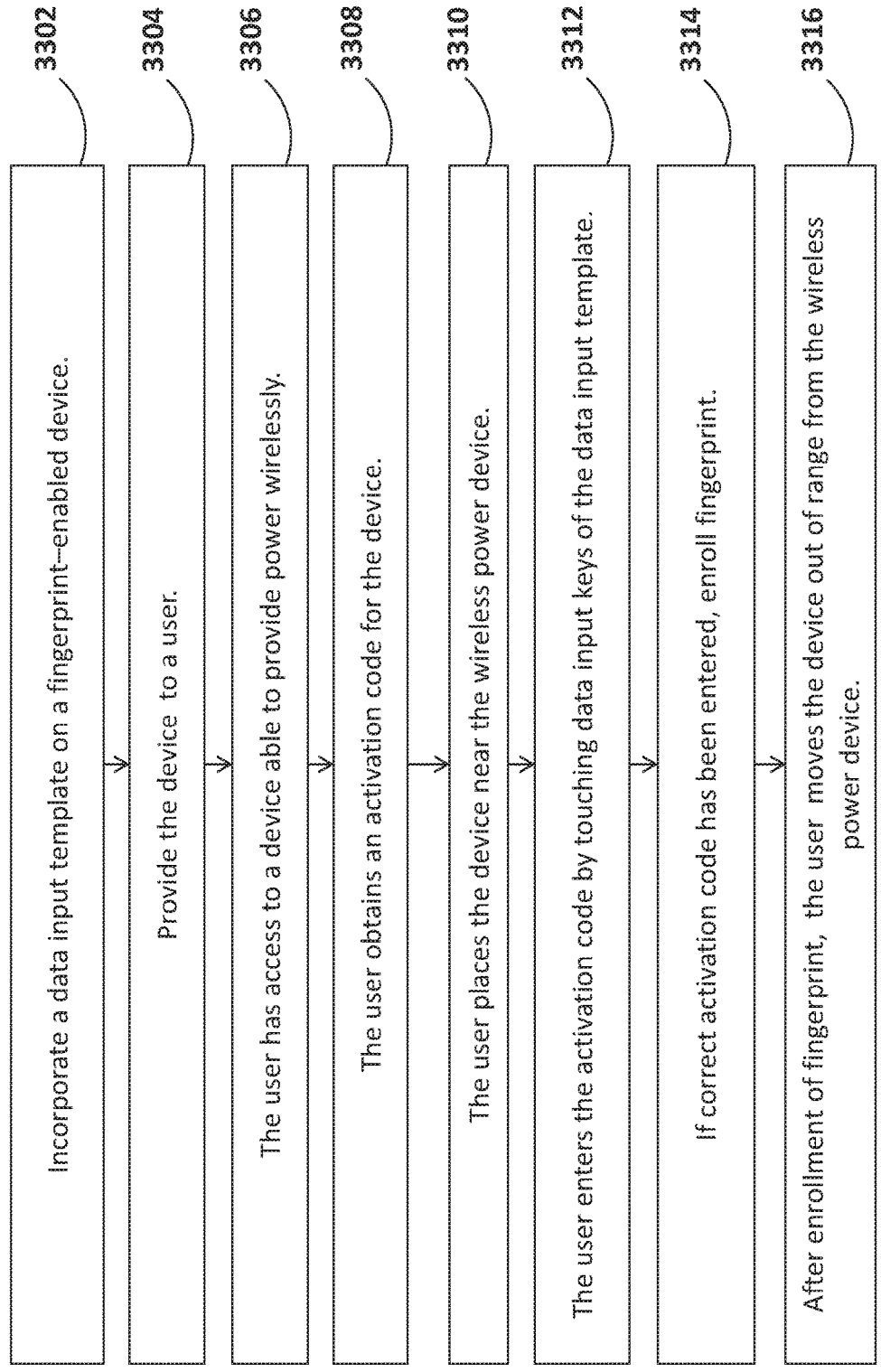

FIGS. 32-33 are flow charts showing enrollment process 3200 and 3300, respectively, on a device as illustrated in FIGS. 29A-B where data input keys 2902A-F, 2902G-H and portion Y 2704 of the fingerprint sensor 102 are permanently available to the user.

Referring to FIG. 32, in step 3202, data input keys are incorporated into a fingerprint-enabled smart card or other device. In some embodiments, a unique code, such as an activation code, is written into a secure memory of the device and encrypted in a secure location during the manufacturing process of the device. The fingerprint sensor on the device may be calibrated during the manufacturing process and set to data-input mode before the smart card is sent to the user.

In step 3204, the device provider provides the device and a low-cost, simple power source to the user, e.g., sent by mail or courier or given out by a bank or retail outlet. The power source may be battery powered, powered by mains (e.g., via a USB connector), or solar powered. A non-limiting exemplary embodiment of the power source is described in FIGS. 9A-9H. In some embodiments, if the device contains an on-board power source, the power source need not be provided to the user.

A smart card and the power source may be sent to the user with the smart card already inserted in the power source as described in FIGS. 11A-11C and 12A-C. In such embodiments, a battery connection tab is inserted between the power source and the smart card to keep a power connection disconnected. The user may pull out the battery connection tab, as shown in FIG. 12A, to connect the power source to the smart card.

In step 3206, the user follows instructions, received with the device to obtain an activation code from the device provider. For example, the user could be asked to call a number, or the data input device might have a QR® code that the user can scan with a smart phone, or the user could log-in to their on-line banking site or mobile application and indicate they wish to receive an activation code by SMS. Other secure mechanisms to obtain the activation code may be available in alternative embodiments. A six digit activation code may provide the user with an appropriate security level. The security level may be increased or decreased by varying the number of required digits, depending on the card provider's requirements.

In step 3208, if not already done, the user connects the device to the power source, for example by inserting the device, e.g., a card, into a power source housing. The device receives power from the power source, and a status indicator on the device (e.g., an LED) indicates to the user that the device is ready.

In step 3210, the user enters the activation code by sequentially touching the data input keys of the data input device in a sequence corresponding to the activation code. The status indicator may indicate to the user that the entered code is correct or incorrect. As described above, if the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out.

In step 3212, if the activation code has been entered correctly, the user can now start to enroll a fingerprint (enrollment mode). The device must remain connected to the power source throughout the enrollment process. The status indicator may make an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

The user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 3214, the user removes the device from the power source.

Accordingly, the user has now successfully enrolled a fingerprint in the device according to process 3200 and can use the device in the normal way, but now requiring fingerprint verification in order to use the device. In some embodiments, multiple users may enroll a fingerprint on the device, or a user may enroll multiple fingers on the device, using the above noted method. In such embodiments, the device may be programmed with multiple activation codes that are provided to each user. To enroll a new user/finger according to process 3200, a new activation code is entered, which is made convenient by the fact that the data input keys are permanently incorporated into the device.

Referring to FIG. 33, the process 3300 begins with step 3302, in which data input keys are incorporated into a fingerprint-enabled smart card or other device. In some embodiments, a unique code, such as an activation code, is written into a secure memory of the device and encrypted in a secure location during the manufacturing process of the device. The fingerprint sensor on the device may be calibrated during the manufacturing process and set to data-input mode before the smart card is sent to the user.

In step 3304, the device provider provides the device to the user, e.g., sent by mail or courier or given out by a bank or retail outlet.

In step 3306, the user has access to a device, e.g., a smartphone, that is able to provide power wirelessly, e.g., via Near Field Communication, and thus, it is not necessary to provide a power source to the user. A power source may be provided to the user to give the user the choice of using wireless power or wired power.

In step 3308, the user follows instructions, received with the device to obtain an activation code from the device provider. For example, the user could be asked to call a number, or be given a QR® code that the user can scan with a smart phone, or the user could log-in to their on-line banking site or mobile application and indicate they wish to receive an activation code by SMS. Other secure mechanisms to obtain the activation code may be available in alternative embodiments. A six digit activation code may provide the user with an appropriate security level. The security level may be increased or decreased by varying the number of required digits, depending on the card provider's requirements.

In step 3310, the user places the device near the smartphone in range for NFC connectivity, e.g., as shown in FIGS. 25A-25D. The device receives power through NFC connectivity and a status indicator shows the user that the smart card is ready for enrollment to start. In some embodiments, the user may disable all connectivity on the device, except for NFC, to ensure that the device is completely "off-grid" during the enrollment process for added security. For example, the user can turn off cellular data, Wi-Fi, Bluetooth, etc.

In step 3312, the user enters the activation code by sequentially touching the data input keys in a sequence corresponding to the activation code. The status indicator may indicate to the user that the entered code is correct or incorrect. If the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out.

The user may trigger the enrollment mode by correctly entering the activation code and not complete the enrollment. That is, the fingerprint sensor may be in enrollment mode, but the user does not provide any or sufficient input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In some embodiments, if one or two unsuccessful entries have been made, the number of unsuccessful entries is stored in a non-volatile memory. In such embodiments, even if power to the smart card is disconnected and reapplied, the smart card still remembers how many unsuccessful entries have been made. Accordingly, the card cannot be "re-set" to a full complement of attempts by disconnecting the card after a number of unsuccessful attempts that is less than the maximum allowed number of attempts.

In step 3314, if the activation code has been entered correctly, the user can now start to enroll a fingerprint (enrollment mode). The device must remain in range for NFC connectivity to the smartphone throughout the enrollment process. In some embodiments, the status indicator makes an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

In step 3316, the user moves the device out of range for NFC connectivity to remove the smart card from the power source. In some embodiments, if the user had disabled all connectivity on the device, except for NFC, in step 3310, the user can re-enable all connectivity on the device.

FIGS. 34A-34E illustrate another embodiment of a data input device in the form of an overlay 3402. As shown in FIGS. 34A-34E, the overlay 3402 integrates a power source (also referred to as a non-data-transmitting power source) for the fingerprint sensor 102 installed on a device 104 as well as data input elements for entering data via signals generated at the fingerprint sensor. In the embodiment described in relation to FIGS. 34A-34E, a smart card is the device containing the fingerprint sensor. However, the application of the data input device is not restricted to a smart card and can be used for any device that contains a fingerprint sensor in alternative embodiments. In some embodiments, the smart card 104 comprises the fingerprint sensor 102 with a sensing area 106, possibly LEDs or other status indicators 308, and contact pads 108 providing contacts for an external power source.

In some embodiments, the overlay 3402 comprises a thin material, e.g., a film that conforms to a surface of the host device when secured thereto. The overlay 3402 may comprise an adhesively-backed sticker or film temporarily and removably placed over the card. In some embodiments, repositionable adhesives provided by companies such as 3M, Krylon, Franklin Adhesives and Polymers, and Bostik may be applied to the overlay 3402 to temporarily place over the portion of the card 104 including the contact pads 108. In other embodiments, the temporary overlay 3402 may be slid over the device, clipped onto the device, or folded onto the device rather than adhering to the device surface. The overlay may be magnetic and stick to the device surface if the device is metal.

Figure 34A:
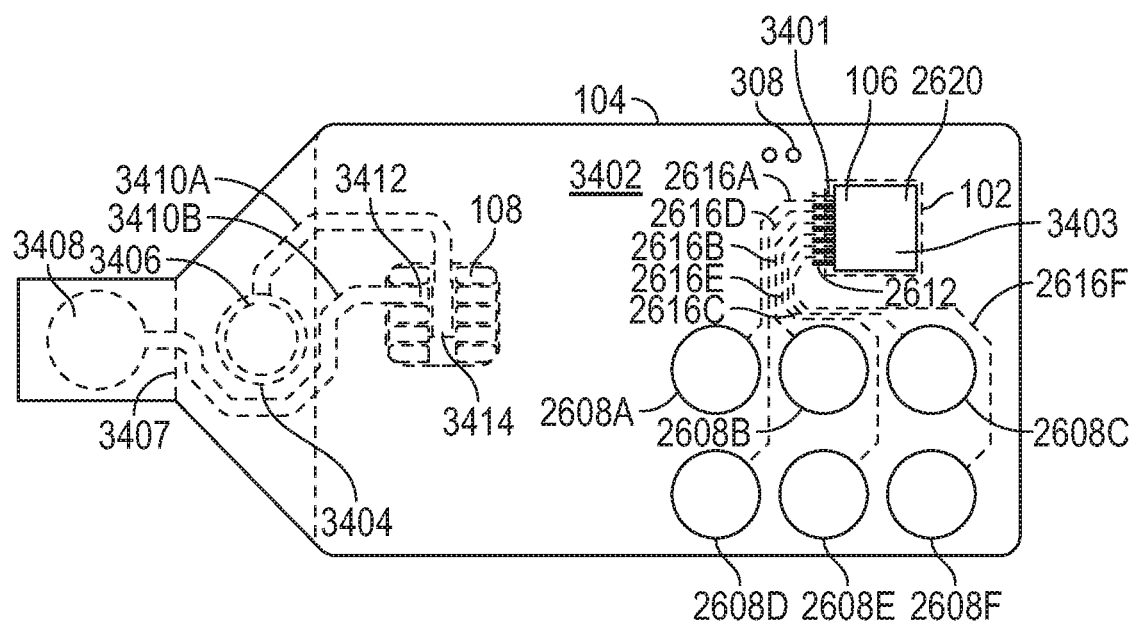
FIG. 34A is a plan view of a data input device in the form of an overlay integrating a power source with a host device disposed beneath the overlay according to some embodiments.

FIG. 34A is a plan view of an embodiment of a data input device in the form of an overlay 3402 integrating a power source with a host device (e.g., smart card) disposed beneath the overlay. Features disposed on the back, or non-exposed surface, of the overlay 3402 or features disposed on the underlying host device that are covered by the overlay 3402 are shown in dashed lines in FIGS. 34A, 34B, and 34F. The overlay 3402 is configured to provide power to an electronic device 104, such as a smart card, having terminals (e.g., power connection pads) for connecting a source of electric power to the electronic device 104, and the overlay 3402 is configured to be removably secured to a surface of the electronic device 104.

In some embodiments, the overlay 3402 is not secured to the surface of the device 104, but is connected to the device 104 by a ribbon cable or other conductor. For example, a power source, such as that shown in FIGS. 34A-34F and 35, may be incorporated in a remote keypad device 1902 shown in FIG. 19, and data transfer cable 1906 may also include conductive contacts for connecting the power source to power transmission pads of the host device 104.

The overlay 3402 may comprise a suitable power element 3404 to power the card 104, such as a small cell battery LR44. In such embodiments, the power element 3404 is securely attached to the overlay 3402 and makes electrical contact with power element contact pad 3406. For example, one terminal of a battery may contact the power element contact pad 3406. As shown in FIG. 34A, the power element contact pad 3406 makes contact with power connection trace 3410A. A corresponding conductive contact 3408 is printed or etched onto a section of the overlay 3402 which can be folded such that the conductive contact 3408 aligns with the power element 3404. In some embodiments, pressure applied to the folded conductive contact 3408 holds the conductive contact 3408 in contact with the power element 3404. For example, the conductive contact 3408 contacts another terminal of the battery. The surface of conductive contact 3408 may be coated in conductive, repositionable adhesive such that the folded section of overlay will stay in contact with the power element 3404 without the user having to continue to hold it in place. Conductive contact 3408 additionally makes contact with power connection trace 3410B.

In some embodiments, power connection traces 3410A and 3410B are printed in conductive ink or are etched on the overlay 3402. Power connection trace 3410A routes the power element 3404 and power element contact pad 3406 to the ground connection 3414 on contact pad 108. Power connection trace 3410B routes the conductive contact 3408 to the card contact power input on contact pads 108 on the smart card 104. Moving the conductive contact 3408 into contact with power element 3404 (i.e., so that conductive contact 3408 contacts one part (e.g., terminal) of the power element 3404 and the power element contact pad 3406 contacts another part (e.g., terminal) of the power element 3404) completes a circuit from the conductive contact 3408, through the power element 3404, and to the power element contact pad 3406. The overlay 3402 includes a circuit closure configured to enable a user to selectively close a power circuit between the power element 3404 and the terminals of the electronic device to enable power transmission between the power element and the electronic device. In some embodiments, the circuit closure includes a section of the overlay 3402 containing conductive contact 3408 folded (e.g., over a fold line 3407 shown in FIG. 34A) such that when the conductive contact 3408 makes contact with power element 3404 the power source circuit is completed and power is supplied to the card 104. The conductive contact 3408 may be held in contact with the power element 3404 by applying pressure to the conductive contact 3408. For example, the pressure may be applied by a user's press or pinch, by a conductive adhesive between the conductive contact 3408 and the power element 3404 or by mechanical means, such as a clip or clasp.

The overlay 3402 may include data input keys 2608A-F, connection traces 2616A-F coupling each data input key with an associated, spatially distinct portion (part of portion X 3401) of the sensing area 106 of the fingerprint sensor, and a cutout 2620 exposing a portion Y 3403 of the sensing area 106 as described above.

Figure 34B:
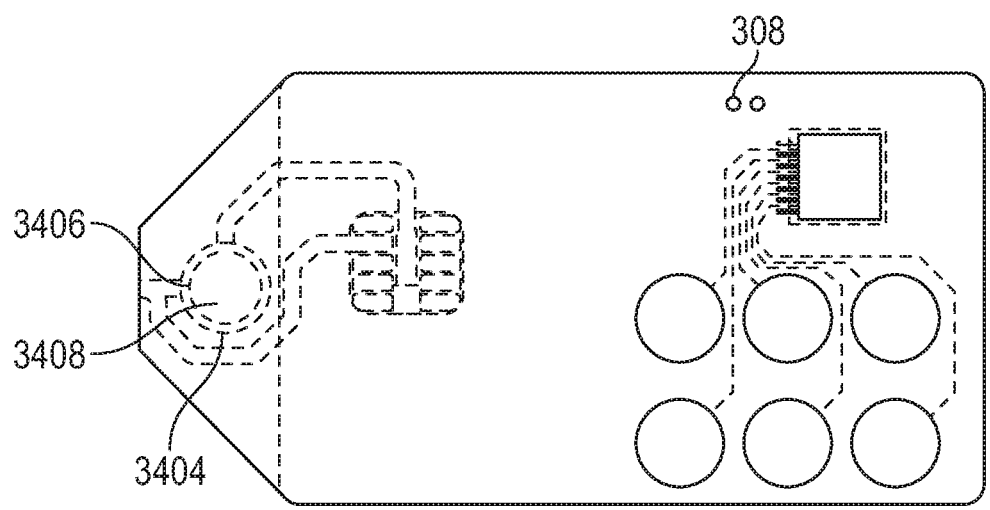
FIG. 34B is a view of the data input device and host device with a portion of the overlay folded over to complete a power circuit to the host device according to some embodiments.

FIG. 34B is a view of the overlay 3402 and host device with a portion of the overlay folded over to complete a power circuit to the host device according to some embodiments.

FIG. 34B shows the result of folding a section of the overlay 3402 to align the conductive contact 3408 and power element 3404 to complete the power source circuit and provide power to the card 104. In some embodiments, status indicators 308, e.g., light elements (e.g., LEDs) and/or other visual or auditory elements, may be used to signal to the user that power is present and/or that the enrollment process may begin.

In some embodiments the overlay 3402 may be transparent or translucent such that one can see its various elements and their alignment with associated elements of the smart card 104. However, this is not required and the overlay may not be transparent or translucent in alternative embodiments.

Figure 34C:
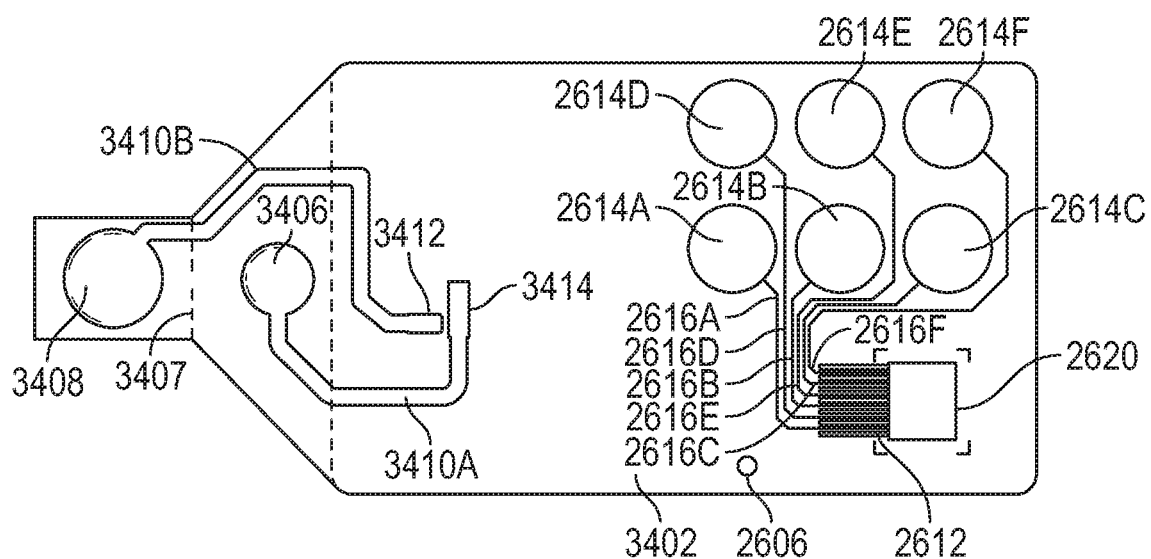
FIG. 34C is a plan view illustrating a surface of the data input device that is placed in contact with the smart card according to some embodiments.
Figure 34D:
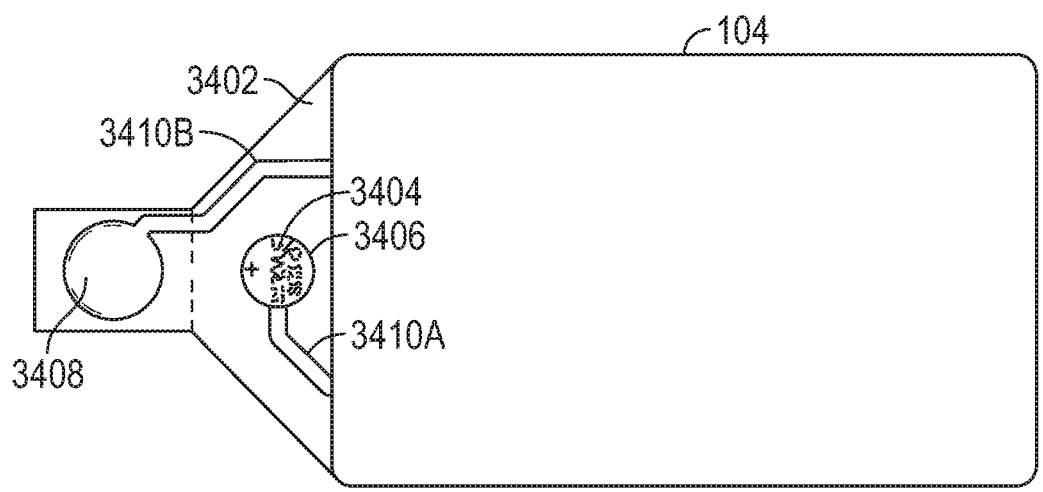
FIG. 34D is a plan view illustrating a card placed on the data input device according to some embodiments.

FIG. 34C is a plan view illustrating a surface of overlay 3402 that is placed in contact with the card 104 according to some embodiments. The card 104 and the power element 3404 are not shown in FIG. 34C. The surface of the overlay 3402 shown in FIG. 34C makes contact with the surface of the card 104 and includes the power connection traces 3410A, 3410B and card contacts 3412, 3414 that contact power pads (e.g., power terminals) of the contact pads 108 when the overlay 3402 is applied to the card 104. FIG. 34D is a plan view illustrating a card 104 placed on the overlay 3402 according to some embodiments. In some embodiments, the overlay 3402 includes a rectangular portion having a size (e.g., length and width) and shape generally corresponding to the size and shape of the card 104, and the overlay 3402 is placed on the card 104 with three edges defining three sides of the rectangular portion aligned with the three corresponding edges of the card 104 to help ensure that the overlay 3402 is properly positioned with respect to the card 104 such that power contacts 3412, 3414 of the overlay 3402 align with the proper pads of the pads 108 of the card 104 and such that the cutout 2620 properly aligns with the sensing area 106 of the card 104.

In a non-limiting exemplary implementation of the embodiment of the overlay 3402, when the fingerprint sensor is in control mode and data input mode, sensor elements within a portion (portion X 3401) of the sensing area 106 covered by the overlay 3402 are activated and scanned in contact sensing mode and data input keys 2608A-D are operatively coupled to associated spatially distinct activation traces within the portion X 3401 of the sensing area 106 that is covered by part of the overlay 3402. When the fingerprint sensor with overlay 3402 is in enrollment mode, only the sensor elements located within the portion Y 3403 of the two-dimensional array of the sensing area 106 exposed by cutout 2620 may be activated and scanned in the fingerprint sensing mode, and the sensor controlling circuitry is configured so that multiple images of a user's fingerprint may be gathered to acquire a sufficient fingerprint template that is stored in memory. In verification or authentication mode, the overlay 3402 would typically have been removed from the card 104 (or other host device in alternative embodiments), and the sensor elements of the entire sensing area 106, including the portion X 3401 and the portion Y 3403, are scanned in fingerprint sensing mode to generate a fingerprint image for comparison against the fingerprint template created in enrollment mode.

Figure 34E:
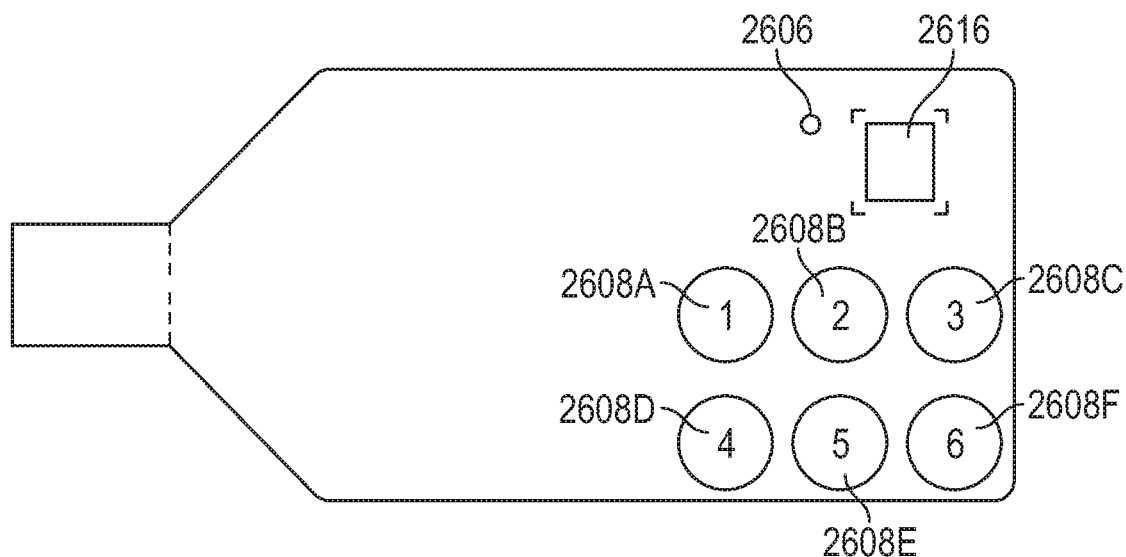
FIG. 34E is a plan view of an upper surface of the data input device according to some embodiments.

FIG. 34E is a plan view of an upper surface of overlay 3402 (i.e., the surface not in contact with the smart card) according to some embodiments. The user may make contact with the surface shown in FIG. 34E when the overlay 3402 is applied to the card 104.

In some embodiments of the overlay 3402, the power element may be a USB socket. In such embodiments, the USB socket may be connected to the power and ground inputs of the contact pads 108 via power connection traces 3410A and 3410B. The circuit closure may be established by inserting a USB cable into the socket and connecting the overlay 3402 to the mains.

In some embodiments of the overlay 3402, the power element may be a solar cell with a pull tab cover. In such embodiments, the solar cell may be connected to the power and ground inputs of the contact pads 108 via power connection traces 3410A and 3410B. The circuit closure may be established by removing the pull tab covering the solar cell, thus exposing it to light.

In some embodiments of the overlay 3402, the power element may be an NFC transceiver, mounted on the overlay 3402. In such embodiments, the NFC transceiver may be connected to the power and ground inputs of the contact pads 108 via power connection traces 3410A and 3410B and is able to harvest power from a NFC-enabled device such as a mobile phone or card reader. The circuit closure may be established by placing the card 104 within range of the NFC-enabled device and keeping it in range until the desired process completes.

As shown in FIGS. 34A and 34C, the overlay 3402 may further comprise a portion 2612 covering the portion X 3401 of the sensing area 106 of the fingerprint sensor installed on the smart card 104, and a cut-out 2620 in the overlay 3402 to expose the remaining portion Y 3403 of the sensing area 106 of the fingerprint sensor. The overlay 3402 includes data input keys 2608A-F associated with (e.g., coupled to) spatially distinct sensing areas on the portion X 3401 of the sensing area 106 of the fingerprint sensor by connection traces 2616A-F. The data input keys 2608A-F may be remotely located from the sensing area 106.

In some embodiments, as described above, each data input key 2608A-F may function to enable the user to enter numbers (e.g., an activation code, such as a PIN code) by touching a data input key 2608A-F with a finger. Each data input key 2608A-F of the overlay 3402 is electrically coupled to an associated spatially distinct portion of the portion X 3401 of the sensing area 106 such that contact with each key will result in a detectable signal from the sensor element(s) of the associated spatially distinct portion of the sensing area 106. The coupling between the keys 2608A-F and the sensing area 106 allows the keys 2608A-F to be remotely located from the sensing area 106. This provides the significant advantage of positioning keys 2608A-F in locations not restricted by the boundaries of the sensing area 106. For example, extra space on the smart card 104 may be used to provide additional keys (e.g., more than four keys) or the keys 2608A-F can be spaced further apart, which may improve access for the user. The overlay 3402 may comprise one data input key electrically coupled to an associated spatially distinct portion of the sensing area 106 configured to receive a Morse code-type data input by the user.

The overlay 3402 may comprise a portion that covers the fingerprint sensor installed on the smart card 104, but additionally including data input keys associated with (e.g., coupled to) spatially distinct sensing areas on the sensing area 106 of the fingerprint sensor where the data input keys are located on the sensing area 106, as shown in FIG. 3B, or where the data input keys are remotely located from the sensing area 106 as shown in FIG. 13. In both of these scenarios, the portion of the overlay 3402 covering the fingerprint sensor may be separable from the section of the overlay 3402 comprising the power source connected to the power inputs of the smart card 104. For example, the overlay 3402 may be in two parts, or is perforated, or the overlay has two layers—one on top of the other—where the section containing the data input keys is uppermost. Thus, after the user has entered data using the data input keys, the fingerprint sensor can be revealed to complete the enrollment, without disrupting the power supply to the card 104. When enrollment is complete, the remaining portion of the overlay 3402 may be removed.

Figure 34F:
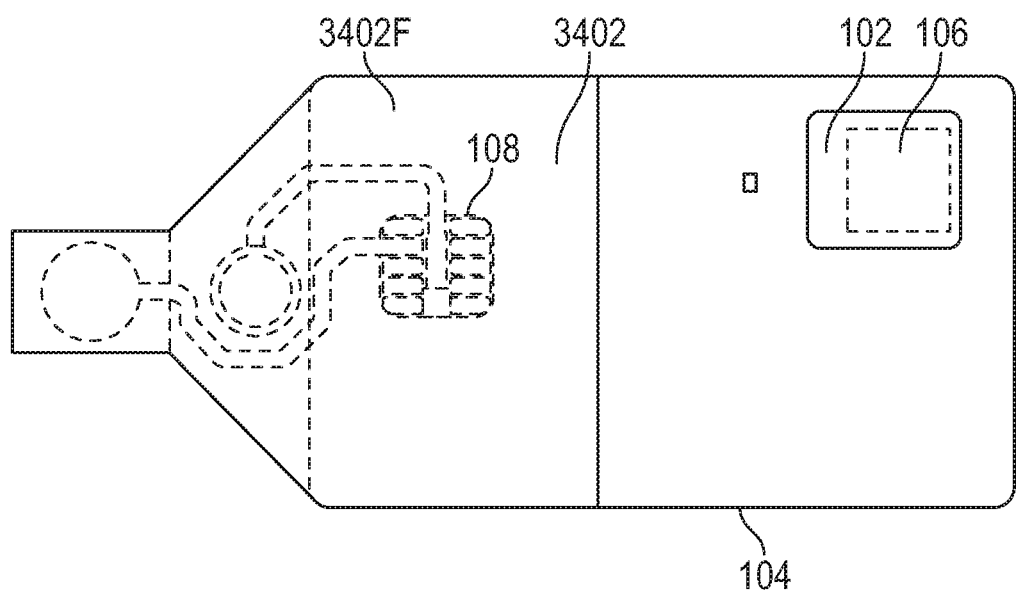
FIG. 34F is a plan view of an overlay providing a power source to an electronic host device disposed beneath the overlay according to some embodiments.

In some embodiments, an overlay 3402F, as shown in FIG. 34F, does not cover the sensing area 106 or fingerprint sensor 102 of the host device 104. Rather, the overlay 3402F simply covers the portion of the card 104 including the contact pads 108. The overlay 3402F may comprise a power element 3404 disposed on a power element contact pad 3406, a conductive contact 3408, a power connection trace 3410A connecting the power element contact pad 3406 to card contact ground 3414, which is connected to a power contact pad of the contact pads 108, and power connection trace 3410B connecting the conductive contact 3408 to card contact power input 3412, which is connected to another power contact pad of the contact pads 108. In some embodiments, the overlay 3402F is strictly a power source for a smart card 104 or other device and does not include data input functionality. The overlay 3402F may be used in combination with data input devices, such as those shown in FIGS. 3B, 13, and 26A-26C and discussed herein.

The data input device in the form of an overlay 3402 may comprise a pierced hole 2606 over the LED 308 or other indicator element on the card 104 when the overlay 3402 is placed over a portion of the card 104 including the sensing area 106 and the LED 308. In other embodiments, an OLED display may operate as the fingerprint sensor. In such embodiments, a portion of the OLED display that is included in portion Y 3403 of the sensing area 106 may be configured to be used as the indicator element and hence a status indication is visible through the cut-out 2620 in the overlay 3402.

The overlay 3402 may comprise one or more LEDs or other status indicators (e.g., visual, audible, tactile indicators) used to indicate the status to the user during enrollment in a situation where there are no status indicators on the smart card itself, where status indicators on the smart card are not suitable, or to supplement the status indicators on the smart card. In such embodiments, a component on the smart card 104, such as the fingerprint sensor, the secure element module, or other processing circuitry, monitors the state of the enrollment process and modulates a power line in the card 104 in a known manner, depending on the state of the enrollment process. The overlay 3402 may further comprise a detector circuit configured to detect the power line modulation and activate the one or more LEDs accordingly to indicate the correct state of the enrollment process.

Figure 35:
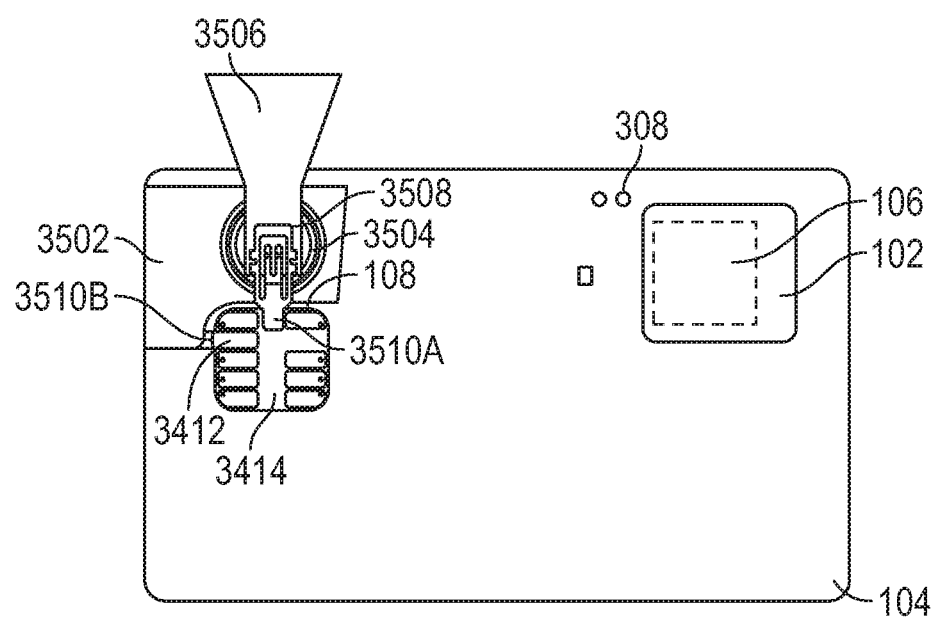
FIG. 35 is a plan view of an overlay providing a power source to an electronic host device disposed beneath the overlay according to some embodiments.

FIG. 35 illustrates an embodiment of a power source overlay (also referred to as a non-data-transmitting power source) 3502 according to some embodiments. As shown in FIG. 35, the power source overlay 3502 comprises a power element 3504 for the fingerprint sensor 102 installed on a device 104. In the illustrated embodiment shown in FIG. 35, a smart card is the device containing the fingerprint sensor, but the application of the power source overlay 3502 is not restricted to a smart card and can be used for any device that contains a fingerprint sensor in alternative embodiments. The card 104 comprises the fingerprint sensor 102 with a sensing area 106, LEDs or other status indicators 308, and contact pads 108 providing contacts for an external power source.

In the illustrated embodiment shown in FIG. 35, the overlay 3502 is an adhesively-backed sticker or film which may be temporarily and removably placed over the card 104. In an embodiment, repositionable adhesives provided by companies such as 3M, Krylon, Franklin Adhesives and Polymers, and Bostik may be applied to the overlay 3502 to temporarily place over the portion of the card 104 including the contact pads 108. In some embodiments, the temporary overlay 3502 may be slid over the device 104, clipped onto the device 104, or folded onto the device 104 rather than being adhered to the device surface. The temporary overlay may be magnetic and stick to the device surface if the device is metal.

In some embodiments, the overlay 3502 comprises a suitable power element 3504 to power the card 104, such as a small cell battery LR44. The bottom of the power element 3504 is securely attached to the overlay 3502 and makes contact with power connection trace 3510B. In some embodiments, one end of a conductive spring clip 3508 contacts the top of the power element 3504 and the other end of the conductive spring clip 3508 connects to power connection trace 3510A.

In some embodiments, power connection traces 3510A and 3510B are printed in conductive ink or are etched on the overlay 3502. The power connection trace 3510A electrically connects the power element 3504 via the conductive spring clip 3508 to ground connections 3414 on contact pads 108. The power connection trace 3510B electrically connects the power element 3504 to the card contact power input 3412 on contact pads 108 on the smart card 104. The circuit closure includes a pull tab 3506 made of non-conducting material temporarily placed between the power element 3504 and the conductive spring clip 3508 to break the power circuit. When the user removes the pull tab 3506 out of the spring clip 3508, the power source circuit is completed and power is supplied to the card 104. In some embodiments, status indicators 308 may be used to signal to the user that power is present and/or that the enrollment process may begin.

The overlay 3502 may be coated with conductive material. In such embodiments, power connection traces 3510A, 3510B are absent. Instead, the overlay 3502 may be shaped such that that the overlay 3502 couples with the ground connections 3414 on contact pads 108 and with the card contact power input 3412 on contact pads 108 on the smart card 104 and the terminals of the power element do not conductively couple with any other part of contact pad 108.

The overlay 3502 may be part of data input device extending over the fingerprint sensor 102. Data input keys and associated key traces may be printed and/or etched on the overlay 3502 and coupled to the sensing area 102 in a similar manner as was described for FIG. 34A-E to allow the user to input data. In other embodiments, the overlay 3502 may comprise a portion that covers the fingerprint sensor 102 installed on the smart card 104, and further comprise data input keys associated with (e.g., coupled to) the spatially distinct sensing areas on the sensing area 106 of the fingerprint sensor where the data input keys are located on the sensing area, as shown in as shown in FIG. 3B, or where the data input keys are remotely located from the sensing area 106 as shown in FIG. 13. In both of these scenarios, the portion of the overlay 3502 covering the fingerprint sensor 102 may be separable from the section of the overlay containing the power source connected to the power inputs of the smart card. For example, the overlay 3502 may be in two parts, or is perforated, or the overlay has two layers—one on top of the other—where the section containing the data input keys is uppermost. Thus, after the user has entered data using the data input keys, the fingerprint sensor 102 can be revealed to complete the enrollment, without disrupting the power supply to the card 104. When enrollment is complete, the remaining portion of the overlay 3502 can be removed.

The overlay 3502 may comprise one or more LEDs or other status indicators (e.g., visual, audible, tactile indicators) used to indicate the status to the user during enrollment in a situation where there are no status indicators on the smart card itself, where status indicators on the smart card are not suitable, or to supplement the status indicators on the smart card. In such embodiments, a component on the smart card 104, such as the fingerprint sensor, secure element module, or other processing circuitry, monitors the state of the enrollment process and modulates a power line in the card 104 in a known manner, depending on the state of the enrollment process. The overlay 3502 may further comprise a detector circuit configured to detect the power line modulation and activate the one or more LEDs accordingly to indicate the correct state of the enrollment process.

In an alternative embodiment of FIGS. 34A-34F and FIG. 35, the circuit closure may comprise a switch or button instead of the folding overlay section of FIGS. 34A-34F or the pull tab of FIG. 35, thus enabling the user to complete the power circuit by applying the switch or button.

In an alternative embodiment of FIGS. 34A-34F and FIG. 35, the overlay 3402, 3502 makes contact with data input and output contacts on the card contact pad 108 in addition to the power input and ground contacts. This may enable the overlay 3402, 3502 to provide communication channels to and from elements on the card 104, such as the secure element module or the biometric sensor. A wireless transceiver (e.g., Bluetooth, WiFi, NFC) mounted to the overlay 3402, 3502 and connected to the data input/outputs of the card contact pads 108 may permit elements in the card 104 to wirelessly connect to other devices such as a mobile phone, lap top, ATM, card reader, or PC. The overlay 3402, 3502 may harvest power from the wireless signal to power the card 104 in addition to using the wireless connection to provide a communication channel. In such embodiments, the overlay 3402, 3502 capable of harvesting power may temporarily convert a contact card into a contactless card.

A cable socket (e.g., USB) mounted to the overlay 3402, 3502 and connected to the data inputs/outputs of the card contact pads 108 may permit elements in the card 104 to connect via a cable to other devices such as a mobile phone, lap top, ATM, card reader, or PC. The overlay 3402, 3502 may also receive power from the cable to power the card in addition to using the cable connection to provide a communication channel.

The overlay 3402, 3502 may make contact with the data input and output contacts on the card contact pad 108 in addition to the power input and ground contacts. In such embodiments, the overlay 3402, 3502 may provide status indications to the user regarding elements on the card 104, such as the secure element module, the biometric sensor, and external devices connected to the card 104. For example, LEDs, buzzers, or a small LCD screen mounted on the overlay 3402, 3502 and connected to the data input/outputs of the card contact pad 108 may indicate commands, responses, status information, data or instructions to the user.

Figure 36:
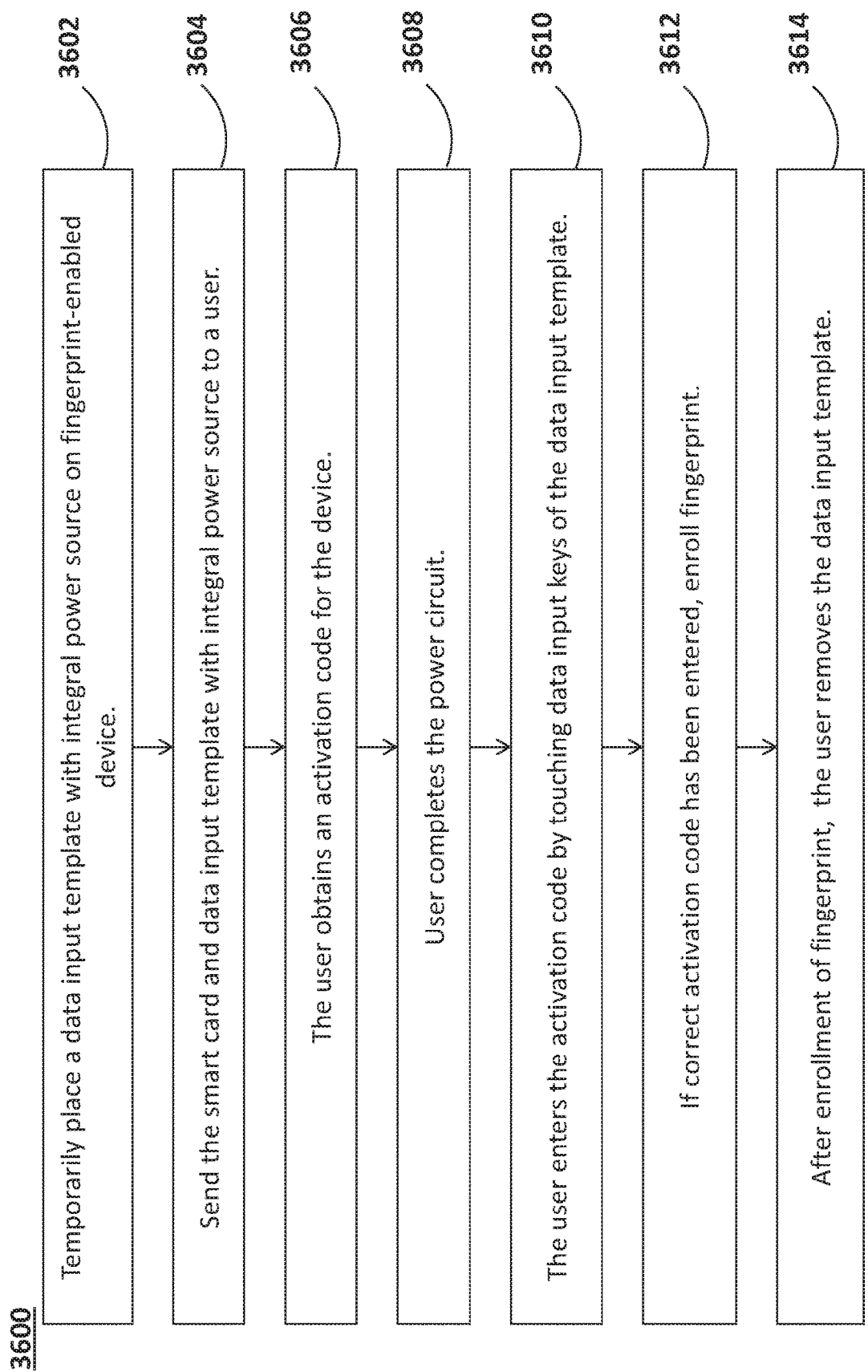
FIGS. 36-37 show flow charts illustrating embodiments of an enrollment process on a device.

FIG. 36 is a flowchart illustrating an embodiment of a simple, cost effective method 3600 to enroll a biometric template, such as a fingerprint template, on a device that has limited ability to provide feedback to the user, such as a smart card, requiring entry of activation data (i.e., an activation code) prior to enrolling the fingerprint template.

In step 3602, a data input device, such as the overlay described in FIGS. 34A-34E, is temporarily connected to a biometric-enabled device, such as a fingerprint-enabled smart card. A unique code, such as an activation code, may be stored in a secure memory of the smart card and encrypted in a secure location during the manufacturing process of the smart card. The fingerprint sensor on the smart card may be calibrated during the manufacturing process and set to data-input mode before the smart card is sent to the user.

In step 3604, the card provider provides the smart card and the data input device with integral power source to the user. For example, the card provider may provide the smart card and the data input device with integral power source to the user by mail, courier or directly at a bank or a retail outlet. The card and data input device may be packaged such that the power circuit cannot be completed accidentally during transit.

In step 3606, the user follows instructions to obtain an activation code from the card provider. In some embodiments, the instructions to obtain the activation code may be received with the card. For example, the user may be asked to call a number, the data input device might have a QR® code that the user can scan with a smart phone or the user may log-in to their on-line banking site or mobile application and indicate the user wishes to receive an activation code by SMS. Other secure mechanisms to obtain the activation code may be available in alternative embodiments. A six digit activation code may provide the user with an appropriate security level. The security level may be increased or decreased by varying the number of required digits, depending on the card provider's requirements.

In step 3608, the user connects the smart card to the power source by completing the power circuit. For example, the power circuit may be completed by folding a section of the data input device to make conductive contact pads meet or by removing a pull tab separating the power source from the smart card. Accordingly, the card receives power from the power source, and a status indicator on the smart card (e.g., an LED) may indicate to the user that the smart card is ready.

In step 3610, the user enters the activation code by sequentially touching the data input keys of the data input device in a sequence corresponding to the activation code. In some embodiments, the status indicator may indicate to the user that the entered code is correct or incorrect. As described herein, if the entered code is incorrect, the user may make a pre-determined number of additional attempts before the smart card locks the user out permanently. For example, the user may get three attempts to correctly enter the code. In some embodiments, if the number of unsuccessful attempts reaches the limit or the activation code is not entered before a pre-set time has passed, the smart card locks the user out.

In step 3612, if the activation code has been entered correctly, the user can now start to enroll a fingerprint (enrollment mode) without removing the data input device from the card. The smart card must remain connected to the power source throughout the enrollment process. The status indicator may make an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for a fingerprint template, e.g., by the LED illuminating for longer period, such as 10 or more seconds. A flexible display such as an OLED panel may be used to provide textual feedback during the enrollment process.

The user may trigger the enrollment mode by correctly entering the activation code and not complete the enrollment. That is, the fingerprint sensor may be in enrollment mode, but the user does not provide any input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

In step 3614, the user removes the data input device from the smart card, and the data template may be discarded. The user may, optionally, also remove the data input device after successful enrollment, possibly after additional data input.

Accordingly, the user has now successfully enrolled a fingerprint in the smart card through the simple, cost effective method 3600 and can use the smart card in the normal way to pay for items, but now requiring fingerprint verification in order to use the smart card. In some embodiments, multiple users may enroll a fingerprint on the smart card, or a user may enroll multiple fingers on the smart card, using the above noted method 3600. In such embodiments, the card may be programmed with multiple activation codes that are provided to each user. For each method 3600, a new activation code is required and entered to enroll a new user/finger, which is made convenient by the fact that the data input overlay was not removed during enrollment of the previous fingerprint.

Figure 37:
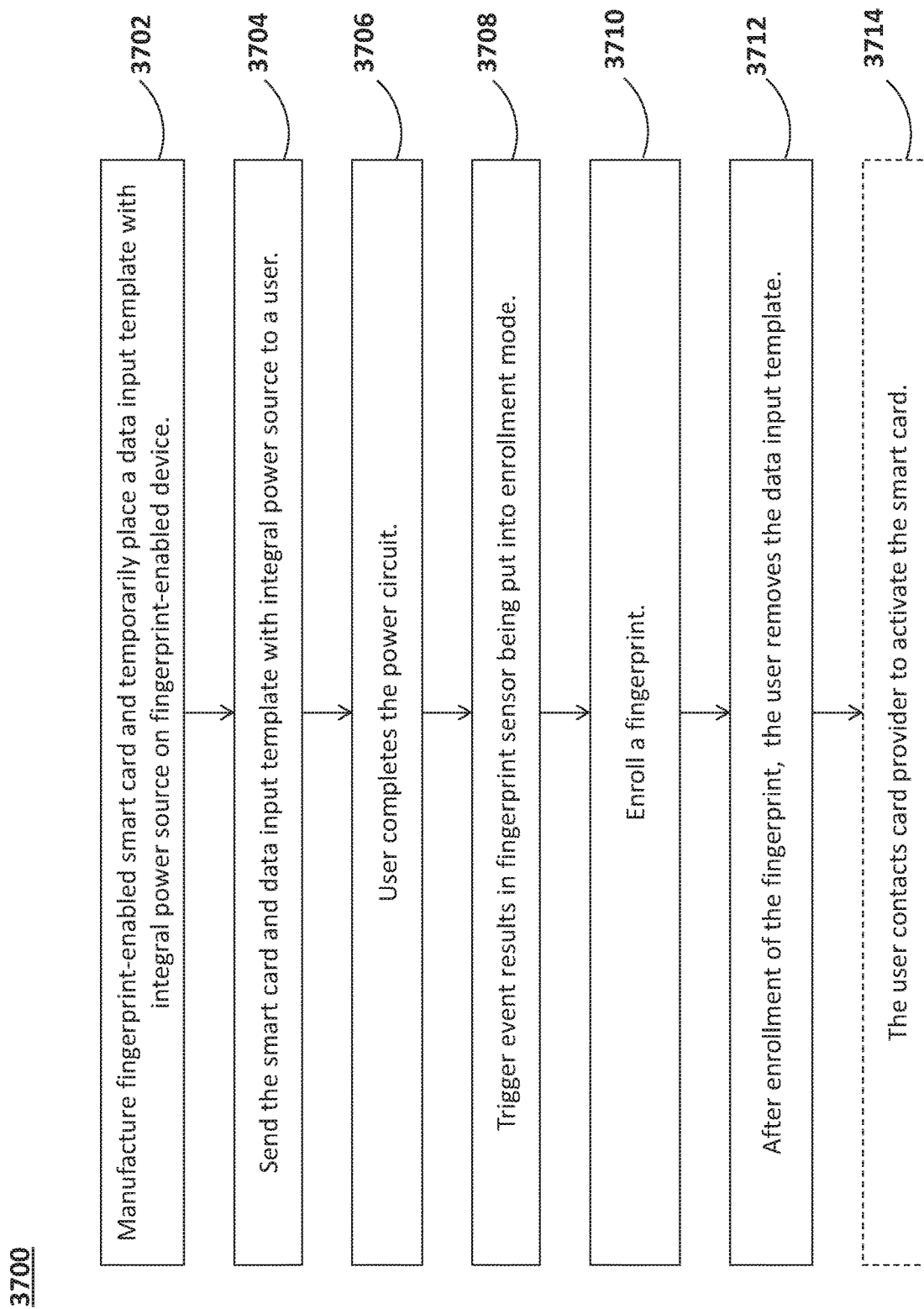

FIG. 37 is a flowchart illustrating an embodiment of a simple, cost effective method 3700 to enroll a biometric template, such as a fingerprint template, on a device that has limited ability to provide feedback to the user, such as a smart card, without requiring entry of activation data (i.e., an activation code) prior to enrolling the fingerprint template.

In step 3702, a fingerprint-enabled smart card is manufactured. A data input device, such as the overlay described in FIGS. 34A-34E, may be temporarily connected to the smart card. The card provider may optionally set the status of the smart card as inactive to prevent unauthorized use before the intended user can enroll a fingerprint template and contact the card provider to activate the card.

In step 3704, the card provider provides the smart card and the data input device with integral power source to the user. For example, the card provider may provide the smart card and the data input device with integral power source to the user by mail, courier or directly at a bank or a retail outlet. The card and data input device may be packaged such that the power circuit cannot be completed accidentally during transit.

In step 3706, the user connects the smart card to the power source by completing the power circuit. For example, the power circuit may be completed by folding the data input device such that conductive contact pads align or by removing a pull tab separating the power source from the smart card. Accordingly, connecting the smart card to the power source does nothing but provide power to the electrical components of the smart card—e.g., LED, logic elements, sensor elements, etc. —and the power source is unable to transmit data to or from the smart card.

In step 3708 one or more trigger events are detected that results in the fingerprint sensor being put into enrollment mode. An example trigger event may be based on the non-expiration of a timer or a counter. For example, the trigger event may be detecting that the timer or counter has not expired. In such embodiments, a user can enroll a biometric template within a certain time after the fingerprint sensor is put into enrollment mode. In other embodiments, the trigger event may be detecting that the age of the smart card is under a certain age limit which is tracked, for example, by the timer or the counter. The counter may be incremented each time a biometric template has been successfully enrolled or whenever the smart card was used. In such embodiments, the trigger event may be detecting that the counter has not exceeded a predetermined threshold (e.g., a predetermined number of biometric template enrollments or card uses).

Another example trigger event may include an occurrence of an error state. A software or hardware component error may occur during the enrollment. An error recovery procedure initiated in response to such software or hardware component error may be the trigger event. In such embodiments, the software or hardware component error would have to be a recoverable error (e.g., a minor error, a transient event or a glitch). Thus, detection of a recoverable error that precluded completion of the enrollment process would cause the sensor to enter enrollment mode. In such embodiments, a non-recoverable error occurring during the enrollment (e.g., a component on the card fails) would not initiate or constitute a trigger event.

Other example trigger events include detection of a flag set last time the card was inserted in a card reader (for example a flag set when the card is inserted into a card reader that transmits data to or from the card and instructing the card to enter enrollment mode the next time the card is connected to power), detection of a lack of an enrolled fingerprint template on the card, or detection that power has been provided to the card. Some further trigger event examples may include detection that the card has been inserted into a power source that has connection to only power contacts on the card and no data transmission contacts. In some embodiments, other events or a combination of such events may comprise trigger events. The trigger event may be detected by the fingerprint sensor, by another component on the card (e.g., the secure element module) or the trigger event may be detected as a result of the fingerprint sensor and another component on the card interacting, e.g., a handshake. In some embodiments, if a component other than the fingerprint sensor detects the trigger event, the component may signal the fingerprint sensor to enter enrollment mode.

The enrollment mode may be triggered, but the user may not complete the enrollment. That is, the fingerprint sensor may be in enrollment mode, but the user does not provide any input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

The card remains in enrollment mode until disconnected from the power source or until the enrollment is complete. If the card is disconnected from the power source before enrollment is complete, the process may move back to step 3706, in which an appropriate trigger event may result in the fingerprint sensor being put back into enrollment mode. In some embodiments, the user may be required to take some action, such as, for example, contact the card provider or obtain a new card. In such embodiments, the user may enable the new card to be put into enrollment mode.

In some embodiments, the card receives power from the power source, and a status indicator on the smart card (e.g., an LED) may indicate to the user that the one or more power transmission contacts of the power source are connected to the power source (i.e., the card is powered), that the fingerprint sensor is in enrollment mode, and that the smart card is ready for enrollment to start.

In step 3710, the user can now start to enroll a fingerprint. The fingerprint may be enrolled by storing a fingerprint template derived from one or more fingerprint images generated by placing a finger on the fingerprint sensor. The smart card must remain connected to the power source throughout the enrollment process. In some embodiments, however, the smart card may be disconnected from the power source during the enrollment process. In such embodiments, the enrollment mode in the fingerprint sensor is automatically deactivated. In some embodiments, reconnecting the smart card to the power source moves the process back to step 3706, in which an appropriate trigger event will result in the fingerprint sensor being put back into enrollment mode. The enrollment process is complete when a sufficient fingerprint template is acquired and stored in the fingerprint sensor (e.g., as described in previously incorporated U.S. Pat. No. 9,684,813). Once the enrollment process is complete, enrollment mode in the fingerprint sensor is disabled permanently. In some embodiments, once the enrollment process is complete, enrollment mode in the fingerprint sensor is disabled until a fresh trigger event occurs. The status indicator may provide an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for the fingerprint template and confirm that the enrolling step is successfully complete, e.g., by the LED illuminating for longer period, such as 10 or more seconds. In other embodiments, more than one LED may flash different colors to communicate the various indications described herein. A flexible display such as an OLED panel may be used to provide textual feedback during the enrollment process.

In step 3712, the user removes the data input device from the smart card, and the data input device may be discarded. The user may remove the data input device after successful enrollment, possibly after additional data input.

The card provider may set the status of the card as inactive at step 3702. In such embodiments, the user must activate the card before attempting to use it in step 3714, in which the user contacts the card provider (e.g., by phone, app, internet, etc.) to activate the smart card. In some embodiments, the user must provide acceptable user verification details to the card provider in order to activate the smart card. If the user is verified, the card provider sets the card status as active in their systems. The user is now able to use the card in the normal way to pay for items, but now requiring fingerprint verification in order to use the smart card. If the user is not verified, the card remains inactive and cannot be used.

A device including an overlay providing only a power source, such as the overlay 3402F described in FIG. 34F and the overlay 3502 described in FIG. 35 may be enrolled by other methods not requiring data input by the user, such as method 2300 shown in FIG. 23A or method 2314 shown in FIG. 23B.

In an example of an overlay described herein, the overlay provides power to the smart card to which the overlay is applied, data or signals indicative of the enrollment status of the smart card biometric sensor are provided to the overlay by the smart card or are detected in the smart card by detection circuitry in the overlay, no data is transmitted from the overlay to an external device, and status indicators—such as LED lights—on the overlay (and, optionally, on the smart card as well) are activated to indicate the enrollment status. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The overlay may only provide power to the smart card, or the overlay may also include one or more data input keys for inputting data from the overlay to the smart card. The overlay may optionally include a finger guide as described herein attached to the overlay and may optionally include status indicators associated with finger guide channels as described herein for guiding or instructing a user with respect to placement of a finger on a finger guide channel. The overlay may optionally include status indicators adjacent to a fingerprint sensor of a smart card to which the overlay is applied for guiding or instructing a user with respect to placement of a finger on the sensor, and the finger guide channels may be omitted.

In another example of an overlay described herein, the overlay provides power to the smart card to which the overlay is applied, no data or signals are provided to the overlay by the smart card, no data is transmitted from the overlay to an external device, and status indicators—such as LED lights—on the smart card are activated to indicate the enrollment status of the smart card biometric sensor. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The overlay may only provide power to the smart card, or the overlay may also include one or more data input keys for inputting data from the overlay to the smart card. The overlay may optionally include a finger guide as described herein attached to the overlay and may optionally include status indicators associated with finger guide channels as described herein for guiding or instructing a user with respect to placement of a finger on a finger guide channel. The overlay may optionally include status indicators adjacent to a fingerprint sensor of a smart card to which the overlay is applied for guiding or instructing a user with respect to placement of a finger on the sensor, and the finger guide channels may be omitted.

As stated above, it is preferable that the fingerprint template is of sufficient quality, otherwise the user may experience a high rate of false rejections or false acceptances. This can be a particular problem when the user is unfamiliar with the goal of the enrollment stage, which is to capture multiple broad, good quality images of as much of the pad of the finger as possible. If the user does not know that the user needs to get images taken of all of the user's finger pad, including the sides and the tip as well as the central portion of the pad, the user may be inclined to repeatedly present the same portion of their finger during enrollment, thus restricting the coverage of the fingerprint template and increasing the chances of getting a false rejection.

It has been observed that the pressure and angle that a user presents their fingerprint during enrollment is different to how they present their finger in daily use of their device. For example, one might enroll a thumb on a smart card by repeatedly touching the fingerprint sensor when the smart card is lying flat. This is likely to result in a fingerprint template of the central pad of the thumb being captured. However, when the smart card is actually being used, the user is likely to either hold the card in a pincer grip to either insert it into the base of a Point of Sale (PoS) device in the case of a contact smart card, or to hold the card over the PoS until the transaction is registered in the case of a contactless smart card. In such contact and contactless use cases, the tip of the thumb print is typically contacting the sensor when the smart card is in use. That is, a part of the thumb, for example the tip of the thumb, is likely to have been missed from the fingerprint template during an enrollment carried out on a card which was lying flat throughout the enrollment process.

The problems above concern difficulties that occur during the enrollment process on a limited device. A further complication for a input/feedback-limited device is that once the enrollment process is complete, if the user begins to use their device and then finds their fingerprint is not being recognized reliably, the user may not have a mechanism by which they can re-enroll their finger to create a better fingerprint template and thereby improve their user experience. Re-enrollment on a limited device may be deliberately prohibited for security reasons, for example, the device manufacturer may not want to create a "back door" by allowing the fingerprint template to be changed by an unauthorized user, or it may simply not be practical for the user to interact with the device in order to put it back into an "enroll" mode and hence re-enroll their finger. In such situations, it becomes critical to the user experience that their finger is enrolled properly the first time because there are no second chances to change the fingerprint template. A smart card is a good example of an input/feedback-limited device where a user would be unlikely to get the opportunity to re-enroll their finger should the first fingerprint template not be adequate.

In some devices, such as laptop computers or door entry systems, fingerprint sensors may be surrounded by shaped finger guides, such as a beveled peripheral edges, to force the user to place their finger on the sensor in an optimal way. These guides are permanent features of the device. That is, the guides are present when the user enrolls their finger and remain in place when the user is actively using their device. Such guides are designed firstly to ensure that the most useful part of the finger is enrolled for user verification (i.e., the center of the finger pad) and secondly, to increase the chances that the same part of the finger that was initially enrolled will be placed on the sensor during everyday use. An example is described in European Patent Application No. EP 1812890, entitled "Finger Guide Device," the disclose of which is incorporated by reference in its entirety. For many devices however, it is impractical to change the form factor in order to have permanent finger guides in place, or it is undesirable in relation to design aesthetics to have such permanent finger guides. For example, it would be unacceptable for a smart card to have a permanent finger guide in place since the card would no longer fit in standard ATM machines, purses or wallets.

Another existing solution to the above noted problem is to guide the user to present different parts of their finger during enrollment using a graphic on a user interface on the device. Such a solution is described in U.S. Pat. No. 9,715,616, entitled "Fingerprint Sensing and Enrollment," the disclosure of which is incorporated by reference in its entirety. In some embodiments, the graphic on the user interface shows a representation of a fingerprint which gets gradually shaded in as images of the left, right, top, bottom, etc. of the fingerprint are captured, thus encouraging the user to present different parts of their finger during the enrollment process. This solution, however, is limiting in the sense that it is difficult to convey to the user how a captured image of a fingerprint relates to any particular part of their finger when the device that contains a fingerprint sensor has no, or a limited, user interface.

Another existing solution is to employ dynamic enrollment. More specifically, a method in which a fingerprint template is gathered and adapted over time to take account of changes of the way a finger is presented in daily use. That is, the fingerprint template may actively evolve because new captured images are added to it through daily use. An example of a dynamic enrollment method is presented in U.S. Patent Application Publication No. US2014/0003681, entitled "Zero Enrollment," the disclosure of which is incorporated by reference in its entirety. However, dynamic enrollment may be prohibited for certain devices containing fingerprint sensors due to security concerns that an unauthorized user could successfully enroll their finger by repeatedly presenting their finger such that the fingerprint template evolves to the point where their finger will be accepted.

As explained herein, another existing solution for enrolling a fingerprint on a input/feedback-limited device requires the user to visit a secure location, such as a bank, at which the user will perform the enrollment procedure. Such a solution, however, includes various disadvantages particularly related to the inconvenience to the user and possible security breaches as already discussed herein.

Rather than have a user attend a secure location, alternative solutions have been proposed to enroll a finger on an input/feedback-limited device containing a fingerprint sensor. However, such alternative solutions require the device containing the fingerprint sensor to be connected to a second connected device, for example, a smartphone or computer terminal, such that instructions and feedback may be given to the user during enrollment via a user interface of the second connected device. This method is far from ideal because not only does it require the user to have ready access to a second device, but also because it requires the device manufacturer and the fingerprint sensor manufacturer to be able to communicate through a myriad of secondary devices. This method also presents significant security concerns because the user is enrolling their fingerprint on a device which is actively connected to a second connected device which may be connected to other networks.

The embodiments described herein provide systems, devices and methods of enrolling a fingerprint on a device with limited to no user interfaces or status indicators which can be carried out by the user in their own home, without the need to visit a secure location to carry out enrollment and without requiring the user to connect their card to another connected device such as a smart phone. Complementary systems, devices and methods to those described herein improve the quality and coverage of the enrolled fingerprint template, thus enhancing the security and improving the accuracy of fingerprint matching for the limited device.

Such complementary systems, devices and methods include a guide for placement of the finger (where the definition of finger includes a thumb) on a fingerprint sensor during enrollment of the finger. The guide is shaped to increase the likelihood that images of many diverse portions of the fingerprint are obtained when enrolling using a fingerprint sensor with a small area compared to the area of the pad of a typical finger or thumb, in particular capturing images from the longitudinal segment of the fingerprint running from fingertip to knuckle that is richest in fingerprint minutiae, leading to a more complete enrolled fingerprint template (or set of fingerprint templates) and therefore more reliable user verification. In some embodiments, the guide is removably attached to the surface of the device in operative proximity to the sensor and is removed after enrollment is complete. The guide is typically not used during regular operation (e.g., user verification) with the fingerprint sensor.

Figure 38:
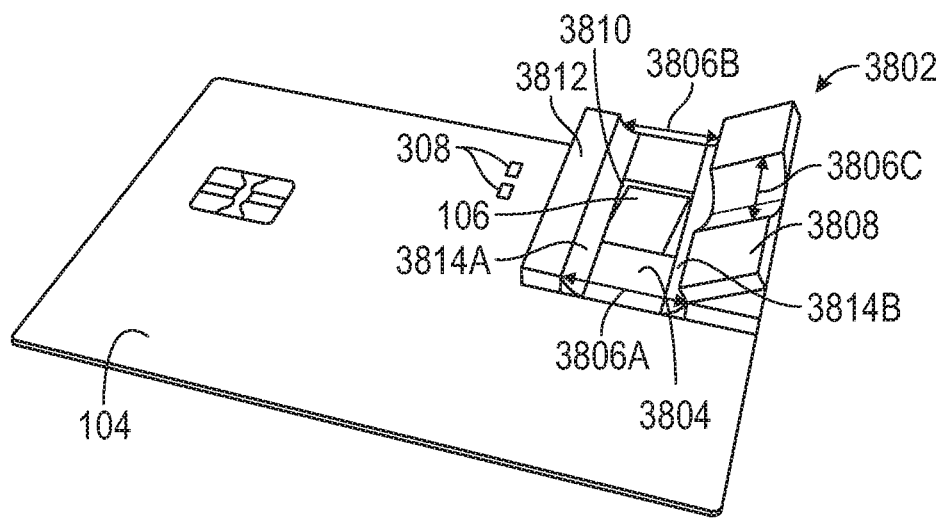
FIG. 38 is a top perspective view of a host device having a fingerprint sensor and a removable finger guide disposed of thereon according to some embodiments.
Figure 39:
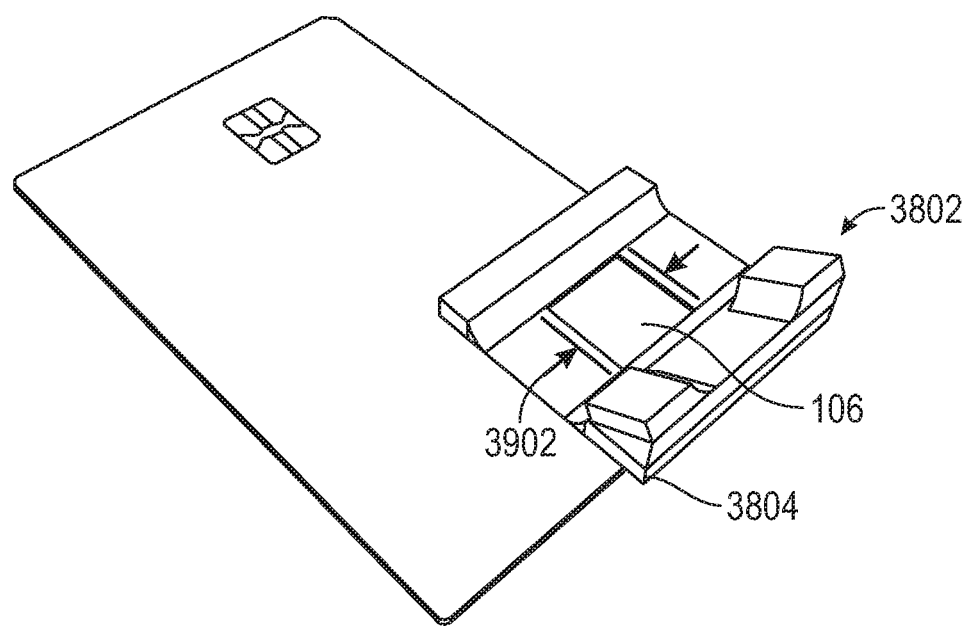
FIG. 39 is a top perspective view of the finger guide according to some embodiments.
Figure 40:
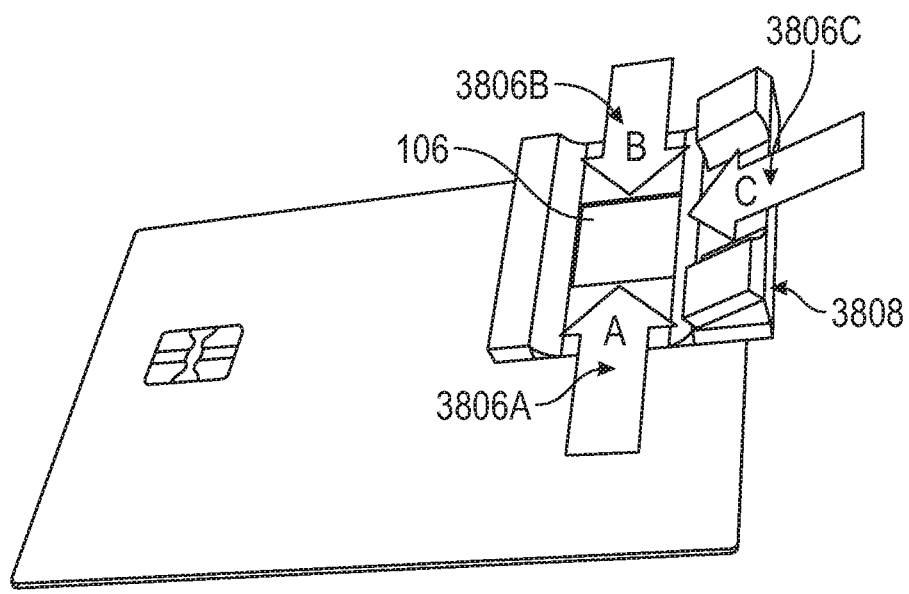
FIG. 40 is a top perspective view of the finger guide with directional finger placement arrows superimposed thereon according to some embodiments.

FIGS. 38-40 show an example of a removable finger guide. In various embodiments, the guide 3802 comprises a base plate 3804 which conforms to the surface of the host device 104 containing the fingerprint sensor 102. In FIGS. 38-40 the host device 104 shown is a flat smart card, hence the base plate 3804 is flat, however, for example, if the surface of the host device was curved (e.g., a control lever in a car), then the base plate 3804 could be shaped appropriately to make a snug fit with the surface of the device 104 surrounding the fingerprint sensor 102. The finger guide 3802 may be made of any suitable material, such as molded plastic. The base plate 3804 is removably attached to the surface, for example, held in place with repositionable adhesives such as those provided by companies such as 3M, Krylon, Franklin Adhesives and Polymers, and Bostik. In some embodiments, the finger guide 3802 may be slid over the host device 104, clipped onto the host device 104, or folded onto the host device 104 rather than adhering to the device 104 surface. If the host device 104 is metal or includes metal components, the finger guide 3802 may be magnetic and thus stick to the device 104 surface. The base plate 3804 may extend over the edges of the host device 104. As shown in FIG. 38, the base plate 3804 comprises a cut out 3810 to reveal the sensing area 106 of the fingerprint sensor 102 when the finger guide 9802 is placed in operative proximity to the fingerprint sensor 102.

The finger guide 3802 further comprises one or more finger guide channels (also referred to herein simply as "channel" or "channels") used to capture diverse images of the user's finger pad. In FIG. 38, the finger guide 3802 has three channels: channel A 3806A, channel B 3806B, and channel C 3806C. With the finger guide 3802 secured (e.g., temporarily) to the host device 104 in operative proximity to the fingerprint sensor 102, each of the channels 3806A-C is configured to position a finger placed thereon in a unique orientation with respect to the fingerprint sensor 102. The finger guide channels 3806A-C may be configured with curved walls and have a width corresponding to a typical finger width.

In some embodiments, the base plate 3804 has a raised section 3808, parallel to one side of the sensing area 106, on which channel C 3806C is formed as shown in FIG. 38. The raised section 3808 is used to tip the user's finger up to orient the user's fingertip to touch the sensor rather than the center of the finger pad. The raised section 3808 may be a ramp with the lowest point of the ramp situated at one edge of the fingerprint sensor 102. The raised section 3808 may be ergonomically shaped to encourage the user to rest their finger in it. A front stop 3812 may be present on the opposite side of the sensor to the raised section 3808 to stop the user's fingertip from sliding off the sensor.

FIG. 39 shows an embodiment of the finger guide 3802. As shown in FIG. 39, the channels 3806A-C may be indicated by markings 3902 (e.g., arrows or lines) on the base plate 3804. For example, the base plate 3804 may be marked with indicia, such as lines, curves, arrows, etc., to indicate how far the finger should be inserted into each channel 3806A-C such that the finger pad touches the fingerprint sensor sensing area and doesn't extend too far or fall too short. In some embodiments, the channels 3806A-C may be ergonomically shaped. In some embodiments, the channels 3806A-C may have side walls to guide the finger into each channel 3806A-C.

FIG. 40 is a top perspective view of the finger guide with directional finger placement arrows superimposed thereon according to some embodiments. In FIG. 40, three channels are shown, indicated by channels A 3806A, B 3806B, and C 3806C. Arrows A and B in FIG. 40 show the direction of a finger approaching the sensing area 106 via channels A 3806A and B 3806B, respectively. Arrow C in FIG. 40 shows the direction of a finger approaching the sensing area 106 via the raised section 3808, i.e., channel C 3806C.

Figure 41:
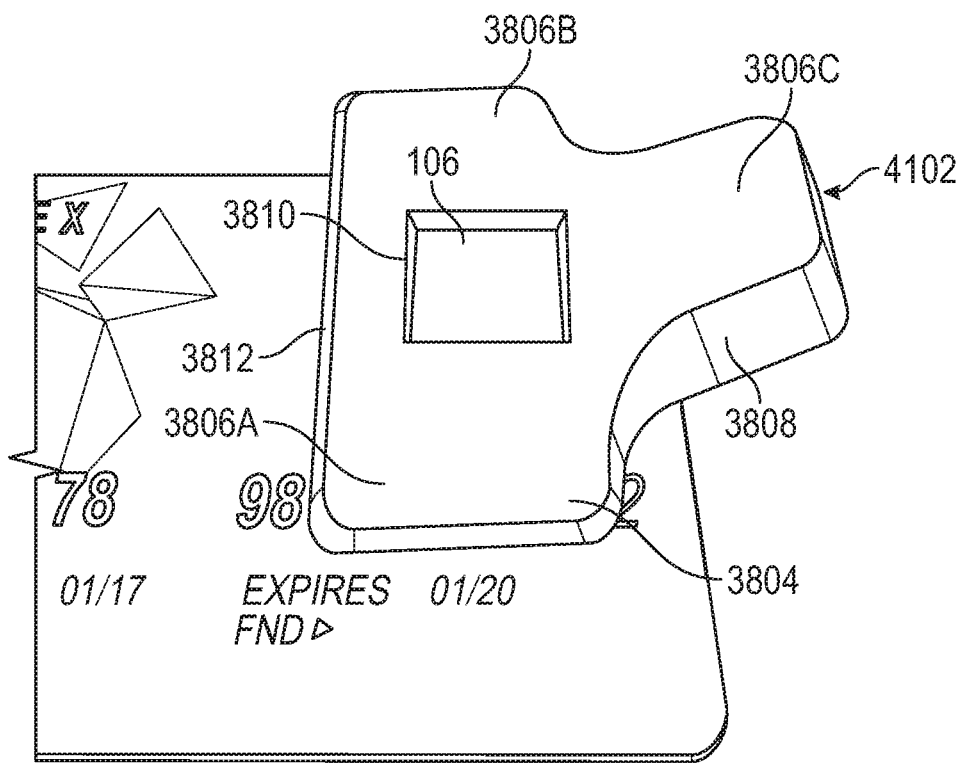
FIG. 41 is a top perspective view of a finger guide disposed on a host device (e.g., smartcard) according to some embodiments.
Figure 42:
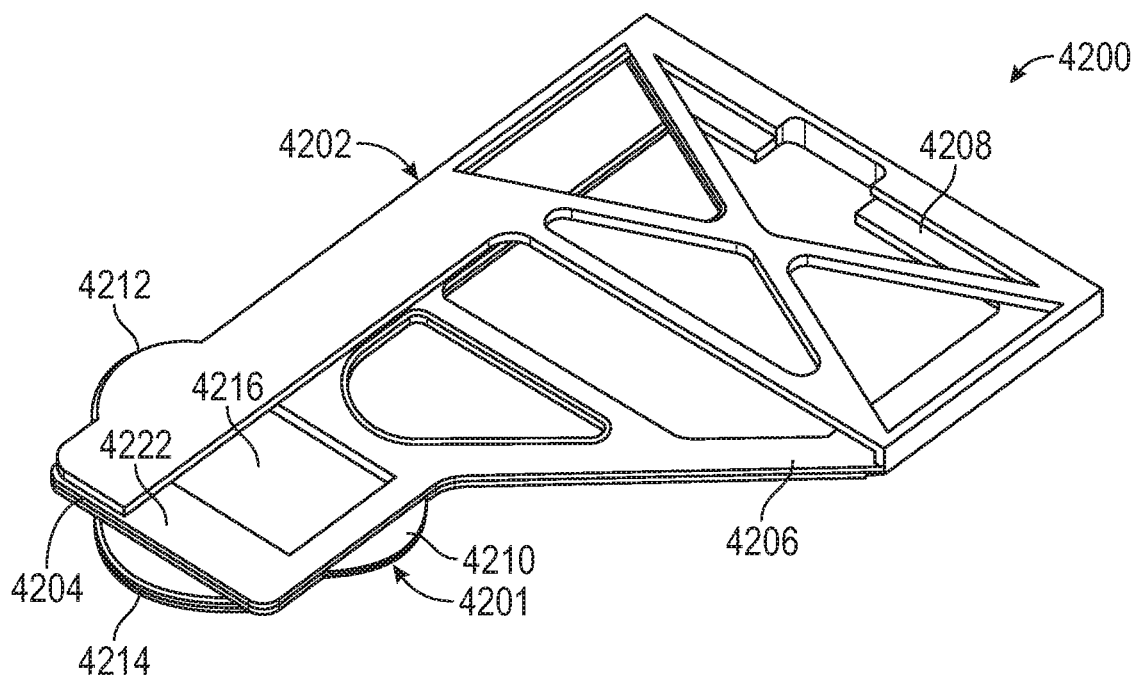
FIG. 42 is a bottom perspective view of a card holder frame of a power source/finger guide according to some embodiments.

FIG. 41 shows a top perspective view of a finger guide 4102 according to some embodiments. As shown in FIG. 41, the finger guide 4102 is T-shaped while comprising the same essential features as the finger guide 3802 described in FIGS. 38-40. For example, the finger guide 4102 comprises a base plate 3804, channels A 3806A, B 3806B, and 3806C, a front stop 3812, a raised section 3808, and a cut-out 3810 to expose the sensing area 106 of the fingerprint sensor.

The channels 3806A-C of the finger guide 3802, 4102 may be the width of a human finger. In some embodiments, different sized finger guides 3802, 4102 could be made available to suit a range of fingers, e.g., small, medium or large, rather than one size to fit all. The cut out 3810 needs to fit around the sensing area 106 of the fingerprint sensor, typically a square of 8×8 mm, 9×9 mm or 9.5×9.5 mm, however other sensor size or shapes may be catered for.

The finger guide 3802, 4102 may be decorated with indicia. For example, pictures of fingers, or finger images may be inscribed on the finger guide 3802, 4102 surface so that it is clear to a user where to put their fingers.

A method of enrollment that makes use of a temporary, inexpensive, "off-grid" power source is described herein. Specific examples include the card holder/power source 920 shown in FIGS. 9E-9G. In some embodiments, the finger guide 3802, 4102 described in FIGS. 38-41 may be placed over the sensor at the same time as the device is provided with power using the power sources described herein.

An alternative implementation of the temporary power source may include an integrated finger guide, such as is shown in FIGS. 42-45. In the illustrated embodiment, a power source/finger print guide 4200 includes a card holder frame 4202 defining card guide rails, including a first longitudinal slot 4204, a second longitudinal slot 4206, and a lateral slot 4208 into which a smart card 104 (shown in phantom lines in FIGS. 44, 45) may be inserted. A battery 4220 (shown only in FIGS. 44, 45) may be carried in a suitable battery holder mounted to the card holder frame 4202 and connected by appropriate conductive elements to power transmission contacts of the card 104 as described above. The power source may be powered by mains (e.g., via a USB connector) or solar powered. In other embodiments, if the smart card 104 contains an on-board power source, such as a solar cell, an external power source is not required.

A finger guide 4201 may be attached to or integrally formed with the card holder frame 4202. The finger guide 4201 may include a portion of the card holder frame 4202 forming a base plate 4222 of the finger guide (i.e., the portion of the finger guide having a surface that contacts the surface of the card), an A-channel wing 4210, a B-channel wing 4212, a C-channel wing (or raised section) 4214, a front stop 4218, and a cut out 4216 through which a sensing portion 106 of the inserted card 104 is exposed. In this context the "wing" may comprise a panel disposed on and extending beyond the base plate 4222.

In some embodiments, the power source with integrated finger guide is a simple rectangular sleeve. For example, the connector housing 904 of the power source 902 shown in FIG. 9A could be extended to cover more of the card, including the sensor, and a finger guide could be mounted on top of the housing and a cut out provided in the housing to expose the sensor.

Figure 43:
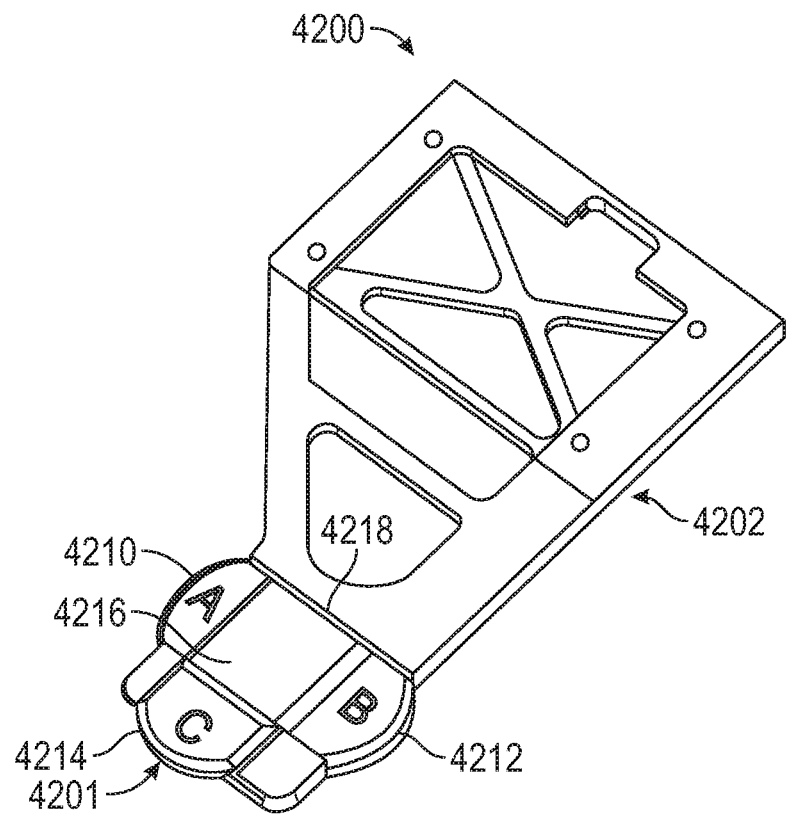
FIG. 43 is a top perspective view of the cardholder frame shown in FIG. 42.
Figure 44:
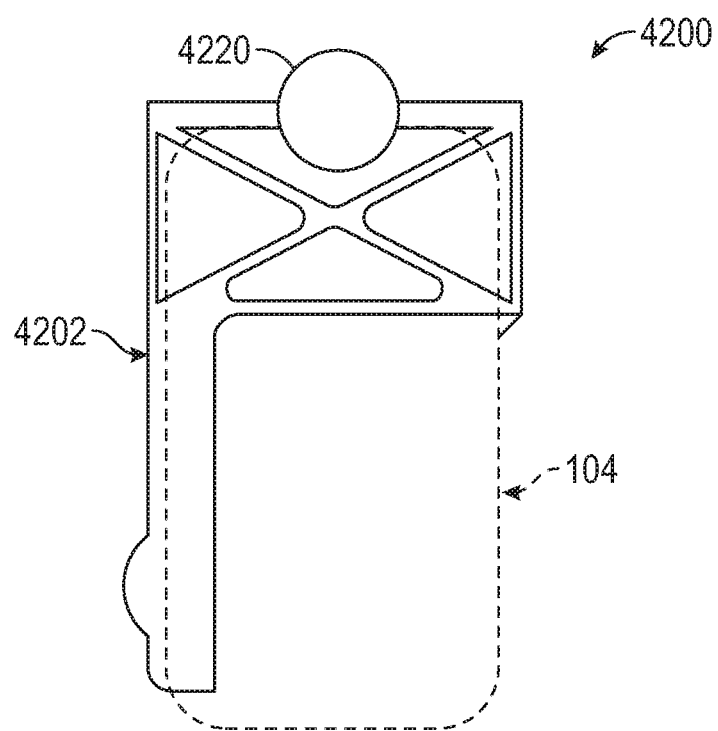
FIG. 44 is a bottom plan view of the power source/finger guide of FIG. 42 with a smart card inserted therein.
Figure 45:
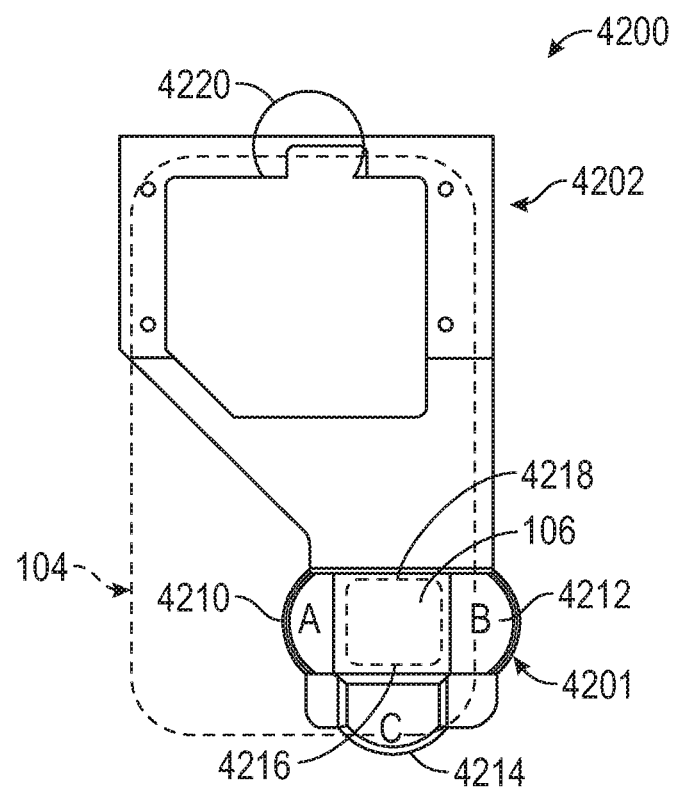
FIG. 45 is a top plan view of the power source/finger guide of FIG. 44 with a smart card inserted therein.

The finger guide channels 4210, 4212, and 4214 may include indicia—such as letters "A," "B," and "C" to uniquely identify each channel, as shown in FIGS. 43 and 45.

In a similar way, the temporary power source shown in FIGS. 34A-34C and described above may be modified to include an integrated finger guide according to some embodiments. For example, a finger guide, such as those shown in FIGS. 38-41 made from a molded plastic may be secured to the overlay 3402 with the finger guide cutout 3810 aligned with cutout 2620 of the overlay 3402.

A finger guide, such as those shown in FIGS. 38-41, may also be incorporated into a data input device having a cutout exposing a part of the fingerprint sensor, such as those shown in FIGS. 21A-21D, 26A-26C, 28, and 34A-34F.

Figure 46A:
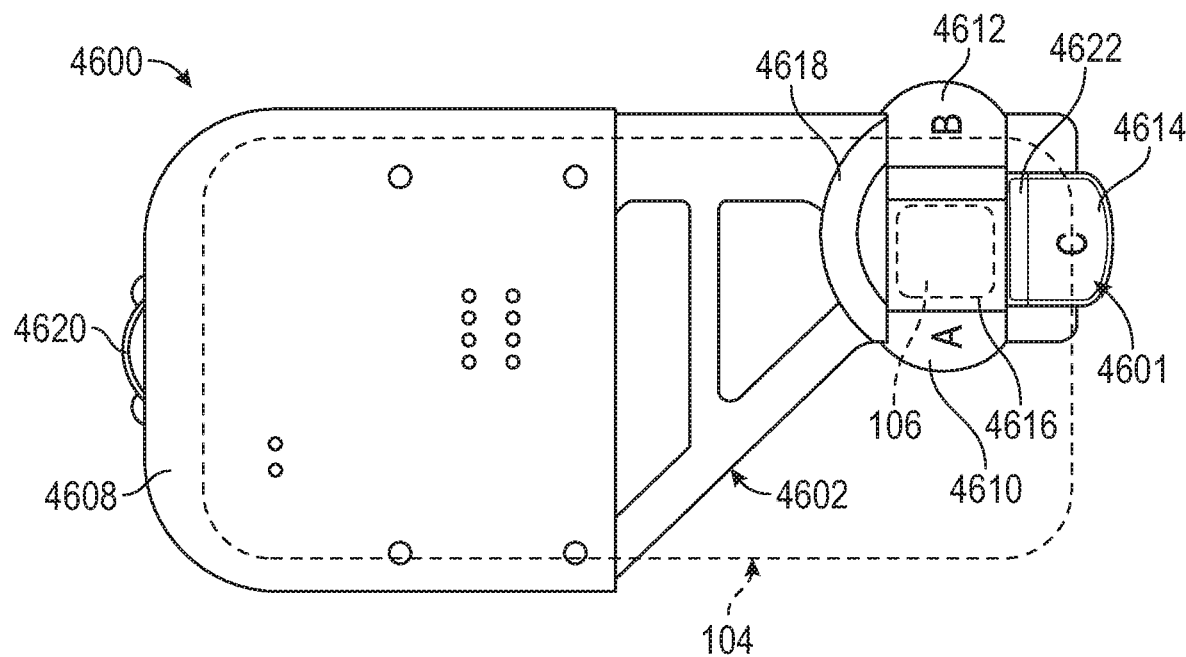
FIGS. 46A-46B is a top plan view and a partial perspective view, respectively, of an embodiment of a power source/finger guide.
Figure 46B:
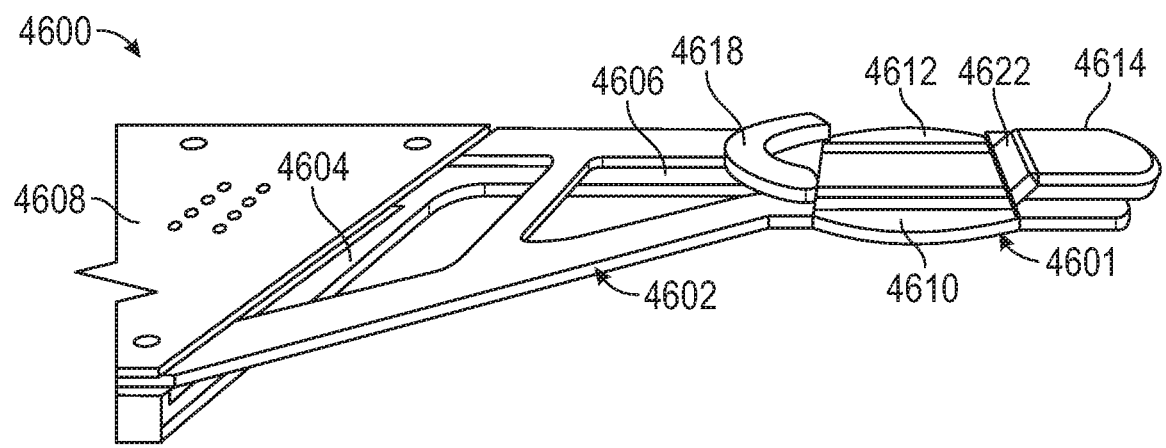

An alternative implementation of an integrated temporary power source and finger guide is shown in FIGS. 46A-46B. In the illustrated embodiment, a power source/finger print guide 4600 includes a card holder frame 4602 defining card guide rails, including a card housing slot 4604 and a longitudinal slot 4606 into which a smart card 104 (shown in phantom lines in FIG. 46A) may be inserted. A panel 4608 may be secured to or an integral top part of the card holder frame 4602. The panel 4608 may extend over the card holder frame 4602 and may display instructions to the user. A battery 4620 (shown only in FIG. 46A) may be carried in a suitable battery holder mounted to the card holder frame 4602 and connected by appropriate conductive elements to power transmission contacts of the card 104 as described above. The power source may be powered by mains (e.g., via a USB connector) or solar powered. In other embodiments, if the smart card contains an on-board power source, such as a solar cell, an external power source is not required.

A finger guide 4601 may be attached to or integrally formed with the card holder frame 4602. The finger guide 4601 may include an A-channel wing 4610, a B-channel wing 4612, a C-channel wing (or raised section) 4614 with a beveled front edge 4622, a front stop 4618 having a curved contour to accommodate the curved tip of a finger placed on the C-channel 4614, and a cut out 4616 through which a sensing portion 106 of the inserted card 104 is exposed. The finger guide 4601 and card holder frame 4602 could be made of any suitable material, such as molded plastic.

FIGS. 47A-47F show a finger guide 4702, such as those shown in FIGS. 38-41 and 48A-B, incorporated into a data input device in the form of an overlay 4704 integrating a power source according to some embodiments. As shown in FIGS. 47A-47F, the finger guide 4702 is incorporated into the overlay 4704 integrating the power source with a host device (e.g., smart card 104) disposed beneath the overlay 4704. The finger guide 4702 may be incorporated into any overlay or data input device having a cutout exposing a part of the fingerprint sensor, such as those shown in FIGS. 26A-26C, 28 and 34A-34F. The finger guide 4702 may be incorporated into an overlay without a data input configuration while having a cutout exposing a part of the fingerprint sensor 106. Such embodiments of the finger guide 4702 incorporated in an overlay 4732 without a data input configuration are described in further detail in FIGS. 47G-47H.

In the embodiment described in relation to FIGS. 47A-47H, a smart card 104 is the device containing the fingerprint sensor 102. However, the application of the finger guide 4702 and the overlay 4704, 4732 is not restricted to a smart card and can be used for any device that contains a fingerprint sensor in alternative embodiments. In some embodiments, the smart card 104 comprises the fingerprint sensor 102 with a sensing area 106, possibly LEDs or other status indicators, and contact pads 108 providing contacts for an external power source.

In some embodiments, the overlay 4704, 4732 comprises a thin material, e.g., a film that conforms to a surface of the host device when secured thereto. The overlay 4704, 4732 may comprise an adhesively-backed sticker or film temporarily and removably placed over the card 104. In some embodiments, repositionable adhesives provided by companies such as 3M, Krylon, Franklin Adhesives and Polymers, and Bostik may be applied to the overlay 4704, 4732 to temporarily place over the portion of the card 104 including the contact pads 108. In other embodiments, the temporary overlay 4704, 4732 may be slid over the device, clipped onto the device, or folded onto the device rather than adhering to the device surface. The overlay may be magnetic and stick to the device surface if the device is metal.

Figure 47A:
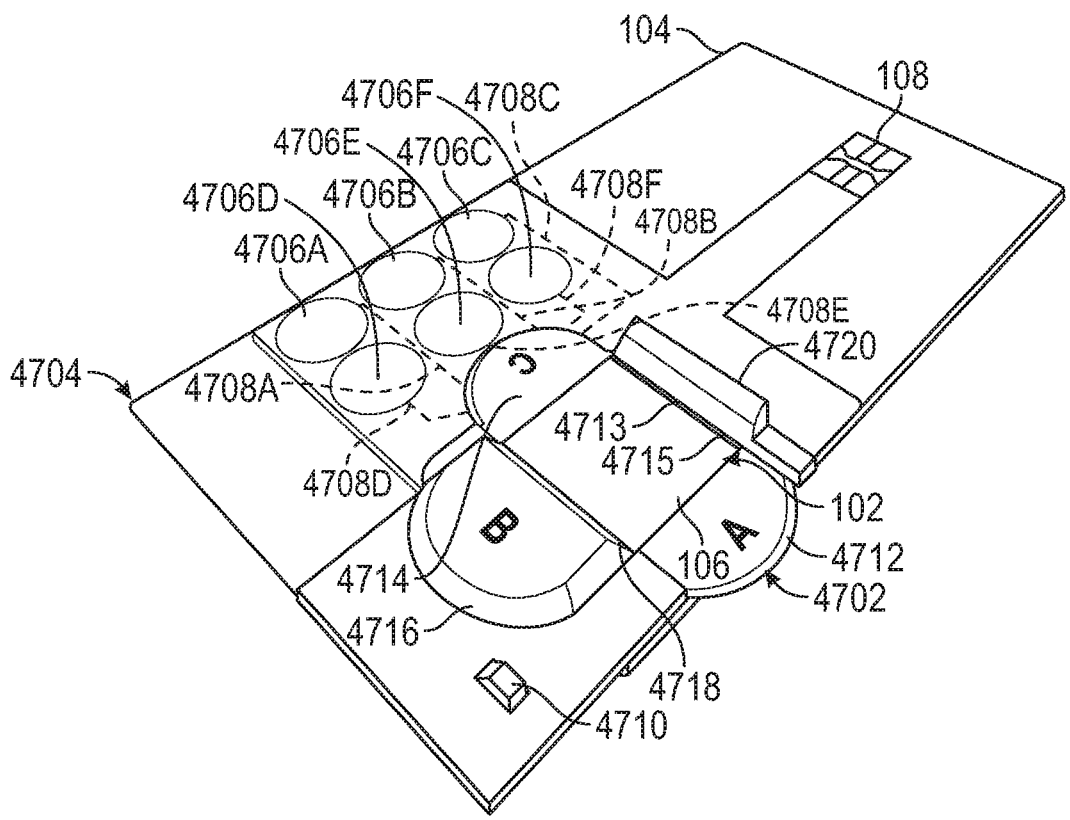
FIGS. 47A-47F illustrate an embodiment of a finger guide incorporated into a data input device in the form of an overlay comprising a power source.
Figure 47B:
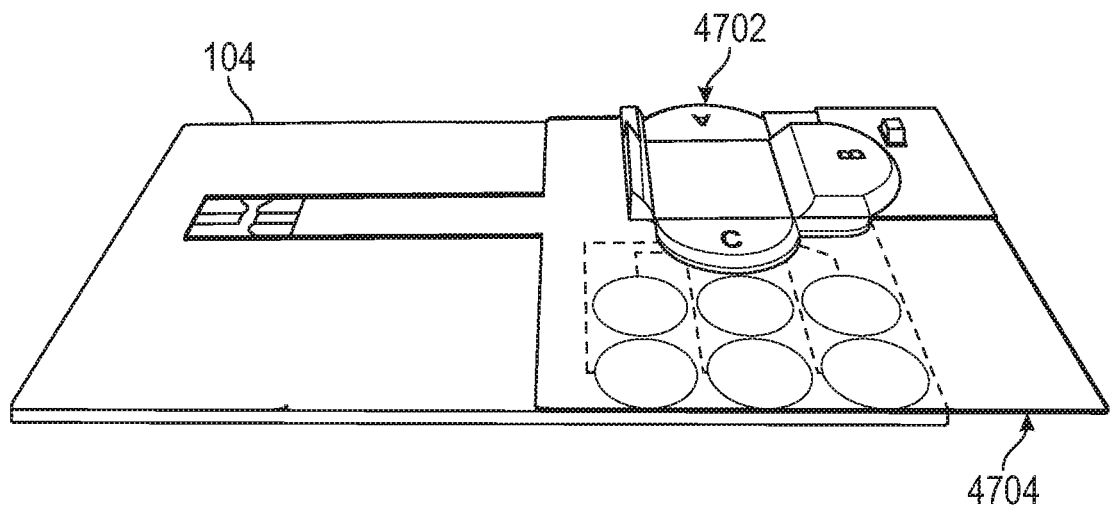

FIGS. 47A-47B show top perspective views of the finger guide 4702 incorporated into the data input device in the form of an overlay 4704 integrating a power source with a host device (e.g., smart card 104) disposed beneath the overlay 4704. A cutout 4713 in the overlay 4704 and a cutout 4715 in the finger guide 4702 exposes a portion of the sensing area 106 while another portion of the sensing area 106 remains covered. As described above, the covered portion of the sensing area 106 is referred to as portion X and the exposed portion of the sensing area 106 is referred to as portion Y. In some embodiments, the overlay 4704 comprises data input keys 4706A-F on a top surface of the overlay 4704. In such embodiments, the overlay 4704 comprises corresponding connection traces 4708A-F on a bottom surface of the overlay 4704. The connection traces 4708A-F electrically couple each data input key with an associated spatially distinct portion of the sensing area 106. In some embodiments, each of the associated spatially distinct portions is within portion X of the sensing area 106 covered by the overlay 4704.

A portion of the overlay 4704 covers the contact pad 108 of the device 104. The overlay 4704 comprises power connection traces 4722A (shown only in FIGS. 47D-47F), 4722B (shown only in FIGS. 47D and 47F) and card contacts (not shown in FIGS. 47A-47F) that contact power pads (e.g., power terminals) of the contact pad 108 when the overlay 4704 is applied to the card 104. In some embodiments, the card contacts include a contact power input and a ground connection. The overlay 4704 may comprise a suitable power element 4726 (shown only in FIGS. 47D-F) to power the card 104 and sensor 102, such as a small cell battery LR44. In such embodiments, the power element 4726 is securely attached to the overlay 4704 and makes electrical contact with a power element contact pad 4730 (shown in phantom lines in FIG. 47F) of the overlay 4704. For example, one terminal of a battery may contact the power element contact pad 4730. A power connection trace 4722B connects the ground connection to the power element contact pad 4730 and a power connection trace 4722A connects the contact power input to a conductive contact 4724 (shown only in FIGS. 47D-47F). In some embodiments, the power connection traces 4722A, 4722B, the card contacts (e.g., the contact power input and the ground connection), the power element contact pad 4730, and the conductive contact 4724 are etched or printed in metal, metalized paint, conductive ink, conductive polymer, or any conductive coating on the bottom side of the overlay 4704. Any appropriate routing arrangement for the power connection traces 4722A, 4722B on the bottom surface of the 4704 overlay is possible with the requirement that the routing of the power connection traces 4722A, 4722B must avoid the exposed portion of the sensing area 106 and the connection traces 4708A-F for the data input keys 4706A-F.

The finger guide 4702 may be attached to or integrally formed with the overlay 4704. In the illustrated embodiment, finger guide 4702 includes three finger guide channels: an A-channel wing 4712, a C-channel wing 4714, a B-channel wing (or raised section) 4716 with a beveled front edge 4718, a front stop 4720 positioned to be engaged to the tip of a finger placed on the B-channel 4716, and the cut out 4715 through which a sensing portion 106 of the inserted card 104 is exposed. The finger guide 4702 could be made of any suitable material, such as molded plastic.

In various embodiments, finger guide 4702 further comprises a lever 4710 configured to enable a user to selectively close a power circuit between the power element 4726 and the terminals of the electronic device to enable power transmission between the power element 4726 and the electronic device. The lever 4710 and the circuit closure will be described in further detail in FIGS. 47C-47F.

Figure 47C:
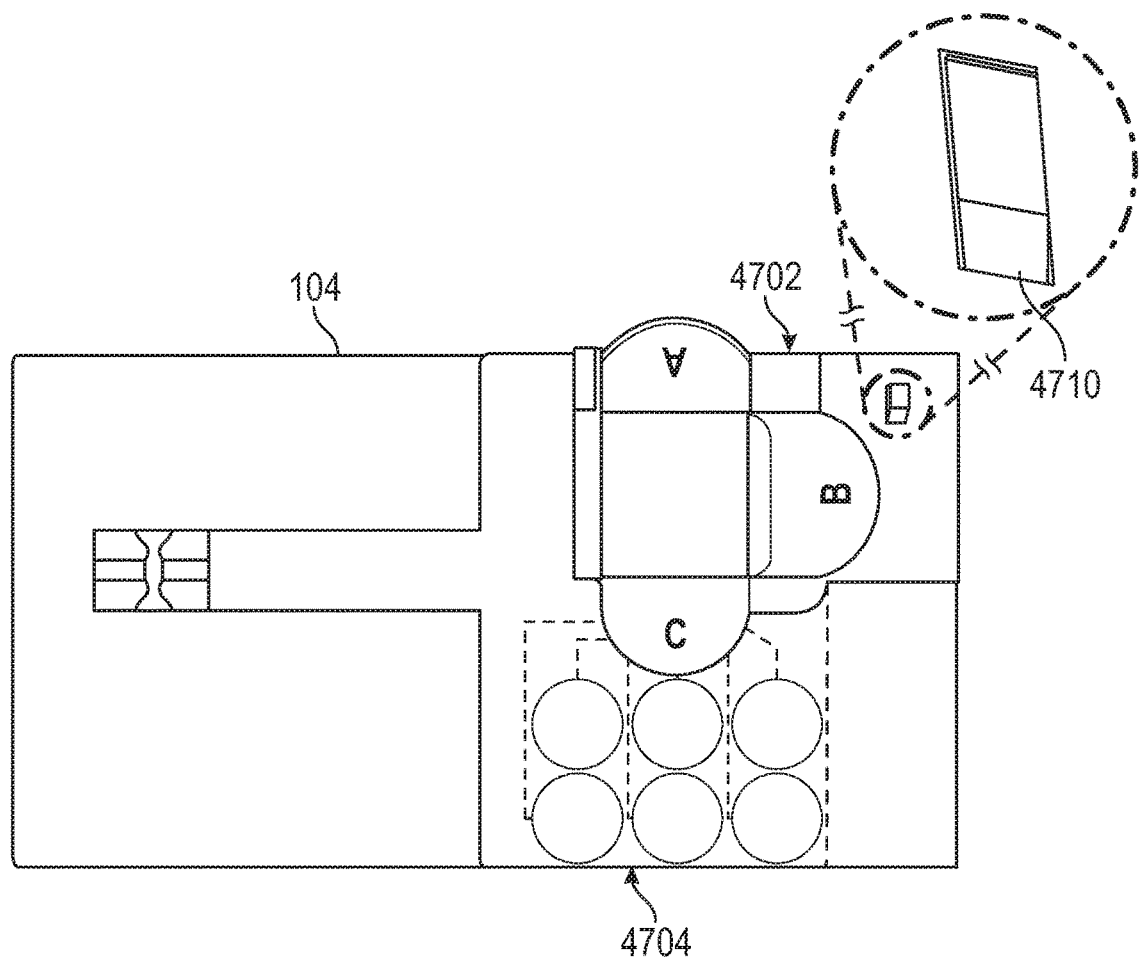

FIG. 47C shows a top view of the finger guide 4702 incorporated into the overlay 4704 with a magnified view of the lever 4710. In some embodiments, the lever 4710 is a single use switch that the user may push down in order to close the power circuit, i.e., power on the fingerprint sensor. In such embodiments, the finger guide 4704 may comprise a latch or detent configured to catch the lever 4710 when pushed down by the user and keep the lever 4710 in the pushed down position. The lever 4710 may be an on-off rocker switch or a dome, plunger, or blister switch.

Figure 47D:
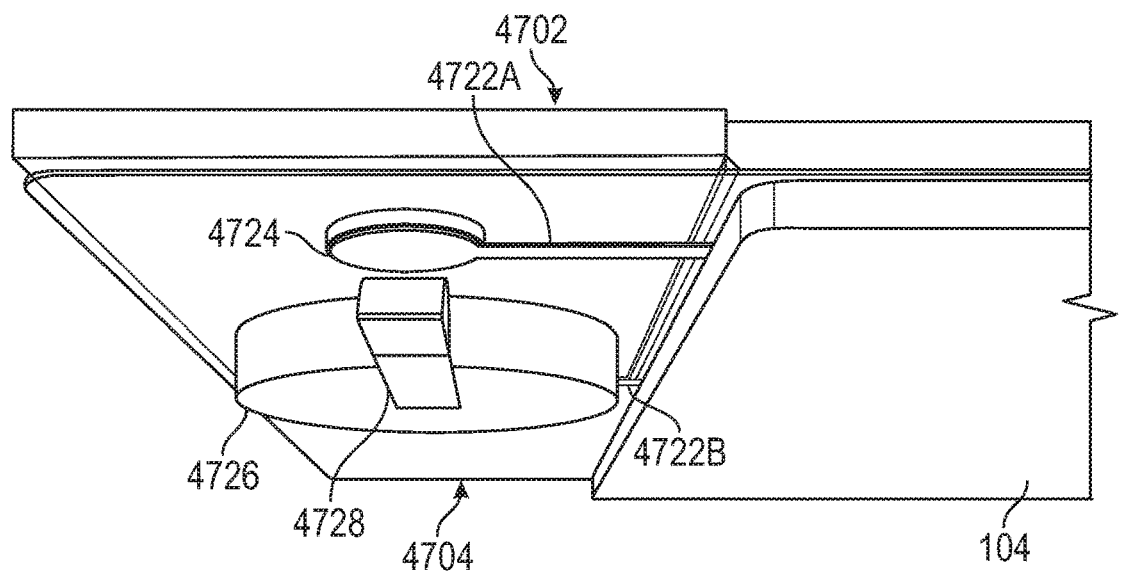
Figure 47E:
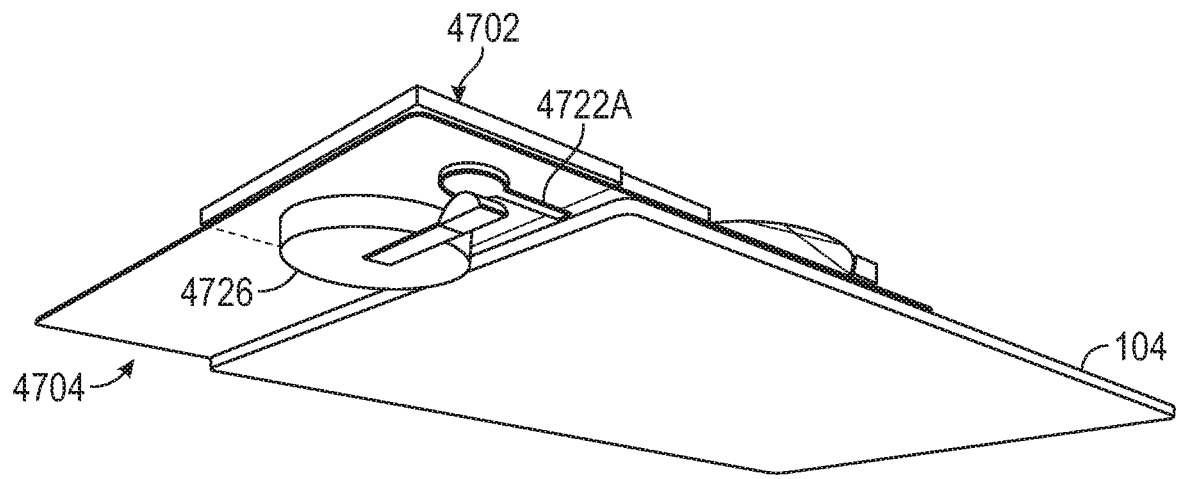
Figure 47F:
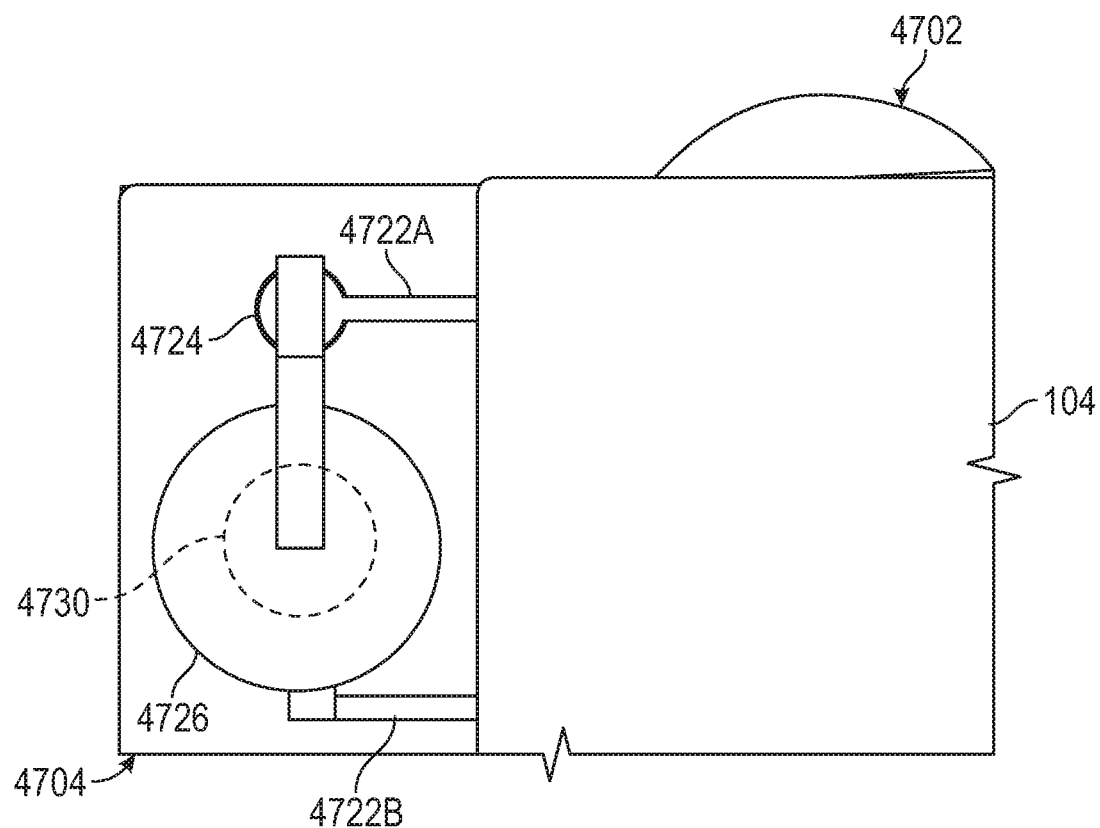

FIGS. 47D-47F show various bottom views of the finger guide 4702 incorporated into the data input device in the form of an overlay 4704 integrating a power source with a host device (e.g., smart card 104) disposed beneath the overlay 4704. As shown in FIGS. 47D-47F, the power element 4726 is attached on the bottom surface of the overlay 4704 over the power element contact pad 4730 (shown only in FIG. 47F). In some embodiments, the power element 4726 is attached to the bottom surface of the overlay 4704 underneath the finger guide 4702. In such embodiments, the finger guide 4702 provides a stiffening effect for the overlay 4704 and further support for the power element 4726.

The conductive contact 4724 is positioned underneath the lever 4710 (not shown in FIGS. 47D-F). In some embodiments, a portion of the overlay 4704 is cut out such that the overlay 4704 is surrounding the conductive contact 4724. A conductive spring clip may contact one terminal of the power element 4726. Accordingly, when the user pushes the lever 4710 down, the conductive contact 4724 is also pushed down and makes contact with the conductive spring clip 4728 extending from the power element 4726, thereby closing the power circuit between the power element 4726 and the power transmission contacts or terminals of the electronic device (e.g., smart card 104) to enable power transmission between the power element 4726 and the electronic device. Once the user has completed an enrollment process using the fingerprint sensor 102, the configuration of the finger guide 4702 incorporated into the overlay 4704 makes it convenient for the user to grip a portion of the finger guide 4702 extending out of the smart card 104 and peel the finger guide 4702 and the overlay 4704 off of the smart card 104. Peeling the finger guide 4702 and the overlay 4704 off of the smart card 104 disconnects the power transmission between the power element 4726 and the smart card 104.

Figure 47G:
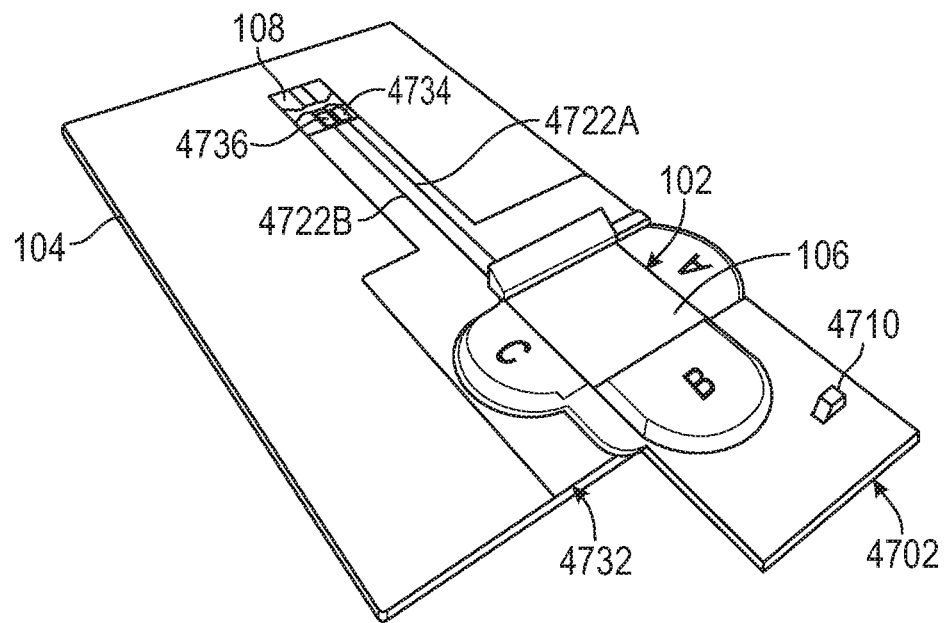
FIGS. 47G-47H illustrate an embodiment of a finger guide incorporated into an overlay comprising a power source.
Figure 47H:
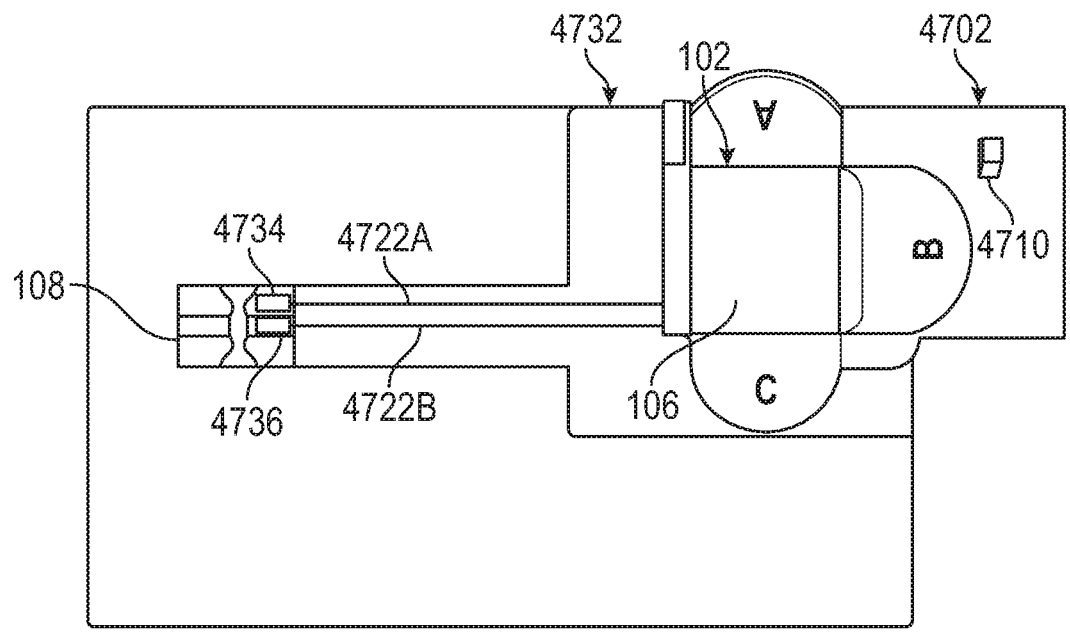

FIGS. 47G-47H show various top views of an embodiment of the finger guide 4702 incorporated into the overlay 4732 comprising a power source. In the illustrated embodiment shown in FIGS. 47G-47H, the overlay 4732 does not comprise a data input device. Accordingly, the overlay 4732 does not include the data input keys and corresponding conductive traces as described above in FIGS. 47A-47F. As such, the size of the overlay 4732 may be minimized to save cost of manufacture.

As described above, a portion of the overlay 4732 covers the contact pad 108 of the device 104. The overlay 4704 comprises power connection traces 4722A, 4722B and card contacts that contact power pads (e.g., power terminals) of the contact pad 108 when the overlay 4732 is applied to the card 104. In some embodiments, the card contacts include a contact power input 4734 and a ground connection 4736. The overlay 4732 may comprise a suitable power element, as described above in FIGS. 47A-47F, to power the card 104 and sensor 102, such as a small cell battery LR44. In such embodiments, the power element is securely attached to a bottom surface of the overlay 4732 and makes electrical contact with a power element contact pad of the overlay 4732. For example, one terminal of a battery may contact the power element contact pad. A power connection trace 4722B connects the ground connection to the power element contact pad and a power connection trace 4722A connects the contact power input to a conductive contact. In some embodiments, the power connection traces 4722A, 4722B, the card contacts (e.g., the contact power input 4734 and the ground connection 4736), the power element contact pad, and the conductive contact are etched or printed in metal, metalized paint, conductive ink, conductive polymer, or any conductive coating on the bottom side of the overlay 4732.

The finger guide 4702 may be attached to or integrally formed with the overlay 4732. As described above in FIGS. 47A-47F, the finger guide 4702 comprises the lever 4710 configured to enable a user to selectively close a power circuit between the power element and the terminals of the electronic device (e.g., the smart card 104) to enable power transmission between the power element and the electronic device. Once the user has completed an enrollment process using the fingerprint sensor 102, the configuration of the finger guide 4702 incorporated into the overlay 4732 makes it convenient for the user to grip a portion of the finger guide 4732 extending out of the smart card 104 and peel the finger guide 4702 and the overlay 4732 off of the smart card 104. Peeling the finger guide 4702 and the overlay 4732 off of the smart card 104 disconnects the power transmission between the power element and the smart card 104.

FIGS. 47I-47L illustrate an embodiment of an overlay including a finger guide 4702 comprising a switch 4738. In the illustrated embodiment shown in FIGS. 47I-47L, the finger guide 4702 comprising the switch 4738 is incorporated into an overlay 4748 comprising a power element 4726, where the overlay 4748 does not comprise a data input device as described above in FIGS. 47G-47H. In other embodiments, the finger guide 4702 comprising the switch 4738 may be combined with a data input device in the form of an overlay integrating a power element as described above in FIGS. 47A-47F.

Figure 47I:
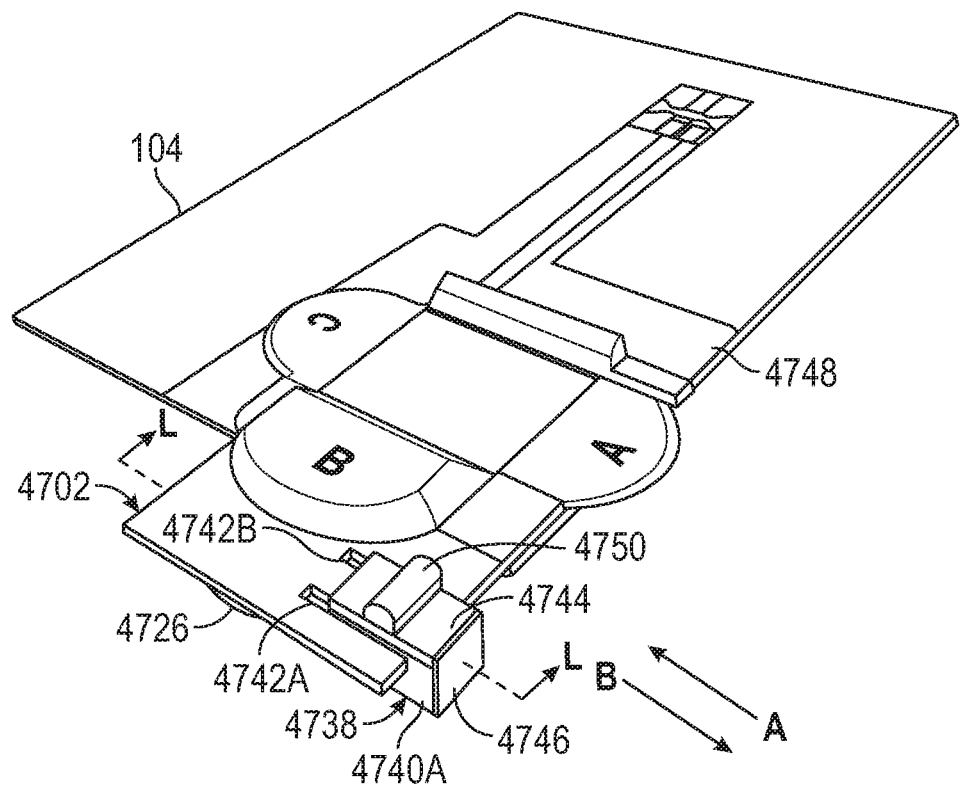
FIGS. 47I-47L illustrate an embodiment of a finger guide comprising a slide switch.
Figure 47J:
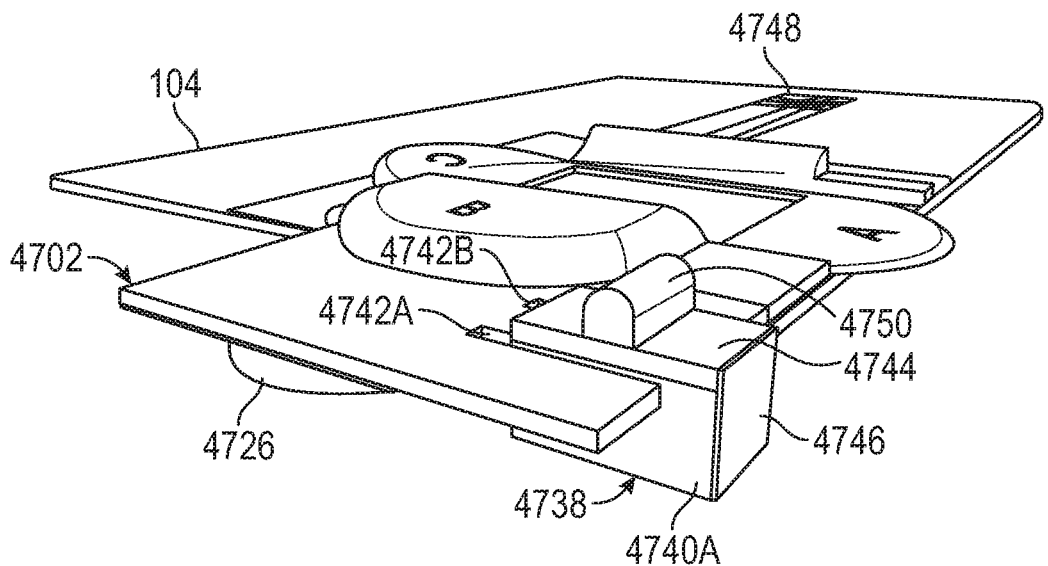

FIGS. 47I-47J show various top views of an embodiment of the finger guide 4702 comprising the switch 4738 configured to enable a user to selectively open and close a power circuit between the power element 4726 (shown in FIGS. 47J-47K) and the terminals of the electronic device (e.g., the smart card 104) to enable and disable power transmission between the power element and the electronic device. As shown in FIG. 47I, the switch 4738 may be configured to be movable in direction "A" to close the power circuit, thereby initiating power transmission between the power element and the electronic device according to some embodiments. The switch 4738 may also be configured to be movable in direction "B" to open the power circuit, thereby terminating power transmission between the power element and the electronic device. The initiating and terminating of power transmission between the power element and the electronic device will be described in further detail below in FIGS. 47K-47L.

In some embodiments, the switch 4738 comprises a top surface 4744, two side walls 4740A-B (one side wall 4740A shown in FIGS. 47I-47J and the other side wall 4740B shown in FIGS. 47K-47L), and a back wall 4746. In such embodiments, the finger guide 4702 comprises two slot cutouts 4742A-B, in which the two side walls 4740A-B of the switch 4738 are located in, respectively. Accordingly, the slot cutouts 4742A-B allow a user to move the switch 4738 back and forth in directions A and B, as shown in FIG. 47I. In some embodiments, the top surface 4744 comprises a raised section (e.g., a handle) 4750 configured to help a user slide the switch back and forth in directions A and B.

Figure 47K:
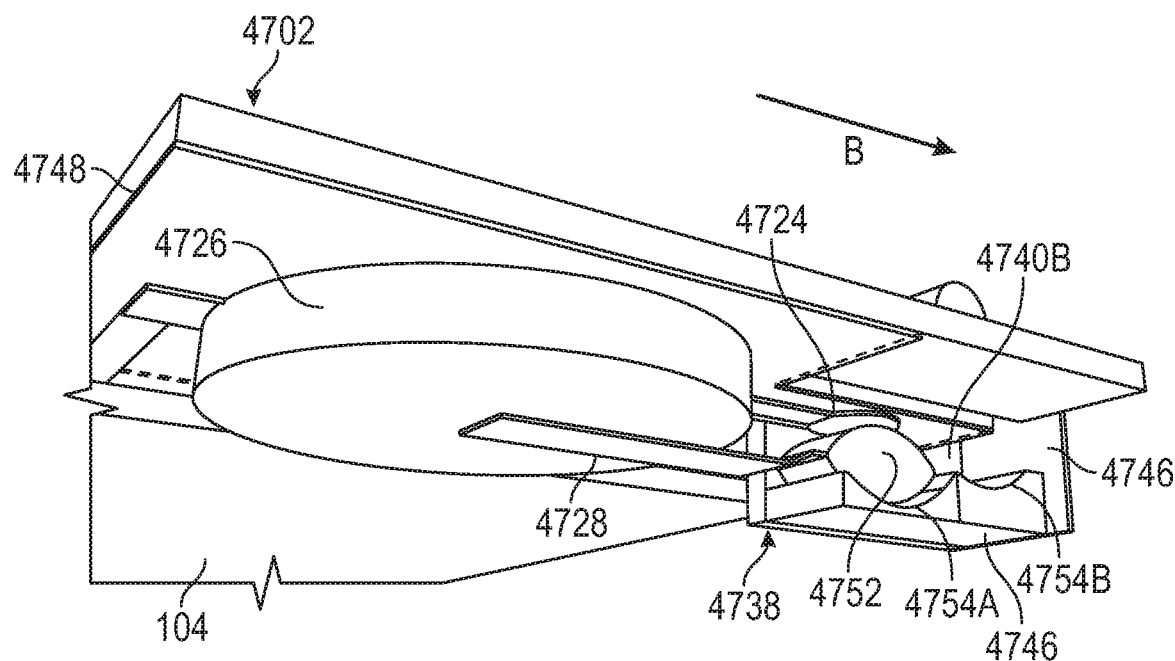

FIG. 47K shows a bottom perspective view of an embodiment of the finger guide 4702 comprising the switch 4738. For the purpose of explanation, FIG. 47K shows the switch 4738 with a side wall 4740A removed. As described above, the power element 4726 is attached on the bottom surface of the overlay 4748 underneath the finger guide 4702. As shown in FIG. 47K, a conductive spring clip 4728 comprising a rounded conductive head 4752 at a distal end extends from the power element 4726. The overlay 4748 comprises a conductive contact 4724 positioned above the head 4752. The switch 4738 further comprises a bottom base 4746 comprising a stepped surface. In some embodiments, the stepped surface comprises two steps 4754A-B, each including a curved and smooth top surface. In such embodiments, each surface of the steps 4754A-B is configured to receive the rounded head 4752. As shown in FIG. 47K, the step 4754A closer to the power element 4726 is lower than the other step 4754B. Accordingly, when the switch 4738 is pushed back in direction B, the lower step 4754A receives the head 4752. The lower step 4754A is configured to receive the head 4752 such that the head 4752 does not contact the conductive contact 4724, thereby opening the power circuit between the power element 4726 and the terminals of the electronic device (e.g., the smart card 104) to terminate or disable power transmission between the power element and the electronic device.

Figure 47L:
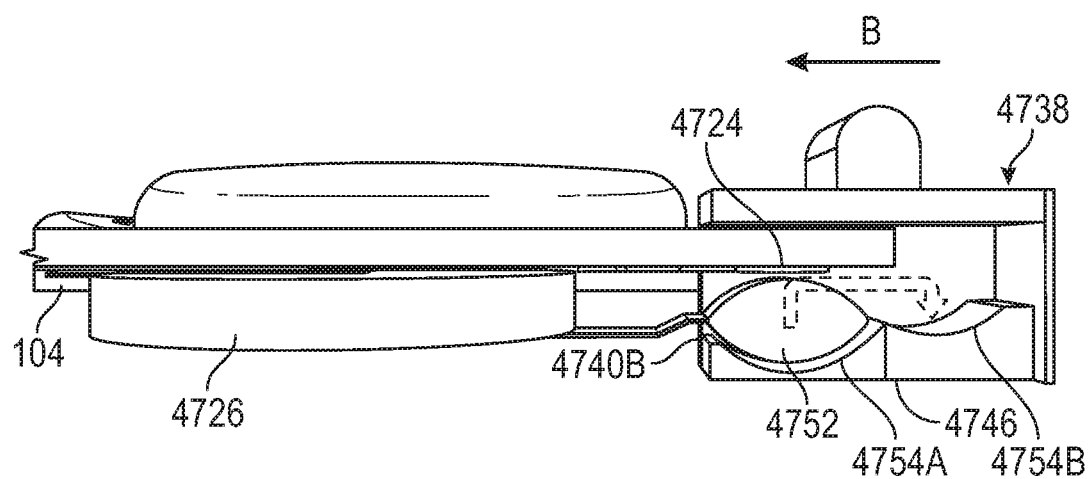

FIG. 47L shows a side cross sectional view of an embodiment of the finger guide 4702 comprising the switch 4738 along the line L-L in FIG. 47I. As shown in FIG. 47L, the switch 4738 is slidable in direction B according to some embodiments. In such embodiments, the lower step 4754A moves towards the direction of the power element and the higher step 4754B moves into the previous position of lower step 4754A. Accordingly, the rounded conductive head 4752 is pushed up into and received by the curved top surface of the higher step 4754B, as shown by the arrow in dotted line in FIG. 47L. The higher step 4754B is configured to receive the head 4752 such that the head 4752 contacts the conductive contact 4724, thereby closing the power circuit between the power element 4726 and the terminals of the electronic device (e.g., the smart card 104) to initiate or enable power transmission between the power element 4726 and the electronic device.

The user may move the switch 4738 in direction B to disable transmission between the power element 4726 and the electronic device (e.g., the smart card 104). In such embodiments, the step closer to the power element 4726 may be higher than the other step of the bottom base 4746. Accordingly, moving the switch 4738 in direction A would enable transmission between the power element 4726 and the electronic device.

The rounded conductive head 4752 may be separate from the conductive spring clip 4728 and attached to the conductive contact 4724. In such embodiments, the distal end of the conductive spring clip 4728 may be pushed up and down by the movement of the switch 4738, as described above, to initiate and terminate transmission between the power element 4726 and the electronic device (e.g., the smart card 104).

As shown in FIGS. 47I-47L, the switch 4738 enables a user to selectively initiate and terminate the power transmission between the power element 4726 and the terminals of the electronic device (e.g., the smart card 104). The minimal number of components of the switch 4738, as described above, allows reduction in cost of manufacture.

In alternative embodiments to the overlay 4702 shown in FIGS. 47A-47L and having a lever 4710 or switch 4738, the overlay lacks a finger guide.

Figure 48A:
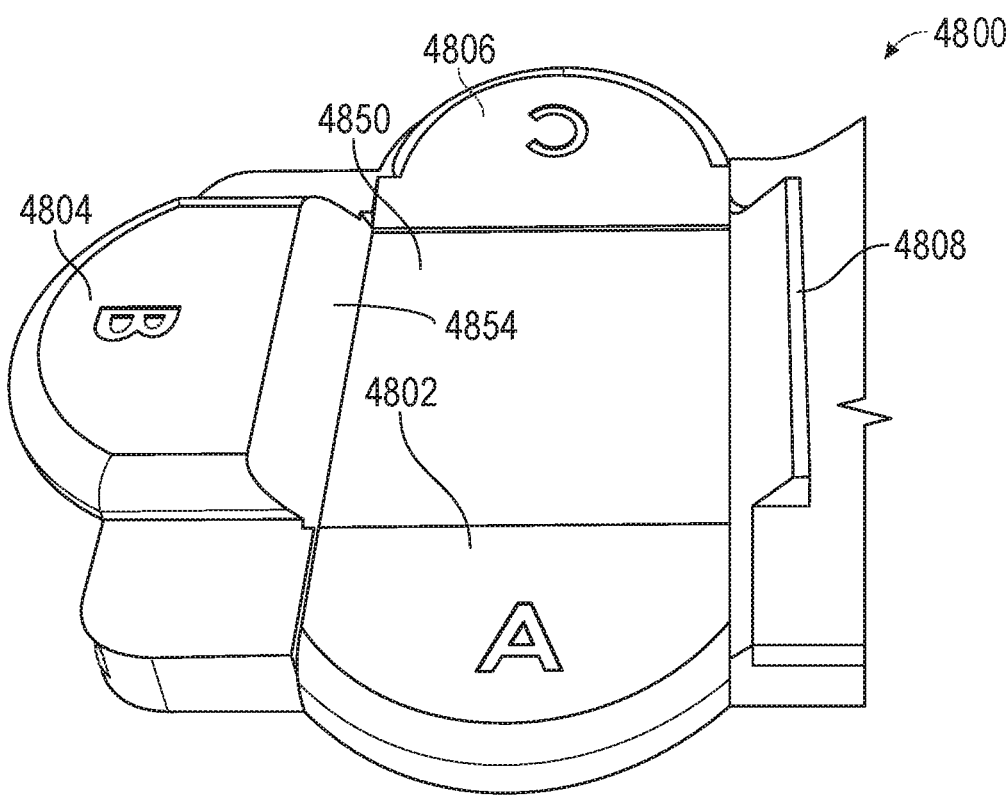
FIGS. 48A and 48B are right and left partial perspective views of an embodiment of a finger guide.
Figure 48B:
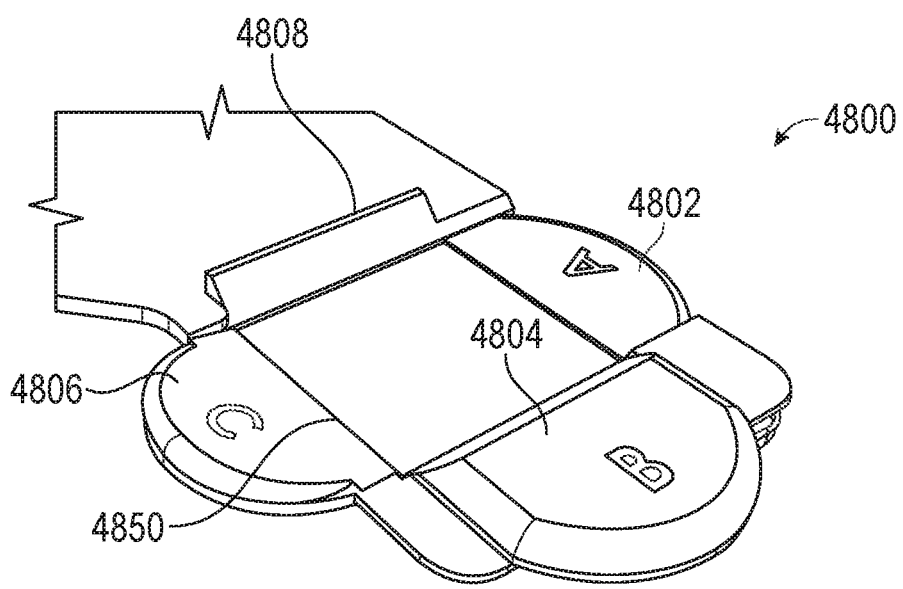

FIGS. 48A and 48B are right and left partial perspective views of an alternative configuration of a finger guide 4800. The finger guide 4800 comprises a first channel 4802 (channel A) a second channel 4804 (channel B), and a third channel 4806 (channel C). Note that the channels A, B, and C are labeled differently than in the embodiment described above as the particular labeling, if any, is not critical. The finger guide 4800 further comprises a cut out 4850 for the fingerprint sensor and a front stop (or finger stop) 4808 located across the cut out 4850 from the channel 4804.

In some embodiments, channel 4802 provides a generally flat approach (i.e., parallel to the sensor surface) for a finger placed thereon. In some embodiments, channel 4804 may be raised above the plane of the sensor surface exposed at the cut out 4850 and has a flat upper portion and a steep ramp 4854 (e.g., about 45 degrees) extending to the cut out 4850. In some embodiments, channel 4806 has a gentle slope (e.g., about 10-15 degrees) extending down to the cut out 4850.

The flat approach of first channel 4802, the gentle ramp of channel 4806, and the steep ramps of channel 4804 could be on any side of the sensor (i.e., cut out 4850), in any order, but the arrangement shown is ideal for a fingerprint sensor positioned above a long central axis and close to the right-hand short edge of a smart card, such as is illustrated in FIG. 1. For example, in a typical bank card, the sensor may be placed in this position so as not to interfere with the secure element module which is typically close to the left-hand short edge of a smart card, or with the printed or embossed symbols and/or a magnetic strip on the smart card, both of which run parallel to, but are positioned below, the long central axis of the card.

Figure 49A:
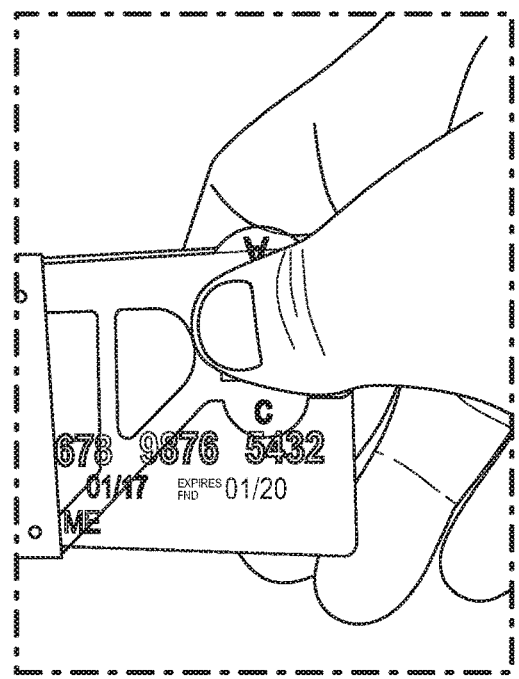
FIGS. 49A, 49B, and 49C show a user grasping a smart card with a fingerprint sensor and sensor guide using different channels of the finger guide according to some embodiments.

When holding the card, it is more natural to provide a tip touch at the second channel 4804 because channel 4804 is closest to the short edge of the card, as shown in FIG. 49A

Figure 49B:
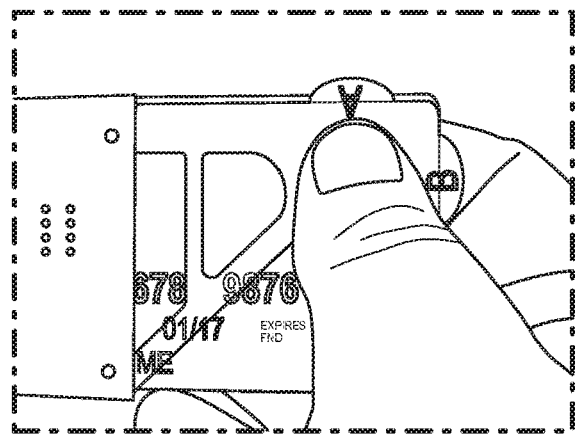

At channel 4806, the user has to reach over more card material compared to channel 4802. The gentle slope of channel 4806 is complementary to the resulting thumb position, meaning a different part of the finger surface is more likely to be imaged compared to channel 4802, as shown in FIG. 49B.

Figure 49C:
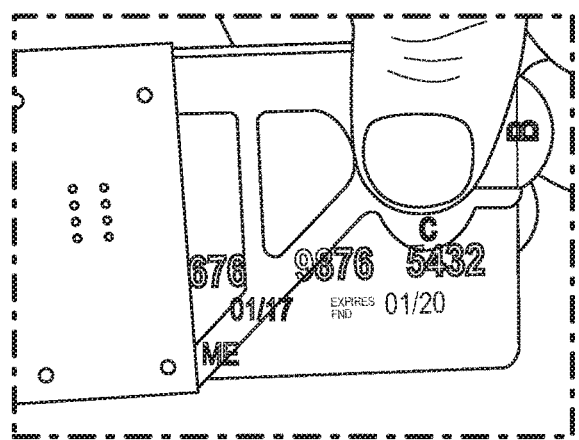

At channel 4802, the user grasps the card from the long side closest to the sensor, as shown in FIG. 49C.

In some embodiments, the finger guides, and, if applicable, card holder frames, of FIGS. 38-48 are made of inexpensive materials that can be safely disposed of, for example, plastic, cardboard, rubber, or foam. The materials may be lightweight such that the finger guide may be sent to the user by mail or courier at low cost. The base plate, raised section(s), and channel(s) of the finger guide may be molded in a single unit, or may be separate parts.

Finger guides such as those shown in FIGS. 39-48 require the user to place a finger on the sensing surface at positions that are separated from each other by angles in a plane parallel to the sensing surface and at positions that are elevated with respect to the sensing surface. Thus, such guides provide three-dimensional variation of the finger positions during enrollment. Benefits of such three-dimensional variation are shown conceptually in FIGS. 50, 51, and 52.

Figure 50:
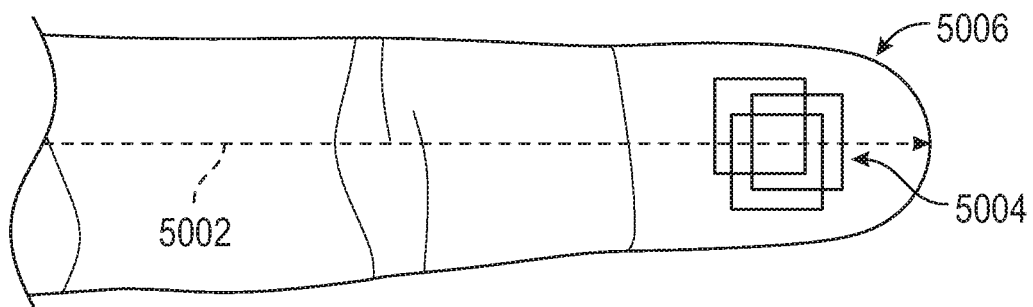
FIG. 50 schematically shows verification template images generated during an enrollment according to some embodiments.

FIG. 50 shows "novice" enrollment (i.e., with no guidance on how to enroll) according to some embodiments. Without guidance, the user typically puts their finger 5006 up and down again in the same or similar places along the finger longitudinal axis 5002. The user does not rotate their finger with respect to the sensor, and hence the captured images 5004 are not very different from one another. In addition, none of fingertip is captured. This has a particularly adverse impact on user verification results if the device containing the fingerprint sensor is a smart card. Since smart cards are thin and light, they are most likely held between pinched thumb and finger with the thumb tip on the sensor, hence it is important to enroll the tip in the fingerprint template.

Figure 51:
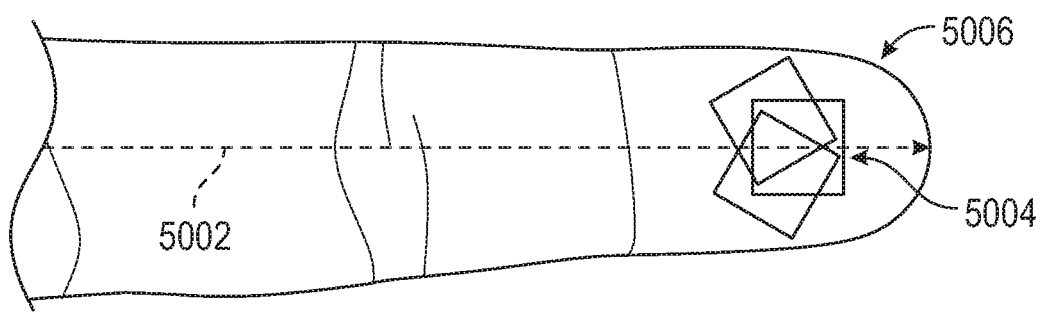
FIG. 51 schematically shows verification template images generated during a two-dimensional enrollment according to some embodiments.

FIG. 51 shows a two-dimensional "angle" enrollment according to some embodiments. In the "angle" enrollment, the user is encouraged to rotate their finger 5006 relative to the finger longitudinal axis 5002. For example, the user may rotate their finger 5006 by +/−45 degrees as well as 0 degrees relative to the finger longitudinal axis 5002. Accordingly, more of the sides of the finger pad may be captured as images 5004 for the fingerprint template, but little more of the longitudinal segment of the fingerprint is captured as the user is likely not going to rotate their finger 5006 much. Since the enrollment showed in FIG. 51 is two-dimensional, i.e., "flat," it is unlikely to capture images of fingertip area.

Figure 52:
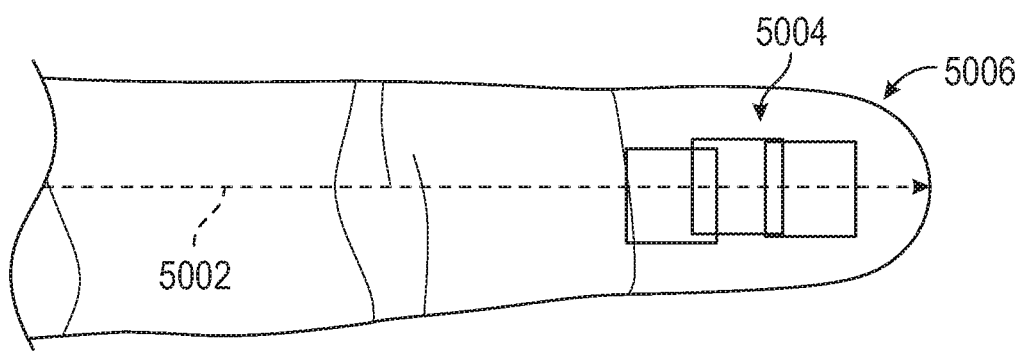
FIG. 52 schematically shows verification template images generated during a three-dimensional enrollment according to some embodiments.

FIG. 52 shows a three-dimensional enrollment according to some embodiments. In the three-dimensional enrollment, the user is encouraged to rotate their finger 5006 relative to the finger longitudinal axis 5002 and to use a channel having a ramp. For example, the user may rotate their finger 5006 by +/−90 degrees as well as 0 degrees and use a channel having a steep ramp and/or a channel having a gentle ramp. For the three-dimensional enrollment, the user has to physically rotate the device containing the sensor in order to insert their finger 5006 in the channel, thereby increasing the chances of extending coverage of the fingerprint template because their finger 5006 will almost certainly be placed in a different place than before (e.g., 180 degrees between A and C channels in FIGS. 48A and 48B). Having channels with both steep and gentle ramps means the fingerprint template coverage extends to include the fingertip. Accordingly, the result of such three-dimensional enrollment is a greater portion of the longitudinal segment of the fingerprint captured as images 5004 for the fingerprint template as compared to other enrollment techniques.

In some alternate finger guide embodiments, two or more different finger guide channels may not be located in fixed positions with respect to the sensing surface as in the finger guides described herein, but may be moved with respect to the sensing surface to selectively place one of the channels in operative proximity to the sensing surface.

FIG. 53A is a top plan view of an alternative finger guide 5302 whereby two or more cut outs 5304A-C and associated finger guide channels 5306A-B are linearly moveable with respect to the sensing surface 106 to selectively align the cut out 5304A-C with the sensing surface 106 and place the associated finger guide channel 5306A-B in operative proximity to the sensing surface according to some embodiments. The finger guide 5302 is clipped, adhered, or otherwise temporarily attached to a smart card 104. The smart card may be inserted into a power sleeve 5308 or other power source, such as, for example power source 902 shown in FIG. 9A, power source 910 shown in FIG. 9D, power source 920 shown in FIG. 9F, or any other suitable power source to which the card 104 may be coupled. The finger guide 5302 and power source 5308 could also be connected together or otherwise manufactured as a single, integral unit.

As shown in FIG. 53A, the finger guide 5302 includes a panel 5310 having two or more cutouts 5304A-C that is slidably or otherwise movably attached to rails 5312, or other structures allowing linear translation of the panel 5310, attached to the card. In the illustrated embodiment, the panel includes three cut outs A 5304A, B 5304B, C 5304C that can be selectively aligned with the sensing surface 106 of the card's fingerprint sensor by moving the panel 5310 with respect to the rails 5312, and each cut out 5304A-C has a different finger guide channel configuration. For example, finger cut out A 5304A has a flat approach by which a finger placed thereon is generally parallel to the surface of the fingerprint sensor sensing surface 106. Cut out B 5304B includes a gentle ramp 5306A whereby a finger placed there and is oriented at an elevation angle of, for example, 10-15° with respect to the sensing surface 106. A front stop (not shown in FIG. 53A) may be provided adjacent the cut out 5304B on the opposite side from the ramp 5306A. Cut out C 5304C may have a steep ramp 306B whereby the finger is oriented at an elevation angle of, for example, about 45° with respect to the sensing surface 106. A front stop (not shown in FIG. 53A) may be provided adjacent the cut out 5304C on the opposite side from the ramp 5306B.

The panel 5310 is movable with respect to the rails 5312, which may be attached to the card 104 such that any of cutouts A, B, or C 5304A-C can be aligned with the sensing surface 106. In the embodiment shown in FIG. 53A, the sensing area 106 is shown through the cut out C 5304C, which is aligned with the sensing area 106. In some embodiments, detents or other similar features may be provided to releasably secure the panel 5310 with respect to the guide rails 5312 to resist, but not prevent, translation of the panel 5310 with respect to the rails 5312 such that the panel 5310 will hold a selected linear position. In an embodiment as shown in FIG. 53B, the underside of the panel 5310 has spaced pins 5314 while the upper side of the rails 5312 have soft teeth 5316 so that the panel 5310 can be slid until a cut out 5304A-B lines up with the sensing surface 106. The panel 5310 stays in the selected position during finger enrollment through the aligned cut out. In some embodiments, the user has to push or pull the panel 5310 sufficiently hard to overcome the resistance of the pins 5314 engaging the teeth 5316 to align a different cut out with the sensing surface 106.

In the illustrated embodiment shown in FIG. 53A, the panel 5310 is movable with respect to the guide rails 5312 and the card 104 in a direction parallel to the long side of the card 104. The panel 5310 may be movable with respect to the guide rails 5312 and the card 104 in a direction parallel to the short side of the card 104.

Figure 54:
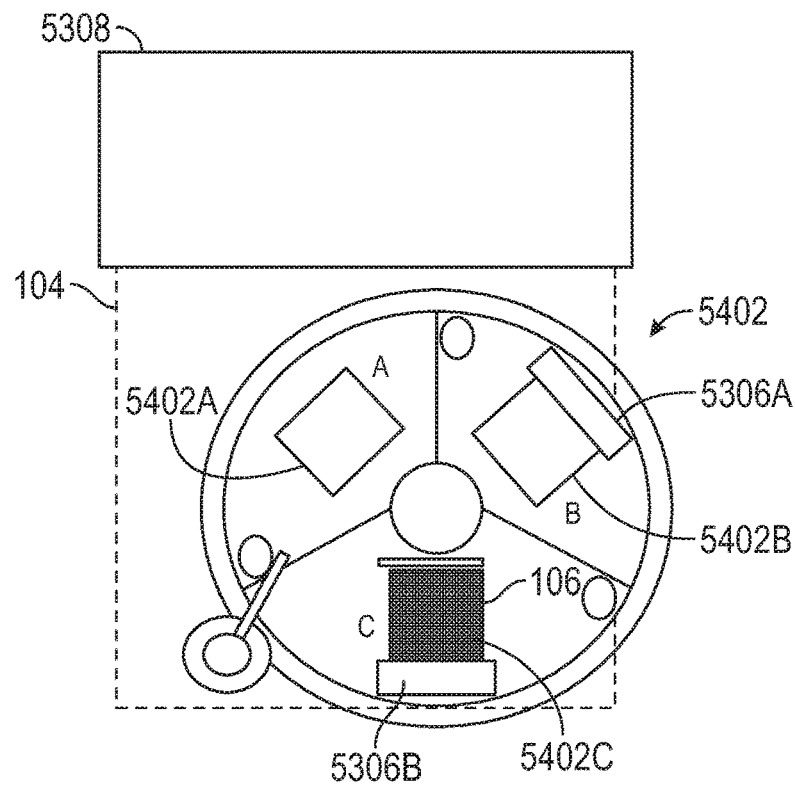
FIG. 54 is a top plan view of a finger guide whereby two or more cut outs and associated finger guide channels are rotatably moveable with respect to the sensing surface to selectively align the cut out with the sensing surface and place the associated finger guide channel in operative proximity to the sensing surface according to some embodiments.

FIG. 54 is a top plan view of an alternative finger guide 5402 whereby two or more cut outs 5402A-C and associated finger guide channels 5306A-B are rotatably moveable with respect to the sensing surface 106 to selectively align the cut out with the sensing surface 106 and place the associated finger guide channel 5306A-B in operative proximity to the sensing surface 106 according to some embodiments. The smart card 104 may be inserted into a power sleeve 5308 or other power source, such as, for example power source 902 shown in FIG. 9A, power source 910 shown in FIG. 9D, power source 920 shown in FIG. 9F, or any other suitable power source to which the card may be coupled. The rotatable finger guide 5402 and power source 5308 could also be connected together or otherwise manufactured as a single, integral unit.

In the illustrated embodiment shown in FIG. 54, the rotatable finger guide 5402 is in the form of a dial or spinner having three cutouts A 5306A, B 5306B, C 5306C. The spinner can be rotated about its center to selectively position one of the cut outs A 5306A, B 5306B, or C 5306C in alignment with the sensor. In the illustrated embodiment shown in FIG. 54, cut out C 5306C is aligned with the sensing surface 106.

Figure 55:
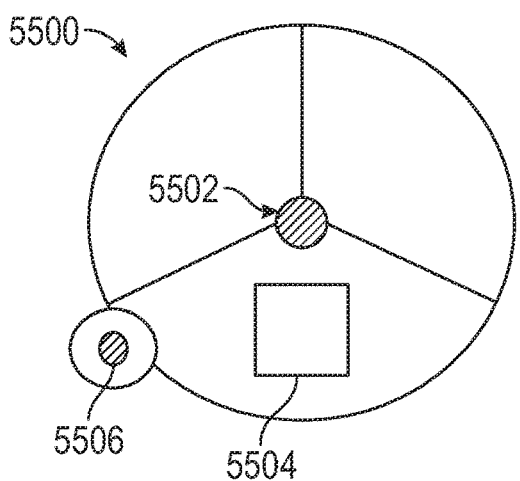
FIG. 55 is a top plan view of a base of a rotatable finger guide according to some embodiments.
Figure 56:
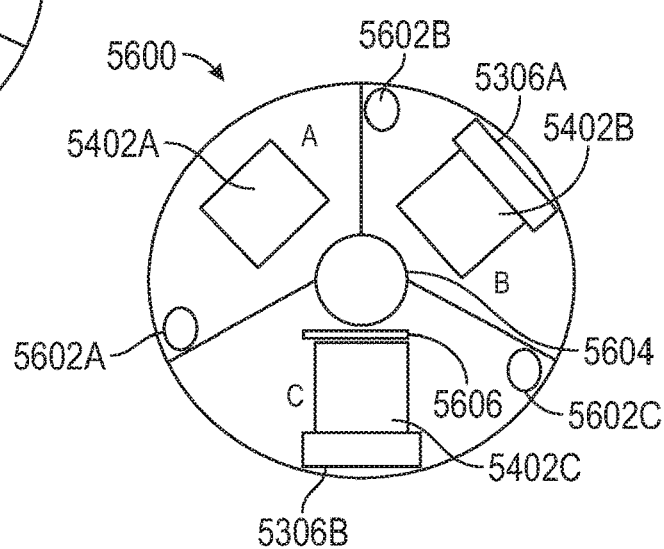
FIG. 56 is a top plan view of a top part of a rotatable finger guide according to some embodiments.
Figure 57:
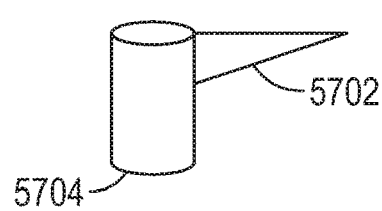
FIG. 57 is a side view of a position selector of a rotatable finger guide according to some embodiments.

FIGS. 55, 56, and 57 illustrate various components of the rotatable finger guide 5402 shown in FIG. 54. FIG. 55 shows an embodiment of the base 5500 of the rotatable finger guide 5402 that may be removably attached to the smartcard 104 or any other fingerprint sensor enabled device. For example, the base 5500 may be removably attached by clips, adhesive, or the like. The spinner base 5500 has an axle 5502 at its center, a base cut out 5504, and a spindle 5506 for an arm of a position selector. The base 5500 is secured to the smart card 104 with the base cut out 5504 aligned with the fingerprint sensor.

FIG. 56 shows a top portion 5600 of the rotatable finger guide 5402 according to some embodiments. The cut outs A, B, and C 5402A-C are formed in the top portion 5600. The top portion 5600 may include a number of position selector posts 5602A-C. The top portion 5600 may further include a center knob 5604 for rotating the top portion. Alternatively, in lieu of the knob 5604, the user could rotate the top portion, i.e., the spinner, 5600 by its outer peripheral edge.

FIG. 57 is a side view of a position selector 5702 of the rotatable finger guide 5402 according to some embodiments. In some embodiments, the position selector 5702 comprises a flexible arm 5704 projected radially from the spindle 5506 of the base 5500.

The top portion 5600 is mounted on the axle 5502 of the base 5500 so that the top portion 5600 can rotate about the axle 5502 when the user turns the knob 5604 or turns the top portion about its edge. The position selector arm 5704 is positioned so that the arm 5704 contacts the position selector posts 5602A-C of the top portion 5600 to thereby hold the top portion 5600 in a position aligning one of the cut outs A 5402A, B 5402B, C 5402C with the base cut out 5504 and the sensor. To rotate the top portion 5600 and re-position the guide 5402, the user applies torque to the top portion 5600 to overcome the resilience of the position selector arm and move the position selective post 5602A-C past the position selector arm 5704 and rotate the top portion 5600 to align the next cut out 5402A-C with the base cut out 5504 and the sensor.

In the illustrated embodiment shown in FIG. 56, the top portion 5600 includes three cut outs A 5402A, B 5402B, C 5402C that can be selectively aligned with the sensing surface 106 of the card's fingerprint sensor by rotating the top portion 5600, i.e., the spinner, with respect to the base 5500, and each cut out has a different finger guide channel 5306A-B configuration. For example, finger cut out A 5402A has a flat approach by which a finger placed thereon is generally parallel to the surface of the fingerprint sensor sensing surface. In some embodiments, cut out B 5402B includes a gentle ramp 5306A whereby a finger placed thereon is oriented at an elevation angle of, for example, 10-15° with respect to the sensing surface 106. A front stop may be provided adjacent the cut out on the opposite side from the ramp. Cut out C 5402C may have a steep ramp 5306B whereby the finger is oriented at an elevation angle of, for example, about 45° with respect to the sensing surface 106. A front stop may be provided adjacent the cut out on the opposite side from the ramp. In the illustrated embodiment shown in FIG. 56, a front stop 5606 is provided on the opposite side from the steep ramp 5306B. However, a front stop may also be provided on the opposite side from the gentle ramp 5306A in some embodiments.

In some embodiments, more than three cut outs may be provided in the rotatable finger guide 5402 each with different angles of finger guide channel raised sections (also referred to as ramps) and/or with different finger shaped channel walls.

Figure 58:
FIG. 58 shows a flowchart illustrating an embodiment of a method to enroll a biometric template.

FIG. 58 is a flowchart illustrating an embodiment of a simple, cost effective method 5800 to enroll a biometric template, such as a fingerprint template, on a device that has limited ability to provide feedback to the user, such as a smart card and using a power source (such as the power source described above in FIG. 9F) and separate finger guide (such as the finger guide described above in FIGS. 38-41), or alternatively using a power source with integrated finger guide (such as the power source with integrated finger guide described above in FIGS. 42-47).

In step S802, a fingerprint-enabled smart card is manufactured. The card provider may set the status of the smart card as inactive to prevent unauthorized use before the intended user can enroll a fingerprint template and contact the card provider to activate the card.

In step S804, the card provider provides the smart card and a low-cost, simple power source and a temporary finger guide to the user, e.g., sent by mail or courier or given out by a bank or retail outlet. The power source could be battery powered, powered by mains (e.g., via a USB connector), or solar powered. The finger guide may be separate to the power source, or integrated in the power source. In another embodiment, if the smart card contains an on-board power source, such as a solar cell, an external power source is not required.

In step S806, the user positions the finger guide around the sensing area of the fingerprint sensor. The smart card may be sent to the user with the finger guide already positioned around the sensor. The user then connects the smart card to the power source by, for example, inserting the card into a power source housing having contacts for connecting one or more power transmission contacts of the smart card to the power source without connecting any data transmission contacts of the smart card to a device configured to transmit data to or receive data from the card. Accordingly, in such embodiments, connecting the smart card to the power source does nothing but provide power to the electrical components of the smart card—e.g., LED, logic elements, sensor elements, etc. —and the power source is unable to transmit data to or from the smart card. In other embodiments, the finger guide may be used in conjunction with a power source including means for transmitting data to or from the smart card. If the finger guide and the power source are a single integrated device, then positioning the finger guide with respect to the fingerprint sensor and connecting the smart card to the power source comprise one single step of inserting the smart card or otherwise operatively coupling the smart card to the integrated device.

The smart card and the power source may be sent to the user with the smart card already inserted in the power source. In such embodiments, a battery connection tab is inserted between the power source and the smart card to keep a power connection disconnected. The user may pull out the battery connection tab to connect the power source to the smart card.

In step S808 one or more trigger events are detected that results in the fingerprint sensor being put into enrollment mode. An example trigger event may be based on the non-expiration of a timer or a counter. For example, the trigger event may be detecting that the timer or counter has not expired. In such embodiments, a user can enroll a biometric template within a certain time after the fingerprint sensor is put into enrollment mode. In other embodiments, the trigger event may be detecting that the age of the smart card is under a certain age limit which is tracked, for example, by the timer or the counter. The counter may be incremented each time a biometric template has been successfully enrolled or whenever the smart card was used. In such embodiments, the trigger event may be detecting that the counter has not exceeded a predetermined threshold (e.g., a predetermined number of biometric template enrollments or card uses).

Another example trigger event may include an occurrence of an error state. A software or hardware component error may occur during the enrollment. An error recovery procedure initiated in response to such software or hardware component error may be the trigger event. In such embodiments, the software or hardware component error would have to be a recoverable error (e.g., a minor error, a transient event or a glitch). Thus, detection of a recoverable error that precluded completion of the enrollment process would cause the sensor to enter enrollment mode. In such embodiments, a non-recoverable error occurring during the enrollment (e.g., a component on the card fails) would not initiate or constitute a trigger event.

Other example trigger events include detection of a flag set the last time the card was inserted in a card reader (for example a flag set when the card is inserted into a card reader that transmits data to or from the card and instructing the card to enter enrollment mode the next time the card is connected to power), lack of an enrolled fingerprint template on the card is detected, detecting that power has been provided to the card, or entry of a PIN code (e.g., via a data entry template coupled to the power source as described above). Still another trigger event may be detection that the card has been inserted into a power source that has connection to only power contacts on the card and no data transmission contacts. Other events, or combinations of events, may be trigger events. The trigger event may be detected by the fingerprint sensor, or by another component on the card (e.g., the secure element module) or may be detected as a result of the fingerprint sensor and another component on the card interacting, e.g., a handshake. If a component other than the fingerprint sensor detects the trigger event, that component may signal to the fingerprint sensor to enter enrollment mode.

The enrollment mode may be triggered, but the user may not complete the enrollment. That is, the fingerprint sensor may be in enrollment mode, but the user does not provide any input to the fingerprint sensor for the purpose of gathering sufficient acceptable images for a fingerprint template. In such embodiments, the fingerprint sensor may enter a power saving sleep mode, also referred to as a "wait on finger mode," to avoid draining the power source. For example, once the fingerprint sensor enters the enrollment mode and does not receive any input from the user for a predetermined period of time, the fingerprint sensor enters the power saving sleep mode and waits for a user touch to wake up and resume the enrollment process. In some embodiments, any acceptable images captured before the fingerprint sensor entered the power saving sleep mode are saved so that the enrollment process continues where the user had left off. In some embodiments, smart card components, such as the secure element module, may enter a sleep mode when the fingerprint sensor enters the power saving sleep mode. Similarly, the smart card components may wake up when the fingerprint sensor wakes up from the power saving sleep mode and resumes the enrollment process.

The card remains in enrollment mode until disconnected from the power source or until the enrollment is complete. If the card is disconnected from the power source before enrollment is complete, the process may move back to step S808, whereby an appropriate trigger event will result in the sensor being put back into enrollment mode, or alternatively the user may be required to take some action, such as contact the card provider or obtain a new card, to enable the card to be put into enrollment mode.

The card receives power from the power source, and a status indicator on the smart card (e.g., an LED) indicates to the user that the one or more power transmission contacts of the power source are connected to the power source (i.e., the card is powered), that the fingerprint sensor is in enrollment mode, and the smart card is ready for enrollment to start.

In step S810, the user can now start to enroll a fingerprint with the assistance of the finger guide. Step S810 is described in further detail in FIG. 59. The fingerprint is enrolled by storing a fingerprint template derived from one or more fingerprint images generated by placing a finger on the fingerprint sensor. The smart card must remain connected to the power source throughout the enrollment process. In the event the smart card is disconnected from the power source during the enrollment process, the enrollment mode in the fingerprint sensor is automatically deactivated. In some embodiments, reconnecting the smart card to the power source moves the process back to step S808, whereby an appropriate trigger event will result in the sensor being put back into enrollment mode. The enrollment process is complete when a sufficient fingerprint template is acquired and stored in the fingerprint sensor (e.g., as described in previously incorporated U.S. Pat. No. 9,684,813). Once the enrollment process is complete, enrollment mode in the fingerprint sensor is disabled permanently or alternatively, until a fresh trigger event occurs. In some embodiments, the status indicator provides an indication to the user when an image is acceptable, e.g., by an LED illuminating for a few seconds, and may indicate when an image is not acceptable, e.g., by the LED flashing several times. The status indicator may indicate to the user when sufficient acceptable images have been gathered for the fingerprint template and confirm that the enrolling step is successfully complete, e.g., by the LED illuminating for longer period, such as 10 or more seconds. In some embodiments, more than one LED may flash different colors to communicate the various indications described above. A flexible display such as an OLED panel may be used to provide textual feedback during the enrollment process.

In step S812, the user removes the smart card from the power source, thereby disconnecting the one or more power transmission contacts of the smart card from the power source, and the power source may be discarded. The user may also now remove the finger guide (if it is not integrated in the power source) and may dispose of it.

If the card provider set the status of the card as inactive at step S802, then the user must activate the card before attempting to use it. In step S814, the user contacts the card provider (e.g., by phone, app, internet, etc.) to activate the smart card. The user must provide acceptable user verification details to the card provider in order to activate the smart card. If the user is verified, the card provider sets the card status as active in their systems. The user is now able to use the card in the normal way to pay for items, but now requiring fingerprint verification in order to use the smart card. If the user is not verified, the card remains inactive and cannot be used.

Figure 59:
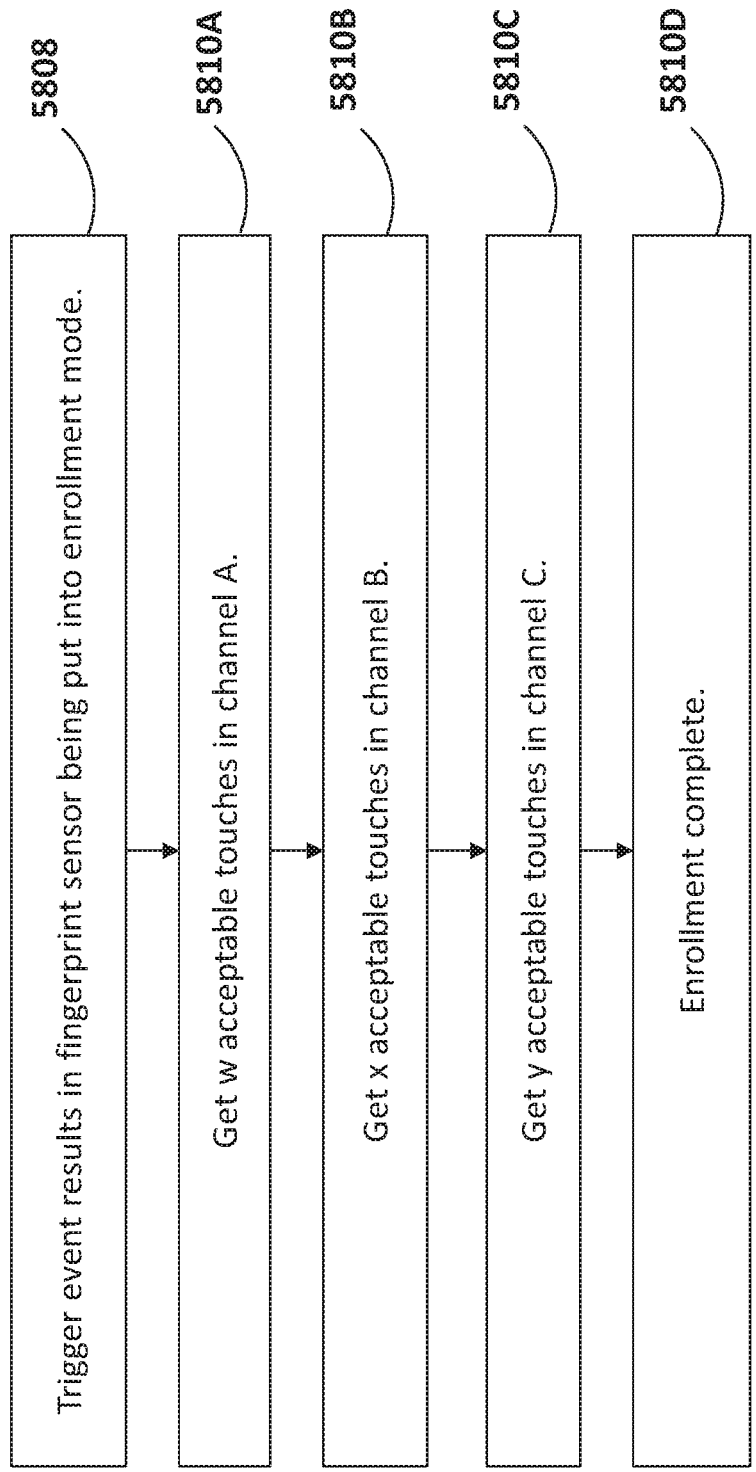
FIG. 59 shows a flow chart further illustrating the embodiment of the method to enroll the biometric template shown in FIG. 48.

As discussed above, in step S810 of FIG. 58, the user enrolls their finger on the host device with the assistance of the finger guide. FIG. 59 breaks down step S810 of FIG. 58 as a method 5900 to provide more detail as to how the finger guide assists in the enrollment process.

As described above, in step S808, a trigger event puts the fingerprint sensor into enrollment mode. Once the fingerprint sensor is put into enrollment mode, the process may begin method 5900 with step S810A according to some embodiments. In step S810A, the user puts their finger in channel A of the finger guide and touches the sensing area of the fingerprint sensor. The sensor captures an image of the finger and optionally signals to the user if the captured image is acceptable via a status indicator. The user repeatedly lifts and touches the sensor with the same finger via channel A until a total of w acceptable images (touches) have been captured, where w may range between 1-5, for example, 2. The user may lift and touch the sensor with the same finger any number of times before the total of w acceptable images (touches) have been captured and move on to step S810B or step S810C before returning to step S810A to complete the total of w acceptable images.

In step S810B, the user puts the same finger in channel B of the finger guide and touches the sensing area of the fingerprint sensor. The sensor captures an image of the finger and optionally signals to the user if the captured image is acceptable via a status indicator. The user repeatedly lifts and touches the sensor with the same finger via channel B until a total of x acceptable images have been captured, where x may range between 1-5, for example 2. The user may lift and touch the sensor with the same finger any number of times before the total of x acceptable images (touches) have been captured and move on to step S810A or step S810C before returning to step S810B to complete the total of x acceptable images.

In step S810C, the user puts the same finger in channel C and touches the sensing area of the fingerprint sensor. The sensor captures an image of the finger and optionally signals to the user if the captured image is acceptable via a status indicator. The user repeatedly lifts and touches the sensor with the same finger via channel C until a total of y acceptable images have been captured, where y may range between 1-5, for example, 2. The user may lift and touch the sensor with the same finger any number of times before the total of y acceptable images (touches) have been captured and move on to step S810A or step S810B before returning to step S810C to complete the total of y acceptable images.

In step S810D, the enrollment is complete and the process continues to step S812 described earlier.

Steps S810A-C may be carried out in any order. For example, the method 5900 may begin with any one of steps S810A-C.

In some embodiments, the total number of acceptable images (touches) that need to be captured for a sufficient fingerprint template may be the sum of x+y+z. In such embodiments, the user may put the same finger in one channel, for example channel A, B, or C, of the finger guide and repeatedly lift and touch the sensor with the same finger via the same channel until the total number of acceptable images, e.g., x+y+z, are captured. For example, if the method 5900 had begun with step S810B, the user may repeatedly lift and touch the sensor with the same finger via channel B until the total number of acceptable images are captured. Once the total number of acceptable images is reached in step S810B, enrollment is complete and the process continues to step S812.

The finger guide may comprise one or more status indicators, such as LEDs, and a controlling processor coupled to the one or more status indicators and configured to assist the user during the enrollment process described in method 5900. The one or more status indicators may provide an indication to the user regarding which channel of the finger guide to put the same finger in. Referring to the finger guide (such as the finger guide described above in FIGS. 38-41), or alternatively the power source with integrated finger guide (such as the power source with integrated finger guide described above in FIGS. 42-47), each of the finger guide's channels may comprise one or more status indicators. Accordingly, the controlling processor may be configured to indicate to the user through the one or more status indicators on each channel which channel the user should put the same finger in. For example, one or more status indicators on a C-channel wing may indicate to the user to place the same finger in the C-channel. As a further example, after the user places the same finger in the C-channel, one or more status indicators on a B-channel wing may indicate to the user to subsequently place the same finger in the B-channel. In this way, the controlling processor may guide the user through the enrollment process by indicating which channels of the finger guide to place the same finger in.

In some embodiments, capacitive strips may be implemented around the edges of each side of the sensing area corresponding to each channel. For example, a capacitive strip may be placed around an edge of the sensing area corresponding to channel A. Similarly, a capacitive strip may be placed around the remaining two edges of the sensing area corresponding to channel B and channel C. In such embodiments, the fingerprint sensor may be configured to recognize that the user has placed a finger in a certain channel when the finger contacts, or comes within a close proximity to, the corresponding capacitive strip. For example, the fingerprint sensor may recognize that the user has placed a finger in the C-channel when the finger contacts, or comes within a close proximity to, the capacitive strip placed around the edge of the sensing area corresponding to channel C.

In an alternative embodiment, such capacitive strips may be implemented in each side of the finger guide's cutout corresponding to each channel. For example, a capacitive strip may be located on a bottom surface of a side of the cutout corresponding to channel A. Similarly, a capacitive strip may be located on a bottom surface of the remaining two sides of the cutout corresponding to channel B and channel C. In such embodiments, each capacitive strip may slightly overlap with a corresponding edge of the sensing area when finger guide is placed over the fingerprint sensor such that the cutout exposes the sensing area. Accordingly, the fingerprint sensor may be configured to recognize that the user has placed a finger in a certain channel when the finger contacts, or comes within a close proximity to, the corresponding capacitive strip. For example, the fingerprint sensor may recognize that the user has placed a finger in the C-channel when the finger contacts, or comes within a close proximity to, to the capacitive strip located on the bottom surface of a side of the cutout corresponding to channel C.

In some embodiments, the finger guide may have only a single channel. Accordingly, the method 5900 of FIG. 59 may include just step S810A. In such embodiments, the process continues to step S812 after step S810A.

The finger guide may have only two channels. Accordingly, the method 5900 of FIG. 59 may include just two step, e.g., step S810A and step S810B. In such embodiments, the process continues to step S812 after step S810B.

The finger guide may be removed after step S810C and the user may then touch the sensing area of the fingerprint sensor with the same finger with no guide present. In such embodiments, the method 5900 may include an additional step, in which the sensor captures an image of the finger and optionally signals to the user if the captured image is acceptable via a status indicator. The user repeatedly lifts and touches the sensor with the same finger until a total of z acceptable images have been captured, where z may range between 1-5, for example 2. The process then continues to step 4812.

The process described in the method 5900 of FIG. 59 is easily extended if the finger guide has more than three channels.

The sensitivity of a fingerprint sensor's performance to a poor enrollment is governed to some extent by the way that the biometric matching algorithm, running in conjunction with that particular sensor hardware, is designed to operate. For example, some biometric algorithms perform matching by minutiae matching, while others employ ridge flow analysis. Fingerprint templates may be created in different ways, such as stitching, or image filtering and sorting. Some biometric algorithms are agnostic to the rotation of the finger with relation to the orientation of the sensor while others are not. It is beneficial if fingerprint sensor device manufacturer understands how fingerprint templates are generated and how its matching algorithms operate. This information, taken with knowledge of how the end user holds and operates the device in everyday use, allows the identification of parts of the finger pad, including peripheral portions, that should be enrolled in order to see reliable user verification in all use cases, when a particular sensor design is running a particular biometric algorithm.

For some fingerprint sensor and biometric algorithm combinations, one way to maximize coverage of the minutiae-rich longitudinal segment is to use a finger guide with three channels, where channel A is offset from channel C by −m degrees and channel B is offset from channel C by +n degrees, assuming the center of channel C aligns with the center of the sensing area of the fingerprint sensor, measured in the same plane as the plane of the sensing area of the fingerprint sensor. «m» and «n» are in the range 0-180 degrees and in some embodiments, m and n are 90 degrees, although it is not necessary that m and n are equal.

In addition, when viewed in cross-section, channel C is elevated from the plane of the sensing area of the fingerprint sensor (and hence the plane of channels A and B) by and elevation angle of +p degrees, assuming the center of channel C aligns with the center of the sensing area of the fingerprint sensor, measured in cross section to the plane of the sensing area of the fingerprint sensor. The elevation angle «p» is in the range 0-90 degrees and in various embodiments, p is between 15 and 45 degrees.

Figure 60C:
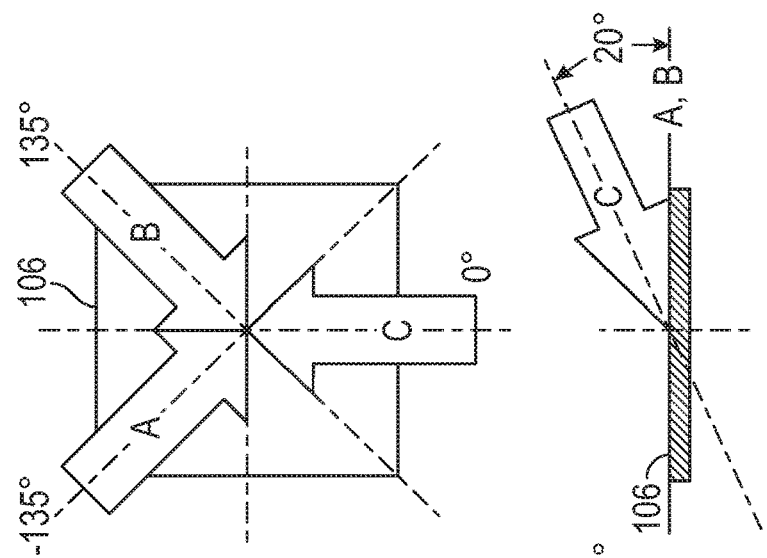
FIGS. 60A, 60B, 60C, 60D show schematic illustrations of various embodiments of angled channels.
Figure 60B:
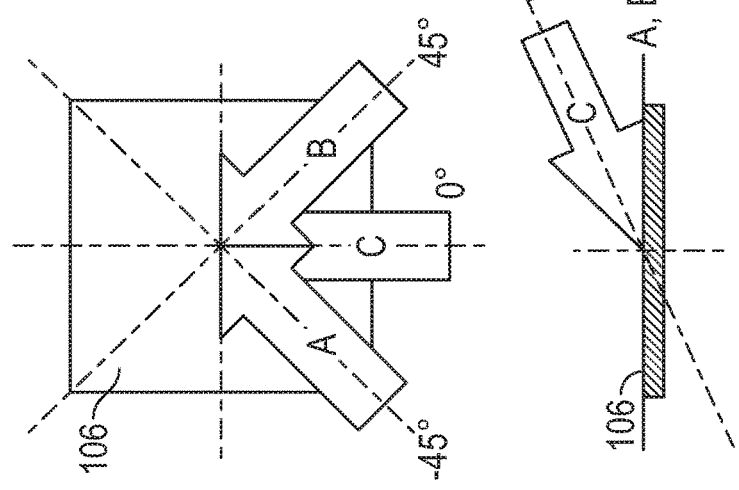
Figure 60A:
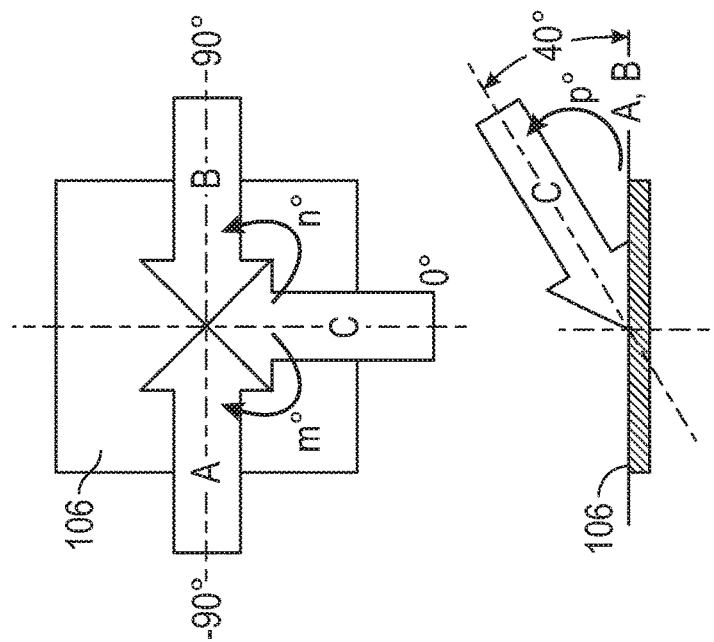
Figure 60D:
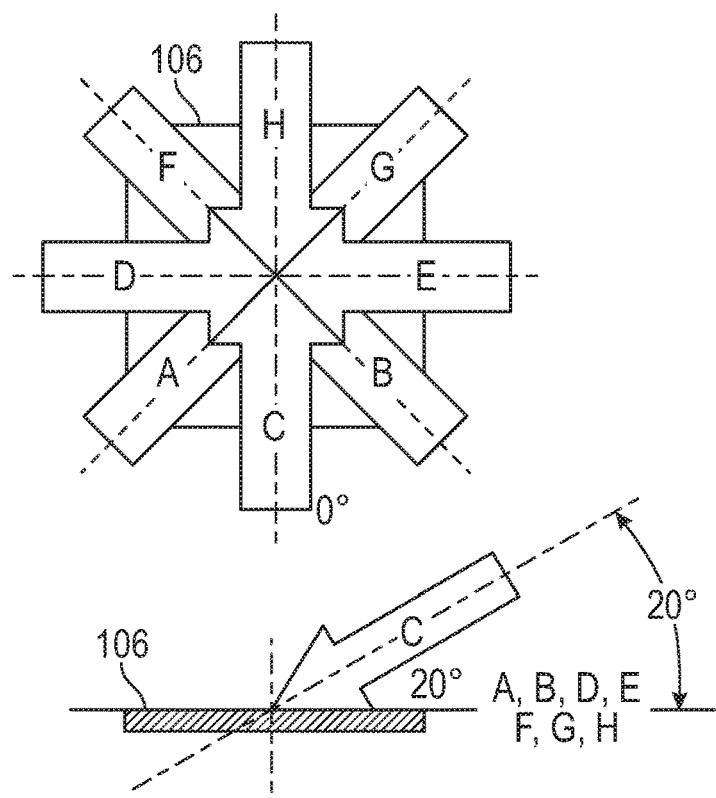

Various embodiments of angled channels are shown in FIGS. 60A-60D. In the embodiment shown in FIG. 60A, channel A is offset from channel C by −90 degrees and channel B is offset from channel C by +90 degrees, while the center of channel C aligns with the center of the sensing area 106 of the fingerprint sensor. As shown in FIG. 60A, channel C is elevated from the plane of the sensing area 106 by the elevation angle of +40 degrees. In the embodiment shown in FIG. 60B, channel A is offset from channel C by −45 degrees and channel B is offset from channel C by +45 degrees, while the center of channel C aligns with the center of the sensing area 106 of the fingerprint sensor. As shown in FIG. 60B, channel C is elevated from the plane of the sensing area 106 by the elevation angle of +20 degrees. In the embodiment shown in FIG. 60C, channel A is offset from channel C by −135 degrees and channel B is offset from channel C by +135 degrees, while the center of channel C aligns with the center of the sensing area 106 of the fingerprint sensor. As shown in FIG. 60C, channel C is elevated from the plane of the sensing area 106 by the elevation angle of +20 degrees. In some embodiments, the biometric algorithm is agnostic to rotation. In such embodiments, FIGS. 60B and 60C will produce similar images. FIG. 60D shows an example of a finger guide configuration with eight channels, seven of which lie in the same plane as the fingerprint sensing area 106 and one of which, i.e., channel C, is angled via the raised section to tip the finger onto the sensing area. In an alternative embodiment described above in FIGS. 48A and 48B, more than one channel may be angled by using more than one raised section on the base plate to tip the finger in different orientations on the sensing area.

Figure 61A:
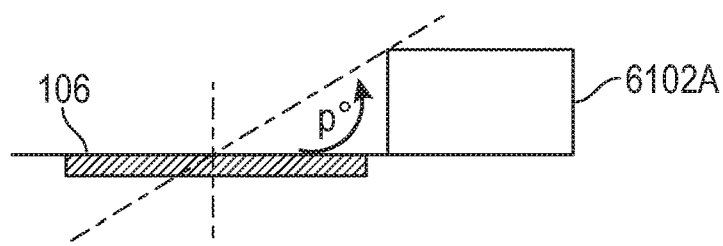
FIGS. 61A, 61B, 61C show example profiles in cross-section of a raised section of a finger guide to illustrate how an elevation angle is achieved when the finger is tipped up by hitting the highest edge of the raised section nearest the sensing area according to some embodiments.
Figure 61B:
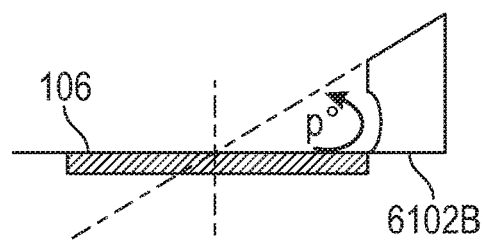
Figure 61C:
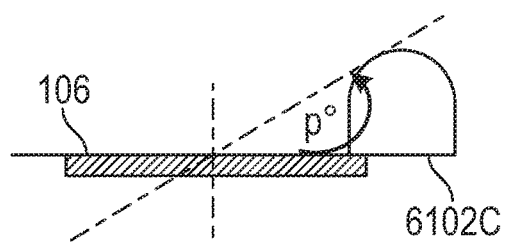

FIGS. 61A-61C show example profiles in cross-section of the raised section and illustrate how angle p of channel C is achieved when the finger is tipped up by hitting the highest edge of the raised section nearest the sensing area 106. As shown in FIGS. 61A-61C, various regular and irregular shapes of the raised section are possible and these figures show only a few examples. The raised section may be aligned with the edge of the fingerprint sensor, or may be set back from the edge of the sensor. In FIG. 61A, the raised section 6102A is set back from an edge of the sensing area 106. In FIG. 61B, an edge of the raised section 6102B forms a curved shape of the channel wall. In FIG. 61C, the raised section is set at an edge of the sensing area 106.

Figure 62A:
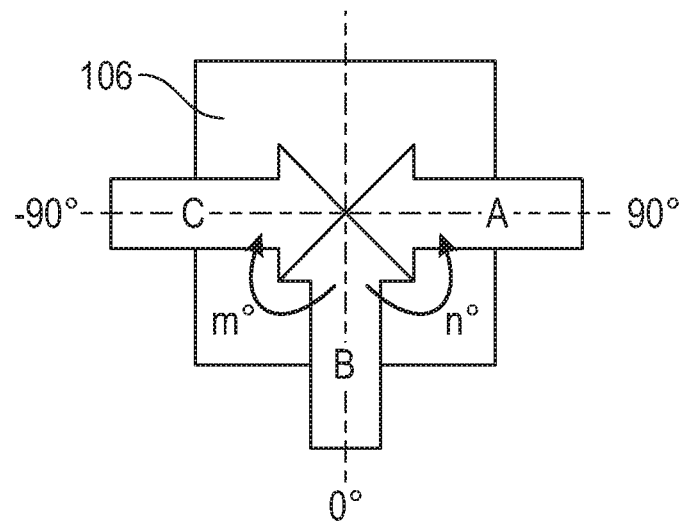
FIGS. 62A, 62B, and 62C show schematic illustrations of finger contact with a fingerprint sensor using the fingerprint guide of FIGS. 48A and 48B according to some embodiments.
Figure 62B:
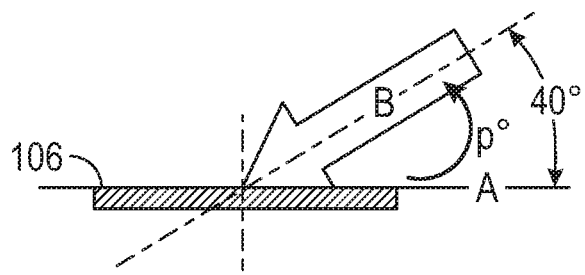
Figure 62C:
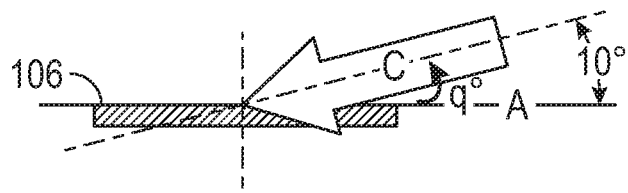

FIGS. 62A, 62B, 62C schematically represent finger contact with a fingerprint sensor using the fingerprint guide of FIGS. 48A and 48B according to some embodiments. FIG. 62A shows a top plan view of finger contact with the sensing area 106, where the finger position is represented by arrows A, B, and C. As shown in FIG. 62A, finger positions A and B are separated by n degrees (e.g., 90 degrees), and finger positions B and C are separated by m degrees (e.g., 90 degrees). FIG. 62B shows a side view of a finger contacting the sensing area 106 while positioned on channel B, whereby the finger is oriented at an elevation angle of p degrees (e.g., about 45 degrees). FIG. 62C shows a side view of a finger contacting the sensing area while positioned on channel C, whereby the finger is oriented at an elevation angle of q degrees (e.g., about 10-15 degrees).

Figure 63:
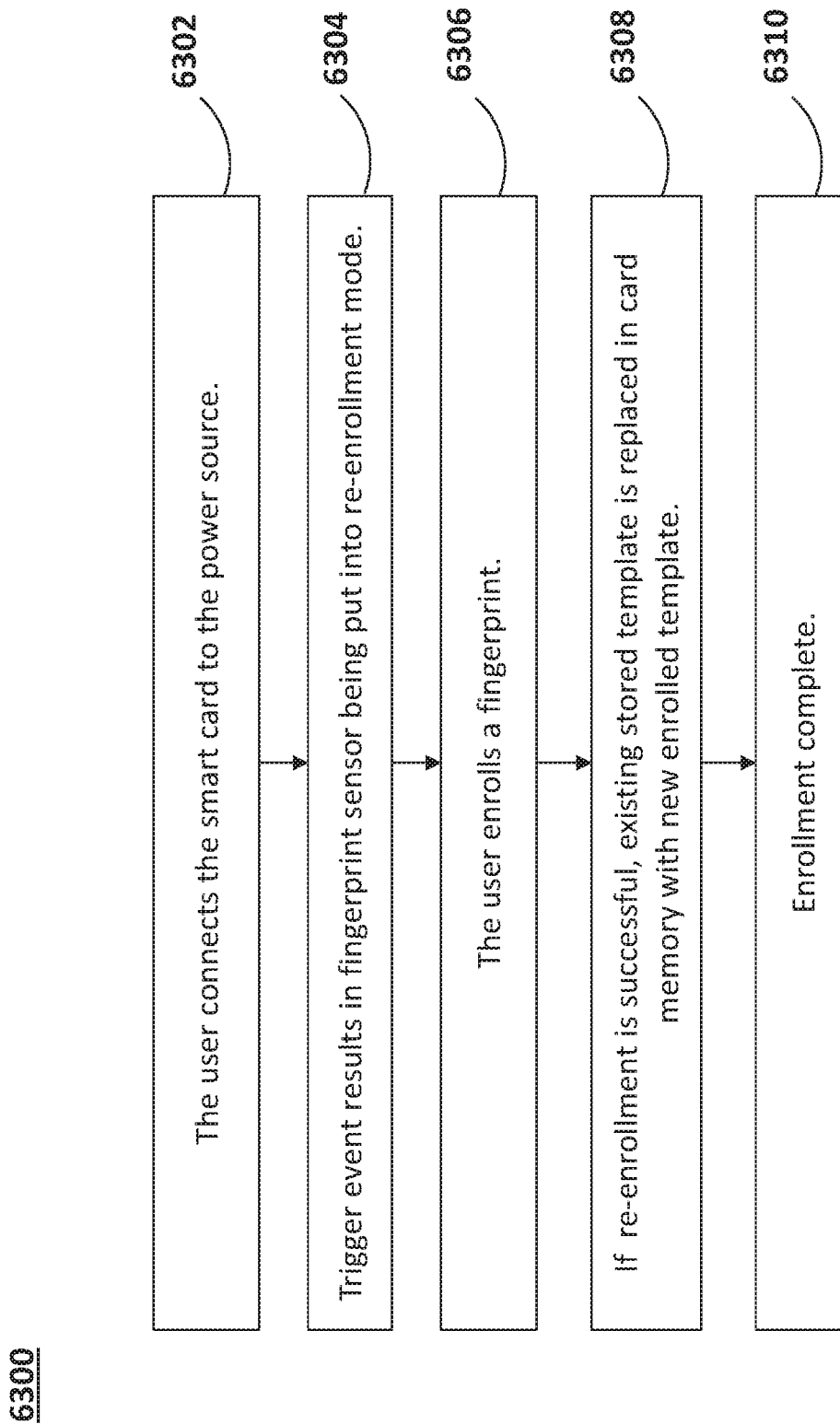
FIG. 63 shows a flow chart illustrating an embodiment of a process to re-enroll a biometric sensor, such as a fingerprint sensor, based on a trigger event the causes the sensor to go into re-enrollment mode.

FIG. 63 is a flow chart showing a process 6300 to re-enroll a biometric sensor, such as a fingerprint sensor, based on a trigger event that causes the sensor to go into re-enrollment mode. A process for initially enrolling a biometric such as a fingerprint whereby a trigger event causes the sensor, such as a fingerprint sensor, to enter the enrollment mode is described above and shown in FIG. 23B. Re-enrollment may be necessary where the initial enrollment was unsuccessful or was only partially successful, resulting in an biometric template incapable of providing reliable verification. A card provider may prohibit re-enrollment entirely for security reasons.

In step 6302 of process 6300, the user connects the biometric sensor-enabled device, such as a fingerprint sensor enabled smart card, for which a biometric template has already been enrolled or an enrollment has been attempted, to a power source, including any of the power sources described above (with or without a finger guide). In step 6304, a trigger event results in the sensor being put into re-enrollment mode. Exemplary trigger events for re-enrollment at step 6304 may include inserting the card into power source, detecting a specific instance of connecting the card to the power source (e.g., second, third, etc. connection of the smart card to the power source), detection of an existing biometric template already enrolled, detection of certain card inserted into a certain power source (i.e., a known pair), a user is verified by matching finger against existing biometric template, entry of an activation code (i.e., PIN code) (e.g., via a data input template coupled to the power source as described above), a signal from the secure element module or other component of the card, counter of number of uses below a certain threshold (i.e., the user is not permitted to re-enroll if card is not new, or relatively new), age of card below a certain threshold (e.g., memory on card stores a timestamp of when the card was first used in a PoS and a timestamp of when the card was last used and if the difference between the timestamps is less than a certain threshold, re-enrollment is triggered), maximum number of allowable re-enrollments not yet reached, user interactions with the sensor, placing or removing an overlay on the biometric sensor, placing or removing a data input device in the form of an overlay or a sleeve on the biometric sensor, activation of an input mechanism, or any combination of the above. Instead of using a power source, a card provider may trigger re-enrollment if the card is placed in secure terminal, e.g., ATM, PoS or bank terminal. A user ID could then be verified via fingerprint and/or activation code (PIN) or other ID forms as a trigger for re-enrollment.

In step 6306, the user enrolls a fingerprint, e.g., in accordance with any of the enrollment procedures described above.

In step 6308, if the re-enrollment is successful, the existing stored biometric template is replaced in the memory of the host device with a new enrolled biometric template. If the re-enrollment is unsuccessful, then no new biometric template is stored, and the existing biometric template stored in the memory of the host device is retained. Alternatively, in step 6308, if the re-enrollment is successful, the existing biometric template is modified based on the biometric images acquired during the re-enrollment procedure. For example, the existing biometric template could be enhanced or augmented with additional images, rather than replacing it completely. As part of the process for enhancing or augmenting an existing biometric template, a requirement could be set that new images can only be enrolled to the existing biometric template if they are similar to existing biometric template images (also referred to as a limited form of "dynamic" enrollment.).

In step 6310, the user may remove the smart card from the power source after enrollment of the fingerprint.

Figure 64:
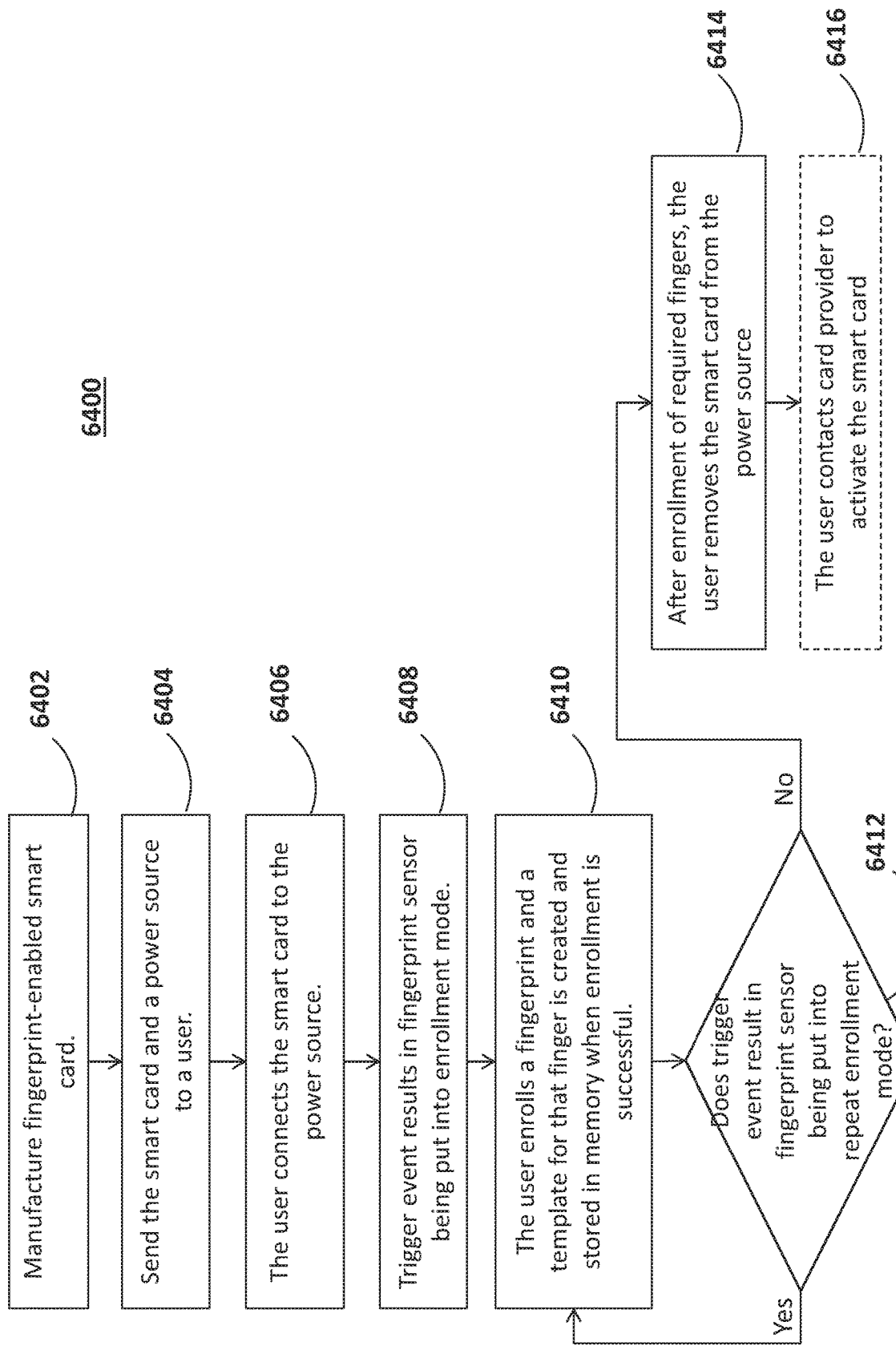
FIG. 64 shows a flow chart illustrating an embodiment of a process for enrolling a fingerprint template in a fingerprint sensor-enabled smart card, whereby after an enrollment process, determination is made as to whether a repeat enrollment procedure should be performed for a different finger.

In some instances, it may be necessary or desirable to enroll a biometric template for each of more than two fingers. FIG. 64 shows a flow chart illustrating a process 6400 for enrolling a biometric template in a biometric sensor-enabled host device, such as enrolling a fingerprint template in a fingerprint sensor-enabled smart card, whereby after an enrollment process, determination is made as to whether a repeat enrollment procedure should be performed for a different finger. In step 6402, a fingerprint-enabled smart card is manufactured, and optionally, the manufacturer sets the status of the smartcard as inactive. In step 6404, the smart card and a power source, e.g., a temporary and removable power source (with or without a finger guide) as described above, is sent to the user. In step 6406, the user connects the smartcard to the power source. In step 6408, a trigger event causes the fingerprint sensor to be put into an enrollment mode for a first finger. Exemplary trigger events may include events such as those described above, for example in connection with the process shown in FIG. 23B. In step 6410, the user enrolls a fingerprint and if the enrollment is successful, a fingerprint template is created for that finger in the memory of the host device. In step 6412, a trigger event occurs to determine whether the fingerprint sensor should be put into a repeat enrollment mode for another finger. Trigger event for repeat enrollment at step 6412 could be: a signal from the secure element or other component of the smartcard, detection that the card remains in power source for more than a predetermined number of seconds after last fingerprint template was successfully enrolled, detection of that a number of existing fingerprint templates already enrolled has not yet reached maximum, data entry from user (e.g., the user may hold down an enrolled finger for a long hold on sensor or double tap on sensor, activation code entry), placing or removing an overlay on the sensor, placing or removing a data input device in the form of an overlay or a sleeve on the sensor, activating an input mechanism or any combination of the above. If it is determined at step 6412 that the sensor should be put into a repeat enrollment mode, the sensor returns to step 6410. If the trigger event does not occur such that the sensor is not put into a repeat enrollment mode, at step 6414, after enrollment of the required fingers, the user removes the smart card from the power source. In an optional step 6416, the user contacts the smartcard provider to activate the smartcard.

Status Indicators on a Power Source

A power source may comprise two or more status indicators (also referred to as indicator elements in the current disclosure). The power source may comprise a receptacle, with or without a finger guide, or the power source may comprise a temporary overlay including a power element, with or without a finger guide.

The power source is used only for temporarily providing power to the biometric sensor of the smart card, or other biometric-enabled device, to facilitate enrollment of a biometric verification template. In various embodiments, the power source is not able, and includes no components that would enable the power source, to communicate data to or from any external device other than, in certain embodiments, detecting a status signal from a smart card so that a status indicator may be presented to the user, but without transmitting such signal to any other external device. To thereafter use the biometric sensor for user verification, for example to enable a fingerprint sensor in a smart card to be used for user verification to permit transactions to be completed with the smart card, the smartcard, or other biometric-enabled device, must be uncoupled from the temporary power source and thereafter coupled to an external receiving device capable of transmitting and/or receiving communications (e.g., a point of sale card reader), between the biometric enabled device and the external receiving device.

The power source does not provide any capability to transmit data to an external device nor does the power source receive any data from an external device. As such, communication between the power source and any external device is prevented. For example, if the power element of a power source is a socket and the socket is plugged into a main power, the socket is used for power transmission only and power line communication protocols are not used. In addition, the power source does not provide any means to input a biometric template to the smart card or receive a stored biometric template (or a copy of a biometric template) from the smart card.

Figure 65:
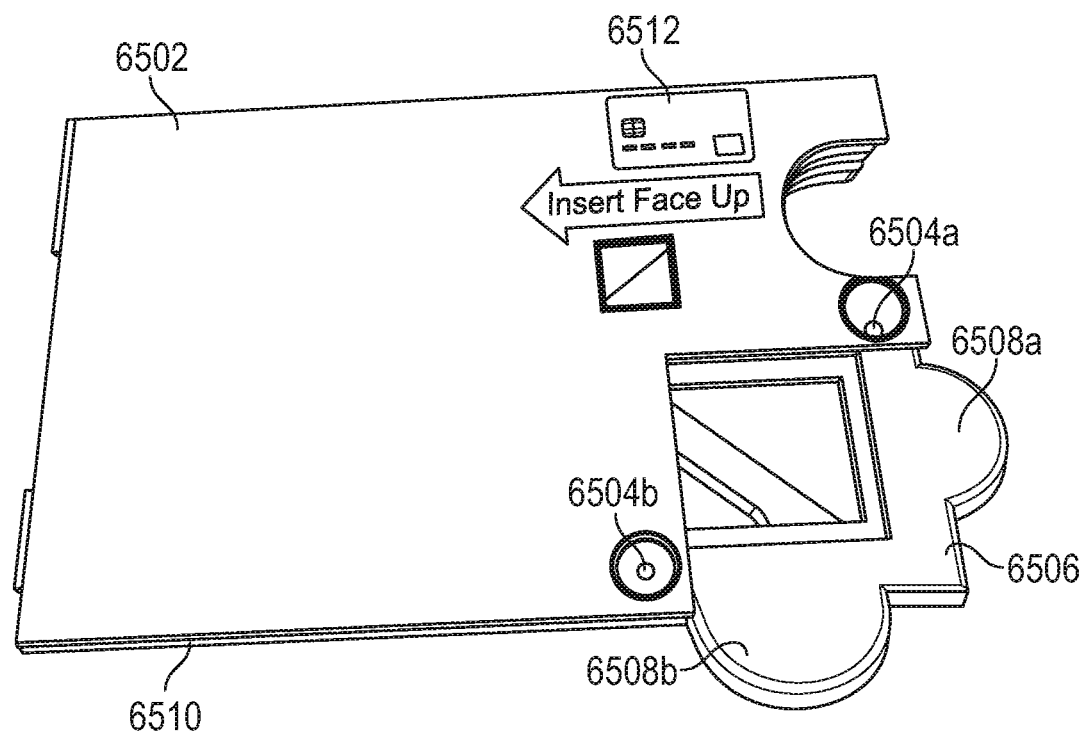
FIG. 65 shows a top perspective view of a power source according to one embodiment.
Figure 66:
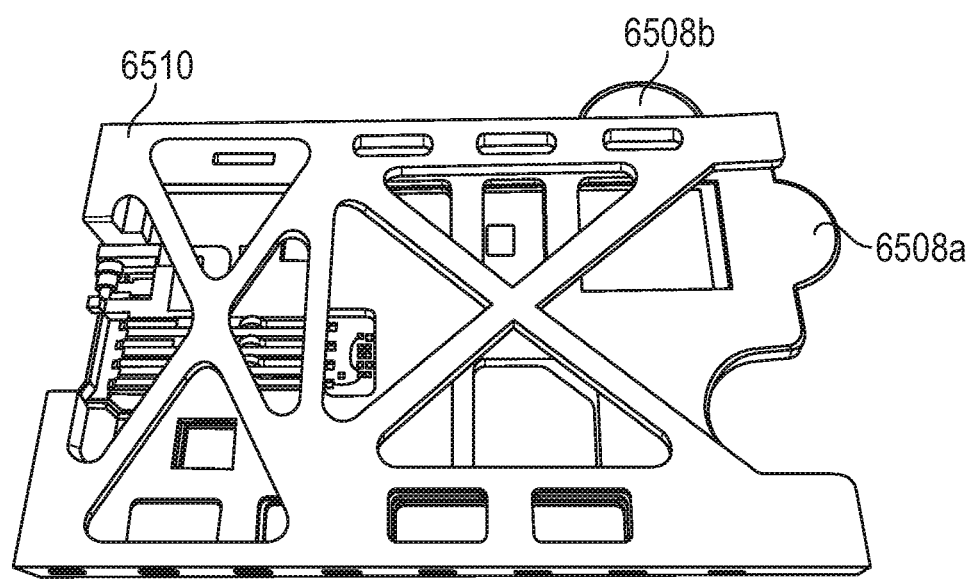
FIG. 66 shows a bottom perspective view of a power source according to one embodiment.

In some embodiments, status indicators comprise LEDs, audio speaker, vibrators, a display, or any combination of the aforementioned. The status indicators may use flashing lights (slow/fast), solid lights (on/off), colored lights, images, text, images, audible tones, vibrations, among others, and/or any combination of the aforementioned, to convey information regarding an enrollment process as shown, for example, in Table 1 below and FIGS. 69 and 74. The status indicators may use flashing lights (slow/fast), solid lights (on/off), colored lights (including lights capable of displaying in two or more colors), images, text, images, audible tones, vibrations, among others, and/or any combination of the aforementioned, to instruct a user to place a finger on a fingerprint sensor in a certain direction/position at the appropriate time. The status indicators may convey information regarding the status of the enrollment process to the user while instructing the user to place a finger on a fingerprint sensor in a certain direction/position at the appropriate time FIGS. 65-66 illustrate a device to facilitate enrollment of a verification template of fingerprint data in the form of a power source 6502 comprising two or more status indicators 6504*a-b*. In some embodiments, the power source 6502 comprises a receptacle 6510 configured to be removably coupled to a smart card, and the smart card is coupled to the power source 6502 by inserting the smart card into the receptacle 6510 in the direction indicated by printed instructions 6512 included on a surface of the power source 6502. The printed instructions 6512 included on the surface of the power source 6502 may guide the user as to how to couple and/or decouple the smart card to the power source 6502. For example, the printed instructions 6512 may comprise text, arrows, and diagrams. In some embodiments, the printed instructions 6512 instruct the user how to enroll their finger and/or inform the user regarding the function of the status indicators.

Figure 67:
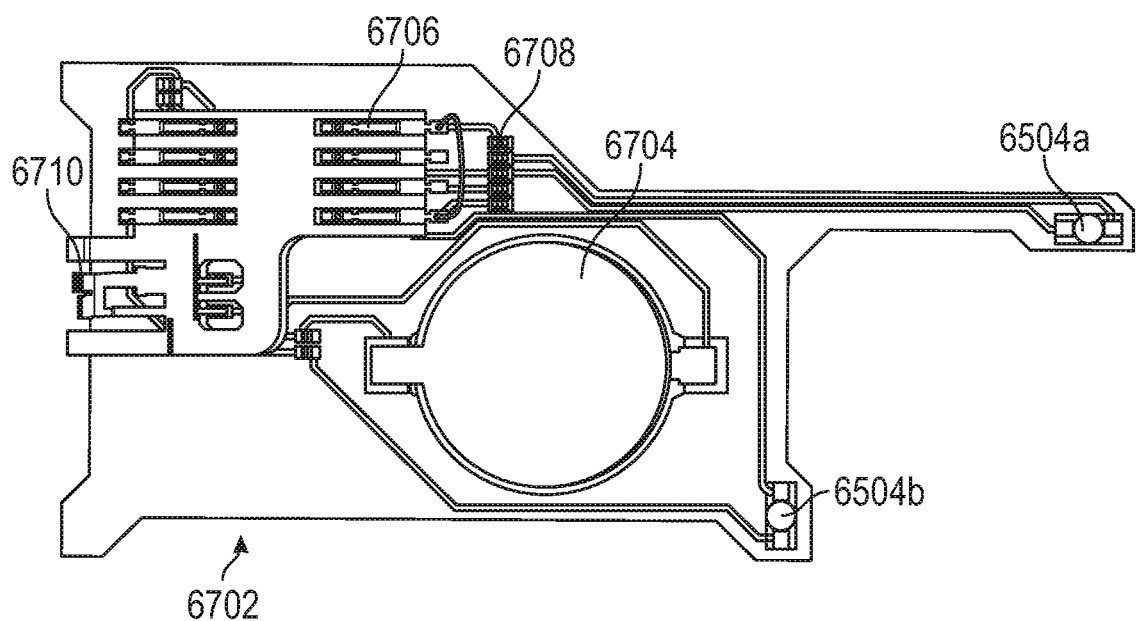
FIG. 67 shows a top view of one or more components of a power source according to one embodiment.
Figure 68:
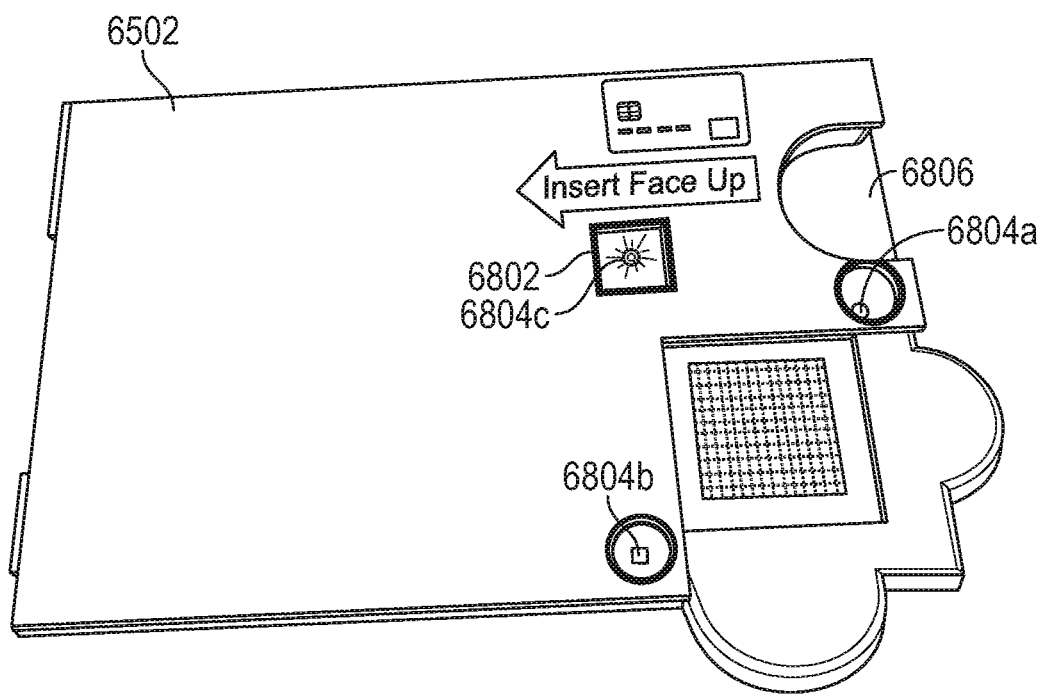
FIG. 68 shows a power source and a smart card according to one embodiment.

In some embodiments the receptacle 6510 comprises an injection molded plastic frame, a covering layer of artwork and instructions, a PCB 6702, contact pins 6706, a signal detection circuit 6708, and/or support for the power element 6704, as shown, for example, in FIGS. 67-68. The power source 6502 is designed for ease of volume manufacture, low cost and is preferably small and lightweight so that the power source 6502 may be readily transmitted to a user by mail or post. The injection molded plastic frame may be molded as a single piece of plastic and is manufactured with conventional molding tools. The PCB 6702 and the power element 6704 are attached to the injection molded plastic frame. The status indicators 6504*a-b* may be mounted on the PCB 6702, as shown in FIG. 67. The power source includes the power element 6704 which powers the status indicators 6504*a-b*. The power element 6704 may be a battery, a solar cell and/or a plug or outlet for connecting to a main power. The PCB 6702 may comprise contact pins 6706 connected to the power element 6704 and the signal detection circuit 6708 and the status indicators 6504*a-b*. In such embodiments, the contact pins 6706 make contact with power contact pads of the smart card when the smart card is coupled to the power source 6502, thereby providing power to the smart card.

In some embodiments, the status indicators 6504*a-b* and the signal detection circuit 6708 on the power source are connected to contact pads on the surface of smart card. In such embodiments, the signal detection circuit 6708 may detect a signal from the SE of the smart card regarding a status of the enrollment process. The signal detection circuit 6708 may then signal one or more of the status indicators 6504*a-b* based on the detected status of the enrollment process. The signal detection circuit is open when a smart card is not coupled to the power source and the signal detection circuit is closed when the smart card is coupled to the power source in order to prevent the status indicators from draining the power element. The signal detection circuit may be configured to be open and closed based on the presence of the smart card by using a mechanical switch 6710 which moves when the smart card is coupled to the power source.

The signal detection circuit may comprise a voltage comparator configured to detect whether the available voltage of the power element 6704 is below a threshold indicating that the available voltage is not sufficient to power the enrollment process. As described in further detail below, if the voltage is too low, one or more status indicators 6504*a-b* may convey this to the user and/or this state may be signaled to the smart card.

As shown in FIG. 65, a finger guide 6506 is attached to the receptacle 6510 according to some embodiments. The finger guide 6506 may include two finger guide channels (such as any of the finger guide channels described herein): a first finger guide channel 6508*a* and a second finger guide channel 6508*b*. This is not required, however, and the finger guide 6506 may include fewer or more finger guide channels. In some embodiments, a first status indicator 6504*a*, for example a green LED, is associated with the first finger guide channel 6508*a* and a second status indicator 6504*b* is associated with the second finger guide channel 6508*b*. During enrollment, the status indicators 6504*a-b* instructs the user to place their finger in the direction of the associated finger guide channel in order to capture an image of the finger. The user relies on the status indicators 6504*a-b* to know when and where to apply their finger. The status indicators 6504*a-b* may be used to indicate to the user that enrollment is successful and/or complete.

As disclosed herein, the user may apply their finger on each finger guide channel alternately for optimal enrolment. For example, if six images are to be captured with a two-channel finger guide 6506, the user first goes to position A (e.g., apply a finger in the direction of the first finger guide channel 6508*a*), then position B (e.g., apply the finger in the direction of the second finger guide channel 6508*b*), then position A, then position B, then position A, and then position B. Applying a finger alternately on each channel increases finger movement and increases the likelihood of gathering a sufficient number of different images, thereby providing a high quality template. This exemplary sequence is not required, however, and any sequence of the channel finger guides is possible in alternative embodiments.

After enrolling one finger, the user may be permitted to enroll one or more additional fingers according to some embodiments. In such embodiments, a status indicator may signal to the user that the user start enrolling a new finger. As described above, the status indicators associated with each respective channel finger guide instructs and guides the user during enrollment of each new finger.

In the context of the present disclosure, a status indicator is "associated" with a finger guide channel if the status indicator and the finger guide channel are constructed and arranged such that there is a one to one correspondence, actual or perceived, between the status indicator and the finger guide channel. For example, and without intending to be limiting, a status indicator may be associated with a finger guide channel by instructional text and/or graphic elements or audible instructions or other signals informing a user that a particular status indicator is associated with a particular finger guide channel, by spatial proximity between the status indicator and the associated finger guide channel, or by physical integration of the status indicator into the associated finger guide channel.

As another example, the association between a status indicator and finger guide channel maybe a matter of user perception and may not be the same from one user to the next. For example, for enrolling a fingerprint verification template for a fingerprint-enabled smart card using a temporary power source with status indicators, such as LEDs, associated with different finger guide channels on the power source, users tend to hold the card receptacle of the power source in landscape orientation (i.e., the long dimension of the rectangular card is oriented substantially horizontally) because the user can then read the artwork (text and/or graphic elements) on the receptacle, assuming the artwork is also printed in landscape orientation which is the customary (but not exclusive) orientation for bank cards, bank notes and check books. With the receptacle and card thus oriented, one LED on the receptacle is disposed above the other. That is, the user perceives an "upper" LED and a "lower" LED. Accordingly, the first LED to light up may be the upper LED. Assuming a user is first instructed to place a finger on the fingerprint sensor in the direction of the first finger guide channel 6508a, when enrolling a right thumb print, it is natural to approach the card from the right-hand side, i.e., to place the thumb in the "correct" finger guide channel (i.e., the finger guide channel 6508a next to the active upper LED). However, to enroll a left thumb print, a left-handed user would have to turn the receptacle by ninety degrees straight away for the very first thumb touch to be in the "correct," or intended, finger guide channel 6508a. This may feel odd to a new user, and thus, the left-handed user may intuitively put his thumb in the "wrong," or unintended, finger guide channel (i.e., the finger guide channel 6508b nearest to the lower LED which was not lit). A left-handed user trying to enroll a finger may follow the LED lights and alternately hop between the two finger guide channels as desired, but, because of his natural angle of approach, he may consistently place his finger in the "wrong" finger guide channel compared to where the active LED is alight. As long as the user is consistently alternating between the finger guide channels, it may not impact upon the quality of the resulting fingerprint verification template because the order of which finger guide channel starts does not matter. But, in this case, the association of a status indicator with a finger guide channel is a matter of a user's perception rather than some other associational aspect, such as spatial proximity between the status indicator and the finger guide channel.

In another example, the artwork on the power source could be oriented in portrait (i.e., the long dimension of the rectangular card is oriented substantially vertically) so the finger guide is at the bottom with respect to the text on the artwork when a user holds the power source. If the artwork is oriented in this fashion then the user would be more likely to hold the receptacle in portrait orientation and the user would not need to turn the receptacle to obey the first status indicator, regardless of if the user were left or right-handed. Alternatively, a landscape-style power source could be customized for left-handed users to swap the order in which the status indicators come on and/or the sensor may be repositioned in the biometric card.

A blind user may choose to hold the power source in a different orientation. The status indicators may be audio rather than visual. In such embodiments, as there is no benefit in seeing the status indicators, the user may turn the power source upside down while enrolling so that the user may more easily feel the finger guide channels. The status indicators may be positioned on a surface of the power source opposite of the surface including the finger guide channels.

In an alternative embodiment, the status indicators 6504a, 6504b may be positioned adjacent one side of the sensor opening as shown, but finger guide channels 6508a, 6508b may be omitted. The status indicators 6504a, 6504b may be selectively activated to indicate a position and/or orientation at which a finger should be placed on the sensor without the assistance of a finger guide channel for positioning and orienting the finger.

In some embodiments, one or more status indicators may be implemented on the smart card 6806. In such embodiments, an opening 6802 on the power source 6502 may reveal a status indicator 6804c on the smart card 6806 while two status indicators 6804a-b are implemented on the power source, as shown in FIG. 68. The status indicators 6804a-c may be used to display status information during the enrollment process. The status indicators 6804a-c may be implemented on the power source 6502. In some embodiments, any combination of one or more status indicators on the smart card 6806 and the power source 6502 may be used. and the opening 6802 may reveal two more status indicators on the smart card 6806. In some embodiments, status indicators on the smart card 6806 may be connected to the status indicators on the power source, such that the status indicators on the power source mirror the indications provided to the user by the status indicators on the smart card. The status indicators on the power source may supplement or replace the status indicators on the smart card.

A key objective for the system for fingerprint enrollment using the power source as described herein is to prevent any risk of tampering with the smart card and any risk of interfering with or intercepting the enrollment process and/or the components on the smart card.

The smart card may signal an enrollment state to the power source during the enrollment process. In some embodiments, status indicators on the power source convey a particular enrollment state to the user during the enrollment process. For example, possible enrollment states that are signaled from the smart card to the power source during the enrollment process are listed below in Table 1. FIG. 69 lists further possible enrollment states that are signaled from the smart card to the power source and associated status indicators. The list of possible enrollment states shown in FIG. 69 may be explained with reference to FIG. 68. For example, status indicator 6804a may correspond to LED "A," status indicator 6804b may correspond to LED "B," and status indicator 6804c may correspond to "Card Green."

TABLE 1

| Possible enrollment state (from smart card to power source) | Comment |
|---|---|
| Wait for finger on (optionally this is indicated next to the finger guide channel required) | Waiting for finger to go down |

TABLE 1-continued

| Possible enrollment state (from smart card to power source) | Comment |
|---|---|
| Wait for finger off | Signal user to lift finger off the sensor before next image is taken |
| Additional finger | Optional indicator for user to enroll a second, third, etc. finger on the card |
| Acceptable image | |
| Unacceptable image | Optional. (Alternative to signaling an unacceptable image is simply to keep signaling to the user that additional images are required.) |
| Error | Optional |
| Enrollment is complete | |

In some embodiments, only information regarding the status of the enrollment process is sent from the smart card to the power source during enrollment. Other information, for example, card holder details, the fingerprint template, etc. does not leave the smart card during enrollment.

In an example of a power source described herein, the power source includes a receptacle into which a smart card may be inserted, the power source provides power to the smart card inserted into the receptacle, data or signals indicative of the enrollment status of the smart card biometric sensor are provided to the power source by the smart card or are detected in the smart card by detection circuitry in the power source, no data is transmitted from the power source to an external device, and status indicators—such as LED lights—on the receptacle (and, optionally, on the smart card as well) are activated to indicate the enrollment status. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The power source may only provide power to the smart card, or the power source may also include one or more data input keys as described herein for inputting data from the power source to the smart card. The power source may optionally include a finger guide as described herein attached to the receptacle and may optionally include status indicators associated with finger guide channels as described herein for guiding or instructing a user with respect to placement of a finger on a finger guide channel. The power source may optionally include status indicators adjacent to a fingerprint sensor of a smart card inserted into the power source receptacle for guiding or instructing a user with respect to placement of a finger on the sensor, and the finger guide channels may be omitted.

In another example of a power source described herein, the power source includes a receptacle into which a smart card may be inserted, the power source provides power to the smart card inserted into the receptacle, no data or signals are provided to the power source by the smart card, no data is transmitted from the power source to an external device, and status indicators—such as LED lights—on the smart card are activated to indicate the enrollment status of the smart card biometric sensor. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The power source may only provide power to the smart card, or the power source may also include one or more data input keys as described herein for inputting data from the power source to the smart card. The power source may optionally include a finger guide as described herein attached to the receptacle and may optionally include status indicators associated with finger guide channels as described herein for guiding or instructing a user with respect to placement of a finger on a finger guide channel. The power source may optionally include status indicators adjacent to a fingerprint sensor of a smart card inserted into the power source receptacle for guiding or instructing a user with respect to placement of a finger on the sensor, and the finger guide channels may be omitted.

In instances with smart cards including a Secure Element (SE) in addition to a biometric module, two signaling scenarios with respect to the enrollment process may be provided depending on how the enrollment process is split between the Secure Element, the biometric module, and other components on the smart card. The signaling scenario may be determined based on, and not restricted to, the capability of the SE and security requirements, e.g., whether the biometric module is being utilized for a payment application or an application which requires less security.

In a first scenario, biometric template storing and matching is performed entirely by the biometric module. In the first scenario, the biometric module notifies the SE (in accordance with a known and predefined protocol) of an enrollment state during enrollment process. In accordance to the received enrollment state notification, the SE may then send signals high/low on contact pads of the smart card. The contact pads used for the signaling may be the data contact pads or the power contact pads or both. The SE or the biometric module may additionally signal the enrollment state via status indicators on the card. The signal detection circuit on the power source detects the state change based on the high/low signals on the contact pads and may drive the status indicators on the power source accordingly.

In a second scenario, biometric template storing and matching is split between the biometric module and the SE. In the second scenario, for example, the template storing is performed on the SE. Accordingly, the SE is involved in the enrollment process in cooperation with the biometric module and therefore aware of the enrollment state during the enrollment process. In accordance to the enrollment state, the SE sends signals high/low on contact pads of the smart card. The contact pads used for signaling may be the data contact pads or the power contact pads or both. The SE or the biometric module may additionally signal the enrollment state via status indicators on the card. The signal detection circuit on the power source detects the state change based on the high/low signals on the contact pads and drives the status indicators on the power source accordingly.

If the card does not include a SE, the biometric module may send signals high/low on contact pads of the smart card in accordance to the enrollment state. In some embodiments, any other component on the smart card may send signals high/low on contact pads of the smart card in accordance to the enrollment state. The signal detection circuit on the power source detects the state change based on the high/low signals on the contact pads and drives the status indicators on the power source accordingly.

The power source may provide an input signal to the smart card to trigger enrollment mode when the smart card is coupled to the power source. In some embodiments, the smart card is a contact or dual-interface card and the smart card may default into operating according to ISO standards for a card transaction as soon as the smart card receives power (i.e., the smart card enters "contact mode"). In such embodiments, a signal from the power source to the card to trigger the enrollment process is necessary.

The power source may signal to the smart card that the power element, e.g., a battery, is low. In some alternative embodiments, the power source may not signal to the smart card that the power element is low. In some embodiments, status indicators may indicate to the user that the power element is low.

In some embodiments, contact pads on the surface of the smart card may be used to output signals indicating the enrollment states to the user or to input a signal to the smart card as described above.

In some embodiments, contact pads that are conventionally used to input/output data to/from the smart card when the smart card is operating in contact mode during a transaction may be repurposed for input/output during enrolment. For example, one output pad, e.g., the C7 pad, may be connected to a signal detection circuit on the power source to drive two status indicators in order to signal enrollment states according to some embodiments. The two status indicators may be two LEDs, e.g., one green LED and one red LED. In some embodiments, additional output pads may be used to drive additional status indicators, e.g., additional LEDs.

In some alternative embodiments, conventionally unused pads, e.g., the C4 pad and the C8 pad, may be used to input/output data to/from the smart card.

In alternative embodiments, the power source may not provide any input to the smart card.

In some embodiments, components on the smart card may manage power during enrollment depending on the nature of the power element on the power source and the number and nature of status indicators on the power source. For example, if too much current is drawn from the power element, e.g., the battery or solar cell, to power the status indicators and the components on the smart card during enrolment, the power element may drain too quickly. A method of managing power during enrollment may include, for example, power management circuitry or a biometric microcontroller (MCU) transitioning components on the smart card not being used to a low power state and/or reducing the processor speed. Another method of managing power during enrollment may include, for example, power management circuitry or the biometric MCU transitioning components on the smart card to a lower power state when the user does not apply a finger to the smart card for a predetermined period of time after the smart card is coupled to the power source. In such instances, the user may need to recouple the card to the power source in order to restart the enrollment process.

Figure 70:
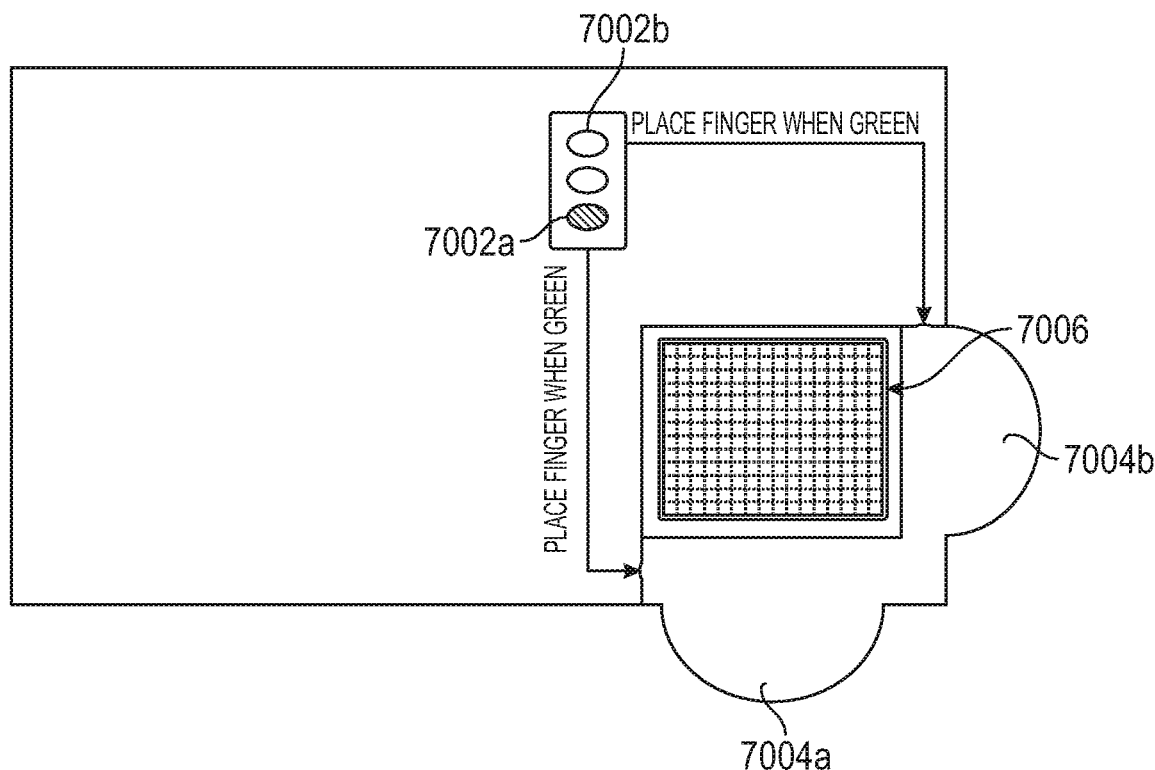
FIG. 70 shows a power source and smart card with status indicator lights on the smart card visible through an opening in a receptacle of the power source and arrows associating a status indicator light on the smart card with a finger guide channel on the power source receptacle.

In some embodiments, art work on a surface of the power source is used to instruct the user to associate a status indicator on the smart card 7002a-b with a particular finger guide channel 7004a-b on the power source, as shown in FIG. 70. For example, for an LED 7002a-b on the smart card that is visible through an opening in the power source receptacle, the artwork on the surface of the power source may include text and arrows pointing from the LED 7002a-b to a particular finger guide channel 7104a-b, respectively, thereby indicating to the user to place a finger on the fingerprint sensor 7006 using the finger guide channel 7004a-b associated with the lighted LED 7002a-b.

In another example of a power source described herein, the power source includes a receptacle into which a smart card may be inserted, the power source provides power to the smart card inserted into the receptacle, no data is transmitted from the power source to an external device, and the emissions of optical status indicators—such as LED lights—on the smart card, which may be activated to indicate the enrollment status of the smart card biometric sensor, are detected by photo detectors on the receptacle or are channeled via light pipes on the receptacle, and optical status indicators—such as LED lights or display windows—on the receptacle are activated by the emissions detected by the photo detectors or display light channeled by the light pipes to indicate the enrollment status. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The power source may only provide power to the smart card, or the power source may also include one or more data input keys as described herein for inputting data from the overlay to the smart card. The power source may optionally include a finger guide as described herein attached to the receptacle and may optionally include status indicators associated with finger guide channels as described herein for guiding or instructing a user with respect to placement of a finger on a finger guide channel. The power source may optionally include status indicators adjacent to a fingerprint sensor of a smart card inserted into the power source receptacle for guiding or instructing a user with respect to placement of a finger on the sensor, and the finger guide channels may be omitted.

Figure 71:
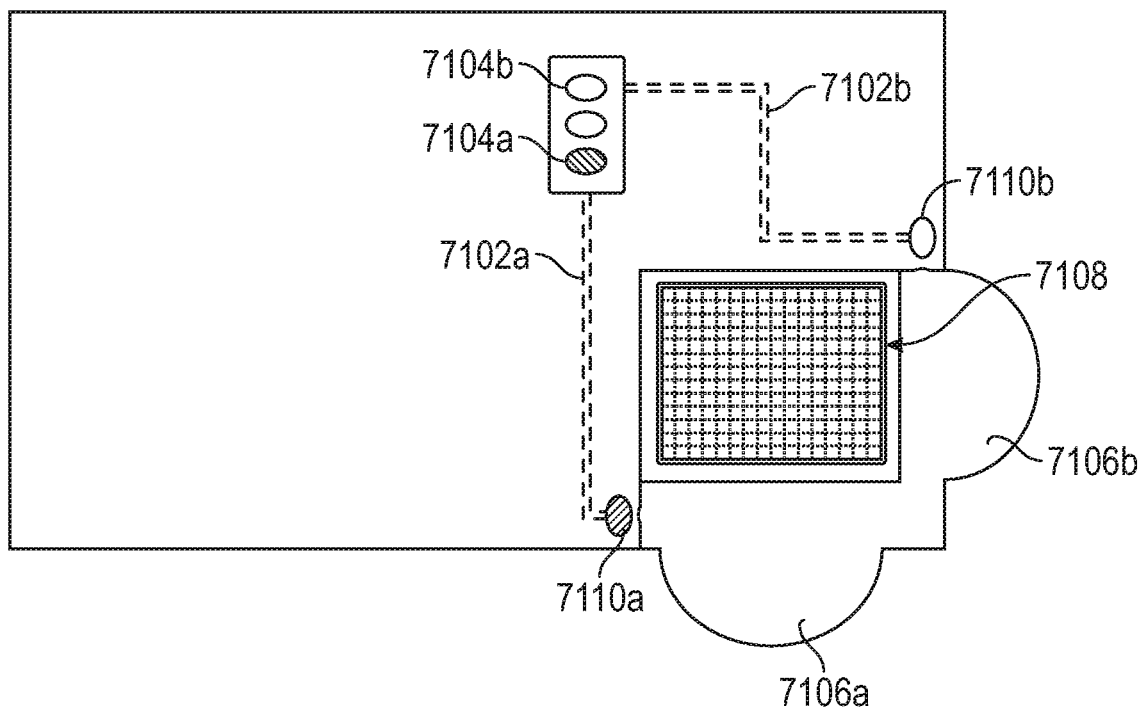
FIG. 71 shows a power source and smart card with status indicator lights on the smart card and light pipes in a receptacle of the power source that direct light from the indicator lights to display windows on the power source receptacle adjacent finger guide channels on the power source receptacle.

The power source may comprise light pipes 7102a-b to route the light signal from the status indicators 7104a-b on the smart card, e.g., LEDs, to a position on the surface of the power source receptacle, such as a display window 7110a-b adjacent to the associated finger guide channel on the power source at the appropriate time, as shown in FIG. 71. For example, an LED 7104a on the smart card may be illuminated and the associated light pipe 7102a may extend the light signal from the LED 7104a to the associated finger guide channel 7106a, thereby indicating to the user to place a finger on the fingerprint sensor 7108 using the associated finger guide channel 7106a. (Optionally, the input end of the light pipes 7110a-b are located on a PCB 6702 (not shown in FIG. 71) of the power source under an external cover panel, facing the surface of the smart card including the one or more status indicators 7104a-b and thus the light pipes are exposed to relatively low levels of ambient light making them better able to channel the light emissions from the status indicators 7104a-b to the display windows that are visible to the user.) The light pipes 7102a-b may extend from a status indicator 7104a-b to a display window 7110a-b that contacts or covers a portion of the associated finger guide channel.

Figure 72A:
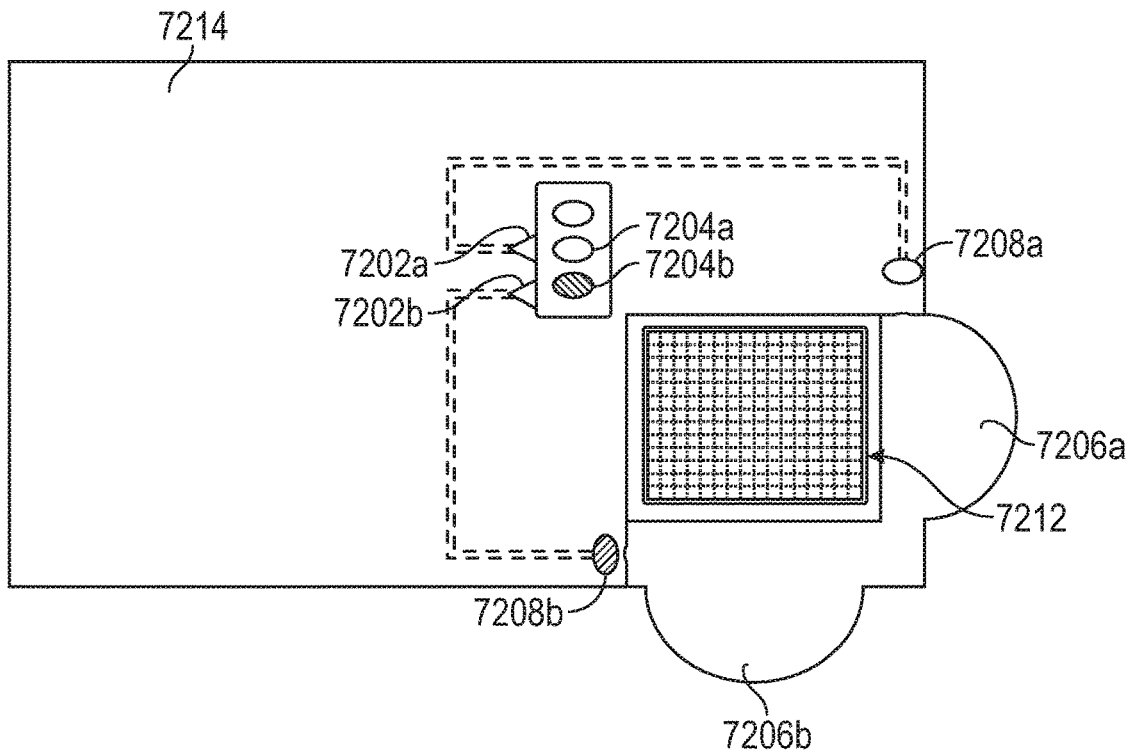
FIGS. 72A-C show a power source and smart card with status indicator lights on the smart card and photo detectors in a receptacle of the power source that are connected to indicator lights on the power source receptacle adjacent finger guide channels on the power source receptacle.

The power source comprises one or more photo detectors (e.g., photodiodes) 7202a-b configured to detect illumination emitted by each of the status indicators 7204a-b on the smart card and trigger status indicators 7208a-b on the power source to highlight the associated finger guide channel 7206a-b, thereby indicating to the user to place a finger on the fingerprint sensor 7212 using the associated finger guide channel at the appropriate time, as shown in FIG. 72A. In some embodiments, the one or more photo detectors 7202a-b are located on a PCB 6702 (not shown in FIG. 72A) of the power source under an external cover panel 7214 (e.g., the artwork), each photo detector 7202a-b located adjacent to a separate status indicator 7204a-b. As shown in FIG. 72A, the power source comprises a cutout for each status indicator on the smart card so that the status indicators may be revealed to the user.

Figure 72B:
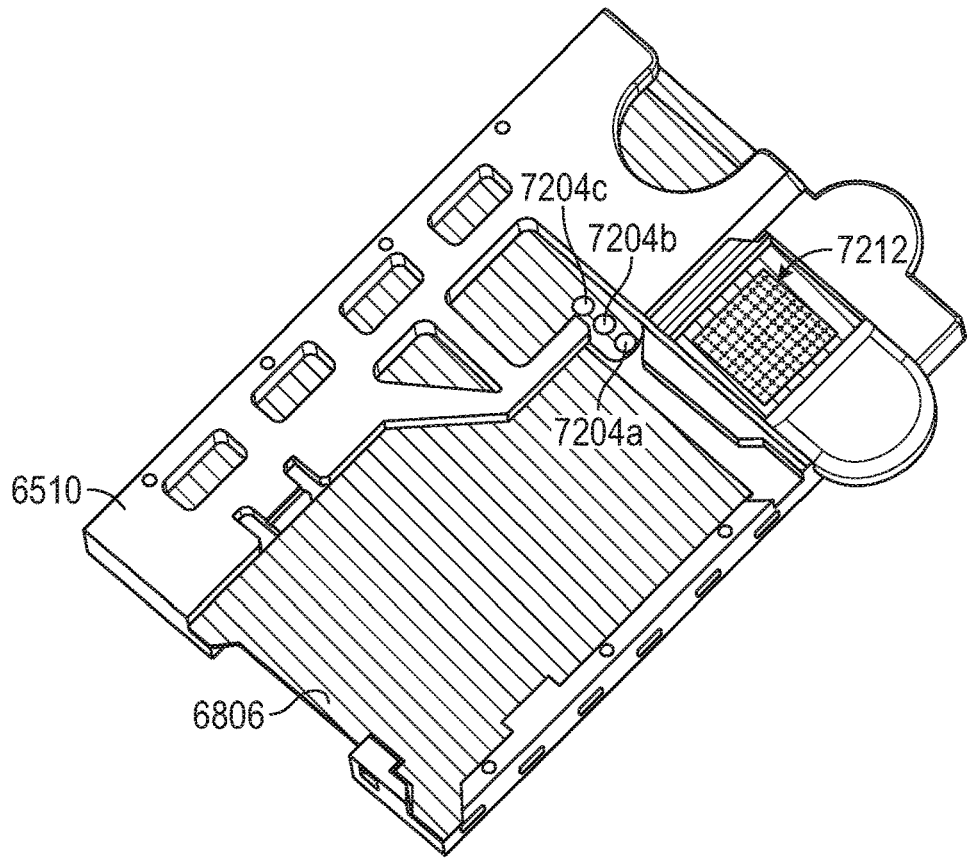
Figure 72C:
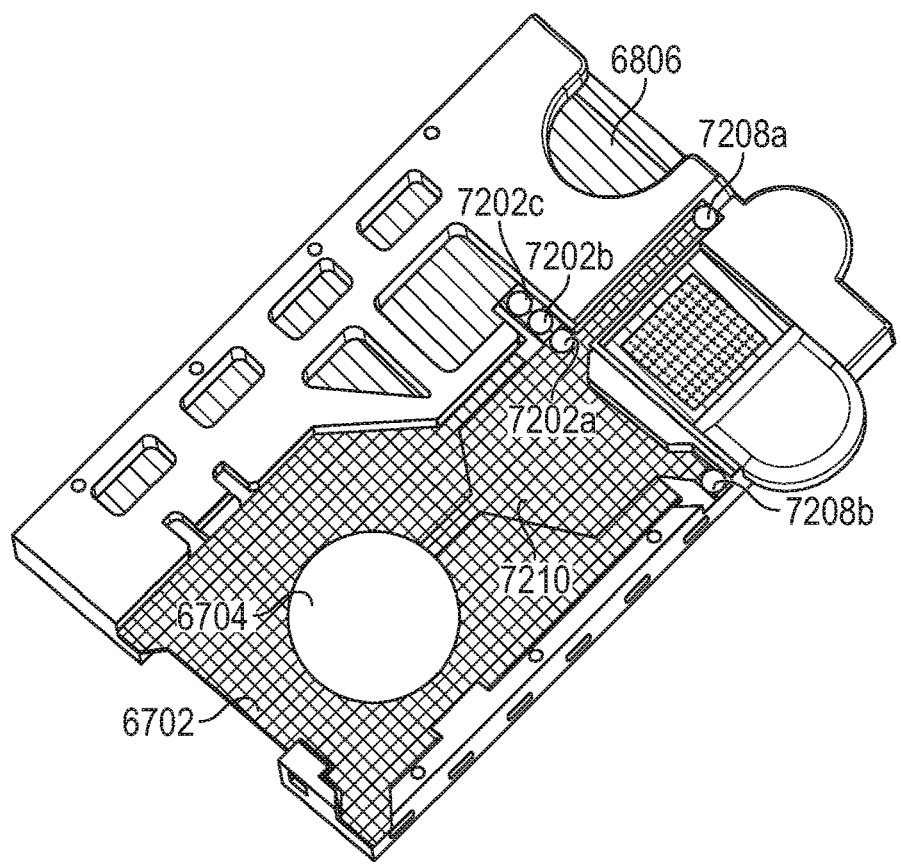

FIGS. 72B-C show another embodiment of the power source with an external cover panel on the receptacle—which may be printed with instructions, graphics, logos, or other artwork—omitted to illustrate internal features of the power source. The power source comprises one or more photo detectors 7202a-c configured to detect the status indicators 7204a-c on the smart card 6806. FIG. 72B shows the smart card 6806 including three status indicators 7204a-c and the power source including three photo detectors 7202a-c, each photo detector associated with a separate status indicator. This is not required, however, and the smart card 6806 may include any number of status indicators with the power source including a corresponding number of photo detectors. FIG. 72B illustrates the receptacle 6510 of the power source into which the smart card 6806 is inserted, with the PCB 6702 omitted from the figure for the purpose of explanation. FIG. 72C illustrates the power source including the PCB 6702 and the inserted smart card 6806.

Referring to FIG. 72B, the receptacle 6510 is configured with an opening that aligns with the status indicators 7204a-c of the card 6806 when the card is fully inserted into the receptacle such that the one or more status indicators 7204a-c are not covered by the receptacle 6510.

As shown in FIG. 72C, the PCB 6702 is mounted within the receptacle 6510. In some embodiments, the photo detectors 7202a-c are located on a surface of the PCB 6702 facing the surface of the smart card including the one or more status indicators 7204a-c and thus the photo detectors 7202a-c are exposed to relatively low levels of ambient light making them more sensitive to light emissions from the status indicators 7204a-c. In an embodiment, each of the photo detectors 7202a-c is associated with and detects emissions from one of the status indicators 7204a-c. For example, photo detector 7202a is associated with status indicator 7204a, photo detector 7202b is associated with status indicator 7202b, and photo detector 7202c is associated with status indicator 7202c. Ideally, the photo detectors 7202a-c are positioned with respect to their associated status indicators 7204a-c and their triggering threshold (i.e., the level of light emission that will trigger a positive detection) are set appropriately, to ensure that photo detectors are not triggered by light bleeding from neighboring, un associated status indicators. In some embodiments, the status indicators 7204a-c on the smart card are separated from each other by a distance of at least 3.5 mm such that a light emitting from neighboring, unassociated status indicators is minimized.

The PCB 6702 further comprises a decoder and power circuitry 7210 connecting the photo detectors 7202a-b to the power source (e.g., a battery 6704) and to each associated status indicator 7208a-b on the power source. In some embodiments, the decoder detects a signal from a photo detector 7202a-c when the photo detector 7202a-c is triggered by the illumination of the associated status indicator 7204a-c on the smart card. Accordingly, the decoder may decode a status of the enrollment process being signaled by the smart card via the status indicators. For example, the decoder may decode a sequence of signals indicated by the status indicators 7204a-c into any number of states regarding the enrollment process. As another non-limiting example, when the smart card includes three status indicators 7204a-c, the decoder may detect the illuminance of each status indicator, i.e., signaling indicated by the status indicators, using three associated photo detectors 7202a-c and the decoder may comprise a binary decoder to decode the signaling indicated by the three status indicators 7204a-c into eight different states regarding the enrollment process. The decoder may then trigger one or more status indicators 7208a-b on the power source based on the decoded status of the enrollment process.

The status indicators on the smart card 6806 and/or the power source 6510 may be bicolor. For example, the status indicators 7208a-b on the power source 6510 may be bicolor. The bicolor status indicators may be used to display indications in a particular color, e.g., yellow, when the user is being instructed to apply a certain finger, e.g., a right index finger or a right thumb, and display indications in a different color, e.g., green, when the user is being instructed to apply a different finger, e.g., a left index finger or a left thumb.

The three embodiments described above with reference to FIGS. 70, 71, and 72A-C do not require signals to leave the smart card via the contact pads. Accordingly, there is no need for the biometric module, secure element, or any other component on the smart card to provide a signal that leaves the smart card in the three embodiments described above. Equally, there is no need for the power source to transmit any signal to any external device.

In alternative embodiments, the power sources shown in FIGS. 70, 71, and 72A-72C may be provided without finger guide channels. In such embodiments, the arrows of FIG. 70, the display windows 7110a, 7110b of FIG. 71, or the status indicator lights 7208a, 7208b of FIGS. 72A and 72C are positioned adjacent a side of the sensor opening as shown, but finger guide channels 7004a, 7004b, 7106a, 7106b, 7206a, 7206b may be omitted. The arrows of FIG. 70, the display windows 7110a, 7110b of FIG. 71, and the status indicator lights 7208a, 7208b of FIGS. 72A and 72C indicate a position and/or orientation at which a finger should be placed on the sensor without the assistance of a finger guide channel for positioning and orienting the finger.

Figure 73:
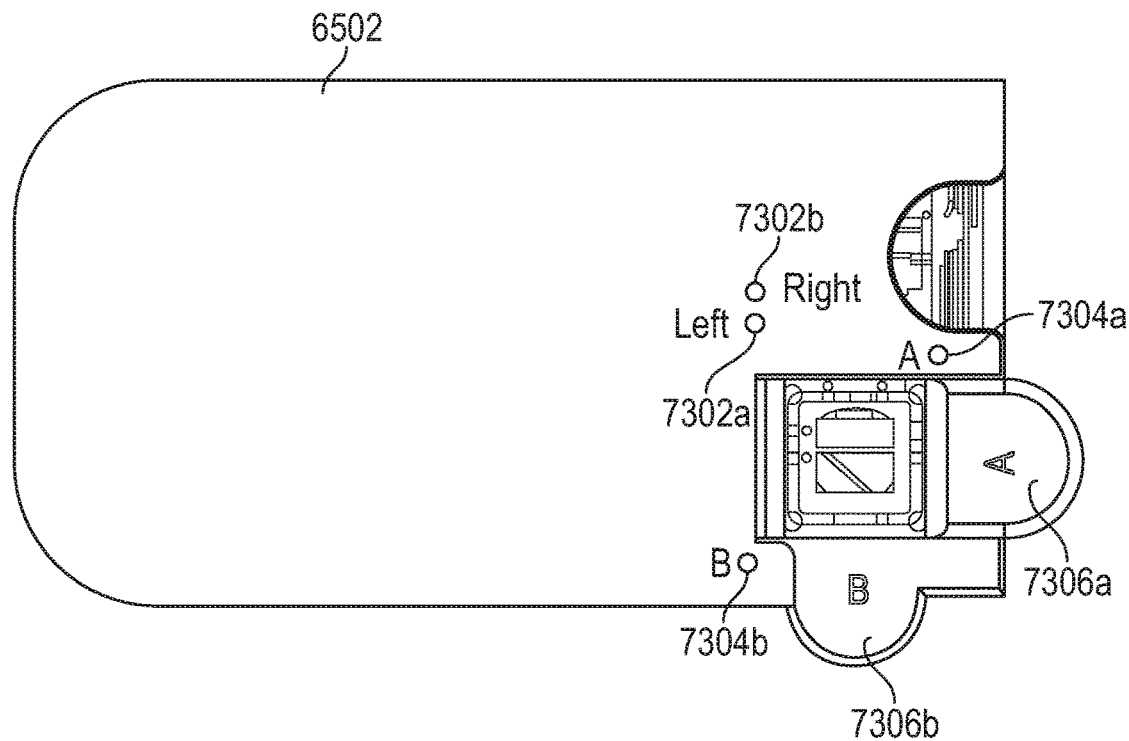
FIG. 73 illustrates a two finger enrollment process according to some embodiments.

The enrollment process may require an initial enrollment of two fingers. For example, a user may be required to enroll a left thumb and a right thumb. In such embodiments, the power source may comprise at least four status indicators 7302a-b, 7404a-b, as shown in FIG. 73. The smart card may comprise two status indicators 7302a-b. In such embodiments, the power source 6502 may comprise two cutouts where each cutout is positioned over one of the two status indicators 7302a-b implemented on the smart card. Printed instructions may be provided on the surface of the power source 6502 to provide guidance to the user with respect to the function of each status indicator. For example, the printed instructions may indicate to the user that one status indicator 7302a lights up when the user is required to apply a finger from the left hand and that one status indicator 7302b lights up when the user is required by apply a finger from the right hand. In another example, the printed instruction may simply indicate that one status indicator 7302a lights up when the user is required to apply a finger from any hand and that one status indicator 7302b lights up when the user is required to apply any other finger. As described above, each of the status indicators 7304a-b lights up to indicate to the user to position a finger on the associated finger guide channel 7306a-b. As such, each status indicator 7302a-b, 7304a-b represents an immediate physical direction cue for the user. Possible states that may be signaled from the smart card to the power source during the two finger enrollment are illustrated in FIG. 74 according to one embodiment. In the embodiment shown in FIG. 74, the "Left" column reflects the indication of the status indicator 7302a, the "Right" column reflects the indication of the status indicator 7302b, the "A" column reflects the indication of the status indicator 7306a, and the "B" column reflects the indication of the status indicator 7306b, as shown in FIG. 73.

The photo detectors, light pipes, detector circuits, decoders, and/or finger guide status indicators described herein may also be incorporated in to an overlay, such as overlays shown in FIGS. 34A-34F and 35 and described above. Finger guide status indicator could be implemented with or without finger guides as described herein.

Thus, in another example of an overlay described herein, the overlay provides power to the smart card to which the overlay is applied, no data is transmitted from the overlay to an external device, and the emissions of optical status indicators—such as LED lights—on the smart card, which may be activated to indicate the enrollment status of the smart card biometric sensor, are detected by photo detectors on the receptacle or are channeled via light pipes on the overlay, and optical status indicators—such as LED lights or display windows—on the overlay are activated by the emissions detected by the photo detectors or display windows on the overlay display light channeled by the light pipes to indicate the enrollment status. The enrollment status indicated may include one or more of the following: the smart card biometric sensor is (or is not) in an enrollment mode, the user should provide a biometric image (e.g., place a finger on the a fingerprint sensor), a biometric image provided by the user is (or is not) accepted, the biometric enrollment template is (or is not) complete, the enrollment mode is terminated. The overlay may only provide power to the smart card, or the overlay may also include one or more data input keys as described herein for inputting data from the overlay to the smart card. The overlay may optionally include a finger guide as described herein attached to the overlay and may optionally include status indicators associated with finger guide channels as described herein for guiding or instructing a user with respect to placement of a finger on a finger guide channel. The overlay may optionally include status indicators adjacent to a fingerprint sensor of a smart card to which the overlay is applied for guiding or instructing a user with respect to placement of a finger on the sensor, and the finger guide channels may be omitted.

A novel feature of embodiments described herein is the ability to use a fingerprint sensor in a position sensing mode on a limited device such as a smart card. The conventional use of a fingerprint sensor in position sensing mode has been reserved for smart phones, computers and tablets.

Another novel feature of embodiments described herein is the different configurations of data input devices, such as data input devices in the form of overlays and frames, temporarily placed over the sensing area of a fingerprint sensor installed on a limited device in order to guide a user to spatially distinct control areas for control and data entry for the device. Once the data input device is removed, the fingerprint sensor operates as a verification method for authorized use of the device.

Another novel feature of embodiments described herein is the simple, cost-effective method to enroll a fingerprint template on a limited device using the different configurations of data input devices, such as data input device in the form of overlays and frames, temporarily placed over the sensing area of a fingerprint sensor.

One of the significant advantages achieved by embodiments described herein is that the user's fingerprint data never leaves the smart card. The power source (also referred to as a non-data-transmitting power source) simply provides power to operate the smart card and takes no part in the enrollment process by transmitting data to or from the smart card. Another significant advantage provided by embodiments described herein is that the fingerprint sensor can provide a mechanism for data entry and control of the limited device in addition to user verification.

Embodiments described herein provide the user with a convenient method of enrolling a fingerprint while enhancing the security because the enrollment process can be carried out in their home and entirely "off-grid." A further benefit is the suitability of the process for devices for enrolling fingerprint templates on devices with limited feedback/input capabilities.

EXEMPLARY EMBODIMENTS

Aspects of the disclosure are summarized by the following numbered embodiments.

Embodiment 1

A fingerprint sensor and data input system comprising:
a two-dimensional array of sensor elements, each sensor element being configured to generate a signal in response to a finger surface placed in detectable proximity to the sensor elements; and
a processor configured to process signals generated by the sensor elements and to be selectively placed in a fingerprint sensing mode and a data input mode, wherein
in the data input mode, the processor is configured to determine in which of two or more spatially distinct regions of the array each sensor element that generates a signal in response to a finger surface placed in detectable proximity to the sensor element is located to effect a data input based on which spatially distinct region is contacted by the finger surface, and
in the fingerprint sensing mode, the processor is configured to detect variations in signals generated by sensor elements in detectable proximity to the finger surface that are indicative of features of a fingerprint of the finger surface and to form an image of the fingerprint of the finger surface.

Embodiment 2

The fingerprint sensor and data input system of embodiment 1, wherein, in the fingerprint sensing mode, the processor is further configured to detect variations in signals generated by sensor elements in detectable proximity to the finger surface that are indicative of features of the fingerprint of the finger surface in each of the two or more spatially distinct regions of the array.

Embodiment 3

The fingerprint sensor and data input system of embodiment 1, wherein the processor is further configured to detect different interactions of the finger surface with the two-dimensional array of sensor elements, wherein the different interactions of the finger surface with the two-dimensional array of sensor elements include a double tap, a hold, and a drag motion in a direction along the array.

Embodiment 4

The fingerprint sensor and data input system of embodiment 3, wherein the processor is further configured to switch between the data input mode and the fingerprint sensing mode based on the detected different interactions of the finger surface with the two-dimensional array of sensor elements.

Embodiment 5

The fingerprint sensor and data input system of any one of embodiments 1 to 4, wherein the two or more spatially distinct regions of the array are permanently indicated on a surface of the two-dimensional array of sensor elements.

Embodiment 6

The fingerprint sensor and data input system of any one of embodiments 1 to 5, wherein, in the data input mode, the processor is further configured to:
 calculate an average signal measurement at each of the sensor elements,
 determine a threshold signal measurement based on the average signal measurement, and
 determine that a sensor element is contacted by the finger surface when the signal generated by the sensor element exceeds the threshold signal measurement.

Embodiment 7

The fingerprint sensor and data input system of embodiment 6, wherein, in the data input mode, the processor is further configured to:
 determine that one or more sensor elements contacted by the finger surface are confined within one spatially distinct region of the array, and
 determine that the one spatially distinct region of the array is contacted by the finger surface.

Embodiment 8

The fingerprint sensor and data input system of any one of embodiments 1 to 7, wherein, in the data input mode, sensor elements are selectively enabled to generate signals in response to the finger surface placed in detectable proximity to the selectively enabled sensor elements.

Embodiment 9

The fingerprint sensor and data input system of embodiment 8, wherein, in the data input mode, sensor elements confined in the two or more spatially distinct regions of the array are selectively enabled.

Embodiment 10

A fingerprint sensor and data input system comprising:
 a two-dimensional array of sensor elements, each sensor element being configured to generate a signal in response to a finger surface placed in detectable proximity to the sensor element;
 a data input device operatively placed on the array and defining two or more spatially distinct regions of the array; and
 a processor configured to detect and distinguish contact with each of the two or more spatially distinct regions of the array when the data input device is operatively placed on the array and to detect variations in signals generated by sensor elements in detectable proximity to the finger surface that are indicative of features of a fingerprint of the finger surface and to form an image of the fingerprint of the finger surface when the data input device is not operatively placed on the array.

Embodiment 11

The fingerprint sensor and data input system of embodiment 10, wherein the processor is further configured to form an image of the fingerprint of the finger surface when the data input device is operatively placed on the array.

Embodiment 12

The fingerprint sensor and data input system of embodiment 10, wherein the data input device comprises two or more windows, the two or more windows defining the two or more spatially distinct regions of the array.

Embodiment 13

The fingerprint sensor and data input system of any one of embodiments 10 to 12, wherein sensor elements confined in the two or more spatially distinct regions of the array are selectively enabled to generate signals in response to the finger surface placed in detectable proximity to the selectively enabled sensor elements.

Embodiment 14

The fingerprint sensor and data input system of any one of embodiments 10 to 13, wherein
 the data input device includes a conductive component which contacts the surface of the array, and
 the processor is further configured to detect the conductive component when placed in detectable proximity to the two-dimensional array of sensor elements.

Embodiment 15

The fingerprint sensor and data input system of embodiment 14, wherein the processor is further configured to determine whether the data input device is operatively placed on the array based on the detection of the conductive component.

Embodiment 16

The fingerprint sensor and data input system of embodiment 15, wherein the processor is further configured to:
 compare a position of the detected conductive component with an expected position of the detected conductive component when the data input device is operatively placed on the array, and
 determine whether the data input device is misaligned with the array based on the comparison.

Embodiment 17

The fingerprint sensor and data input system of embodiment 16, wherein the processor is further configured to calibrate for the misalignment of the data input device when determining whether a finger surface is proximate to the spatially distinct regions.

Embodiment 18

The fingerprint sensor and data input system of any one of embodiments 14 to 17, wherein
the conductive component is arranged on the data input device in a predetermined pattern, the predetermined pattern being a unique pattern associated with the data input device, and
the processor is further configured to detect the predetermined pattern and recognize the predetermined pattern as associated with the data input device.

Embodiment 19

The fingerprint sensor and data input system of any one of embodiments 14 to 18, wherein the conductive component is arranged on the data input device as a pattern, a bar code, a line, a dot, or a cross.

Embodiment 20

The fingerprint sensor and data input system of any one of embodiments 14 to 19, wherein the conductive component comprises a metal, metalized paint, or conductive ink.

Embodiment 21

The fingerprint sensor and data input system of any one of embodiments 10 to 20, wherein the data input device comprises an adhesively-backed sticker or film.

Embodiment 22

The fingerprint sensor and data input system of embodiment 21, wherein the data input device is removably secured to the array.

Embodiment 23

The fingerprint sensor and data input system of any one of embodiments 10 to 20, wherein the data input device comprises a sleeve configured to be slid over the fingerprint sensor to be operatively placed on the array.

Embodiment 24

The fingerprint sensor and data input system of embodiment 23, wherein the sleeve is configured to be flipped or slid over the fingerprint sensor to be operatively placed on the array, defining a different two or more spatially distinct regions of the array.

Embodiment 25

The fingerprint sensor and data input system of embodiment 23 or 24, wherein the sleeve includes a power source and contacts configured to transmit power to the fingerprint sensor when the sleeve is slid over the fingerprint sensor.

Embodiment 26

The fingerprint sensor and data input system of any one of embodiments 10 to 25, wherein the two or more spatially distinct regions of the array do not constitute the entire two-dimensional array of sensor elements.

Embodiment 27

The fingerprint sensor and data input system of any one of embodiments 10 to 26, wherein the data input device comprises an upper sheet and a lower sheet, the upper sheet comprising holes defining the two or more spatially distinct regions of the array and the lower sheet comprising a thin continuous material through which the finger surface is detected.

Embodiment 28

The fingerprint sensor and data input system of embodiment 27, wherein the thin continuous material is polymer and has a thickness of about less than 100 microns.

Embodiment 29

The fingerprint sensor and data input system of embodiment 27 or 28, wherein the lower sheet has printed, etched, or textured indications to the user positioned to show through the holes of the upper sheet when the lower sheet is combined with the upper sheet.

Embodiment 30

A fingerprint sensor and data input system comprising:
a two-dimensional array of sensor elements, each sensor element being configured to generate a signal in response to a finger surface placed in detectable proximity to the sensor element;
a data input device operatively placed on the array and defining two or more spatially distinct regions of the array; and
a processor configured to detect and distinguish contact with each of the two or more spatially distinct regions of the array and to detect an activation code entered by a user contacting the two or more spatially distinct regions in a specified sequence when the data input device is operatively placed on the array and to detect variations in signals generated by sensor elements in detectable proximity to the finger surface that are indicative of features of a fingerprint of the finger surface and to form an image of the fingerprint of the finger surface after a correct activation code has been detected.

Embodiment 31

The fingerprint sensor and data input system of embodiment 30, wherein the processor is configured to distinguish each separate input in the specified sequence for the activation code entered by the user based on an absence of signals generated by sensor elements in the array in between each data input.

Embodiment 32

The fingerprint sensor and data input system of embodiment 30, wherein the processor is configured to detect a data input by the user simultaneously contacting two or more spatially distinct regions.

Embodiment 33

The fingerprint sensor and data input system of embodiment 30, wherein
the data input device comprises a pattern of windows defining spatially distinct regions of the array corresponding to the pattern of windows, and

Embodiment 34

The fingerprint sensor and data input system of embodiment 30, wherein the activation code is an input gesture requiring the user to swipe a pattern connecting two or more spatially distinct regions in a predetermined sequence.

Embodiment 35

The fingerprint sensor and data input system of any one of embodiments 30 to 34, wherein the processor is configured to detect a valid or invalid data input for the activation code.

Embodiment 36

The fingerprint sensor and data input system of any one of embodiments 30 to 35, further comprising a status indicator, wherein the status indicator provides an indication to the user regarding the detected valid or invalid data input.

Embodiment 37

The fingerprint sensor and data input system of embodiment 35, wherein the status indicator is an LED, a screen, or a sound emitting unit.

Embodiment 38

A method for enrolling a fingerprint with two-dimensional array of sensor elements, each sensor element being configured to generate a signal in response to a finger surface placed in detectable proximity to the sensor element, the method comprising:
  detecting contact by a user's finger with different spatially distinct regions of the array of sensor elements;
  detecting a code entered by the user contacting different spatially distinct regions of the array in a sequence, and authenticating the detected code if it matches a predefined activation code;
  and
  if the detected code matches the predefined activation code, storing one or more fingerprint images formed when the user places a finger on the array of sensor elements.

Embodiment 39

The method of embodiment 38, wherein the code entered by the user comprises data input by simultaneously contacting two or more of the different spatially distinct regions of the array.

Embodiment 40

The method of embodiment 38, wherein the code entered by the user is a continuous input connecting two or more of the different spatially distinct regions of the array in a pattern.

Embodiment 41

The method of embodiment 40, further comprising authenticating the detected code if the pattern matches a predefined activation pattern.

the activation code requires the user to contact all of the spatially distinct regions of the array corresponding to the pattern of windows simultaneously.

Embodiment 42

The method of any of embodiments 38 to 41, further comprising:
  alerting the user when the detected code does not match the predefined activation code;
  and
  terminating the enrollment method after a predetermined number of failed matches.

Embodiment 43

The method of any one of embodiments 38 to 42, wherein the two-dimensional array of sensor elements is located on a smart card.

Embodiment 44

A method for enrolling a fingerprint on a smart card containing a fingerprint sensor comprising:
  inserting the smart card into a card reader with a power source;
  entering an activation code by using a finger to contact spatially distinct regions of a sensing area of the fingerprint sensor in a sequence, wherein the spatially distinct regions of the sensing area are defined by a data input device operatively placed on the sensing area;
  removing the data input device to reveal the entire sensing area of the fingerprint sensor;
  repeatedly contacting, using the finger, the sensing area of the fingerprint sensor until sufficient images of the finger have been captured to generate a fingerprint template; and
  removing the smart card from the card reader.

Embodiment 45

The method of embodiment 44, wherein the entered activation code comprises a data input by simultaneously contacting two or more of the spatially distinct regions of the sensing area.

Embodiment 46

The method of embodiments 44 or 45, wherein the entered activation code is authenticated if it matches a predefined activation code.

Embodiment 47

The method of embodiment 44, wherein the entered activation code is a continuous input connecting two or more of the spatially distinct regions of the sensing area in a pattern.

Embodiment 48

The method of embodiment 47, wherein the entered activation code is authenticated if the pattern matches a predefined activation pattern.

Embodiment 49

A device comprising:
  a sensor with a removable data input device over the sensor, the removable data input device comprising a pattern of windows defining spatially distinct regions of the sensor.

Embodiment 50

The device of embodiment 49, wherein the device is a smart card.

Embodiment 51

The device of embodiment 49 or 50, wherein the sensor comprises a fingerprint sensor.

Embodiment 52

A fingerprint sensor and data input system comprising:

a plurality of sensor elements arranged in a two-dimensional array, each sensor element being configured to produce a signal in response to a finger surface placed in detectable proximity to the sensor element;

a data input device operatively coupled to the array and including two or more data input keys, each key being associated with one or more spatially distinct data input regions of the array; and a processor configured to detect and distinguish contact with each data input key via a signal produced by the one or more spatially distinct data input regions of the array associated with that data input key when the data input device is operatively coupled to the array and to detect variations in signals produced by sensor elements in detectable proximity to the finger surface that are indicative of features of a fingerprint of the finger surface and to form an image of the fingerprint of the finger surface when the data input device is not operatively coupled to the array.

Embodiment 53

The fingerprint sensor and data input system of embodiment 52, wherein the plurality of sensor elements arranged in the two-dimensional array comprises a plurality of spaced apart drives lines and a plurality of spaced apart pickup lines arranged transversely to the drive lines and separated from the drive lines by a layer of dielectric material.

Embodiment 54

The fingerprint sensor and data input system of embodiment 52, wherein the plurality of sensor elements arranged in the two-dimensional array comprises a first plurality of spaced apart conductive lines and a second plurality of spaced apart conductive lines arranged transversely to the first plurality of spaced apart conductive lines, wherein each conductive line of the first plurality of spaced apart conductive lines is configured to transmit a signal to the finger surface placed in detectable proximity and each conductive line of the second plurality of spaced apart conductive lines is configured to receive a resultant signal.

Embodiment 55

The fingerprint sensor and data input system of embodiments 52 to 54, wherein each data input key is electrically connected to the associated spatially distinct data input region of the array.

Embodiment 56

The fingerprint sensor and data input system of embodiments 52 to 55, wherein each data input key comprises:

one or more electrically conductive key traces remotely disposed with respect to the sensor array and configured to be selectively touched by a user finger;

one or more conductive sensing area activation traces, each sensing activation trace being disposed in detectable proximity to one data input region of the array; and a conductive connecting trace electrically connecting each of the one or more electrically conductive key traces with one of the sensing area activation traces.

Embodiment 57

The fingerprint sensor and data input system of embodiment 56, wherein the one or more electrically conductive key traces comprise conductive material applied on or embedded in the data input device.

Embodiment 58

The fingerprint sensor and data input system of embodiment 56 or 57, wherein the one or more conductive sensing area activation traces comprise conductive material applied on or embedded in the data input device.

Embodiment 59

The fingerprint sensor and data input system of any one of embodiments 56 to 58, wherein the connecting trace comprises conductive material applied on or embedded in the data input device.

Embodiment 60

The fingerprint sensor and data input system of any one of embodiments 52 to 59, wherein the array comprises one or more spatially distinct reference regions not associated with a data input key.

Embodiment 61

The fingerprint sensor and data input system of embodiment 60, wherein each spatially distinct reference region is positioned adjacent to at least one of the spatially distinct data input regions.

Embodiment 62

The fingerprint sensor and data input system of embodiment 60, wherein the processor is further configured to derive a signal variation based on a first signal produced from one of the spatially distinct reference regions and a second signal produced from one of the one or more spatially distinct data input regions as a result of contact by the user finger with the associated data input key.

Embodiment 63

The fingerprint sensor and data input system of embodiment 62, wherein the derivation of the signal variation comprises subtracting the first signal produced from the one reference region from the second signal produced from the one data input region.

Embodiment 64

The fingerprint sensor and data input system of any one of embodiments 52 to 63, wherein at least one of the data input keys comprises first and second electrically conductive contacts configured to be contacted simultaneously by a finger contacting the data input key, wherein the first electrically conductive contact is associated with a first of the spatially distinct data input regions and the second electrically conductive contact is associated with a second of the spatially distinct data input regions.

Embodiment 65

The fingerprint sensor and data input system of embodiment 64, wherein the first electrically conductive contact and the second electrically conductive contact are interdigitated conductive plates.

Embodiment 66

The fingerprint sensor and data input system of embodiment 64 or 65, wherein the processor is further configured to derive a signal variation based on a first signal produced from the first spatially distinct data input region of the array and a second signal produced from the second spatially distinct data input region of the array as a result of contact by the user finger with the data input key.

Embodiment 67

The fingerprint sensor and data input system of embodiment 66, wherein the derivation of the signal variation comprises subtracting the first signal produced from the first spatially distinct data input region of the array from the second signal produced from the second spatially distinct data input region of the array.

Embodiment 68

The fingerprint sensor and data input system of embodiments 64 to 67, wherein the first spatially distinct data input region is positioned adjacent to the second spatially distinct data input region.

Embodiment 69

The fingerprint sensor and data input system of embodiment 53, wherein each of the spatially distinct data input regions is substantially aligned with an orientation of the plurality of spaced apart pickup lines.

Embodiment 70

The fingerprint sensor and data input system of embodiment 53, wherein each of the spatially distinct data input regions is transverse with an orientation of the plurality of spaced apart pickup lines.

Embodiment 71

The fingerprint sensor and data input system of any one of embodiments 52 to 70 further comprising a power source temporarily connectable to the sensor elements and the processor.

Embodiment 72

The fingerprint sensor and data input system of embodiment 71, wherein the power source comprises a battery.

Embodiment 73

The fingerprint sensor and data input system of embodiment 71, wherein the power source comprises a solar cell.

Embodiment 74

The fingerprint sensor and data input system of embodiment 73, wherein the solar cell is carried on a portion of the data input device.

Embodiment 75

A fingerprint sensor and data input system comprising:
a fingerprint sensor comprising an array of capacitive sensor elements, each sensor element being configured to produce a contact signal when contacted by a finger; and
a data input device configured to be removably attached to a host device incorporating the fingerprint sensor and including two or more data input keys,
wherein each data input key is remotely coupled with one or more associated data input regions of the array so that the sensor elements encompassed by the associated data input region produce a contact signal when a user touches the data input key.

Embodiment 76

The fingerprint sensor and data input system of embodiment 75, wherein the data input device comprises an upper layer and a lower layer,
the upper layer comprising a hole associated with each of the two or more data input keys, and
the lower layer comprising the two or more data input keys, each data input key electrically connected to the associated data input region of the array.

Embodiment 77

The fingerprint sensor and data input system of embodiment 75, wherein each data input key comprises:
a conductive key trace disposed on a top surface of the data input device,
a conductive sensing area activation trace disposed on a bottom surface of the data input device, and
a conductive connecting trace extending through the data input device and electrically connecting the key trace with the sensing area activation trace.

Embodiment 78

The fingerprint sensor and data input system of any one of embodiments 75 to 77, wherein the data input device is removably attached to the host device with a repositionable adhesive.

Embodiment 79

The fingerprint sensor and data input system of any one of embodiments 75 to 78, wherein the data input device further comprises a conductive positioning feature which contacts the array when the data input device is attached to the host device, wherein the fingerprint sensor is configured to detect the positioning feature, to compare a position of the positioning feature with an expected position of the positioning feature when the data input device is attached to the host device, and to determine the position of the data input device with respect to the array based on the comparison.

Embodiment 80

The fingerprint sensor and data input system of embodiment 79, wherein the fingerprint sensor is further configured to calibrate positions of the data input regions based on the position of the data input device with respect to the array.

Embodiment 81

The fingerprint sensor and data input system of embodiment 75, wherein the data input device comprises:
a remote keypad device including the two or more data input keys, and
a data transfer cable electrically coupling the data input keys electrically to each associated data input region.

Embodiment 82

The fingerprint sensor and data input system of any one of embodiments 75 to 81, wherein the array of capacitive sensor elements is a two-dimensional array or a one-dimensional array.

Embodiment 83

A data input system comprising:
a host device with a sensor; and
a data input device removably disposed over the sensor, the data input device comprising two or more data input keys, wherein each data input key is associated with one or more spatially distinct data input regions of a sensing area of the sensor.

Embodiment 84

The system of embodiment 83, wherein the host device comprises a smart card.

Embodiment 85

The system of embodiment 83 or embodiment 84, wherein the sensor comprises a fingerprint sensor.

Embodiment 86

The system of any one of embodiments 83 to 85, wherein the data input device is wrapped around a portion of the host device containing the sensor so as to cover at least a part of a first surface of the host device in which the sensor is disposed and a second surface of the host device different from the first surface.

Embodiment 87

The host device of embodiment 86, wherein the data input device comprises at least one data input key on the portion of the data input device covering the first surface and at least one data input key on the portion of the data input device covering the second surface.

Embodiment 88

A data input device removably attachable with respect to an array of contact sensor elements, said data input device comprising:
two or more data input keys remotely disposed with respect to a portion of the data input device covering the array, each data input key comprising a conductive key trace disposed on the data input device;
a conductive sensing area activation trace associated with each data input key and configured to be disposed over a spatially discrete portion of the array when the data input device is removably attached with respect to the array, and
a conductive connecting trace electrically connecting each conductive key trace with the associated sensing area activation trace.

Embodiment 89

A method for enrolling a fingerprint on a smart card containing a fingerprint sensor, the method comprising:
connecting the smart card to a power source;
entering an activation code by using a finger to contact two or more data input keys of a data input device attached to the smart card in a sequence corresponding to the activation code, wherein a portion of the data input device is positioned over a sensing area of the fingerprint sensor and each data input key is associated with one or more spatially distinct data input regions of the sensing area;
removing a portion of the data input device from the smart card to uncover the sensing area of the fingerprint sensor;
contacting the sensing area of the fingerprint sensor one or more times with a finger to enroll a fingerprint template; and
disconnecting the smart card from the power source.

Embodiment 90

The method of embodiment 89, wherein the entered activation code comprises a data input by simultaneously contacting two or more data input keys.

Embodiment 91

The method of embodiment 89 or embodiment 90, wherein the power source is a wireless power source configured to wirelessly power the fingerprint sensor, and the connecting step comprises placing the smart card in operative proximity to the wireless power source.

Embodiment 92

The method of embodiment 89, wherein the data input device comprises the power source, the power source electrically coupled to the fingerprint sensor.

Embodiment 93

The method of embodiment 92, wherein the power source is a solar cell panel and
wherein the step of connecting the smart card to the power source comprises removing an overlay removably placed over the solar cell panel contained in the data input device.

Embodiment 94

A smart card comprising:
a card body capable of deflection along any axis lying in the plane of the card;
a fingerprint sensor for authenticating a user of the smart card;
a data storage element storing an activation code;
a data input device coupled to the fingerprint sensor to associate distinct areas of the data input device with distinct areas of the fingerprint sensor, each distinct area of the sensor corresponding to a uniquely identifiable portion of an activation code; and
a processor configured to translate a code input by a user interacting with the fingerprint sensor via the data input device and to compare the code input by the user with the stored activation code.

Embodiment 95

The smart card of embodiment 94, wherein the fingerprint sensor comprises a plurality of sensor elements arranged in a two-dimensional array, each sensor element being configured to produce a signal in response to a finger surface placed in detectable proximity to the sensor element.

Embodiment 96

A method for enrolling a fingerprint sensor comprising:
defining an activation code to initiate an enrollment process for the fingerprint sensor;
and
enabling a user to enter the activation code into the fingerprint sensor by interacting with each of two or more distinct portions of the fingerprint sensor, wherein each of the two or more distinct portions of the fingerprint sensor corresponds to a uniquely-identifiable portion of the activation code.

Embodiment 97

The method of 96, wherein the fingerprint sensor comprises a plurality of sensor elements arranged in a two-dimensional array, each sensor element being configured to produce a signal in response to a finger surface placed in detectable proximity to the sensor element.

Embodiment 98

A method for enrolling a fingerprint template on a smart card having a fingerprint sensor, said method comprising:
connecting one or more power transmission contacts of the smart card to a power source without connecting any data transmission contacts of the smart card to a device configured to transmit or receive data;
automatically activating an enrollment mode in the fingerprint sensor upon a specific instance of connecting the one or more power transmission contacts of the smart card to the power source;
enrolling a fingerprint by storing a fingerprint template derived from one or more fingerprint images generated by placing a finger on the fingerprint sensor; and
upon completion of the enrolling step, automatically deactivating the enrollment mode in the fingerprint sensor.

Embodiment 99

The method of embodiment 98, further comprising automatically deactivating the enrollment mode in the fingerprint sensor upon disconnecting the one or more power transmission contacts of the smart card from the power source before completing the enrolling step.

Embodiment 100

The method of embodiment 98 or embodiment 99, further comprising providing a confirming indication that the smart card is in enrollment mode after the specific instance of connecting the one or more power transmission contacts of the smart card to the power source.

Embodiment 101

The method of embodiment 100, wherein the confirming indication that the smart card is in enrollment mode comprises illuminating a light on the smart card.

Embodiment 102

The method of any one of embodiments 98 to 101, further comprising providing a confirming indication that the enrolling step is successfully completed.

Embodiment 103

The method of embodiment 102, wherein the confirming indication that the enrolling step is successfully completed comprises illuminating a light on the smart card.

Embodiment 104

The method of any one of embodiments 98 to 103, further comprising providing a confirming indication that the one or more power transmission contacts of the smart card are connected to the power source.

Embodiment 105

The method of embodiment 104, wherein the confirming indication that the one or more power transmission contacts of the smart card are connected to the power source comprises illuminating a light on the smart card.

Embodiment 106

The method of any one of embodiments 98 to 105, wherein the specific instance is the first instance.

Embodiment 107

A method for enrolling a fingerprint template on a smart card having a fingerprint sensor, said method comprising;
connecting one or more power transmission contacts of the smart card to a power source without connecting any data transmission contacts of the smart card to a device configured to transmit data to or receive data from the smart card;
determining if a fingerprint template has been enrolled for the fingerprint sensor of the smart card;
if no fingerprint template has been enrolled for the fingerprint sensor of the smart card, automatically activating an enrollment mode in the fingerprint sensor upon connecting the one or more power transmission contacts of the smart card to the power source;

enrolling a fingerprint by storing a fingerprint template derived from one or more fingerprint images generated by placing a finger on the fingerprint sensor; and upon completion of the enrolling step, automatically deactivating the enrollment mode in the fingerprint sensor.

Embodiment 108

The method of embodiment 107, further comprising providing a confirming indication that the smart card is in enrollment mode after the specific instance of connecting the one or more power transmission contacts of the smart card to the power source.

Embodiment 109

The method of embodiment 108, wherein the confirming indication that the smart card is in enrollment mode comprises illuminating a light on the smart card.

Embodiment 110

The method of any one of embodiments 107 to 109, further comprising providing a confirming indication that the enrolling step is successfully completed.

Embodiment 111

The method of embodiment 110, wherein the confirming indication that the enrolling step is successfully completed comprises illuminating a light on the smart card.

Embodiment 112

The method of any one of embodiments 107 to 111, further comprising providing a confirming indication that the one or more power transmission contacts of the smart card are connected to the power source.

Embodiment 113

The method of embodiment 112, wherein the confirming indication that the one or more power transmission contacts of the smart card are connected to the power source comprises illuminating a light on the smart card.

Embodiment 114

The method of any one of embodiments 107 to 113, wherein the specific instance is the first instance.

Embodiment 115

A fingerprint sensor and data input system comprising:
a plurality of sensor elements arranged in a two-dimensional array, each sensor element being configured to produce a signal in response to a finger surface placed in detectable proximity to the sensor element;
a data input device, including a portion disposed over the array and including a pattern of piercings formed in the portion of the data input device disposed over the array, wherein the piercings are spatially associated with one or more spatially distinct data input regions of the array; and
a processor configured to detect a finger placed in contact with the associated spatially distinct data input regions of the array and to detect a pattern of signals produced by the spatially distinct data input regions contacted through the pattern of piercings.

Embodiment 116

The fingerprint sensor and data input system of embodiment 115, wherein the processor is further configured to compare the pattern of signals detected with a predefined pattern to determine if the pattern of piercings of the data input device corresponds to the predefined pattern.

Embodiment 117

A fingerprint sensor and data input system comprising:
a plurality of sensor elements arranged in a two-dimensional array, each sensor element being configured to produce a signal in response to a finger surface placed in detectable proximity to the sensor element;
a data input device, including a portion disposed over the array and including a pattern of conductive material applied to the portion of the data input device disposed over the array, wherein the pattern is spatially associated with one or more spatially distinct data input regions of the array; and
a processor configured to detect contact of the pattern of conductive material with the associated spatially distinct data input regions of the array and to detect a pattern of signals produced by the spatially distinct data input regions contacted by the pattern of conductive material.

Embodiment 118

The fingerprint sensor and data input system of embodiment 117, wherein the processor is further configured to compare the pattern of signals detected with a predefined pattern to determine if the pattern of conductive material of the data input device corresponds to the predefined pattern.

Embodiment 119

A fingerprint sensor and data input system comprising:
a plurality of sensor elements arranged in a two-dimensional array, each sensor element being configured to produce a signal in response to a finger surface placed in detectable proximity to the sensor element;
a data input device partially disposed over the array and including two or more data input keys, each key being associated with one or more spatially distinct data input regions of a first portion of the array, and a cutout exposing a second portion of the array; and
a processor configured to detect and distinguish contact with each data input key via a signal produced by the one or more spatially distinct data input regions of the array associated with that data input key and to detect variations in signals produced by sensor elements of the second portion of the array in detectable proximity to the finger surface that are indicative of features of a fingerprint of the finger surface.

Embodiment 120

The fingerprint sensor and data input system of embodiment 119, wherein each data input key is electrically connected to the associated spatially distinct data input region of the array.

Embodiment 121

The fingerprint sensor and data input system of embodiment 119 or 120, wherein each data input key comprises:

one or more electrically conductive key traces remotely disposed with respect to the first portion of the sensor array and configured to be selectively touched by a user finger;

one or more conductive sensing area activation traces, each sensing area activation trace being disposed in detectable proximity to one data input region of the array; and a conductive connecting trace electrically connecting each of the one or more electrically conductive key traces with one of the sensing area activation traces.

Embodiment 122

The fingerprint sensor and data input system of embodiment 121, wherein the one or more electrically conductive key traces comprise conductive material applied on or embedded in the data input device.

Embodiment 123

A device including a fingerprint sensor and data input system and comprising:

a plurality of sensor elements arranged in a two-dimensional array, each sensor element being configured to produce a signal in response to a finger surface placed in detectable proximity to the sensor element;

two or more data input keys disposed on a portion of the device remote from the plurality of sensors, each data input key being coupled with one or more spatially distinct data input regions of a first portion of the array so that contact with the data input key results in a signal produced by sensor elements within each spatially distinct data input region coupled to the data input key; and a processor configured to detect and distinguish contact with each data input key via a signal produced by the one or more spatially distinct data input regions of the array coupled with that data input key and to detect variations in signals produced by sensor elements of a second portion of the array in detectable proximity to the finger surface that are indicative of features of a fingerprint of the finger surface.

Embodiment 124

A method for enrolling a fingerprint on a smart card containing a fingerprint sensor, the method comprising:

connecting the smart card to a power source;

entering an activation code by using a finger to contact two or more data input keys of a data input device attached to the smart card in a sequence corresponding to the activation code, wherein a portion of the data input device is positioned over a portion of the sensing area of the fingerprint sensor, and each data input key is associated with one or more spatially distinct data input regions of a portion of the sensing area;

contacting the portion of the sensing area of the fingerprint sensor that is not covered by a portion of the data input device one or more times with a finger to enroll a fingerprint template;

and disconnecting the smart card from the power source.

Embodiment 125

A method for enrolling a fingerprint template on a smart card having a fingerprint sensor, said method comprising:

connecting one or more power transmission contacts of the smart card to a power source without connecting any data transmission contacts of the smart card to a device configured to transmit or receive data;

activating an enrollment mode in the fingerprint sensor upon detection of a trigger event;

enrolling a fingerprint by storing a fingerprint template derived from one or more fingerprint images generated by placing a finger on the fingerprint sensor; and upon completion of the enrolling step, deactivating the enrollment mode in the fingerprint sensor.

Embodiment 126

The method of embodiment 125, wherein the trigger event comprises one or more trigger events selected from the list consisting of:

a. user interactions with the biometric sensor assembly;

b. placing a detectable object on the biometric sensor assembly;

c. removing a detectable object from the biometric sensor assembly;

d. detecting the absence of a stored verification template;

e. detecting the presence of a stored verification template that is partially complete;

f. detecting that power is being transmitted to the smart card for the first time;

g. detecting a specified instance of power being transmitted to the smart card;

h. detection that a maximum number of unsuccessful attempts to derive a verification template has not been reached;

I. activating an input mechanism;

j. expiration of a timer or counter;

k. occurrence of an error state;

l. detection of a flag set last time the smart card was inserted in a card reader that transmits data to or from the smart card;

m. detection that the smart card has been connected to a power source that does not transmit data to or from the card;

n. detection of a trigger event by a component of the smart card other than the biometric sensor assembly; and o. detection that a particular smart card has been coupled to a particular non-data-transmitting power source.

Embodiment 127

A power source for a smart card comprising:

a power element; and a housing comprising:

a slot configured to receive an end of the smart card; and contacts connected to the power element, wherein the contacts contact power transmission contact pads of the smart card and do not contact data transmission contact pads of the smart card when the smart card is inserted into the slot to thereby connect the power transmission contact pads of the smart card to the power element.

Embodiment 128

The power source of embodiment 127, wherein the power element is a battery.

Embodiment 129

The power source of embodiment 127, wherein the power element is a socket on the power source to allow connection to a main power source.

Embodiment 130

The power source of embodiment 127, wherein the housing is made of plastic.

Embodiment 131

The power source of embodiment 127, wherein the housing may include one or more status indicators.

Embodiment 132

The power source of embodiment 131, where the power source further comprises a detector circuit that, responsive to detecting that a component on the smart card has modulated a power line to indicate its state, activates the one or more status indicators to indicate the detected state to a user.

Embodiment 133

An overlay configured to provide power to an electronic device having terminals for connecting a source of electric power to the electronic device, wherein the overlay is configured to be removably secured to a surface of the electronic device and comprises:
 a film configured to conform to the surface of the electronic device when secured thereto;
 a power element supported on the film;
 conductive material disposed on or embedded in a surface of the film, wherein the conductive material connects the power element to the terminals of the electronic device when the overlay is secured to the surface of the electronic device; and
 a circuit closure configured to enable a user to selectively close a power circuit between the power element and the terminals of the electronic device to enable power transmission between the power element and the electronic device.

Embodiment 134

The overlay of embodiment 133, wherein the power element comprises a battery, a solar chip, a USB plug or an NFC transceiver.

Embodiment 135

The overlay of embodiment 133 or 134, wherein the overlay further includes:
 a power element contact pad disposed on the film and on which the power element is disposed; and
 a conductive contact disposed on a portion of the film that is spatially distinct from the power element contact pad, and wherein the conductive material comprises a first power connection trace extending from the power element contact pad to a first terminal of the electronic device and a second power connection trace extending from the conductive contact to a second terminal of the electronic device, and wherein the circuit closure comprises a portion of the film on which the conductive contact is disposed that is foldable so as to place the conductive contact in contact with the power element disposed on the power element contact pad.

Embodiment 136

The overlay of embodiment 133 or 134, wherein the overlay further includes:
 a power element contact pad disposed on the film and on which the power element is disposed; and
 a conductive clip positioned on the film and configured to hold the power element in place on the power element contact pad, and wherein the conductive material comprises a first power connection trace extending from the power element contact pad to a first terminal of the electronic device and a second power connection trace extending from the a portion of the conductive clip to a second terminal of the electronic device, and wherein the circuit closure comprises a non-conductive material disposed between the clip and the power element and which can be removed by a user to complete the power circuit through the power element.

Embodiment 137

The overlay of any one of embodiments 133 to 136, further comprising an adhesive on a surface of the film for removably securing the film to the surface of the electronic device.

Embodiment 138

The overlay of any one of embodiments 133 to 137, further comprising:
 one or more electrically conductive key traces disposed on the film and configured to be selectively touched by a user finger;
 one or more conductive sensing area activation traces, each sensing area activation trace being disposed on the film in detectable proximity to one data input region of a two-dimensional array of sensor elements of the electronic device, each sensor element being configured to produce a signal in response to a finger surface placed in detectable proximity to the sensor element; and
 a conductive connecting trace disposed on the film and electrically connecting each of the one or more electrically conductive key traces with one of the sensing area activation traces.

Embodiment 139

The overlay of embodiment 138, wherein the film includes a cutout exposing a portion of the array.

Embodiment 140

The overlay of any one of embodiments 133 to 139, wherein the electronic device is a smart card, and the overlay covers at least a portion of a surface of the smart card.

Embodiment 141

The overlay of any one of embodiments 133 to 140, wherein the overlay is configured to connect to data transmission terminals of the electronic device.

Embodiment 142

The overlay of embodiment 141, wherein the overlay enables a wired or wireless communication channel between the data transmission terminals of the electronic device and a second electronic device.

Embodiment 143

The overlay of embodiment 141 or 142, further comprising status indicators configured to indicate information transmitted to or received from the data transmission terminals.

Embodiment 144

A method for enrolling a biometric template on an electronic device having power terminals, data transmission terminals and a biometric sensor, the method comprising:
  connecting an overlay to the electronic device, wherein the overlay is configured to provide power to the electronic device from a power element mounted on the overlay to the power terminals of the electronic device and to connect to the data transmission terminals of the electronic device;
  closing a power circuit between the power element and the power terminals of the electronic device to enable power transmission between the power element and the electronic device;
  triggering the biometric sensor to enter an enrollment mode; and
  generating the biometric template from biometric inputs from a user to the biometric sensor.

Embodiment 145

A finger guide configured to be removably attached to a device having a fingerprint sensor and comprising two or more channels, wherein each channel is configured to position a finger placed thereon to contact the fingerprint sensor at a different orientation.

Embodiment 146

The finger guide of embodiment 145, wherein each channel is spaced from each other channel by an angle in the plane of a sensing surface of the fingerprint sensor.

Embodiment 147

The finger guide of embodiment 145 or 146, wherein at least one channel positions the finger to contact the fingerprint sensor at an elevation angle relative to the plane of the sensing surface.

Embodiment 148

The finger guide of any one of embodiments 145 to 147, wherein at least two channels position the finger to contact the fingerprint sensor at an elevation angle relative to the plane of the sensing surface and wherein the elevation angle of each of the two channels is different from the other.

Embodiment 149

The finger guide of any one of embodiments 145 to 148, wherein each channel is spaced 90 degrees from one other channel.

Embodiment 150

The finger guide of any one of embodiments 145 to 149, comprising a base plate having a surface conforming or conformable to a surface of the device on which the finger guide is removably attached, wherein a removable adhesive is applied to the surface of the base plate.

Embodiment 151

The finger guide of any one of embodiments 145 to 150, wherein at least one of the channels is formed on a raised section that is adjacent to the fingerprint sensor so that the finger placed on the channel contacts the fingerprint sensor at an elevation angle with respect to a plane of the fingerprint sensor.

Embodiment 152

The finger guide of embodiment 151, further comprising a front stop disposed on an opposite side of the fingerprint sensor from the raised section.

Embodiment 153

The finger guide of any one of embodiments 145 to 152, including a cutout formed therein to expose the fingerprint sensor.

Embodiment 154

The finger guide of any one of embodiments 145 to 153, wherein each channel is formed on a channel wing.
Embodiment 155 The finger guide of embodiment 154, wherein at least one channel wing extends beyond an edge of the device when the finger guide is attached to the device in operative proximity to the fingerprint sensor.

Embodiment 156

The finger guide of any one of embodiments 145 to 155, further comprising a power element to provide a source of electrical power and contacts connected to the power element, wherein the contacts contact power transmission elements of the device when the finger guide is attached to the device to thereby connect the power transmission element of the device to the power element.

Embodiment 157

The finger guide of any one of embodiments 145 to 156, further comprising a data input device partially disposed over the fingerprint sensor and including two or more data input keys, each data input key being associated with one or more spatially distinct data input regions of the portion of the fingerprint sensor over which the data input device is disposed.

Embodiment 158

The finger guide of any one of embodiments 146 to 157, wherein the finger guide is configured to be moveable with respect to the fingerprint sensor to selectively place a different one of the channels in operative proximity to the fingerprint sensor.

Embodiment 159

The finger guide of embodiment 158, wherein the finger guide is linearly movable with respect to the fingerprint sensor.

Embodiment 160

The finger guide of embodiment 158, wherein the finger guide is rotatable with respect to the fingerprint sensor.

Embodiment 161

A power source and finger guide for a smart card including a fingerprint sensor comprising:
a power element;
a card holder frame comprising:
one or more card guide rails into which the smart card is inserted to position the cardholder frame with respect to the smart card; and
contacts connected to the power element, wherein the contacts contact power transmission contact pads of the smart card when the smart card is inserted into the card guide rail to thereby connect the power transmission contact pads of the smart card to the power element; and
a finger guide attached to the card holder frame and comprising two or more channels, wherein each channel is configured to position a finger placed thereon to contact the fingerprint sensor at a different orientation.

Embodiment 162

A fingerprint sensor and data input system comprising:
a plurality of sensor elements arranged in a two-dimensional array, each sensor element being configured to produce a signal in response to a finger surface placed in detectable proximity to the sensor element;
a data input device partially disposed over the array and including two or more data input keys, each key being associated with one or more spatially distinct data input regions of a first portion of the array, and a cutout exposing a second portion of the array;
a processor configured to detect and distinguish contact with each data input key via a signal produced by the one or more spatially distinct data input regions of the array associated with that data input key and to detect variations in signals produced by sensor elements of the second portion of the array in detectable proximity to the finger surface that are indicative of features of a fingerprint of the finger surface; and
finger guide comprising two or more channels, wherein each channel is configured to position a finger placed thereon to contact the two-dimensional array at a different orientation.

Embodiment 163

A method for enrolling a fingerprint on a smart card containing a fingerprint sensor, the method comprising:
connecting the smart card to a power source;
entering into an enrollment mode upon determination of a trigger event;
contacting the fingerprint sensor by placing the same finger on each of two or more finger guide channels configured to position the finger placed thereon in a unique orientation with respect to the fingerprint sensor to enroll a fingerprint template for that finger; and
disconnecting the smart card from the power source after enrolling the fingerprint template.

Embodiment 164

The method of embodiment 163, wherein the trigger event comprises one or more trigger events selected from the list consisting of:
a. user interactions with the biometric sensor assembly;
b. placing a detectable object on the biometric sensor assembly;
c. removing a detectable object from the biometric sensor assembly;
d. detecting the absence of a stored verification template;
e. detecting the presence of a stored verification template that is partially complete;
f. detecting that power is being transmitted to the smart card for the first time;
g. detecting a specified instance of power being transmitted to the smart card;
h. detection that a maximum number of unsuccessful attempts to derive a verification template has not been reached;
I. activating an input mechanism;
j. expiration of a timer or counter;
k. occurrence of an error state;
l. detection of a flag set last time the smart card was inserted in a card reader that transmits data to or from the smart card;
m. detection that the smart card has been connected to a power source that does not transmit data to or from the card;
n. detection of a trigger event by a component of the smart card other than the biometric sensor assembly; and
o. detection that a particular smart card has been coupled to a particular non-data-transmitting power source.

Embodiment 165

The method of embodiment 163 or embodiment 164, wherein enrolling the fingerprint template comprises determining that a specified number of acceptable fingerprint sensor images has been generated for each finger guide channel.

Embodiment 166

A method for re-enrolling a fingerprint on a smart card containing a fingerprint sensor wherein at least one fingerprint template has been previously enrolled, the method comprising:
A. connecting the smart card to a power source;
B. entering into a re-enrollment mode upon determination of a trigger event;
C. contacting the fingerprint sensor by sequentially placing the same finger on each of two or more finger guide channels configured to position the finger placed thereon in a unique orientation with respect to the fingerprint sensor to enroll a fingerprint template for that finger;
D. replacing the previously enrolled fingerprint template with a new fingerprint template formed from fingerprint images generated during step C or updating the previously enrolled fingerprint template with fingerprint images generated during step C; and
E. disconnecting the smart card from the power source.

Embodiment 167

The method of embodiment 166, wherein the trigger event for entering re-enrollment mode comprises one or more of inserting the card into power source, detection of a specific instance of card connection to the power source, detection of an existing fingerprint template already enrolled, detection of a certain card inserted into a certain power source, verifying a user by matching a finger against existing fingerprint template, entry of an activation code, receiving a signal from a secure element module of the card, a counter of number of uses below a certain threshold, the age of card below a certain threshold, a maximum number of allowable re-enrollments not yet reached, user interactions with the sensor, placing or removing an overlay, placing or removing a data input device in the form of an overlay or a sleeve on the biometric sensor, and activation of an input mechanism.

Embodiment 168

A method for enrolling two or more fingerprints on a device containing a fingerprint sensor, the method comprising:
 A. connecting the device to a power source;
 B. entering into a first enrollment mode upon determination of a trigger event;
 C. enrolling a first fingerprint template for a first finger,
 D. entering a subsequent enrollment mode upon determination of a trigger event;
 E. enrolling a subsequent fingerprint template for a subsequent finger different from a previously enrolled finger;
 F. determining if a required number of fingers has been enrolled;
 G. if the required number of fingers has not been enrolled, return to step D; and
 H. if the required number of fingers has been enrolled, disconnecting the smart card from the power source.

Embodiment 169

A system for enrolling a verification template of biometric data in a biometric-enabled smart card, the system comprising:
 a non-data-transmitting power source configured to be coupled to the smart card to transmit power to the smart card without transmitting data to or from the smart card, wherein the non-data-transmitting power source comprises a power element and a receptacle configured to receive an end of the smart card; and
 a biometric sensor assembly comprising one or more sensor elements and associated circuitry for controlling operation of the one or more sensor elements and for processing signals from the one or more sensor elements,
 wherein the biometric sensor assembly is configured to be installed in the smart card whereby power is transmitted to the biometric sensor assembly when the non-data-transmitting power source is coupled to the smart card,
 wherein the biometric sensor assembly is configured to operate in an enrollment mode when power is transmitted to the biometric sensor assembly by the non-data-transmitting power source, and
 wherein, when operating in enrollment mode, the biometric sensor assembly is configured to derive and store a verification template of biometric data from one or more biometric images generated by the one or more sensor elements.

Embodiment 170

The system of Embodiment 169, wherein the biometric sensor assembly is configured to operate in an enrollment mode when the non-data-transmitting power source is coupled to the smart card and power is transmitted to the biometric sensor assembly combined with the occurrence of a trigger event.

Embodiment 171

The system of Embodiment 169 or Embodiment 170, wherein the biometric sensor assembly is configured to terminate enrollment mode when the non-data-transmitting power source is uncoupled from the smart card and power is no longer transmitted to the biometric sensor assembly.

Embodiment 172

The system of Embodiment 169 or Embodiment 170, wherein the biometric sensor assembly is configured to terminate enrollment mode after the verification template of biometric data is stored.

Embodiment 173

The system any one of Embodiments 169 to 172, wherein the biometric sensor assembly comprises a fingerprint sensor, and the verification template is derived from one or more fingerprint images.

Embodiment 174

The system of any one of Embodiments 169 to 173, wherein the non-data-transmitting power source comprises one or more terminals configured to contact one or more corresponding power transmission contacts of the smart card when the non-data-transmitting power source is coupled to the smart card, and wherein the non-data-transmitting power source lacks any terminals contacting data transmission contacts of the smart card when the non-data-transmitting power source is coupled to the smart card.

Embodiment 175

The system of Embodiment 170, wherein the trigger event comprises one or more trigger events selected from the group consisting of:
 a. user interactions with the biometric sensor assembly;
 b. placing a detectable object on the biometric sensor assembly;
 c. removing a detectable object from the biometric sensor assembly;
 d. detecting the absence of a stored verification template;
 e. detecting the presence of a stored verification template that is partially complete;
 f. detecting that power is being transmitted to the smart card for the first time;
 g. detecting a specified instance of power being transmitted to the smart card;
 h. detecting that a maximum number of unsuccessful attempts to derive a verification template has not been reached;
 I. activating an input mechanism;
 j. detecting that a timer or counter has not expired;
 k. detecting the occurrence of an error state indicating that a recoverable error has occurred to prevent successful derivation or storing of a verification template;
 l. detection of a flag set the last time the smart card was inserted in a card reader that transmits data to or from the smart card;

m. detecting that the smart card has been connected to a power source that does not transmit data to or from the smart card;

n. detection of a trigger event by a component of the smart card other than the biometric sensor assembly; and o. detecting that a particular smart card has been coupled to a particular non-data-transmitting power source.

Embodiment 176

The system of any one of Embodiments 169 to 175, wherein the power element is a battery, a solar cell or a socket on the non-data-transmitting power source to allow connection to a mains power source.

Embodiment 177

The system of any one of Embodiments 169 to 176, wherein the biometric sensor assembly comprises a fingerprint sensor and wherein the receptacle comprises:

a card holder frame comprising one or more card guide rails into which the smart card is inserted to position the cardholder frame with respect to the smart card; and a finger guide attached to the card holder frame and comprising two or more channels, wherein each channel is configured to position a finger placed thereon to contact the fingerprint sensor at a different orientation.

Embodiment 178

The system of Embodiment 177, wherein each channel is spaced from each other channel by an angle in a plane of a sensing surface of the fingerprint sensor.

Embodiment 179

The system of Embodiment 178, wherein at least one of the channels positions the finger to contact the fingerprint sensor at an elevation angle relative to the plane of the sensing surface.

Embodiment 180

The system of Embodiment 178 or Embodiment 179, wherein at least two channels position the finger to contact the fingerprint sensor at an elevation angle relative to the plane of the sensing surface and wherein the elevation angle of each of the two channels is different from the other.

Embodiment 181

The finger guide of any one of Embodiments 177 to 180, wherein each channel is spaced 90 degrees from one other channel.

Embodiment 182

A method for enrolling a biometric template on a smart card having a biometric sensor, the method comprising:

inserting an end of the smart card into a receptacle;

transmitting power to the smart card from the receptacle without transmitting data to or from the smart card;

causing the biometric sensor to operate in an enrollment mode;

while the biometric sensor is operating in enrollment mode, generating one or more biometric images with the biometric sensor;

deriving at least one verification template of biometric data from the one or more biometric images;

storing the verification template; and after storing the verification template, terminating enrollment mode in the biometric sensor.

Embodiment 183

The method of Embodiment 182, comprising causing the biometric sensor to operate in the enrollment mode when power is transmitted to the biometric sensor assembly combined with the occurrence of a trigger event.

Embodiment 184

The method of Embodiment 183, wherein the trigger even comprises one or more trigger events selected from the group consisting of:

a. user interactions with the biometric sensor assembly;

b. placing a detectable object on the biometric sensor assembly;

c. removing a detectable object from the biometric sensor assembly;

d. detecting the absence of a stored verification template;

e. detecting the presence of a stored verification template that is partially complete;

f. detecting that power is being transmitted to the smart card for the first time;

g. detecting a specified instance of power being transmitted to the smart card;

h. detecting that a maximum number of unsuccessful attempts to derive a verification template has not been reached;

I. activating an input mechanism;

j. detecting that a timer or counter has not expired;

k. detecting the occurrence of an error state indicating that a recoverable error has occurred to prevent successful derivation or storing of a verification template;

l. detection of a flag set the last time the smart card was inserted in a card reader that transmits data to or from the smart card;

m. detecting that the smart card has been connected to a power source that does not transmit data to or from the smart card;

n. detection of a trigger event by a component of the smart card other than the biometric sensor assembly; and o. detecting that a particular smart card has been coupled to a particular non-data-transmitting power source.

Embodiment 185

The method of any one of Embodiments 182 to 184, further comprising automatically terminating enrollment mode in the biometric sensor upon terminating power transmission to the smart card.

Embodiment 186

The method of any of Embodiments 182 to 184, further comprising automatically terminating enrollment mode in the biometric sensor after the verification template of biometric data is stored.

Embodiment 187

The method of any one of Embodiments 182 to 186, further comprising providing a confirming indication that the biometric sensor is operating in enrollment mode.

Embodiment 188

The method of any one of Embodiments 182 to 187, further comprising illuminating a light or lights on the smart card confirming that the verification template is stored.

Embodiment 189

The method of any one of Embodiments 182 to 188, wherein the biometric sensor comprises a fingerprint sensor, and the verification template is derived from one or more fingerprint images.

Embodiment 190

The method of Embodiment 189, wherein generating one or more biometric images with the biometric sensor comprises instructing a user to contact the fingerprint sensor by placing the same finger on each of two or more finger guide channels configured to position the finger placed thereon in a different orientation with respect to the fingerprint sensor.

Embodiment 191

The method of Embodiment 189 or Embodiment 190, wherein deriving the least one verification template comprises determining that a specified number of acceptable fingerprint images has been generated.

Embodiment 192

A device to facilitate the enrollment of a verification template of fingerprint data in a fingerprint sensor-enabled smart card, the device comprising:
a receptacle configured to be removably coupled to the smart card;
a power element supported on the receptacle, wherein the receptacle is configured to transmit power from the power element to the fingerprint sensor of the smart card when the receptacle is coupled to the smart card;
a finger guide attached to the receptacle and comprising two or more finger guide channels, wherein the finger guide is configured so that each finger guide channel is adjacent the fingerprint sensor of the smart card when the receptacle is coupled to the smart card, and wherein each finger guide channel is configured to position a finger placed thereon to contact the fingerprint sensor at a different orientation; and
two or more status indicators, wherein each status indicator is associated with one finger guide channel and is configured to instruct the user with respect to the placement and removal of the user's finger with respect to the associated finger guide channel.

Embodiment 193

The device of embodiment 192, wherein the receptacle comprises one or more terminals configured to contact one or more corresponding power transmission contacts on the surface of the smart card when the receptacle is coupled to the smart card.

Embodiment 194

The device of embodiment 192 or embodiment 193, wherein the power element is a battery, a solar cell, or a socket connected to the receptacle to allow connection to a mains power source.

Embodiment 195

The device of any one of embodiments 192 to 194, wherein the receptacle comprises a card holder frame into which the smart card is inserted to couple the cardholder frame to the smart card.

Embodiment 196

The device of any one of embodiments 192 to 195, wherein each finger guide channel is spaced from each other finger guide channel by an angle in a plane of a sensing surface of the fingerprint sensor.

Embodiment 197

The device of any one of embodiments 192 to 196, wherein at least one of the finger guide channels positions the finger to contact the fingerprint sensor at an elevation angle relative to the plane of the sensing surface.

Embodiment 198

The device of any one of embodiments 192 to 197, wherein each finger guide channel is spaced 90 degrees from one other finger guide channel.

Embodiment 199

The device of any one of embodiments 192 to 198, wherein the status indicators comprise one or more of a light source, an audio source, a vibrating element, and a graphic display.

Embodiment 200

The device of any one of embodiments 192 to 199, wherein the status indicators comprise light sources disposed on the receptacle.

Embodiment 201

The device of any one of embodiments 192 to 200, wherein the status indicators comprise light sources disposed on the smart card that are visible at a surface of the receptacle when the receptacle is coupled to the smart card.

Embodiment 202

The device of embodiment 201, wherein the receptacle comprises graphic elements associating each of the light sources disposed on the smart card with at least one of the finger guide channels.

Embodiment 203

The device of embodiment 201, wherein the receptacle comprises light pipes configured to transmit light from each of the light sources disposed on the smart card to a surface location on the receptacle associated with at least one of the finger guide channels.

Embodiment 204

The device of embodiment 201, wherein the receptacle comprises a photo detect circuit configured to detect light from each of the light sources disposed on the smart card and to activate a status indicator on the receptacle that is associated with at least one of the finger guide channels.

Embodiment 205

The device of any one of embodiments 192 to 204, wherein the status indicators are powered by the power element when the receptacle is coupled to the smart card, and wherein the receptacle includes a switch configured to close a power circuit from the power element to the status indicators when the receptacle is coupled to the smart card and to open the power circuit from the power element to the status indicators when the receptacle is uncoupled from the smart card.

Embodiment 206

The device of any one of embodiments 192 to 205, further comprising a detector circuit configured to detect a signal from the smart card to activate the status indicators.

Embodiment 207

The device of any one of embodiments 192 to 206, wherein the receptacle comprises an injection molded plastic.

Embodiment 208

The device of any one of embodiments 192 to 197, wherein device is unable to transmit data between the device and any device other than the smart card.

Embodiment 209

A method for enrolling a fingerprint template on a smart card having a fingerprint sensor, the method comprising:
A. transmitting power to the smart card from a power source removably coupled to the smart card, the power source including a power element that provides power to the fingerprint sensor and a finger guide comprising two or more finger guide channels positioned adjacent to the fingerprint sensor of the smart card when the power source is coupled to the smart card, and wherein each finger guide channel is configured to position a finger placed thereon to contact the fingerprint sensor at a different orientation; and
B. during step A, instructing the user with respect to the placement and removal of the user's finger with respect to each finger guide channel with a status indicator associated with the finger guide channel.

Embodiment 210

The method of claim 209, wherein the status indicators comprise light sources disposed on the power source, and step B comprises selectively changing the light status of each light source to instruct the user to place the finger on or remove the finger from the associated finger guide channel.

Embodiment 211

The method of embodiment 209 or embodiment 210, wherein the status indicators comprise light sources disposed on the smart card which are visible to the user, and step B comprises providing graphic elements on a surface of the power source instructing the user to place the finger on or remove the finger from a finger guide channel based on an illumination status of the associated light source.

Embodiment 212

The method of any one of embodiments 209 to 211, wherein the status indicators comprise light sources disposed on the smart card, and step B comprises transmitting light from each of the light sources disposed on the smart card to a surface location on the power source associated with at least one of the finger guide channels.

Embodiment 213

The method of any one of embodiments 209 to 212, wherein the status indicators comprise light sources disposed on the smart card, and step B comprises detecting light from each of the light sources disposed on the smart card and activating a status indicator on the receptacle that is associated with at least one of the finger guide channels.

Embodiment 214

The method of any one of embodiments 209 to 213, further comprising, during step B:
generating two or more fingerprint images with the fingerprint sensor by instructing a user to contact the fingerprint sensor by placing the same finger on each of the two or more finger guide channels of the finger guide to position the finger placed thereon in a different orientation with respect to the fingerprint sensor;
deriving at least one verification template of fingerprint data from the two or more fingerprint images; and
storing the verification template.

Embodiment 215

The method of any one of embodiments 209 to 214, comprising causing the fingerprint sensor to operate in an enrollment mode when power is transmitted to the fingerprint sensor during step A combined with the occurrence of a trigger event.

Embodiment 216

The method of embodiment 215, wherein the trigger even comprises one or more trigger events selected from the group consisting of:
a. user interactions with the fingerprint sensor;
b. placing a detectable object on the fingerprint sensor;
c. removing a detectable object from the fingerprint sensor;
d. detecting the absence of a stored verification template;
e. detecting the presence of a stored verification template that is partially complete;

f. detecting that power is being transmitted to the smart card for the first time;

g. detecting a specified instance of power being transmitted to the smart card;

h. detecting that a maximum number of unsuccessful attempts to derive a verification template has not been reached;

i. activating an input mechanism;

j. detecting that a timer or counter has not expired;

k. detecting the occurrence of an error state indicating that a recoverable error has occurred to prevent successful derivation or storing of a verification template;

l. detection of a flag set the last time the smart card was inserted in a card reader that transmits data to or from the smart card;

m. detecting that the smart card has been connected to a power source that does not transmit data to or from the smart card;

n. detection of a trigger event by a component of the smart card other than the fingerprint sensor; and o. detecting that a particular smart card has been coupled to a particular device.

Embodiment 217

The method of embodiment 215, further comprising automatically terminating enrollment mode in the fingerprint sensor upon terminating power transmission to the smart card.

Embodiment 218

The method of embodiment 215, further comprising providing a confirming indication that the fingerprint sensor is operating in enrollment mode.

Embodiment 219

The method of embodiment 214, further comprising activating one or more status indicators confirming that the verification template is stored.

Embodiment 220

The method of any one of embodiments 209 to 219, wherein during step B, the status indicators are selectively changed in a sequence that includes all of the finger guide channels, moving from one finger guide channel to another after an acceptable image has been gathered at the previous finger guide channel.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method for enrolling a fingerprint template on a smart card having a processor, a data storage element, and fingerprint sensor, the method comprising:

temporarily attaching a data input device to the smart card;

connecting the smart card to a power source;

detecting an activation code entered by a user interacting with the data input device;

comparing the detected activation code with a predefined activation code stored in the data storage element;

if the detected activation code matches the predefined activation code, enrolling a fingerprint template from fingerprint data received from the fingerprint sensor; and after enrolling the fingerprint template, removing the smart card from the data input device and the power source, wherein the detecting step, the comparing step, and the enrolling step are performed by the processor without transmitting data from either the power source or the data input device to any device other than the smart card.

2. The method of claim 1, further comprising providing the predefined activation code to the user separately from the data input device.

3. The method of claim 2, wherein providing the predefined activation code comprises transmitting the predefined activation code to the user by one of telephone, text message, and on-line download.

4. The method of claim 1, wherein the fingerprint sensor comprises a two-dimensional array of sensor elements, and the data input device comprises two or more keys, each key being operatively associated with a different spatially-distinct data input region of the array.

5. The method of claim 1, wherein the fingerprint sensor comprises a two-dimensional array of sensor elements, and the detecting step comprises detecting activation of different spatially distinct regions of the array of sensor elements via the user interacting with the data input device.

6. The method of claim 1, further comprising enabling a user to enter the activation code into the fingerprint sensor by interacting with each of two or more distinct portions of the fingerprint sensor, wherein each of the two or more distinct portions of the fingerprint sensor corresponds to a uniquely-identifiable portion of the activation code.

7. A system comprising;

a smart card comprising a fingerprint sensor for authenticating a user of the smart card;

a data storage element integrated with the smart card and storing an activation code;

a data input device temporarily coupled to the smart card;

a power source coupled to the smart card; and a processor integrated with the smart card and configured to translate a code input by a user interacting with the data input device and to compare the code input by the user with the stored activation code, and to enroll a fingerprint template from fingerprint data received from the fingerprint sensor if the detected activation code matches the stored activation code, wherein neither the power source nor the data input device is able to transmit data to any device other than the smart card.

8. The system of claim 7, wherein the data input device and the power source are disposed on a common support element.

9. The system of claim 8, wherein the common support element comprises an overlay configured to be secured to a surface of the smart card.

10. The system of claim 8, wherein the common support element comprise a sleeve, and wherein sleeve is configured to receive the smart card inserted therein.

11. The system of claim 7, wherein the data input device is coupled to the fingerprint sensor.

12. The system of claim 11, wherein the fingerprint sensor comprises a two-dimensional array of sensor elements, and the data input device comprises two or more keys, each key being operatively associated with a different spatially-distinct data input region of the array.

13. The system of claim 11, wherein the fingerprint sensor comprises a two-dimensional array of sensor elements, and the data input device comprises an overlay placed over the array with two or more holes, each hole defining a data input key through which the user may contact a spatially distinct control area of the array.

14. The system of claim 7, wherein the power source comprises a battery supported on a receptacle, and wherein the receptacle includes a slot configured to receive a portion of the smart card inserted therein to couple the smart card to the battery.

15. The system of claim 7, further comprising a status indicator, wherein the status indicator provides an indication to the user regarding enrolment of the fingerprint template.

16. The system of claim 15, wherein the status indicator is an LED, a screen, or a sound emitting unit.

* * * * *